United States Patent
Hendrix et al.

(10) Patent No.: US 12,060,172 B2
(45) Date of Patent: Aug. 13, 2024

(54) SPACE OBJECT ALERT MANAGEMENT AND USER INTERFACES

(71) Applicant: ExoAnalytic Solutions, Inc., Foothill Ranch, CA (US)

(72) Inventors: Douglas Lee Hendrix, Ladera Ranch, CA (US); William Alexander Therien, Upland, CA (US)

(73) Assignee: ExoAnalytic Solutions, Inc., Foothill Ranch, CA (US)

( * ) Notice: Subject to any disclaimer, the term of this patent is extended or adjusted under 35 U.S.C. 154(b) by 0 days.

(21) Appl. No.: 18/352,997

(22) Filed: Jul. 14, 2023

(65) Prior Publication Data

US 2024/0034487 A1 Feb. 1, 2024

Related U.S. Application Data

(60) Provisional application No. 63/410,163, filed on Sep. 26, 2022, provisional application No. 63/393,705, filed on Jul. 29, 2022.

(51) Int. Cl.
*B64G 3/00* (2006.01)
*G06T 3/40* (2006.01)
(Continued)

(52) U.S. Cl.
CPC ............... *B64G 3/00* (2013.01); *G06T 3/40* (2013.01); *G06T 3/60* (2013.01); *G06T 7/20* (2013.01);
(Continued)

(58) Field of Classification Search
CPC .... B64G 3/00; G06V 10/761; G06V 2201/07; G06T 3/40; G06T 3/60; G06T 7/20
(Continued)

(56) References Cited

U.S. PATENT DOCUMENTS

| 3,303,582 A | 2/1967 | Farquhar |
| 3,624,650 A | 11/1971 | Paine |

(Continued)

FOREIGN PATENT DOCUMENTS

| EP | 0886392 A2 | 12/1998 |
| EP | 3002552 A1 | 4/2016 |

(Continued)

OTHER PUBLICATIONS

Ackermann et al., "A systematic examination of ground-based and space-based approaches to optical detection and tracking of satellites", Sandia National Lab. (SNL-NM), Albuquerque, NM; May 1, 2015: 46 pages.

(Continued)

*Primary Examiner* — Tiffany P Young
(74) *Attorney, Agent, or Firm* — Knobbe, Martens, Olson & Bear, LLP

(57) ABSTRACT

A display system can be configured to identify a space object and an object alert associated with a change in one or more movement parameters of the space object. The system can generate data configured to display a display region and an object alert indicator within the display region. The system can display the object alert indicator at a location within the display region and display, within a second display region, a listing of a plurality of alerts comprising the object alert. The system can receive a user selection of an alert from the plurality of alerts configured to be displayed in the second display region and automatically generate updated data configured to display an updated display region based on the user selection of the alert. The updated display region can include a panned, rotated, and/or zoomed perspective of the display region.

23 Claims, 64 Drawing Sheets

(51) Int. Cl.
*G06T 3/60* (2006.01)
*G06T 7/20* (2017.01)
*G06V 10/74* (2022.01)

(52) U.S. Cl.
CPC ........ *G06V 10/761* (2022.01); *G06V 2201/07* (2022.01)

(58) Field of Classification Search
USPC ...................................................... 701/531
See application file for complete search history.

(56) References Cited

U.S. PATENT DOCUMENTS

| | | |
|---|---|---|
| 3,676,581 A | 7/1972 | Swet |
| 4,355,311 A | 10/1982 | Frosch et al. |
| 4,602,257 A | 7/1986 | Grisham |
| 4,617,634 A | 10/1986 | Izumida et al. |
| 4,727,373 A | 2/1988 | Hoover |
| 4,746,976 A | 5/1988 | Kamel et al. |
| 4,943,808 A | 7/1990 | Dulck et al. |
| 5,051,749 A | 9/1991 | Stoyle |
| 5,133,050 A | 7/1992 | George et al. |
| 5,436,632 A | 7/1995 | Sheynblat |
| 5,512,743 A | 4/1996 | Shaffer et al. |
| 5,557,524 A | 9/1996 | Maki |
| 5,570,096 A | 10/1996 | Knight et al. |
| 5,574,465 A | 11/1996 | Okada |
| 5,677,693 A | 10/1997 | Frankot et al. |
| 5,678,175 A | 10/1997 | Stuart et al. |
| 5,701,678 A | 12/1997 | Wang |
| 5,812,932 A | 9/1998 | Wiedeman et al. |
| 5,935,195 A | 8/1999 | Quine |
| 5,979,832 A | 11/1999 | Draim |
| 6,172,747 B1 | 1/2001 | Houlberg |
| 6,182,114 B1 | 1/2001 | Yap et al. |
| 6,304,212 B1 | 10/2001 | Aoki et al. |
| 6,330,988 B1 | 12/2001 | Liu et al. |
| 6,353,794 B1 | 3/2002 | Davis et al. |
| 6,452,532 B1 | 9/2002 | Grisham |
| 6,538,674 B1 | 3/2003 | Shibata et al. |
| 6,690,934 B1 | 2/2004 | Conrad et al. |
| 6,868,316 B1 | 3/2005 | Stevens |
| 7,369,809 B1 | 5/2008 | Wang |
| 7,477,991 B2 | 1/2009 | Cross et al. |
| 7,777,666 B2 | 8/2010 | Gregory et al. |
| 7,953,553 B2 | 5/2011 | Choi |
| 8,160,400 B2 | 4/2012 | Snavely et al. |
| 8,218,013 B1 | 7/2012 | Ellis et al. |
| 8,275,883 B2 | 9/2012 | Snoddy et al. |
| 8,340,423 B1 | 12/2012 | Zelinka et al. |
| 8,401,276 B1 | 3/2013 | Choe et al. |
| 8,401,307 B1 | 3/2013 | Rowe et al. |
| 8,447,071 B2 | 4/2013 | Ohta |
| 8,463,071 B2 | 6/2013 | Snavely et al. |
| 8,498,481 B2 | 7/2013 | Blake et al. |
| 8,645,429 B1 | 2/2014 | Bik et al. |
| 8,718,373 B2 | 5/2014 | Mendis |
| 8,744,214 B2 | 6/2014 | Snavely et al. |
| 8,886,446 B1 | 11/2014 | Baiada et al. |
| 8,942,483 B2 | 1/2015 | Janky et al. |
| 8,989,434 B1 | 3/2015 | Reinhardt et al. |
| 8,989,502 B2 | 3/2015 | Janky et al. |
| 9,025,810 B1 | 5/2015 | Reinhardt et al. |
| 9,042,657 B2 | 5/2015 | Janky et al. |
| 9,324,003 B2 | 4/2016 | France et al. |
| 9,344,182 B2 | 5/2016 | Bigras et al. |
| 9,471,986 B2 | 10/2016 | Janky et al. |
| 9,547,935 B2 | 1/2017 | Haglund et al. |
| 9,569,667 B1 | 2/2017 | Forkert |
| 9,658,073 B2 | 5/2017 | Hindman |
| 9,667,948 B2 | 5/2017 | Wang et al. |
| 9,727,976 B1 | 8/2017 | Perkins et al. |
| 9,819,410 B1 | 11/2017 | Azevedo et al. |
| 9,842,256 B2 | 12/2017 | Krauss |
| 9,857,960 B1 | 1/2018 | Dennis et al. |
| 9,927,513 B2 | 3/2018 | Benninghofen et al. |
| 9,934,453 B2 | 4/2018 | Hammoud et al. |
| 9,990,750 B1 | 5/2018 | Reinhardt et al. |
| 10,115,186 B2 | 10/2018 | Komatsu |
| 10,242,578 B2 | 3/2019 | Mellema et al. |
| 10,402,672 B1 | 9/2019 | Hendrix et al. |
| 10,407,191 B1 | 9/2019 | Hendrix et al. |
| 10,416,862 B1 | 9/2019 | Hendrix et al. |
| 10,452,223 B2 | 10/2019 | Keondjian et al. |
| 10,467,783 B2 | 11/2019 | Hendrix et al. |
| 10,647,453 B2 | 5/2020 | Hendrix et al. |
| 10,657,738 B2 | 5/2020 | Bauchot et al. |
| 10,661,920 B2 | 5/2020 | Hendrix et al. |
| 10,740,609 B1 | 8/2020 | Shaddix et al. |
| 10,835,803 B2 | 11/2020 | Okur et al. |
| 10,976,911 B2 | 4/2021 | Hendrix et al. |
| 11,280,194 B2 | 3/2022 | Sercel |
| 11,402,986 B2 | 8/2022 | Hendrix et al. |
| 11,506,773 B1 | 11/2022 | Everett et al. |
| 11,643,930 B2 | 5/2023 | Sercel |
| 11,748,897 B1 | 9/2023 | Burgoyne et al. |
| 2001/0036293 A1 | 11/2001 | Laumeyer et al. |
| 2002/0047798 A1 | 4/2002 | Platt |
| 2004/0152471 A1 | 8/2004 | MacDonald et al. |
| 2005/0053309 A1 | 3/2005 | Szczuka et al. |
| 2006/0143142 A1 | 6/2006 | Vasilescu et al. |
| 2006/0251292 A1 | 11/2006 | Gokturk et al. |
| 2007/0110338 A1 | 5/2007 | Snavely et al. |
| 2007/0154067 A1 | 7/2007 | Laumeyer et al. |
| 2007/0292046 A1 | 12/2007 | Johnson |
| 2008/0007451 A1 | 1/2008 | De Maagt et al. |
| 2008/0033648 A1 | 2/2008 | Kelly et al. |
| 2008/0052638 A1 | 2/2008 | Frank et al. |
| 2008/0056538 A1 | 3/2008 | Frank |
| 2008/0059452 A1 | 3/2008 | Frank |
| 2008/0198221 A1 | 8/2008 | Liou |
| 2008/0229248 A1 | 9/2008 | Fagans et al. |
| 2009/0125221 A1 | 5/2009 | Estkowski et al. |
| 2009/0157730 A1 | 6/2009 | Huang |
| 2009/0225155 A1 | 9/2009 | Hirotani |
| 2009/0303110 A1 | 12/2009 | Gregory et al. |
| 2010/0118053 A1 | 5/2010 | Karp et al. |
| 2010/0245571 A1 | 9/2010 | De Voe |
| 2011/0064312 A1 | 3/2011 | Janky et al. |
| 2011/0196550 A1 | 8/2011 | Carrico et al. |
| 2011/0235923 A1 | 9/2011 | Weisenburger et al. |
| 2011/0246002 A1 | 10/2011 | Shavit |
| 2012/0113230 A1 | 5/2012 | Jin |
| 2012/0169734 A1 | 7/2012 | Snavely et al. |
| 2012/0169770 A1 | 7/2012 | Snavely et al. |
| 2012/0293678 A1 | 11/2012 | Morales et al. |
| 2012/0301039 A1 | 11/2012 | Maunder et al. |
| 2013/0159263 A1 | 6/2013 | Paffenroth et al. |
| 2013/0195362 A1 | 8/2013 | Janky et al. |
| 2013/0195363 A1 | 8/2013 | Janky et al. |
| 2013/0235071 A1 | 9/2013 | Ubillos et al. |
| 2013/0235074 A1 | 9/2013 | Cherna et al. |
| 2013/0238724 A1 | 9/2013 | Cunningham |
| 2013/0243250 A1 | 9/2013 | France et al. |
| 2013/0254666 A1 | 9/2013 | Snavely et al. |
| 2014/0072233 A1 | 3/2014 | Horwood |
| 2014/0074766 A1 | 3/2014 | Aristoff |
| 2014/0074767 A1 | 3/2014 | Horwood |
| 2014/0074768 A1 | 3/2014 | Horwood |
| 2014/0156411 A1 | 6/2014 | Murgai |
| 2015/0103078 A1 | 4/2015 | Dykes et al. |
| 2015/0170368 A1 | 6/2015 | Janky et al. |
| 2015/0260849 A1 | 9/2015 | Eastman |
| 2015/0266591 A1 | 9/2015 | Petillon |
| 2015/0269860 A1 | 9/2015 | Shaw et al. |
| 2015/0310627 A1 | 10/2015 | Moraites et al. |
| 2015/0353208 A1 | 12/2015 | Turner |
| 2016/0061598 A1 | 3/2016 | NcNair et al. |
| 2016/0188176 A1 | 6/2016 | Runnels |
| 2017/0046962 A1 | 2/2017 | Shipley et al. |
| 2017/0098181 A1 | 4/2017 | Herman et al. |
| 2017/0150060 A1 | 5/2017 | Herz |
| 2017/0192095 A1 | 7/2017 | Jobanputra et al. |
| 2017/0206643 A1 | 7/2017 | Weiss et al. |

(56) References Cited

U.S. PATENT DOCUMENTS

| | | |
|---|---|---|
| 2017/0278180 A1 | 9/2017 | Landry |
| 2017/0283094 A1 | 10/2017 | Ho |
| 2017/0287196 A1 | 10/2017 | Raeburn et al. |
| 2017/0365064 A1 | 12/2017 | Van 't Woud et al. |
| 2018/0011183 A1 | 1/2018 | Tuxen |
| 2018/0024250 A1 | 1/2018 | Nishi et al. |
| 2018/0041032 A1 | 2/2018 | Kumar et al. |
| 2018/0051914 A1 | 2/2018 | Sercel |
| 2018/0089506 A1 | 3/2018 | Taite et al. |
| 2018/0162558 A1 | 6/2018 | Chao et al. |
| 2018/0220107 A1 | 8/2018 | Williams |
| 2018/0232097 A1 | 8/2018 | Kneuper et al. |
| 2018/0268605 A1 | 9/2018 | Jia et al. |
| 2019/0050136 A1 | 2/2019 | Alfano et al. |
| 2019/0056856 A1 | 2/2019 | Simmons et al. |
| 2019/0210746 A1* | 7/2019 | Feconda ............... G01S 5/10 |
| 2019/0219026 A1 | 7/2019 | Sheldon-Coulson et al. |
| 2019/0263543 A1 | 8/2019 | Hendrix et al. |
| 2019/0265872 A1 | 8/2019 | Hendrix et al. |
| 2019/0266744 A1 | 8/2019 | Hendrix et al. |
| 2019/0266763 A1 | 8/2019 | Hendrix et al. |
| 2019/0266764 A1* | 8/2019 | Hendrix ............... G06T 11/206 |
| 2019/0266770 A1* | 8/2019 | Hendrix ............... G06F 18/40 |
| 2019/0304147 A1 | 10/2019 | Hendrix et al. |
| 2019/0315497 A1 | 10/2019 | Blomquiest |
| 2019/0325652 A1 | 10/2019 | Di et al. |
| 2020/0018844 A1 | 1/2020 | Fridman et al. |
| 2020/0240267 A1 | 7/2020 | Sercel et al. |
| 2021/0026524 A1* | 1/2021 | Hendrix ............. G06F 3/04845 |
| 2021/0033309 A1 | 2/2021 | Sercel |
| 2021/0333019 A1 | 10/2021 | Sercel et al. |
| 2021/0404419 A1 | 12/2021 | Sercel et al. |
| 2022/0024611 A1 | 1/2022 | Hendrix et al. |
| 2022/0024612 A1 | 1/2022 | Sercel et al. |
| 2022/0082019 A1 | 3/2022 | Sercel et al. |
| 2022/0089302 A1 | 3/2022 | Sercel et al. |
| 2022/0090500 A1 | 3/2022 | Sercel |
| 2022/0268524 A1 | 8/2022 | Small et al. |
| 2022/0274721 A1 | 9/2022 | Sercel et al. |
| 2022/0369308 A1 | 11/2022 | Hendrix et al. |

FOREIGN PATENT DOCUMENTS

| | | |
|---|---|---|
| WO | WO 2008/112708 A2 | 9/2008 |
| WO | WO 2010/061448 A1 | 6/2010 |
| WO | WO 2021/041918 A1 | 3/2021 |
| WO | WO 2021/252087 A2 | 12/2021 |

OTHER PUBLICATIONS

ASTROROMP.com, "Comparison between LX90GPS and LX200GPS", Observationis and use; Undated, 3 pages.

BISQUE.com, "The SkyX Professional Edition—Software", (Jun. 2019), 2 pages.

Celestron Engineering Team, "The Celestron® EdgeHD™—A Flexible Imaging Platform", (Apr. 2013); 6 pages.

Clark R.N., "Spectroscopy of Rocks and Minerals, and Principles of Spectroscopy". In Manual ofRemote Sensing, vol. 3, Remote Sensing for the Earth Sciences, [Rencz A.N. Ed.], John Wiley & Sons, NY, (1999), pp. 3-58.

Cunio, P. M., et al., 'Photometric and Other Analyses of Energetic Events Related to 2017 GEO RSO Anomalies', in Proceedings of the Advanced Maui Optical and Space Surveillance (AMOS) Technologies Conference, Sep. 19-22, 2017 [Retrieved from the internet on Oct. 13, 2020]; <URL: https://amostech.com/TechnicalPapers/2017/Poster/Conio.pdf> in 15 pages.

Cunio, P. M., et al., Advanced Debris Analysis Techniques Enabled by Rich Persistent Datasets, Jan. 16, 2018, Space Traffic Management Conference [Retrieved from internet on Jun. 11, 2019] <URL: https://commons.erau.edu/stm/2018/presentations/16>, in 18 pages.

Diffraction Limited, MaxIm DL Astronomical Imaging Software by Cyanogen Imaging®, Product Advertisement/Specification; 3 pages.

Ecoanalytic Solutions, Demonstrates Value-added Service to Provide Direct Support to First Successful On-Orbit Servicing in Geosynchronous Orbit, Press Release Apr. 4, 2022; pp. 1-4.

Elenin et al., Remote Observatory ISON-NM. Survey of Minor Solar System Bodies, Asteroids, Comets, Meteors 2012. May 2012;1667: 6016.

European Space Agency, "ESA—Scanning and Observing", downloaded Aug. 11, 2023 in 6 pages.

European Space Agency, "ESA—Scanning and Observing—Continuation", Space Safety, downloaded Aug. 11, 2023 in 5 pages.

European Space Policy Institute [ESPI], Towards a European Approach to Space Traffic Management—Full Report, ESPI Vienna, Austria; Jan. 2020, pp. 1-81.

Faccenda W.J., "GEODSS: Past and Future Improvements", The Mitre Corporation (2000), 7 pages.

Flewelling et al., Formation Flying as Formalism for Space Traffic Management, AIAA SciTech Forum, Jan. 6-10, 2020, Orlando, FL. pp. 1-17.

Flury et al., "Searching for Small Debris in the Geostationary Ring", ESA Bulletin. Nov. 2000;104(November): 92-100.

Fors et al., "Telescope Fabra ROA Montsec: A new robotic wide-field Baker-Nunn facility", Pub Astonomical Society of the Pacific. May 14, 2013;125(927): 522 in 34 pages.

Green, Daniel W.E., Central Bureau for Astronomical Telegrams No. 2880; Oct. 31, 2011; downloaded from cbat.eps.harvard.edu/002800/CBET002880.txt; 1 page.

Hendrix D., "Multi-Spectral Countermeasure and Debris Identification and Mitigation Algorithm Suite", Phase 1 Final Report; (Aug. 2012), 2 pages.

Hendrix D., "Multi-Spectral Countermeasure and Debris Identification and Mitigation Algorithm Suite", Phase 2 Final Report; (Mar. 2015), 2 pages.

IEEE Transactions on Electron Devices, (Fay, P. Ed.), Listing of Conference Papers (Jan. 2003) Part 1; vol. 50, No. 1, 8 pages.

IEEE Transactions on Electron Devices, (Fay, P. Ed.), Listing of Conference Papers (Jan. 2003) Part 2; vol. 50, No. 1, 5 pages.

Ivezic et al., SDSS Standard Star Catalog for Stripe 82: the Dawn of Industrial 1% Optical Photometry. Publisher and location unknown; Mar. 7, 2007, 63 pages.

Johnson et al., Fundamental stellar photometry for standards of spectral type on the revised system of the Yerkes Spectral Atlas, Astrophysical J. May 1953;117: 313-352.

Keeptrack.space by ThKruz, Javascript application to view data about satellites and the sensors that track them, 2016 [ Viewed on internet on Jun. 11, 2019 ]< URL: https://keeptrack.space > and source code available at <URL: https://github.com/thkruz/keeptrack.space >; downloaded Jul. 15, 2019 in 3 pages.

Lal et al., Global trends in space situational awareness (SSA) and space traffic management (STM), IDA Science & Technology Policy Institute Document #D-9074, Apr. 2018; 153 pages.

Meade Catalog, company7.com, "Meade® 16" LX200GPS Schmidt-Cassegrain Telescope", Specification and Features; Undated: pp. 44-49.

National Renewable Energy Laboratory [NREL], "Solar Spectra: Standard Air Mass Zero—2000 ASTM Standard Extraterrestrial Spectrum Reference E-490-00", (Nov. 2003); 2 pages.

QSI Imaging.com, "Model 660 Camera Specification Sheet—Overview", (2023); 8 pages.

Rabotin C., NYX-SPACE 0.0.5: A high-fidelity space mission toolkit, with orbit propagation, estimation and some systems engineering Apache-2.0; 2018; downloaded from URL: <https://docs.rs/nyx-space/0.0.5/nyx_space/>; in 2 pages.

Russian Academy of Sciences (Keldysh Instiute of Applied Mathematics), "ISON activitis on highly eliptical orbit (HEO), geosynchronous orbit (GEO) and near-earth objects (NEO) observation and analysis in 2013", 51st Session of STSC Copuos, Vienna, Austria Feb. 10-21, 2014, presentation in 23 pages.

Schildknecht et al., "Challenges Related to Discovery, Follow-up, and Study of Small High Area-to-Mass Ratio Objects at Geo", Proceedings AMOS, (2007); 6 pages.

Sibert et al., "Collaborative Commercial Space Situational Awareness with ESpOC-Empowered Telescopes", Proceedings AMOS. Sep. 2013: 9 pages.

(56) References Cited

OTHER PUBLICATIONS

Simbad Astronomical Database—CDS (Strasbourg, France) Product Information Sheet; downloaded Aug. 11, 2023; [Wenger et al., 2000]; 2 pages.
Slatton et al., Methods of Processing Geosynchronous Breakups. Advanced Maui Optical and Space Surveillance Technologies Conference (AMOS), May 31, 2018 in 9 pages.
Starizona (Adventure in Astronomy & Nature), "HyperStar Specifications", Mar. 2017, 2 pages.
Stuffin.space by jeyoder, Javascript application: A real-time interactive WebGL visualisation of objects in Earth orbit, 2015 [ Viewed on internet on Jun. 11, 2019 ]< URL: http://stuffin.space > and source code available at <URL: https://github.com/jeyoder/ThingsInSpace >; downloaded Jul. 15, 2019 in 13 pages.
U.S. Air Force, "Ground-Based Electro-Optical Deep Space Surveillance", A GEODSS Sourcebook, Oct. 19, 2008 version; 117 pages.
U.S. Naval Observatory, Astrometry Department, Star Catalogs, Apr. 25, 2017, 1 page.
Vallado D.A., Fundamentals of Astrodynamics and Applications, 4th Edition, Space Technology Library, Microcosm Press, Hawthorne, CA; 2013; Cover and Table of Contents, pp. 1-21.
Wenger et al., "The SIMBAD astronomical database—The CDS reference database for astronomical objects", Astronomy and Astrophysics Supplement Series. Apr. 1, 2000;143(1): 9-22.
Woffinden, D.C., et al., "Navigating the Road to Autonomous Orbit Rendezvous", J Spacecraft Rockets. (2007) 44(4): 898-909.
ZEMAX—An Ansys Company, "Products made with Zemax define our world", Product Website downloaded Aug. 11, 2023; 9 pages.
Co-Pending Applications of Assignee—Statement dated May 21, 2019 regarding commonly owned applications of Applicant, in 1 page.
International Search Report and Written Opinion dated Jun. 11, 2019 for corresponding PCT/US2019/019026, filed Feb. 21, 2019.
International Search Report and Written Opinion dated Oct. 21, 2020 for corresponding PCT/US2020/043506, filed Jul. 24, 2020.
U.S. Appl. No. 16/280,967, Visualization Interfaces for Real-Time Identification, Tracking, and Prediction of Space Objects, filed Feb. 20, 2019.
U.S. Appl. No. 16/283,276, Systems and Synchronized Visualization Interfaces for Tracking Space Objects, filed Feb. 22, 2019.
U.S. Appl. No. 16/283,164, Systems and Tagging Interfaces for Identification of Space Objects, filed Feb. 22, 2019.
U.S. Appl. No. 16/283,564, Systems and Visualization Interfaces for Display of Space Object Imagery, filed Feb. 22, 2019.
U.S. Appl. No. 16/283,522, Systems and Tagging Interfaces for Identification of Space Objects, filed Feb. 22, 2019.
U.S. Appl. No. 16/283,548, Systems and Visualization Interfaces for Display of Space Object Imagery, filed Feb. 22, 2019.
U.S. Appl. No. 16/283,543, Systems and Visualization Interfaces for Identification and Display of Space Object Imagery, filed Feb. 22, 2019.
U.S. Appl. No. 16/283,467, Systems and Visual Interfaces for Real-Time Orbital Determination of Space Objects, filed Feb. 22, 2019.
PCT/US2019/019026, Visualization Interfaces for Real-Time Identification, Tracking, and Prediction of Space Objects, Feb. 21, 2019.

* cited by examiner

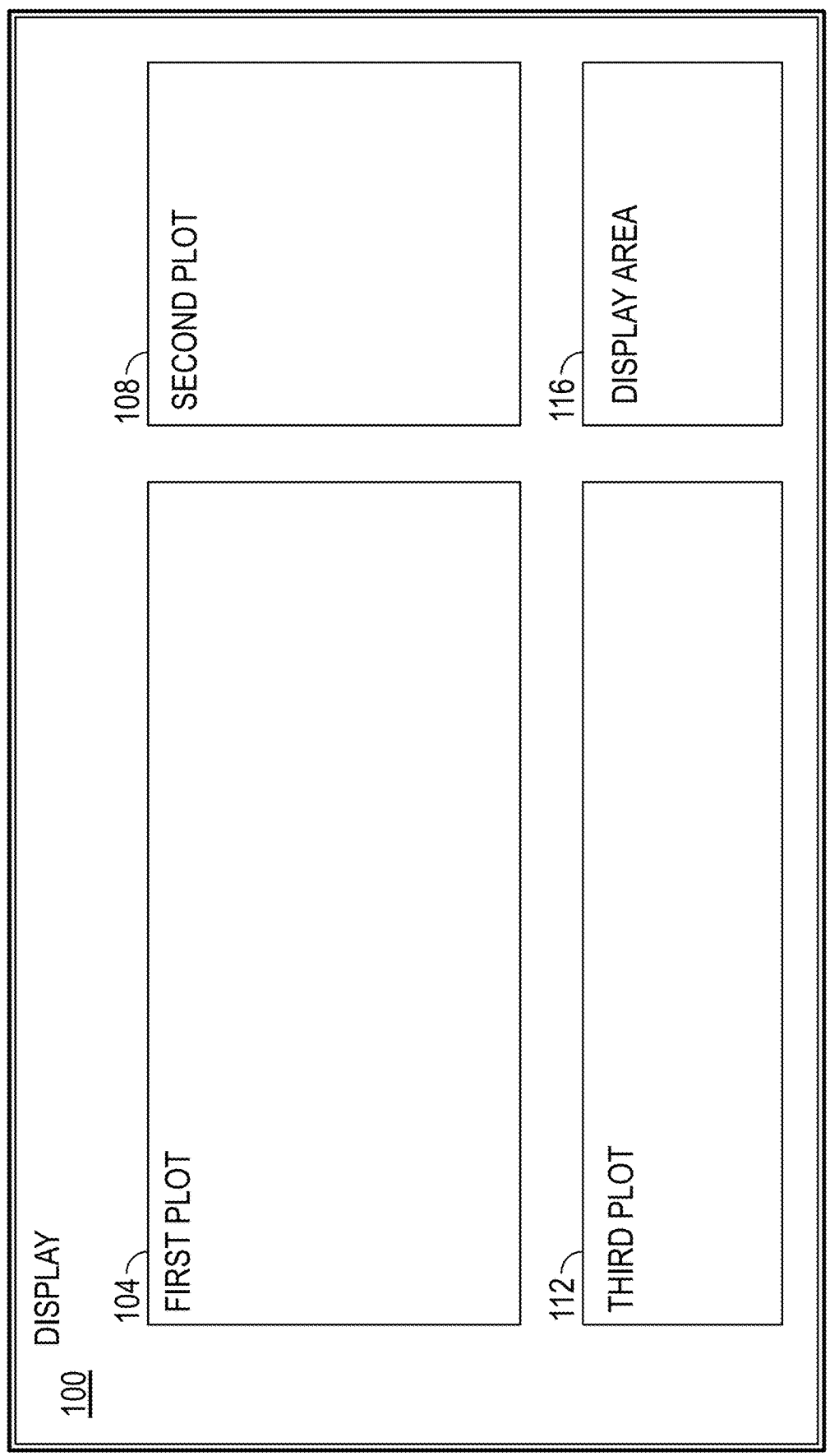

SPACE OBJECT ALERT MANAGEMENT AND USER INTERFACES

INCORPORATION BY REFERENCE OF RELATED APPLICATIONS

This application is claims the benefit under 35 U.S.C. § 119(e) of U.S. Provisional Patent Application Nos. 63/393,705, filed Jul. 29, 2022, and 63/410,163, filed Sep. 26, 2022. The entire contents of these applications are incorporated by reference herein and are made a part of this specification.

BACKGROUND

Field

This disclosure relates generally to tracking space objects such as satellites and visual interfaces and computer configurations used in such tracking.

Description of Related Art

Visualization interfaces can be used to allow a user to view, manipulate, and adjust data representing tracked orbital objects (e.g., satellites). Tracking orbital objects involves taking in an amount of data and incorporating that data into a workable and usable interface.

Tracking orbital objects may be done using photographs of objects in space and tracking their positions using a plurality of photographs. Visualization systems have been developed in various fields that provide some functionality with regard to portraying various information. However, many features are lacking and many problems exist in the art for which this application provides solutions.

SUMMARY

Example embodiments described herein have innovative features, no single one of which is indispensable or solely responsible for their desirable attributes. Without limiting the scope of the claims, some of the advantageous features will now be summarized.

In some embodiments, a system for determining and displaying path parameters can include a display interface. The display interface can be configured to receive, via a user interface, a first identifier associated with a first space object and determine a first maneuver of the first space object. The first maneuver can include a perturbation of the path of the first space object. Based on the first identifier and the first maneuver, the display system can identify one or more path parameters associated with a path of the first space object and generate a display interface. The display interface can include a longitude-time graph having a longitude axis spanning from a lower-longitude limit to an upper-longitude limit and a time axis spanning from the lower-time limit to the upper-time limit and an indication of the one or more path parameters.

BRIEF DESCRIPTION OF THE DRAWINGS

The following drawings and the associated descriptions are provided to illustrate embodiments of the present disclosure and do not limit the scope of the claims.

FIG. 1B shows a schematic of an example visualization display.

FIG. 7 shows the same view as FIG. 6 after the first longitude axis and the synchronized second longitude axis have been zoomed in.

FIG. 8 shows the same view as FIG. 7 after the first time axis and the synchronized second time axis have been zoomed in.

Figure 1A:
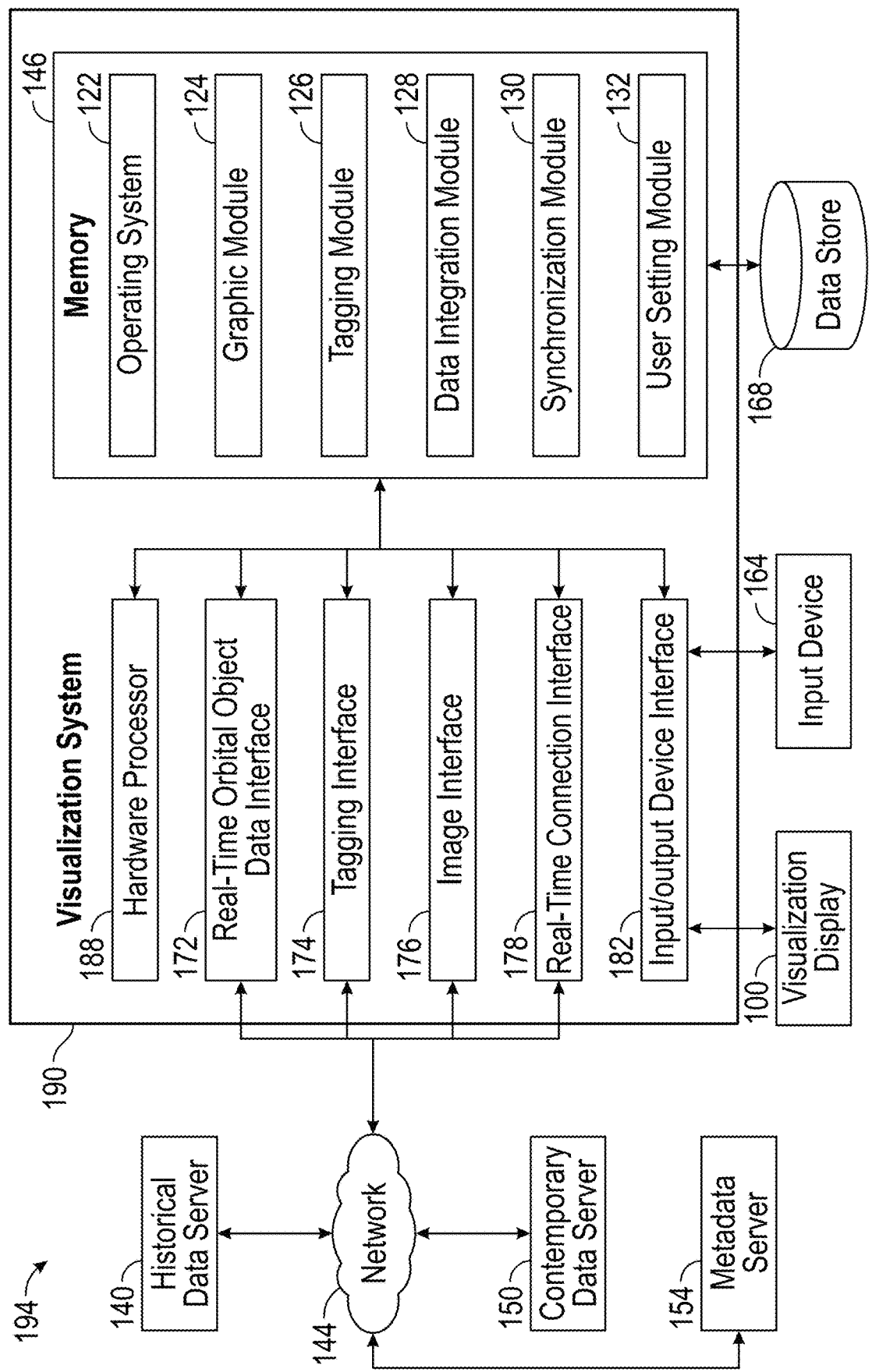
FIG. 1A schematically shows a network configuration that allows for the passing of data to a visualization system.

These and other features will now be described with reference to the drawings summarized above. The drawings and the associated descriptions are provided to illustrate embodiments and not to limit the scope of any claim. Throughout the drawings, reference numbers may be reused to indicate correspondence between referenced elements. In addition, where applicable, the first one or two digits of a reference numeral for an element can frequently indicate the figure number in which the element first appears.

DETAILED DESCRIPTION

Although certain embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Described herein are methodologies and related systems for visualizing data (e.g., tracks, orbits, photographs, measurements, maneuvers, transfer actions, etc.) from tracked satellites and other space objects. It will be understood that although the description herein is in the context of satellites, one or more features of the present disclosure can also be implemented in tracking objects other than satellites like, for example, aircraft, watercraft, projectiles, and other objects. Some embodiments of the methodologies and related systems disclosed herein can be used with various tracking systems, including, for example, those based on government databases.

Unless explicitly indicated otherwise, terms as used herein will be understood to imply their customary and ordinary meaning.

Disclosed herein are methods and systems relating generally to the tracking of objects in orbit (e.g., satellites), other space objects, and related systems and methods of providing an interactive user interface to interact with data related to the tracking of these objects. The information therein can be stored in one or more databases (e.g., as an ephemeris).

Tracking objects in orbit and other space objects can include receiving image data (e.g., photographs) of portions of the sky from one or more sensors, such as telescopes, positioned at various positions across the globe. For example, the data may be collected from a network of telescopes (e.g., over 300 telescopes) that includes telescopes on every populated continent. The photograph data can be used to map out the entirety or near entirety of the sky. Various altitudes above sea level may be tracked. The data can be tracked and processed in real-time. For example, a contemporary database may be configured to receive real-time image data. Images collected by the telescopes may be processed in situ with observations being received with a latency of less than about 1 minute and within about 15-30 seconds in some embodiments. A historical database may be configured to store data received before a threshold time. The threshold time may be a specified amount of time (e.g., years, months, days, etc.). Alternatively, the threshold time may refer to a time based on a user action. For example, the historical database may be configured to store data received before a user causes the system to display the user interface. Using an algorithm, the received data may be consolidated and categorized. For example, the algorithm may be configured to determine whether objects that appear in a plurality of photographs correspond to the same object over time and space. A gap in exposure of certain objects may be small. For example, a mean solar exclusion gap may be less than about 7 hours and may be about 6 hours in some embodiments.

FIG. 1A is an example network configuration 194 for a visualization system 190. The architecture of the visualization system 190 can include an arrangement of computer hardware and software components used to implement aspects of the present disclosure. The visualization system 190 may include more or fewer elements than those shown in FIG. 1A. It is not necessary, however, that all of these elements be shown in order to provide an enabling disclosure. In some embodiments, the visualization system 190 is an example of what may be referred to under different names.

As illustrated, the visualization system 190 can include a hardware processor 188, a memory 146, a real-time orbital object data interface 172, a tagging interface 174, a image interface 176, a real-time connection interface 178, and/or an real-time connection interface 178, each of which can communicate with one another by way of a communication bus 142 or any other data communication technique. The hardware processor 188 can read and write to the memory 146 and can provide output information for the visualization display 100. The real-time orbital object data interface 172, tagging interface 174, image interface 176, and/or real-time connection interface 178 can be configured to accept input from an input device 164, such as a keyboard, mouse, digital pen, microphone, touch screen, gesture recognition system, voice recognition system, and/or another input device capable of receiving user input. In some embodiments, the visualization display 100 and the input device 164 can have the same form factor and share some resources, such as in a touch screen-enabled display.

In some embodiments, the real-time orbital object data interface 172, the tagging interface 174, the image interface 176, and/or the real-time connection interface 178 can be connected to a historical data server 140, a contemporary data server 150, and/or a metadata server 154 via one or more networks 144 (such as the Internet, 3G/Wi-Fi/LTE/5G networks, satellite networks, etc.). The real-time orbital object data interface 172 can receive graphical data information related to orbital objects via the network 144 (the network 144 can provide one-way communication or two-way communication). In some embodiments, the real-time orbital object data interface 172 may receive, where applicable, object data information or information that can be used for location determination (such as a cellular and/or Wi-Fi signal that can be used to triangulate a location) and determine the position of one or more objects.

The tagging interface 174 can receive tagging data from a user via the input/output device interface 182. The metadata server 154 can provide an application programming interface (API) that the tagging interface 174 can access via the network 144 (such as, for example, a 3G, Wi-Fi, LTE, or similar cellular network). The metadata server 154 may comprise data from one or more third-party providers. For example, the metadata server 154 may comprise government information (e.g., received from a United States Air Force satellite database). The image interface 176 may receive track information (such as, for example, an ordered list of known location coordinates) from a historical data server 140, contemporary data server 150, and/or metadata server 154 via the network 144. The track information can also include track-related information, such as photos, videos, or other data related to orbiting objects. In some embodiments, instead of receiving the track information over a network 144 from a historical data server 140, the system can receive such track information from a user via a computer-readable storage device, such as, for example, a USB thumb drive. The image interface 176 can also receive images (e.g., photographs, video) from a contemporary data server 150. In some embodiments, the map data can provide longitude, latitude, altitude information, and any other information related to orbiting objects.

The memory 146 can contain computer program instructions (grouped as modules or components in some embodiments) that the hardware processor 188 can execute in order to implement one or more embodiments described herein. The memory 146 can generally include RAM, ROM and/or other persistent, auxiliary or non-transitory computer-readable media. The memory 146 can store an operating system 122 that provides computer program instructions for use by the hardware processor 188 in the general administration and operation of the visualization system 190.

The memory 146 can include computer program instructions and other information for implementing aspects of the present disclosure including a graphic module 124, a tagging module 126, a data integration module 128, a synchronization module 130, a user settings module 132, other modules, and/or any combination of modules.

In some embodiment, the memory 146 may include the graphic module 124 that generates a track from the received ordered list of known locations using algorithms, such as interpolation or extrapolation algorithms. Additionally, the graphic module 124 may, in response to a user determination, alter the format (e.g., axes, labels, values) of the graphical display. Examples of functionality implemented by the graphic module 124 are more fully described, for example, with reference to FIGS. 1A-5.

In some embodiments, the memory 146 includes a tagging module 126 that the hardware processor 188 executes in order update, in response to a user action, aspects (e.g., metadata, values) of the underlying data. Accordingly, the tagging module 126 can provide data (e.g., updates) to the synchronization module 130. Examples of functionality implemented by the tagging module 126 are more fully described, for example, with reference to FIGS. 10A-10D. The data integration module 128 can correlate various data automatically or in response to a user input. For example, the data integration module 128 can combine data from the one or more servers (e.g., the historical data server 140, the contemporary data server 150, and the metadata server 154) that may be used for displaying on the visualization display 100. Examples of functionality implemented by the data integration module 128 are more fully described, for example, with reference to FIGS. 2-9.

In some embodiments, the memory 146 includes a synchronization module 130 that can be configured to correlate various aspects of data from the one or more servers. For example, the synchronization module 130 can be configured to synchronize the display of a data set on multiple graphs or to synchronize elements (e.g., axes, labels, dimensions, alignments, etc.) of one or more graphs of the visualization display 100. The synchronization module 130 can update data based on inputs from the tagging module 126 (such as stitched objects or elements), guidance parameters from the user settings module 132, and/or inputs from the data integration module 128. Examples of functionality implemented by the synchronization module 130 are more fully described, for example, with reference to FIGS. 2-9.

In some embodiments, the memory 146 includes a user settings module 132. The user settings module 132 can provide access to various user settings related to user preferences, including graph parameters, graph configurations (e.g., layout, orientation, formatting, etc.) and modes (e.g., display mode, tag mode, etc.). For example, the threshold values used for determination of the direction guidance mode may be accessed through the user settings module 132. In some instances, the user settings module 132 may provide connectivity to a data store 168 and access user settings from or store user settings to the data store 168. Examples of functionality implemented by the user settings module 132 are more fully described, for example, with reference to FIGS. 2-10D. In some embodiments, other interfaces and modules, such as the real-time orbital object data interface 172, the tagging interface 174, the image interface 176, real-time connection interface 178, and/or input/output device interface 182 may have access to the data store 168.

The historical data server 140 may communicate via the network 144 with a historical data interface. The historical data interface may include one or more of the real-time orbital object data interface 172, the tagging interface 174, the image interface 176, and the real-time connection interface 178. The historical data interface may be configured to receive historical data of objects in orbit around a planet from a historical data set. The historical data may comprise a time, a latitude, a longitude, a scalar, and/or an object identifier (e.g., name) for each object. The historical data can comprise data collected over a period of time greater than a threshold time (e.g., a year).

The amount of historical data can be unusually immense. For example, the amount of historical data may include billions of data identifiers derived from petabytes or even exabytes of photographic data. The historical data obtained may be increasing over time. Such an immense amount of data can cause serious challenges related to, for example, maintaining, sorting, extracting, transmitting, and/or displaying that data, particularly in a timely and organized fashion. This data may be supplemented from other databases (e.g., the metadata server 154), such as third-party databases. Such third-party databases may include government organizations, such as military groups (e.g., the United States Air Force), but may include private (e.g., commercial) sources additionally or alternatively.

The contemporary data server 150 may communicate via the network 144 with a real-time (e.g., contemporary) data interface configured to receive contemporary data of objects in orbit around a planet from a contemporary data set. The contemporary data may comprise a time, a latitude, a longitude, an object identifier, and/or a scalar for each object. The contemporary data may comprise data collected after the historical data available from the historical data set. The contemporary data may include data received within a few minutes or even seconds of a current time. The contemporary data may be data stored after a user has initiated a particular action, such as causing the system to generate a visualization display 100. In such a case, the system can be configured to update the visualization display 100 with pixels associated with the data collected after the generation of the visualization display 100.

FIG. 1B shows a schematic of an example visualization display 100. Such a visualization display 100 may operate within the network configuration 194 of FIG. 1A, for example. The visualization display 100 may be displayed on any type of digital display device, such as a desktop computer, a laptop computer, a projection-style device, a smartphone, a tablet, a wearable device, or any other display device. The visualization display 100 may include a first plot 104, a second plot 108, a third plot 112, and/or a display area 116.

The first plot 104 and second plot 108 may be displayed with similar (e.g., within a few pixels) vertical dimensions and/or similar vertical alignment. For example, the first plot 104 may be disposed directly left of the second plot 108. The third plot 112 may have similar vertical dimensions and/or similar vertical alignment as the display area 116. The first plot 104 may have similar horizontal dimensions and/or similar horizontal alignment as the third plot 112. In some embodiments, the second plot 108 may have similar horizontal dimensions and/or similar horizontal alignment as the display area 116. In some designs, the second plot 108 may include a tagging interface (e.g., a stitching and/or splicing interface).

Figure 2:
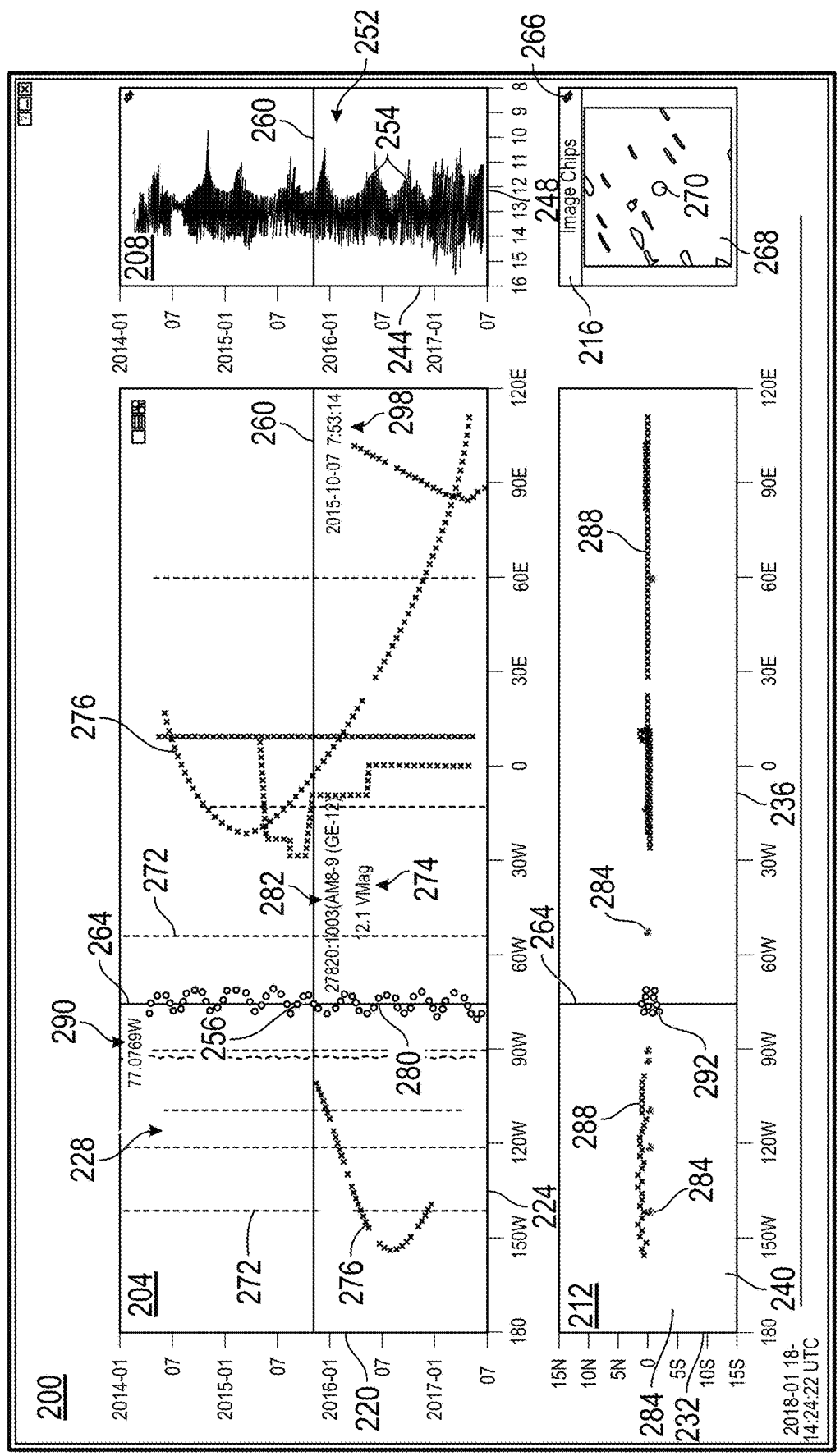
FIG. 2 shows an example visualization display with a longitude-time graph, scalar-time graph, a longitude-latitude graph, and a display area.
Figure 3:
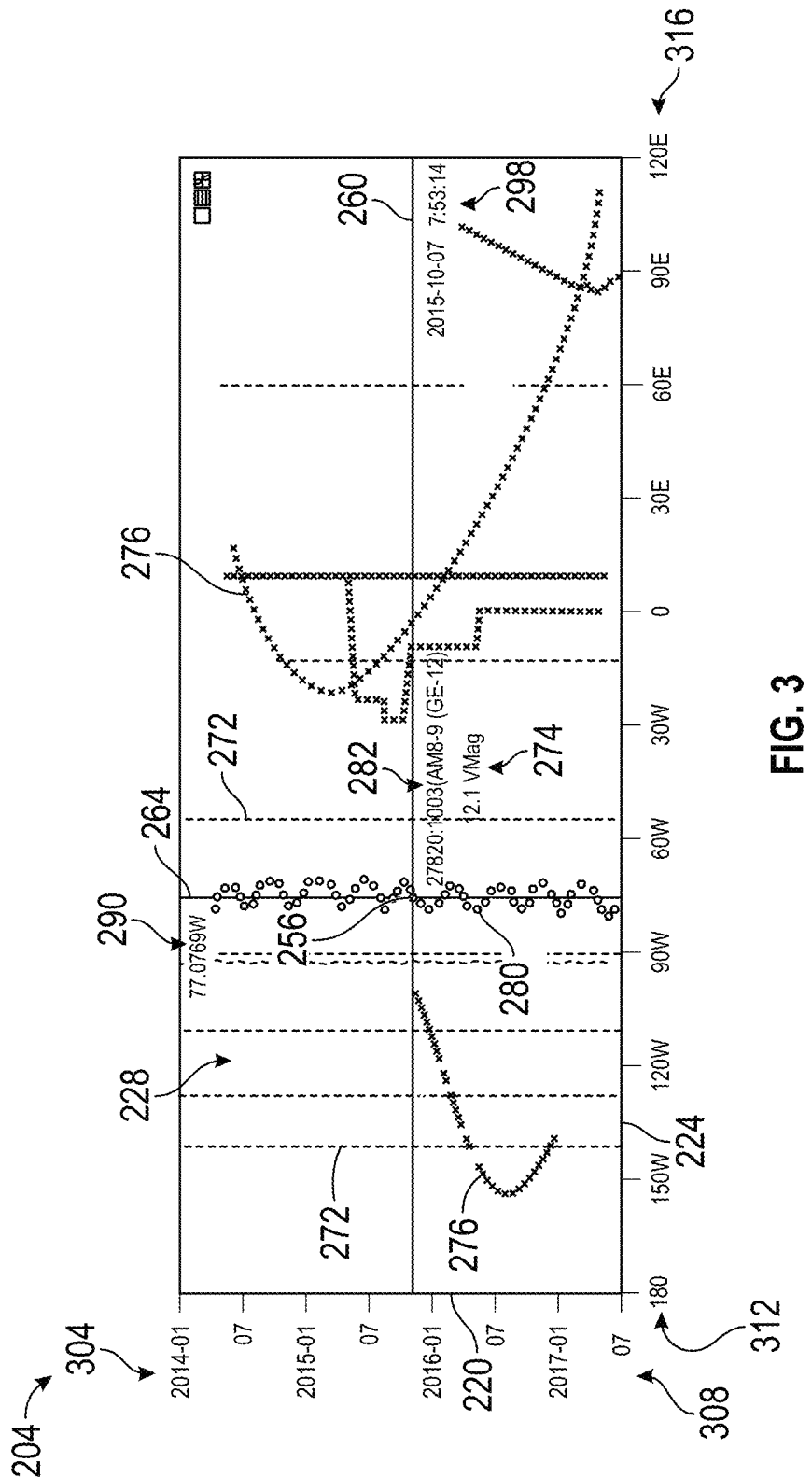
FIG. 3 shows a detail view of an example longitude-time graph that may be a part of the visualization display described in FIG. 2.
Figure 4:
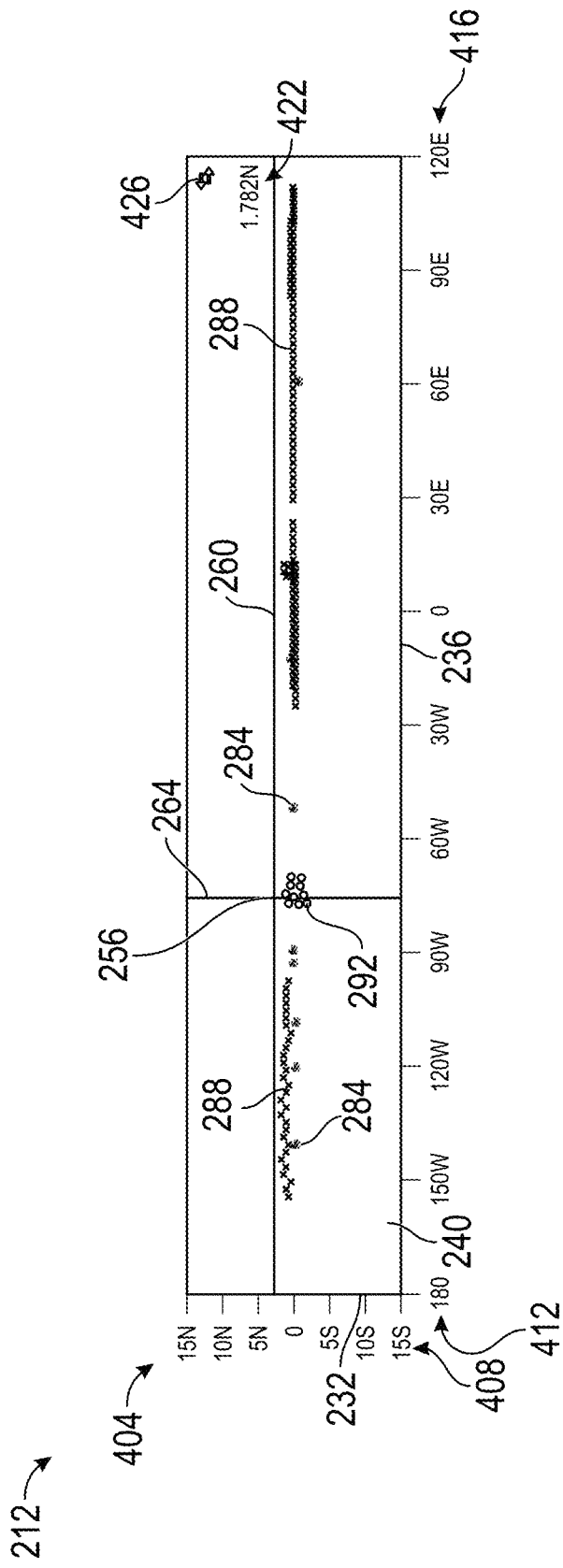
FIG. 4 shows a detail view of an example longitude-latitude graph that may be a part of the visualization display described in FIG. 2.
Figure 5:
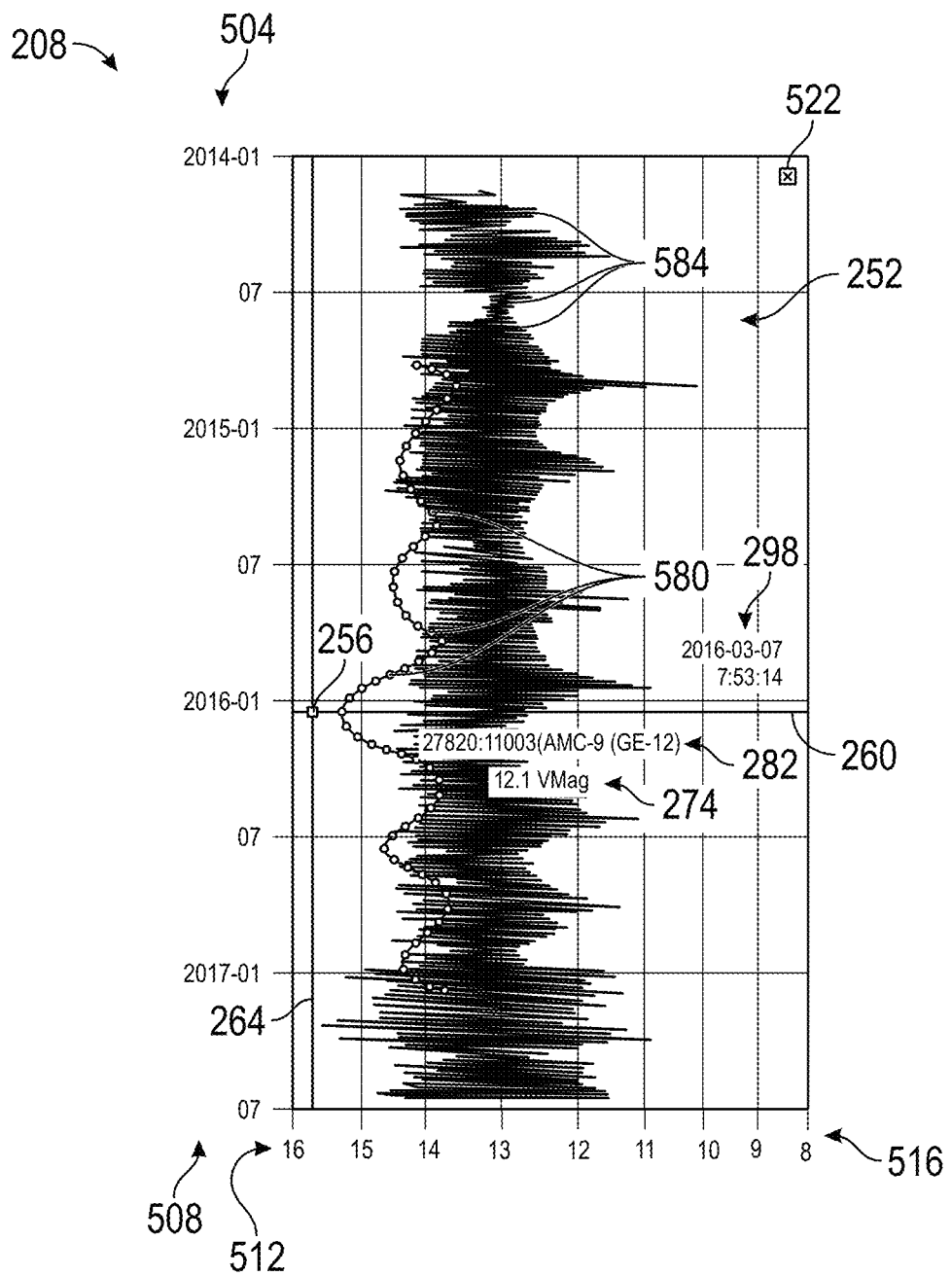
FIG. 5 shows a detail view of an example scalar-time graph that may be a part of the visualization display described in FIG. 2.

FIG. 2 shows an example visualization display 200 with a longitude-time graph 204, scalar-time graph 208, a longitude-latitude graph 212, and a display area 216. The visualization display 200 may correspond in some or all respects with the visualization display 100 of FIG. 1B. FIGS. 3-5 may provide further details related to one or more portions of FIG. 2.

The visualization display 200 can include a longitude-time graph area 228. In some embodiments, the longitude-time graph area 228 is bounded by a first longitude axis 224 and a first time axis 220. Each of the first longitude axis 224 and/or first time axis 220 can include one or more axis labels. In some designs, the axis labels of the first longitude axis 224 are not shown in relation to the longitude-time graph 204 but in relation only to, for example, the longitude-latitude graph 212 (see, e.g., FIGS. 10A-10D). The axis labels of the first longitude axis 224 and/or first time axis 220 may be equidistant from one another to portray equal intervals of the respective longitude or time. The first longitude axis 224 may span any portion of longitudes found on a planet (e.g., Earth). For Earth, the range may be from 180 W (e.g., 180° West or −180°) to 180 E (e.g., 180° East or +180°) or any range therein. For example, as shown in FIG. 2, the first longitude axis 224 spans from 180 W to 120 E. However, other ranges are possible, examples of which are described below. The first longitude axis 224 may run eastern-most to western-most from left to right (e.g., as shown in FIG. 2), but other configurations are possible.

The first time axis 220 may span any time from a historical time to nearly a current time of a user. For example, as shown by FIG. 2, the first time axis 220 may span from 2014 July (e.g., July 2014) to 2017 July (e.g., July 2017). The displayed time may correspond to a universal time, such as the coordinated universal time (UTC). Stored time values may similarly be in UTC. The latest time may be labeled "current time," "now," or a similar label and/or may indicate to a user that data from the most current time available are displayed. The most current time available may include time within a few seconds (e.g., 1-60 seconds) or a few minutes (e.g., 1-30 minutes) of a present time at which a viewer is observing the data. The first time axis 220 may span from a historical time from an earliest time when a database (e.g., a historical data server 140, a miscellaneous data server 154) has available data. The earliest time when the database has data may be as far back as the year 2010. In some embodiments, the historical data server 140, the contemporary data server 150, and/or the metadata server 154, may be configured to store some or all of the corresponding data in short-term memory storage (e.g., Random Access Memory (RAM)). The first time axis 220 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

Each axis label of the first longitude axis 224 and/or first time axis 220 may include gridlines. For example, the longitude-time graph 204 may include one or more horizontal gridlines 296 and/or vertical gridlines 294 (not shown in FIG. 2). The vertical gridlines 294 and horizontal gridlines 296 may aid a viewer in identifying a particular point within one or more of the graphs. To further aid a user in visualizing the orbital object information, in some embodiments, the longitude-time graph 204 may display a longitude-time map (not shown in FIG. 2). The longitude-time map may be a geographical map of a portion of the planet. For example, the longitude-time map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-time graph 204) may be superimposed over the geographic map (e.g., the longitude-time map).

The longitude-latitude graph 212 may include a longitude-latitude graph area 240 that is bounded by a second longitude axis 236 and a latitude axis 232. Each of the second longitude axis 236 and/or the latitude axis 232 can include one or more axis labels. The second longitude axis 236 and the first longitude axis 224 may be identical. For example, first longitude axis 224 may respond to a user input in the same way as the second longitude axis 236. In some embodiments, the axis labels of the second longitude axis 236 represent the values of the axis labels for the longitude-time graph 204. The axis labels of the second longitude axis 236 and/or the latitude axis 232 may be equidistant from one another to portray equal intervals of the respective longitude or latitude. Like the first longitude axis 224, the second longitude axis 236 may span any portion of longitudes found on the planet. For example, as shown in FIG. 2, the second longitude axis 236 spans from 180 W to 120 E. However, other ranges are possible Like the first longitude axis 224, the second longitude axis 236 may run eastern-most to western-most from left to right (e.g., as shown in FIG. 2), but other configurations are possible.

The latitude axis 232 may span any latitude found on the planet. For example, the latitude axis 232 may span from 90 S (e.g., 90° South) to 90 N (e.g., 90° North) or any range therein. For example, as shown in FIG. 2, the latitude axis 232 may range from 15 S (e.g., 15° South) to 15 N (e.g., 15° North). The latitude axis 232 may include axis labels that run western-most to eastern-most from left to right (e.g., as shown in FIG. 2), but other variations are possible. Axis labels may be spaced equidistant from each other to indicate equal latitude intervals therebetween.

Each axis label of the first longitude axis 224 and/or latitude axis 232 may include gridlines. For example, the longitude-latitude graph 212 may include one or more horizontal gridlines 296 and/or vertical gridlines 294. In some designs, the vertical gridlines 294 may correspond to gridlines found in the longitude-time graph 204. If the first longitude axis 224 and the second longitude axis 236 span the same values, then the same vertical gridlines 294 may appear to run through both the longitude-time graph 204 and the longitude-latitude graph 212. In some embodiments, the longitude-latitude graph 212 may display a longitude-latitude map. In some designs, the longitude-latitude map may include a portion of the same features in the longitude-time map. The longitude-latitude map may be a geographical map of a portion of the planet. For example, the longitude-latitude map may identify the contours and/or limits of various landmasses (e.g., continents, islands). This information may help a user quickly ascertain over which landmass or body of water, for example, an orbital object may be located. For example, it may be useful to a viewer to see that a satellite orbits above a portion of Africa (or other planetary location). Points displayed on the corresponding graph (e.g., the longitude-latitude graph 212) may be superimposed over the geographic map (e.g., the longitude-latitude map).

The scalar-time graph 208 may include a scalar-time graph area 252 that is bounded by a scalar axis 248 and a second time axis 244. Each of the scalar axis 248 and/or the second time axis 244 can include one or more axis labels. The second time axis 244 and the first time axis 220 may be identical. For example, first time axis 220 may respond to a user input in the same way as the second time axis 244. In some embodiments, the axis labels of the first time axis 220 represent the values of the axis labels for the scalar-time graph 208. The axis labels of the scalar axis 248 and/or the second time axis 244 may be equidistant from one another to portray equal intervals of the respective longitude or latitude. Like the first time axis 220, the second time axis 244 may span any time from a historical time to nearly a current time of a user. Additional details on the historical and (nearly) current times are discussed above in regard to the longitude-time graph 204.

Like the first time axis 220, the second time axis 244 may include axis labels that run earliest to most recent from top to bottom (e.g., as shown in FIG. 2), but other variations are possible. Axis labels may be spaced equidistant from each other to indicate equal time intervals therebetween. An axis label may show a corresponding time to include a year, a month, a day, an hour, a minute, and/or a second, depending on the level of specificity that is available, the span of the first time axis 220, and/or the level of detail that is needed for a particular display. As shown in FIG. 2, each axis label may not include superfluous detail (e.g., not show a year at each interval) in order to reduce clutter and to increase clarity for a viewer.

The scalar axis 248 may span any value of scalars associated with scalars within a database. Each scalar displayed may correspond to a magnitude or other value. For example, the magnitude may represent an intensity (e.g., of light from the orbital object). However, other scalar values are also possible, such as a size, a projected area, a temperature, a mass, a radar cross section, an altitude, an inclination, a delta-V, a time until a certain event, a probability of a certain event, etc. Many variants are possible. The scalar axis 248 may include axis labels that run greatest to smallest from left to right (e.g., as shown in FIG. 2), but other variations are possible. Axis labels may be spaced equidistant from each other to indicate equal scalar intervals therebetween.

Each axis label of the scalar axis 248 and/or the second time axis 244 may include gridlines. For example, the scalar-time graph 208 may include one or more horizontal gridlines 296 and/or vertical gridlines 294. In some designs, the horizontal gridlines 296 may correspond to gridlines found in the longitude-time graph 204. If the first time axis 220 and the second time axis 244 span the same values, then the same horizontal gridlines 296 may appear to run through both the longitude-time graph 204 and the scalar-time graph 208.

The visualization display 200 may further include a display area 216. The display area 216 may be configured to display an image chip 268. This may offer a viewer an opportunity to see an underlying photograph from which image data were extracted that correspond to a set of data or identifiers that are associated with one or more points displayed by the visualization display 200. The image chip 268 may correspond to a photograph of one or more orbital objects. For example, the image chip 268 may be a representation of the photograph. In some cases, the image chip 268 may display an object image 270 that represents an orbital object. The image chip 268 may include multiple object images 270 (e.g., sequential images, summated images (see below), etc.). The display area 216 may also include an interface toggle 266, which is described in more detail below.

The visualization display 200 may further include a point marker 256. The point marker 256 may be used to identify a pixel associated with one or more points (e.g., longitude-time points) indicated by a user within the display currently. For example, the point marker 256 may comprise a highlighted pixel (or cluster of pixels around the highlighted pixel) to identify the current pixel/point. The one or more points displayed by the visualization display 200 may be received from one or more databases (e.g., the historical data server 140, the contemporary data server 150, the metadata server 154) via one or more data interfaces (e.g., the real-time orbital object data interface 172, the tagging interface 174, the image interface 176, the real-time connection interface 178). The data interfaces may be referred to as application program interfaces (e.g., APIs). The user may use an input device (e.g., a keyboard, a mouse, a digital pen, a microphone, a touch screen, etc.) to indicate the currently identified pixel. The point marker 256 may further be indicated by a horizontal tracking line 260 and/or vertical tracking line 264. As shown in FIG. 2, each of the horizontal tracking line 260 and vertical tracking line 264 may be visible in multiple graphs. For example, if the point marker 256 is displayed in the longitude-time graph 204, the horizontal tracking line 260 may be displayed in both the longitude-time graph 204 and the scalar-time graph 208. Similarly, the vertical tracking line 264 may be visible in both the longitude-time graph 204 and the longitude-latitude graph 212.

The point marker 256 may be associated with one or more point marker metadata stamps. The one or more point marker metadata stamps may display one or more data types not evident from a graph in which the point marker 256 is currently displayed. For example, in the longitude-time graph 204, a scalar stamp 274 and/or object identifier stamp 282 may be displayed. This may be because the longitude-time graph 204 is not configured to display scalar and/or object identifier information. Similarly, a time value, scalar value, and/or object identifier may be displayed for an identified pixel within the longitude-latitude graph 212. Moreover, a longitude value, latitude value, and/or object identifier may be displayed for an identified pixel within the scalar-time graph 208. As shown in FIG. 2, the scalar stamp 274 and/or object identifier stamp 282 may be displayed near (e.g., within a few pixels of) the point marker 256. The scalar stamp 274 can display a scalar value corresponding to a point associated with the identified (e.g., highlighted) pixel. As shown, the scalar value could be, for example, "12.1 VMag." Similarly, the object identifier stamp 282 may display an object identifier (e.g., object name) corresponding to the point associated with the identified pixel. As shown, the object identifier could be, for example, 27820:11003 (AMC-9 (GE-12)). In some embodiments, as noted above, a latitude stamp (not shown) can be displayed. The latitude stamp may be displayed near the point marker 256 and may display a latitude value corresponding to the point associated with the identified pixel.

One or more of the horizontal tracking line 260 and/or the vertical tracking line 264 may have corresponding tracking line metadata stamps. The one or more tracking line metadata stamps may correspond to data types displayed by the corresponding graph in which the identified pixel is displayed. For example, as shown in FIG. 2, an identified pixel within the longitude-time graph 204 may include a horizontal tracking line 260 and/or the vertical tracking line 264 that correspond, respectively, to a tracking line time stamp 298 and/or a tracking line longitude stamp 290. Similarly, an identified pixel within the longitude-latitude graph 212 may include a horizontal tracking line 260 and/or vertical tracking line stamp 290 that correspond, respectively, to a tracking line latitude stamp and/or a tracking line longitude stamp 290. Moreover, an identified pixel within the scalar-time graph 208 may correspond to a horizontal tracking line 260 and/or vertical tracking line stamp 290 that correspond, respectively, to a tracking line time stamp and/or a tracking line scalar stamp. In this way, a user can quickly identify one or more values associated with the pixel identified by the point marker 256. The horizontal tracking line stamp (e.g., tracking line time stamp 298) and/or the vertical tracking line stamp (e.g., tracking line longitude stamp 290) may be displayed near the corresponding tracking line.

As shown in FIG. 2, the longitude-time graph 204 may include one or more unhighlighted collections 272 of longitude-time points, highlighted collections 276 of longitude-time points, and/or selected collections 280 of longitude-time points. Similarly, the longitude-latitude graph 212 may include one or more unhighlighted collections 284 of longitude-latitude points, highlighted collections 288 of longitude-latitude points, and/or selected collections 292 of longitude-latitude points. Moreover, the scalar-time graph 208 may include various scalar-time points 254 within the scalar-time graph area 252. The scalar-time points 254 may include points that are highlighted, unhighlighted, and/or selected.

Object Tracking

The visualization display 200 described herein can be used to track orbital objects and present that data to a user/viewer in a meaningful way. The systems displayed herein provide a novel way of presenting high-dimensional (e.g., four-dimensional, five-dimensional, or higher dimensional) data in a way that is understandable by a human viewer.

For additional detail related to FIG. 2, reference will now include reference to FIGS. 3-5. FIG. 3 shows a detail view of an example longitude-time graph 204 that may be a part of the visualization display 200 described in FIG. 2. The first longitude axis 224 may span from a lower-longitude limit 312 to an upper-longitude limit 316. Similarly, the first time axis 220 may span from a lower-time limit 304 to an upper-time limit 308. Within the longitude-time graph area 228, the visualization display 200 may include one or more sets of longitude-time points. The one or more sets of longitude-time points may correspond to one or more pixels. Each set of longitude-time points may correspond to data on one or more orbital objects around the planet. For example, each of the one or more longitude-time points may correspond to a data set comprising historical data and/or contemporary data. Each set of longitude-time points may correspond to a set of identifiers. The set of identifiers may include a longitude value, a latitude value, a time value, a scalar value, and/or an object (e.g., name) identifier. Each set of identifiers may be obtained from one or more photographs. The photographs may contain image data from which one or more identifiers of the set of identifiers can be obtained (e.g., through algorithm).

The longitude-time points displayed within the longitude-time graph area 228 may be points that have a time value between the lower-time limit 304 and the upper-time limit 308. Additionally or alternatively, the displayed longitude-time points may have a longitude value between the lower-longitude limit 312 and the upper-longitude limit 316.

As shown in FIG. 3, the point marker 256 may comprise one or more highlighted pixels that can help a user determine which pixel is identified by a user input device. If the pixel is associated with object data, the scalar stamp 274 and/or object identifier stamp 282 may be displayed within the longitude-time graph area 228. One or both of the scalar stamp 274 and the object identifier stamp 282 may be displayed in an area easily associated with the point marker 256. If the identified pixel does not contain corresponding object data, then the respective scalar stamp 274 and/or object identifier stamp 282 may not be displayed. As shown the pixel currently identified by the point marker 256 is a pixel that includes a selected collection 280 of longitude-time points.

In order to further aid a user, an interface toggle 320 may be included in the longitude-time graph 204. The interface toggle 320 may be manipulated by a user from an input device (e.g., function keys on a keyboard, a mouse, etc.). The interface toggle 320 may communicate with the user settings module 132 (see FIG. 1A) to determine, for example, display settings for the longitude-time graph 204. A user may be able to adjust the display settings using the interface toggle 320. For example, the user may be able to click a box to switch a view type. The user may be able to filter what types of points (e.g., unhighlighted, highlighted, selected) are displayed. The interface toggle 320 may allow a user to toggle the display of the longitude-time map on and off. For example, as shown in FIG. 3, the longitude-time map is toggled off while in FIG. 2 it is toggled on.

FIG. 4 shows a detail view of an example longitude-latitude graph 212 that may be a part of the visualization display 200 described in FIG. 2. The second longitude axis 236 may span from a lower-longitude limit 412 to an upper-longitude limit 416. Similarly, the latitude axis 232 may span from a lower-latitude limit 408 to an upper-latitude limit 404. The longitude-latitude points displayed within the longitude-latitude graph area 240 may be points that have a latitude value between the lower-latitude limit 408 and the upper-latitude limit 404. Additionally or alternatively, the displayed longitude-latitude points may have a longitude value between the lower-longitude limit 412 and the upper-longitude limit 416.

The longitude-latitude graph area 240 may include various displayed longitude-latitude points. For example, the longitude-latitude graph 212 may display one or more unhighlighted collections 284 of longitude-latitude points, highlighted collections of longitude-latitude points (not shown), and/or selected collections 292 of longitude-latitude points. In some cases, the one or more selected collections 292 of longitude-latitude points may include highlighted longitude-latitude points. FIG. 4 shows the point marker 256 over a point in a selected collection 292 of longitude-latitude points.

As shown in FIG. 4, the point marker 256 may be displayed within the longitude-latitude graph 212. For example, a user may use an input device to indicate where and/or in which graph the point marker 256 is located. As noted above, if the point marker 256 is displayed within the longitude-latitude graph 212, a tracking line latitude stamp 422 may be displayed. The tracking line latitude stamp 422 displays a latitude value associated with a longitude-latitude point corresponding to the pixel identified by the point marker 256. Additionally or alternatively, a tracking line longitude stamp 290 may be displayed. One or more point marker metadata stamps (e.g., the scalar stamp 274, the object identifier stamp 282, a latitude stamp, a longitude stamp, a time stamp) may be displayed, as described above.

An interface toggle 426 may be included to aid a user in interacting with the longitude-latitude graph 212. For example, the interface toggle 426 may allow a user to toggle a view of the longitude-latitude map on or off. The interface toggle 426 may be manipulated by a user from an input device (e.g., function keys on a keyboard, a mouse, etc.). As shown in FIG. 4, the longitude-latitude map is toggled on. Other functionality is also possible.

FIG. 5 shows a detail view of an example scalar-time graph 208 that may be a part of the visualization display 200 described in FIG. 2. The scalar-time graph 208 may show one of a number of possible scalar values. For example, the scalar may refer to a magnitude, such as an intensity of reflected light. However, a number of other scalar values are possible, such as a size, a projected area, a temperature, a mass, a radar cross section, an altitude, an inclination, a delta-V, a time until a certain event, a probability of a certain event, etc.

The scalar axis 248 may span from a lower-scalar limit 512 to an upper-scalar limit 516. Similarly, the second time axis 244 may span from a lower-time limit 504 to an upper-time limit 508. The scalar-time points displayed within the scalar-time graph area 252 may be points that have a scalar value between the lower-scalar limit 512 and the upper-scalar limit 516. Additionally or alternatively, the displayed scalar-time points may have a time value between the lower-time limit 504 and the upper-time limit 508.

As shown in FIG. 5, the point marker 256 may be displayed within the scalar-time graph 208. As noted above, if the point marker 256 is displayed within the scalar-time graph 208, one or more metadata stamps may be displayed. For example, the tracking line time stamp 298 may indicate a time value of a scalar-time point corresponding to the pixel identified by the point marker 256. Similarly, a tracking line scalar stamp (not shown) may indicate a scalar value of a scalar-time point corresponding to the pixel identified by the point marker 256 Additionally or alternatively, one or more point marker metadata stamps (e.g., the scalar stamp 274, the object identifier stamp 282, a latitude stamp, a longitude stamp, a time stamp) may be displayed, as described above.

The scalar-time graph 208 may display one or more unhighlighted collections 584 of scalar-time points, highlighted collections 584 of scalar-time points (not shown), and/or selected collections 580 of scalar-time points. As shown, the point marker 256 identifies a pixel associated with a point in a selected collection 580 of scalar-time points. An interface toggle 522 may be included to aid a user in interacting with the scalar-time graph 208. For example, the interface toggle 522 may allow a user to toggle which type(s) (e.g., unhighlighted, highlighted, selected) points are displayed. Additionally or alternatively, the interface toggle 522 may allow a user to toggle between a stitching panel and a graph and/or to toggle which type of scalar is displayed by the scalar-time graph 208. Other functionality is also possible.

With reference generally to FIGS. 2-5, the system may allow a user to interact with the visualization display 200 in a variety of beneficial ways. For example, a user may be able to pan and zoom within one or more graphs in the visualization display 200. Panning may be up, down, left, right, or any other direction along an axis. Zooming may include zooming in and/or out. The user may give a panning input and/or a zooming input via an input device. The panning input and/or zooming input may comprise a scrolling of a mouse wheel, a click of a mouse, a pinch motion, a flick motion, a swipe motion, a tap, and/or any other input identifying a pan or zoom action. The visualization display 200 may be configured to allow simultaneous manipulation of multiple graphs. For example, in response to a user input to pan or zoom the first time axis 220 or the second time axis 244, the system may set the lower-time limit 304 equal to the lower-time limit 504 and/or set the upper-time limit 308 equal to the upper-time limit 508. Similarly, in response to a user input to pan or zoom the first longitude axis 224 or the second longitude axis 236, the system may set the lower-longitude limit 312 equal to the lower-longitude limit 412 and set the upper-longitude limit 316 equal to the upper-longitude limit 416.

A user may be able to set the upper and/or lower limits of a given axis. Additionally or alternatively, the user may be able to set axis spacing, axis intervals, axis labels, axis formatting, axis length, and or other aspects associated with one or more axes. Once set, the system may be configured to automatically update that axis. In some embodiments, the system may be configured to automatically update a corresponding axis. For example, automatically updating a corresponding axis may include setting a common alignment for both of the two axes, setting a common length for both of them, and/or disposing them parallel to one another. The first longitude axis 224 and second longitude axis 236 may be corresponding axes. Similarly, the first time axis 220 and second time axis 244 may be corresponding axes.

Zooming may be defined as changing a total span (e.g., a difference between an upper-axis limit and a lower-axis limit) of one or more axes in the visualization display 200. A single axis may be zoomed in or out by the user. A single graph (e.g., two perpendicular axes) may be zoomed in or out. However, the system may be configured to allow a user to zoom in and/or out on multiple axes and/or graphs simultaneously. For example, zooming in on the longitude-time graph 204 may adjust not only the first time axis 220 and first longitude axis 224, but it may adjust the second time axis 244 as well.

Zooming and/or panning in one axis or one graph may affect which points are displayed in other graphs within the visualization display 200. For example, in an adjustment of the lower-time limit 304 or the upper-time limit 308, the system may be configured to update the longitude-latitude graph 212 to display pixels corresponding only to longitude-latitude points corresponding to a set of identifiers having a time identifier between the lower-time limit 304 and the upper-time limit 308.

Panning and/or zooming may be done within a graph or along an axis. For example, in response to a user input to pan or zoom along a length of first time axis 220, the system may be configured to simultaneously modify one or more of the lower-time limit 304 and/or the upper-time limit 308. In response to a user input to pan or zoom along a length of second time axis 244, the system may be configured to simultaneously modify one or more of the lower-time limit 504 and/or the upper-time limit 508. Additionally or alternatively, in response to a user input to pan or zoom along a length of the first longitude axis 224, the system may be configured to simultaneously modify one or more of the lower-longitude limit 312 and/or the upper-longitude limit 316. In response to a user input to pan or zoom along a length of the second longitude axis 236, the system may be configured to simultaneously modify one or more of the lower-longitude limit 412 and/or the upper-longitude limit 416. Additionally or alternatively, in response to a user input to pan or zoom along a length of the latitude axis 232, the system may be configured to simultaneously modify one or more of the upper-latitude limit 404 and/or the lower-latitude limit 408. In response to a user input to pan or zoom along a length of the scalar axis 248, the system may be configured to simultaneously modify one or more of the lower-scalar limit 512 and the upper-scalar limit 516.

Further, in response to a user input to adjust the lower-longitude limit 312 or the upper-longitude limit 316, the system may update the scalar-time graph 208 to display pixels corresponding only to scalar-time points corresponding to a set of identifiers having a longitude identifier between the lower-longitude limit 312 limit and the upper-longitude limit 316. Similarly, in response to a user input to adjust the upper-latitude limit 404 or the lower-latitude limit 408, the system may update one or more of the longitude-time graph 204 and/or the scalar-time graph 208 to display pixels corresponding only to respective longitude-time points and/or scalar-time points corresponding to a set of identifiers having a latitude identifier between the lower-longitude limit 312 and the upper-longitude limit 316.

Moreover, in response to a user input to adjust the lower-scalar limit 512 or the upper-scalar limit 516, the system may update one or more of the longitude-time graph 204 and the longitude-latitude graph 212 graph to display pixels corresponding only to respective longitude-time points and/or longitude-latitude points corresponding to a set of identifiers having a scalar identifier between the lower-scalar limit 512 limit and the upper-scalar limit 516.

As noted above, the system may be configured to store dozens of petabytes of data. This can provide a variety of challenges. One of which is how the data are displayed in a way that is helpful to a human user. Accordingly, in certain embodiments, the visualization display 200 may be configured to divide a graph (e.g., the longitude-time graph 204) into a plurality of pixels. Each pixel may represent a corresponding bin of data. Each bin can be configured to store historical and/or contemporary data as well as metadata.

In some cases, a single pixel may correspond to a bin containing dozens, hundreds, or even thousands of data sets corresponding to orbital objects. To aid a user in digesting such a large amount of data, the visualization display 200 may be configured to display an indication of the amount of data (e.g., the number of objects, the number of sets of object identifiers) stored therein. For example, a user may use the point marker 256 to identify a pixel. The system can be configured to display a number of object identifiers (e.g., a number of unique object identifiers) between one and a total number of object identifiers associated with the bin associated with the identified pixel. An object identifier can be any type of identifier of an orbital object. The object identifier may comprise one or more letters, numbers, symbols, or any combination of these.

In some designs, the system is configured to receive a selection from a user of a target object identifier. For example, the system may sequentially cycle (e.g., automatically, manually) through a display of each object identifier associated with the identified pixel (e.g., every second, every two seconds, in response to a user input, etc.). As a different example, the system may be configured to display a list of object identifiers from which a user may select the target object identifier. The system may be configured only to display unique object identifiers since many object identifiers in a single bin may be identical. In some embodiments, the system may not display one or more of the metadata stamps (e.g., the tracking line longitude stamp 290, the horizontal tracking line 260, the object identifier stamp 282, the scalar stamp 274, etc.) until an object identifier has been selected. In certain embodiments, the system displays metadata stamps for each unique object identifier present in the bin. The visualization display 200 may implement a color scale or gray scale to provide information about the number of unique orbital object identifiers in a bin. For example, bins with more unique orbital object identifiers may correspond to lighter pixels while bins with fewer unique orbital object identifiers may be darker. Bins with no orbital object identifiers may be black. This situation may arise, for example, when viewing a small portion (e.g., zoomed in) of the data in a graph.

The system can be configured to identify one or more values (e.g., by various metadata time stamps described herein) associated with a default data set. The point marker 256 is an example of an interface element that can identify values in the default data set. The default data set may be determined based on one or more default rules. The default rule(s) may be based on a storage time (e.g., most recently stored), a view time (e.g., most recently viewed), a numerical value (e.g., smallest latitude), an object identifier (e.g., earliest object identifier by alphabetical order), or any other default measure.

As a user moves the point marker 256, the system may automatically (e.g., in real-time) update the identified values (e.g., metadata time stamps) associated with the updated pixel corresponding to an updated data set. The updated data set may be determined using the same or different rules described above. The user may move the point marker 256 over an updated pixel in a variety of ways, such as by mousing over the pixel using an input device (e.g., mouse), tapping on the pixel (e.g., using a touchscreen), typing in information associated with the updated pixel, or in any other way to identify a pixel.

It may be advantageous to allow a user to save one or more settings associated with the visualization display 200. For example, a user may wish to return at a later time to a point or set of points displayed by the visualization display 200. This may be accomplished in a number of ways. For example, a user may be configured to bookmark one or more values associated with the target point (e.g., an object identifier, a longitude value, a time value, etc.). The system may store a list of the user's bookmarks to allow for easy access at a future time. The system may be configured to store a set of points based, for example, on the points having a common object identifier. For example, multiple points may correspond to the same object as it orbits the planet. Thus, multiple points in time and space may reference the same object. The user may be able to retrieve the set of points by inputting the object identifier (e.g., selecting it from a list, typing it in).

Additionally or alternatively, the system may be able to allow a user to save a view of one or more graphs. For example, a user may be able to bookmark a particular view within the longitude-time graph 204. Accordingly, the system may associate with the bookmark stored values for a bookmark-min longitude value (e.g., the lower-longitude limit 312), a bookmark-max longitude value (e.g., the upper-longitude limit 316), a bookmark-min time value (e.g., the lower-time limit 304), and/or a bookmark-max time value (e.g., the upper-time limit 308). Similar usage may be made for other values (e.g., a scalar value, an object identifier, a latitude). Points that satisfy these bookmark-min and/or bookmark-max values could be displayed by the system in response to a user selection of the associated bookmark.

Display Synchronization

One of the benefits of various embodiments described herein is the ability of a user to quickly and easily view and digest an immense amount of data containing variables in three, four, or more dimensions. To help a user visualize data containing higher-dimension values, various graphs of the visualization display 200 may be synchronized to each other. FIGS. 6-9 illustrate various functionality associated therewith.

Figure 6:
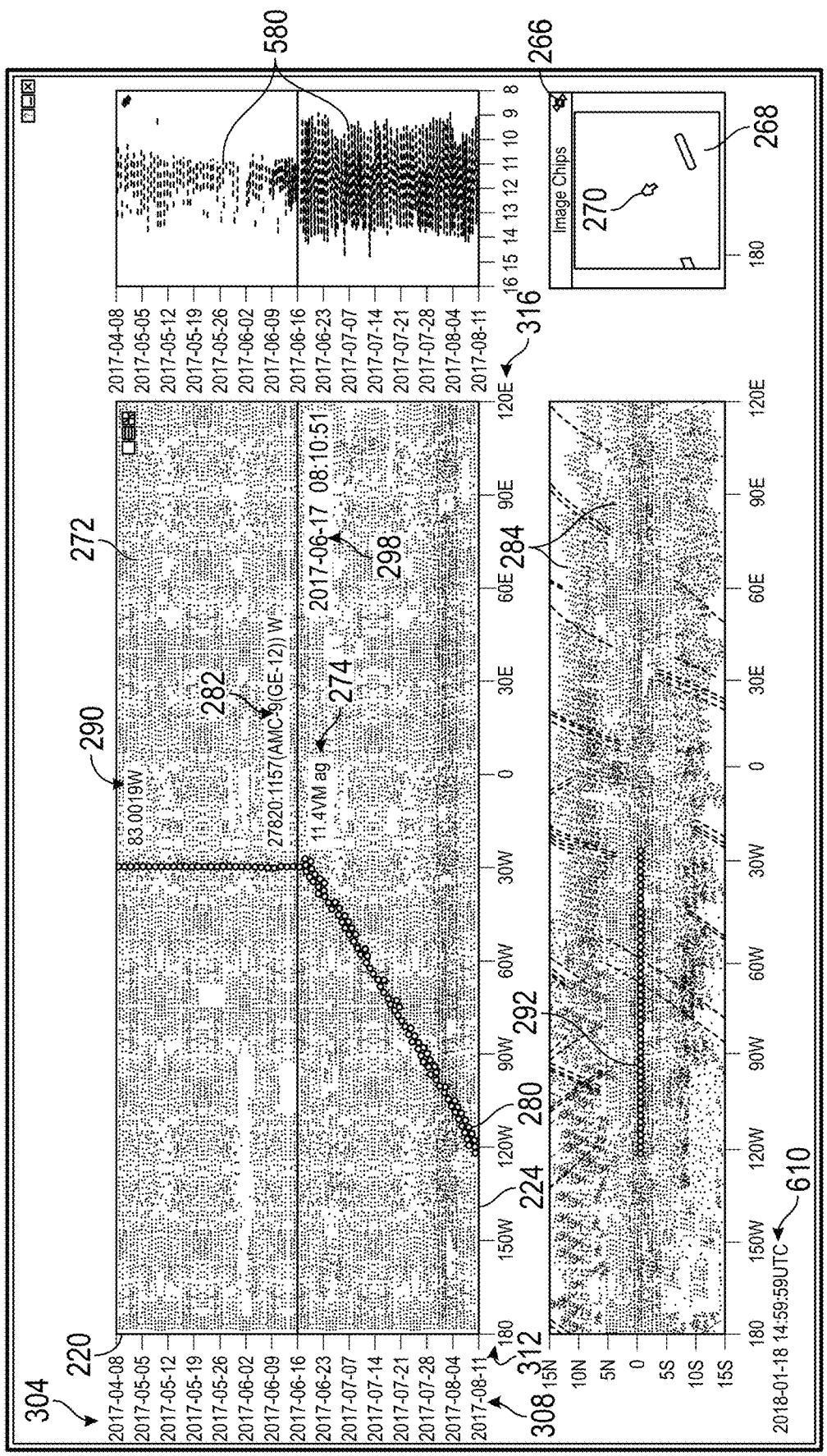
FIG. 6 shows a zoomed-in and panned view of the visualization display of FIG. 2.

FIG. 6 shows a zoomed-in and panned view of visualization display 200 of FIG. 2. As shown, the first time axis 220 spans from and updated lower-time limit 304 to an updated upper-time limit 308. The first time axis 220 spans about fifteen weeks. Similarly, the first longitude axis 224 has been updated to show a span of about 37 degrees between the lower-longitude limit 312 and the upper-longitude limit 316. The object identifier stamp 282 indicates the same object identifier shown in FIG. 2. This indicates that the point marker 256 identifies a pixel associated with the same object as is identified in FIG. 2. The tracking line longitude stamp 290 indicates a longitude of about 83.0019 W and the tracking line time stamp 298 indicates a time of 2017-06-17 08:10:51. As shown, the selected collection 280 of longitude-time points is associated with the pixel identified by the point marker 256. Other unhighlighted collections 272 of longitude-time points are also shown, which are associated with the unhighlighted collections 284 of longitude-latitude points.

The selected collection 280 of longitude-time points is similarly associated with the selected collection 292 of longitude-latitude points displayed in the longitude-latitude graph 212 as well as the selected collection 580 of scalar-time points displayed in the scalar-time graph 208.

The visualization display 200 may further include a current time stamp 610. The current time stamp 610 may indicate a current universal time, such as one tracking the coordinated universal time (UTC).

Figure 7:
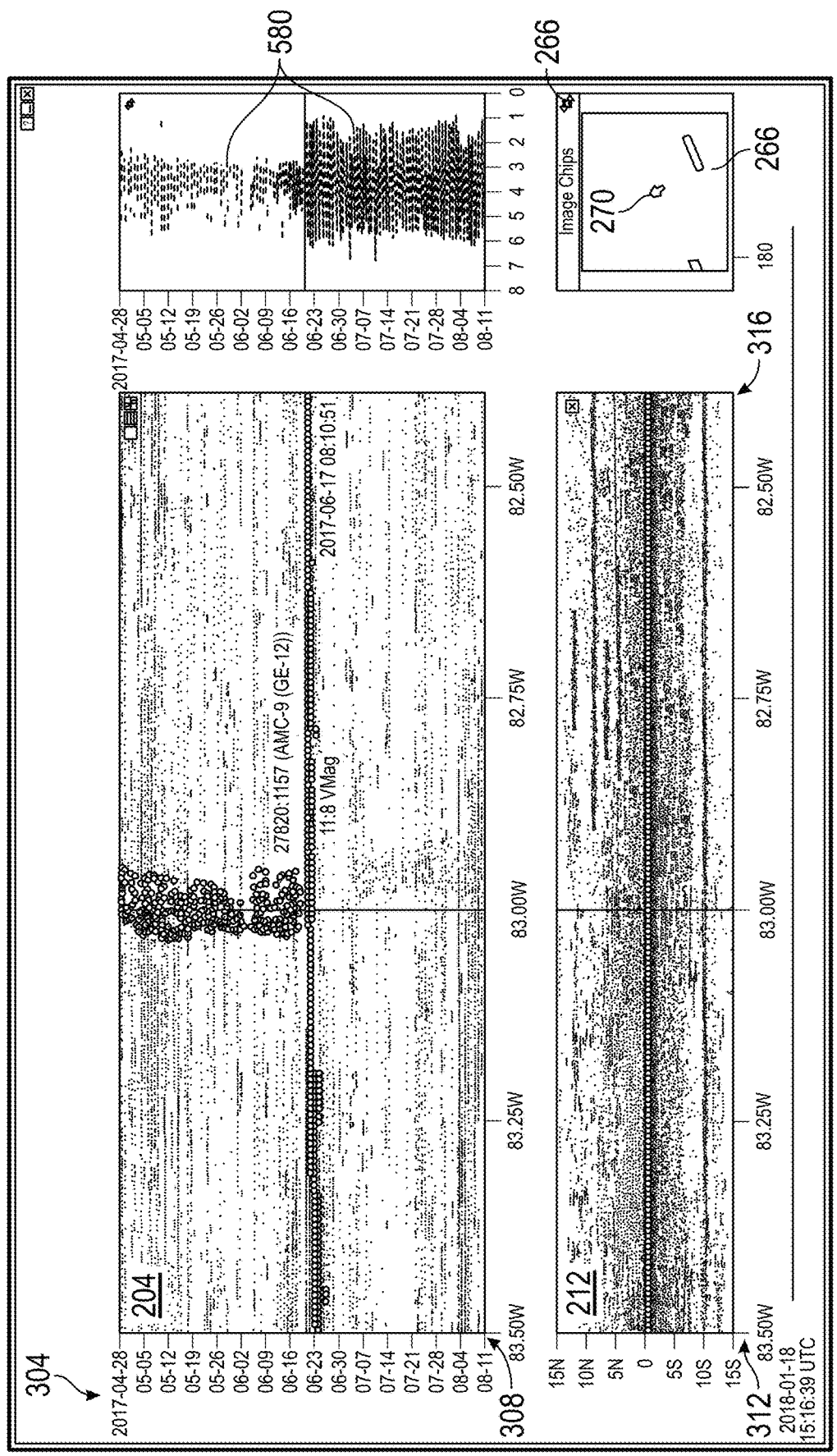

FIG. 7 shows the same view as FIG. 6 after the first longitude axis 224 and the synchronized second longitude axis 236 have been zoomed in. Note that the first longitude axis 224 and the second longitude axis 236 (as well as the first time axis 220 and the second time axis 244) are synchronized in this case, allowing for a seamless viewing experience when viewing each of the graphs. Because the first longitude axis 224 and the second longitude axis 236 are synchronized to each other, the scalar-time graph 208 has also been updated. The point marker 256 identifies a slightly different pixel as compared to FIG. 6. As shown, both longitude axes 224, 236 span a little over a single degree. Moreover, as shown, the axis labels (and/or the associated hash marks) on the first longitude axis 224 have become omitted since the two longitude axes 224, 236 are synchronized. Similarly, the two time axes 220, 244 can be synchronized, in which case the axis labels (and/or the associated hash marks) of the second time axis 244 may be omitted.

Figure 8:
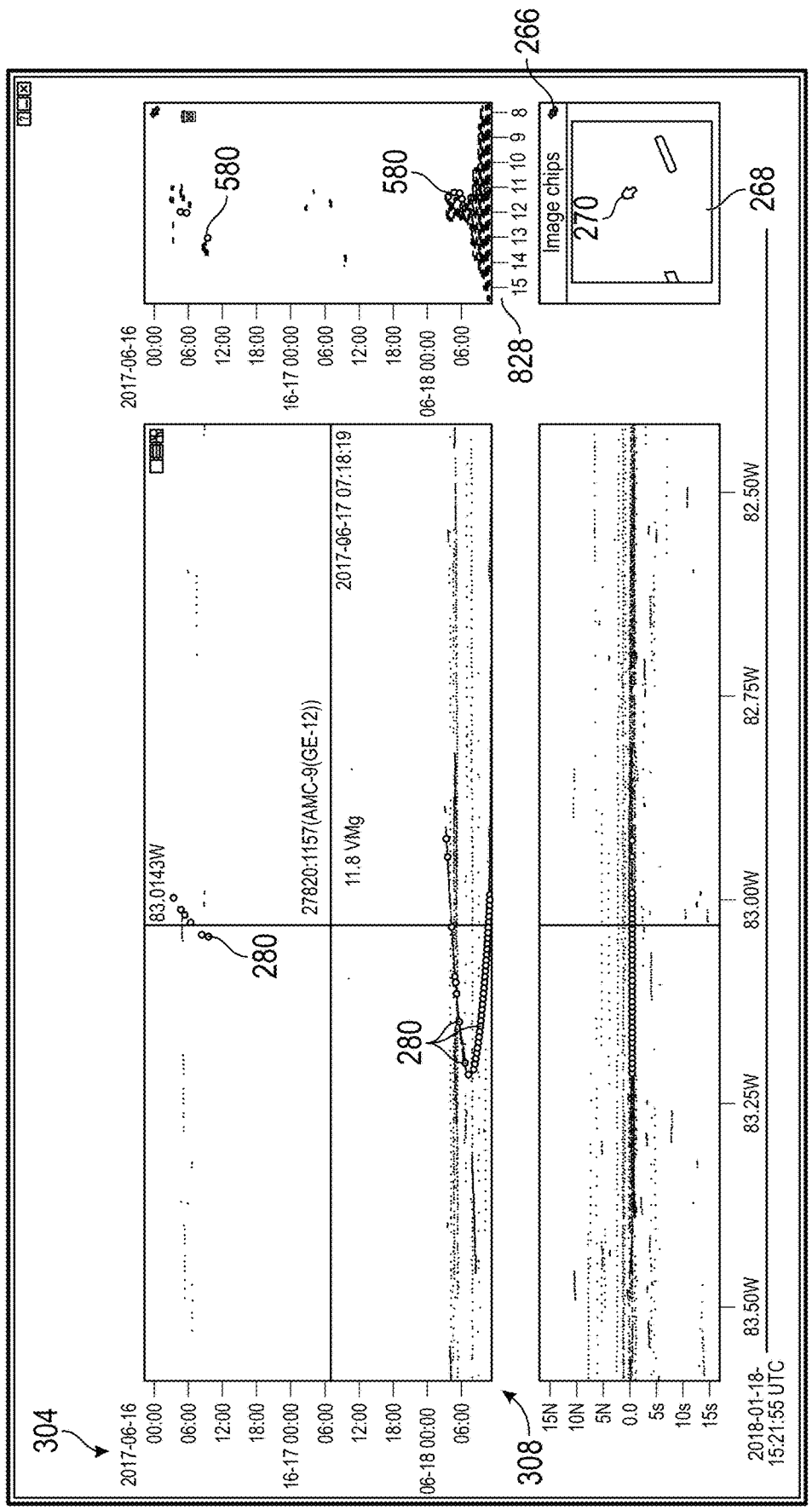

FIG. 8 shows the same view as FIG. 7 after the first time axis 220 and the synchronized second time axis 244 have been zoomed in. Because the first time axis 220 and second time axis 244 are synchronized to each other, the scalar-time graph 208 has also been updated. The point marker 256 identifies a slightly different pixel as compared to either FIG. 6 or FIG. 7.

Figure 9:
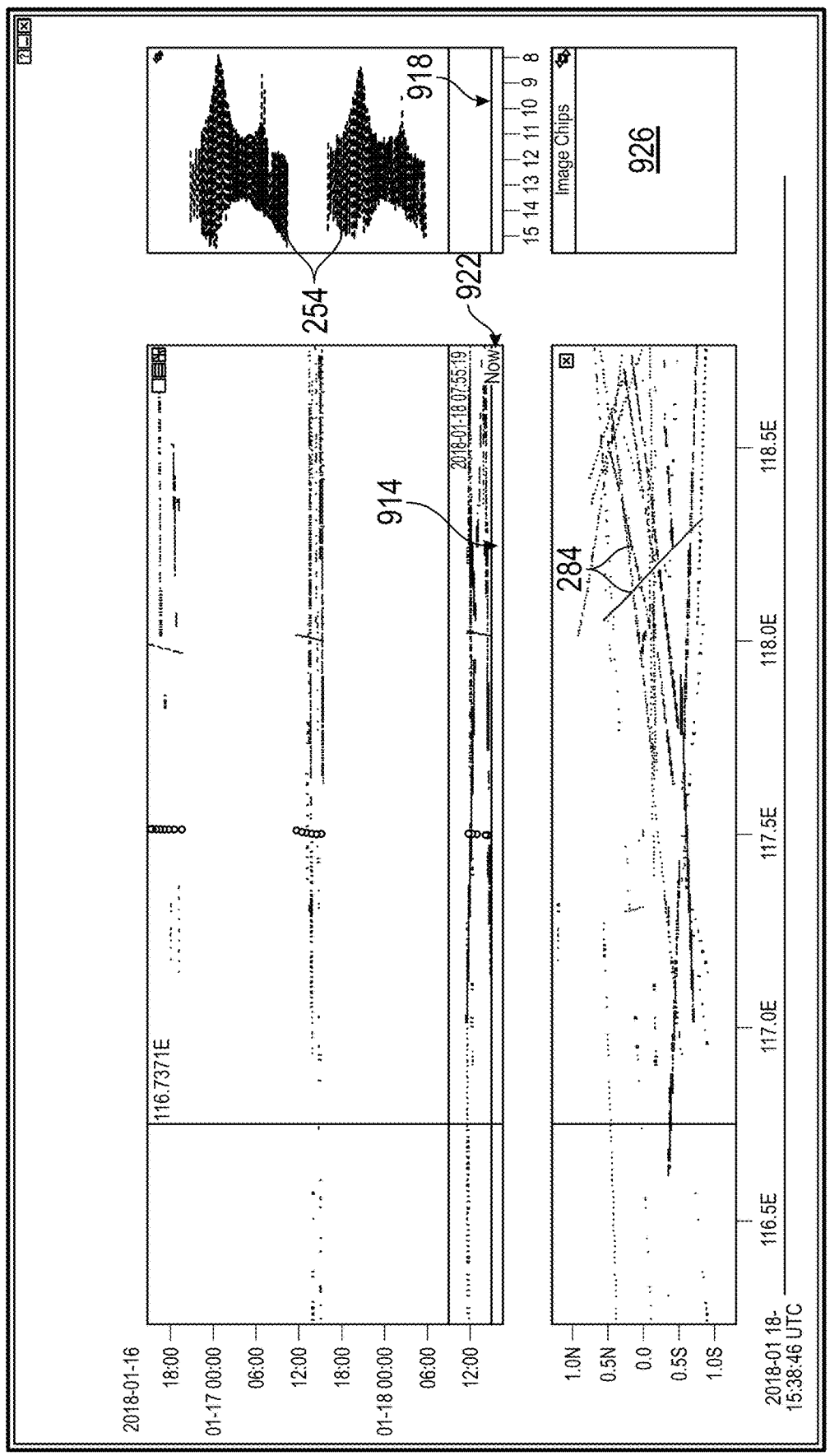
FIG. 9 shows a zoomed-in and panned view of a longitude-time graph and scalar-time graph at a current time horizon.

FIG. 9 shows a zoomed-in and panned view of a longitude-time graph 204 at a current time horizon. The current time horizon may be identified by a current time marker 922. The current time marker 922 may include a line and/or a descriptor, such as a "now" descriptor, as shown. The future longitude-time area 914 and the future scalar-time area 918 do not include any display points corresponding to object data since those times are later than the current time as indicated by the current time stamp 610. Data that has been received later than a threshold time from the current time may not be displayed yet. This delay may be due to latency in the network (e.g., the network 144) or for some other reason that delays the system from receiving the data.

The image chip 268 in FIGS. 6-8 identifies an object image 270 while the image chip 268 in FIG. 9 does not. The image chip 268 corresponds to a photograph from which object data has been obtained associated with a pixel identified by the point marker 256. The photographs shown in FIG. 6-8 may identify the object image 270 received from actual telescopic images. As noted, an image chip 268 may include a plurality of object images 270. In some embodiments, the image chip 268 identifies which of the plurality of object images 270 corresponds to the data associated with the pixel identified (e.g., by the point marker 256). For example, a marker may be displayed indicating a location of the object within the at least one photograph. The marker may comprise a circle, a box, crosshairs, a coloring, a flicker, or any other indication of an object within a photograph. The user may identify the pixel associated with the object image 270 in other ways described above.

Image chip 268 data may be received from one or more databases. For example, the system may receive the image chip 268 data from a database remote from the system. Additionally or alternatively, the data may be received from a database local to the system. The image chip 268 data may be received via one or more pointers (e.g., hyperlinks) that point to corresponding databases. For example, various image chip 268 data may be stored on databases associated with the imager (e.g., telescope) from which the data was first obtained.

The user may select one or more objects from an image chip 268 and a corresponding point or plurality of points may be indicated (e.g., highlighted, supplied with a marker) on one or more of the graphs in the visualization display 200. Additionally or alternatively, the user may be able to select a point or plurality of points on one or more of the graphs in the visualization display 200 and have one or more images (e.g., photo, video) displayed by the image chip 268 with associated marker. In some designs, the image chip 268 is configured to show a video corresponding to multiple points within a graph in the visualization display 200. The multiple points may comprise a common object identifier. In FIG. 9, because an identified pixel does not correspond to image data for a photograph, the blank image chip 926 does not display any photograph.

Tagging Interface

It may be useful to update data corresponding to the object data in the historical and/or contemporary databases. For example, it may be helpful to add or remove an object identifier (e.g., object name) to one or more points. To this end, a tagging interface can be implemented in various embodiments. FIGS. 10A-10D illustrate various aspects of embodiments of the system that include a tagging interface.

Figure 10A:
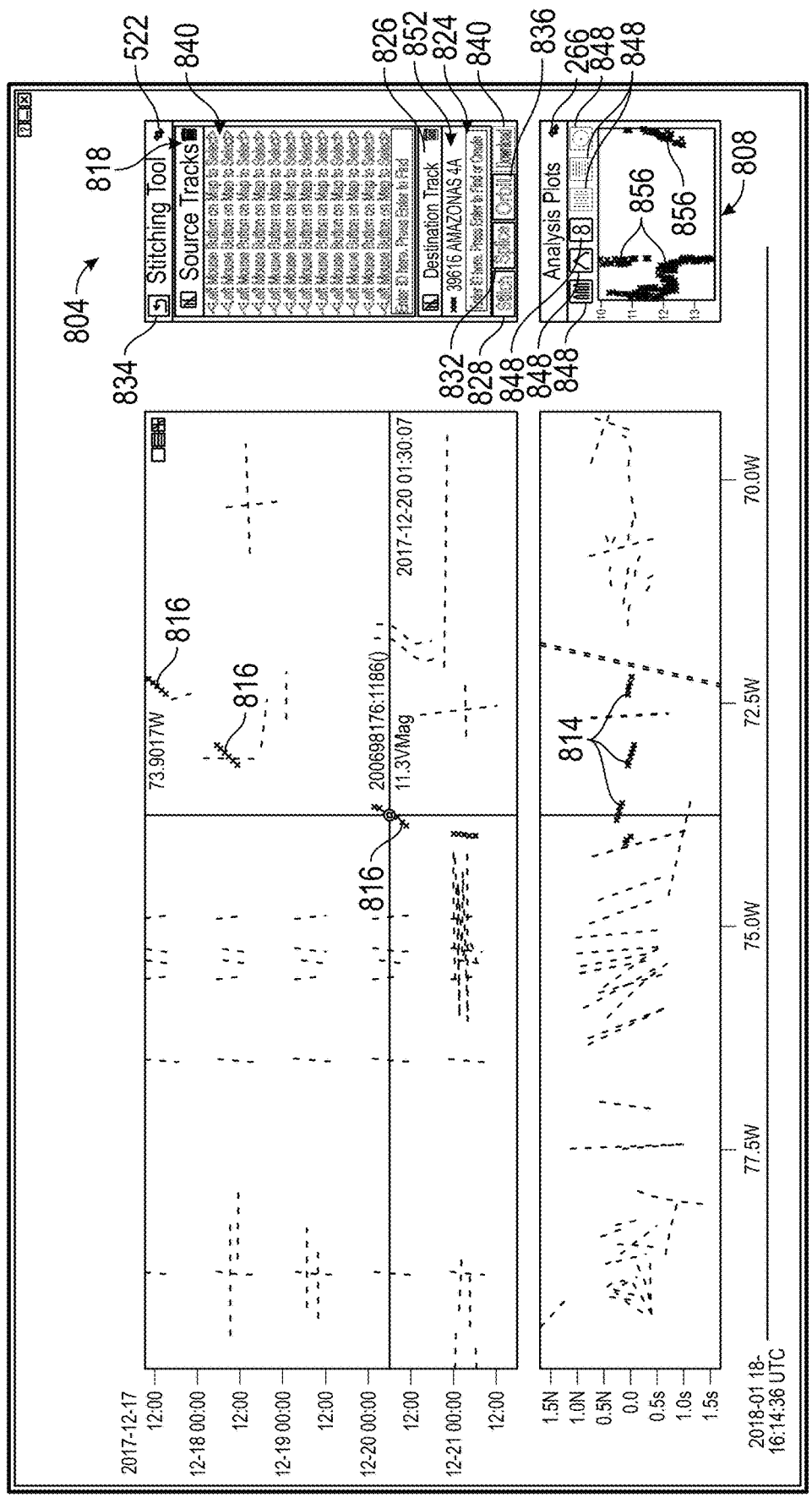
FIG. 10A shows a tagging interface comprising a stitching tool interface and an analysis plot interface.

FIG. 10A shows a tagging interface comprising a stitching tool interface 804 and an analysis plot interface 808. The tagging interface is shown along with a longitude-time graph 204 and a longitude-latitude graph 212. As shown, the stitching tool interface 804 may include a source track region designator 818 with corresponding source track region 820 and/or an destination track region designator 826 with corresponding destination track region 824. In some embodiments, the source track region designator 818 and/or destination track region designator 826 are not included. The destination track region 824 may include one or more of a stitch selector 828, a splice selector 832, an orbit selector 836, and/or a download selector 840. In response to the orbit selector 836, the system may be configured to calculate and/or display an aspect of an orbit of a selected object or plurality of objects. The stitching tool interface 804 may further include an undo selector 834. The undo selector 834 may be represented by words "undo" and/or by a symbol (e.g., an arrow symbol). In response to a selection of the undo selector 834, the system may undo a most recent user selection. In response to a sequence of selections, the system may be configured to revert back a sequence of actions in response to a sequence of previous user selections.

The analysis plot interface 808 may include one or more analysis plot input selectors 848 and/or an interface toggle 266. The interface toggle 266 may be selected by a user to toggle between a tagging interface and the scalar-time graph 208 and/or display area 216. The analysis plot interface 808 may include an analysis plot. The analysis plot may display one or analysis points within a plot area. The analysis plot may include a time axis and/or a scalar axis. The time axis may span a particular number of days (e.g., five days, seven, days, ten days, etc.). The scalar axis may be determined based on a number of selected points, such as a collection 816 of longitude-time destination points.

As shown in FIG. 10A, the collection 816 of longitude-time destination points may be selected by a user. For example, the user may highlight one or more of the collection 816 of longitude-time destination points. As used herein, highlighting may include altering one or more of a color, shading, intensity, and/or background. This may be achieved, for example, by right-clicking on a mouse one of the points in the longitude-time graph 204 and/or the longitude-latitude graph 212. The right-click (or other user input) can cause the point marker 256 to identify a pixel associated with object data. As shown in FIG. 10A, the user has identified the collection 816 of longitude-time destination points. The identified collection 816 of longitude-time destination points may be highlighted (e.g., colored). The collection 816 of longitude-time destination points corresponds to a collection 844 of longitude-latitude destination points. The destination track identifier 852 in the stitching tool interface 804 identifies the collection 816 of longitude-time destination points as a destination track. The selected points may correspond to the destination track analysis points 856 displayed within the analysis plot interface 808.

Figure 10B:
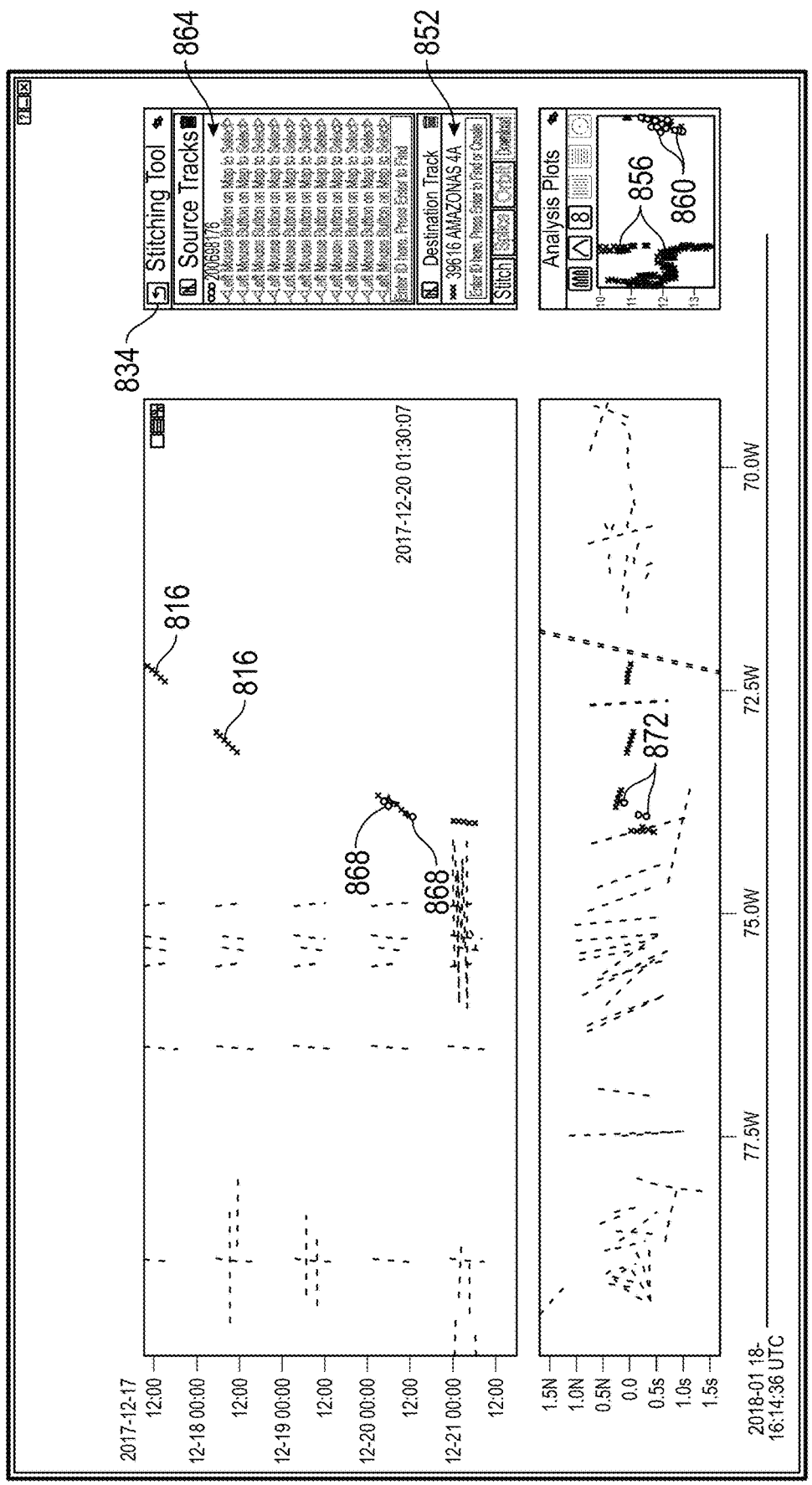
FIG. 10B shows a selection by a user of a collection of first longitude-time source points.

FIG. 10B shows a selection by a user of a collection 868 of first longitude-time source points. The collection 868 of first longitude-time source points may consist of a single point. As shown, the collection 868 of first longitude-time source points is different from the collection 816 of longitude-time destination points. The collection 868 of first longitude-time source points may be highlighted (e.g., differently from the highlighting of the collection 816 of longitude-time destination points). The source track region 820 now shows a first source track identifier 864 that has been selected. A corresponding collection 872 of first longitude-latitude source points and/or a corresponding collection 860 of first source analysis points may be plotted in their respective graph/plot.

Figure 10C:
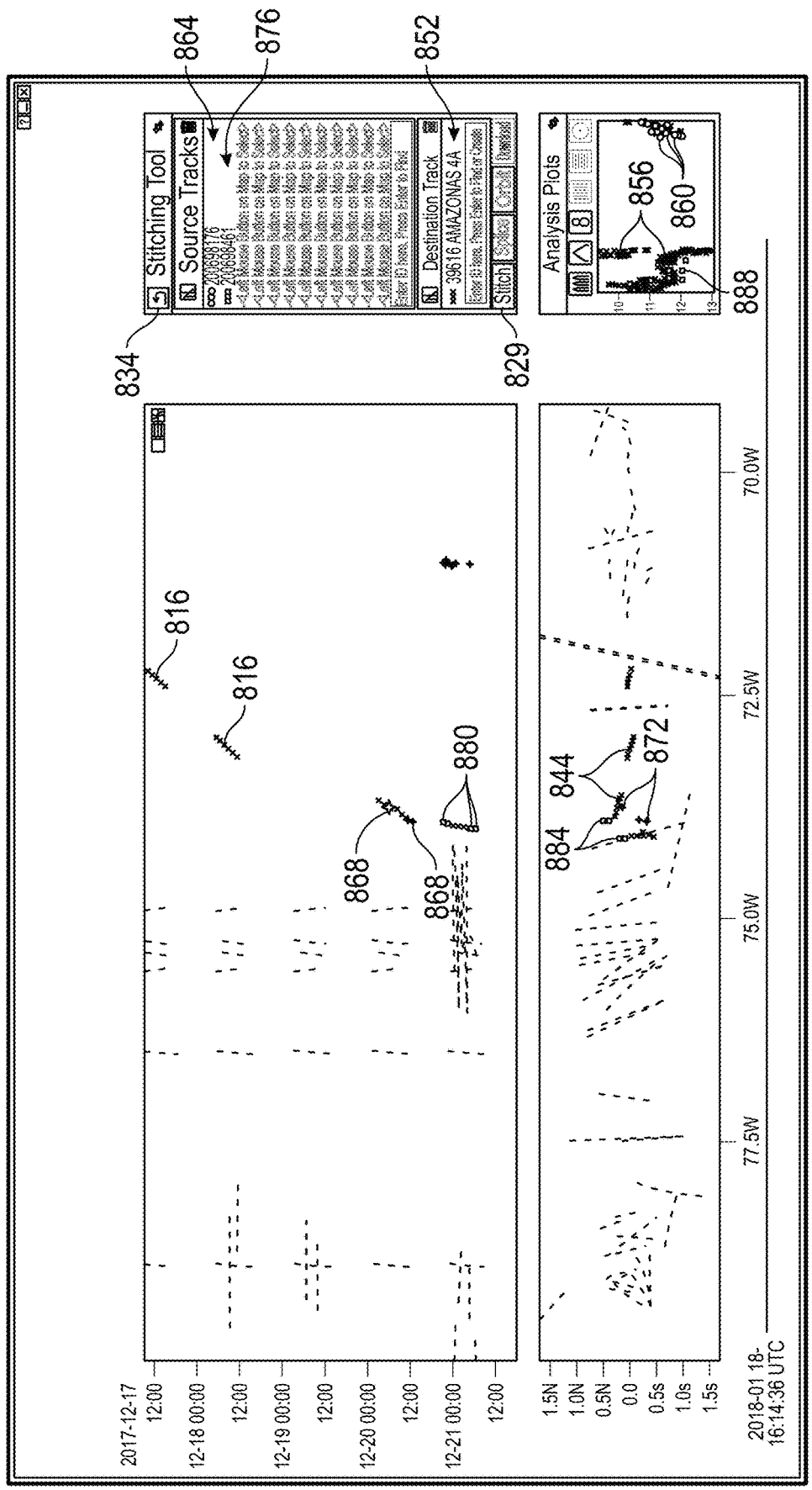
FIG. 10C shows a selection by a user of a collection of second longitude-time source points.

FIG. 10C shows a selection by a user of a collection 880 of second longitude-time source points. The collection 880 of second longitude-time source points may consist of a single point. As shown, the collection 880 of second longitude-time source points is different from either the collection 816 of longitude-time destination points or the collection 868 of first longitude-time source points. Similarly, as shown, the highlighting of the collection 880 of second longitude-time source points may be different from either the collection 816 of longitude-time destination points or the collection 868 of first longitude-time source points. The second source track identifier 876 indicates the additional selection of the collection 880 of second longitude-time source points. A corresponding collection 884 of second longitude-latitude source points and/or a corresponding collection 888 of second source analysis points may be plotted in their respective graph/plot. A highlighted stitch selector 829 may indicate that the selected collections 868, 880 are ready to be stitched. It will be noted that a single source track (as opposed to the two source tracks in the displayed example) may provide the highlighted stitch selector 829 as well.

Figure 10D:
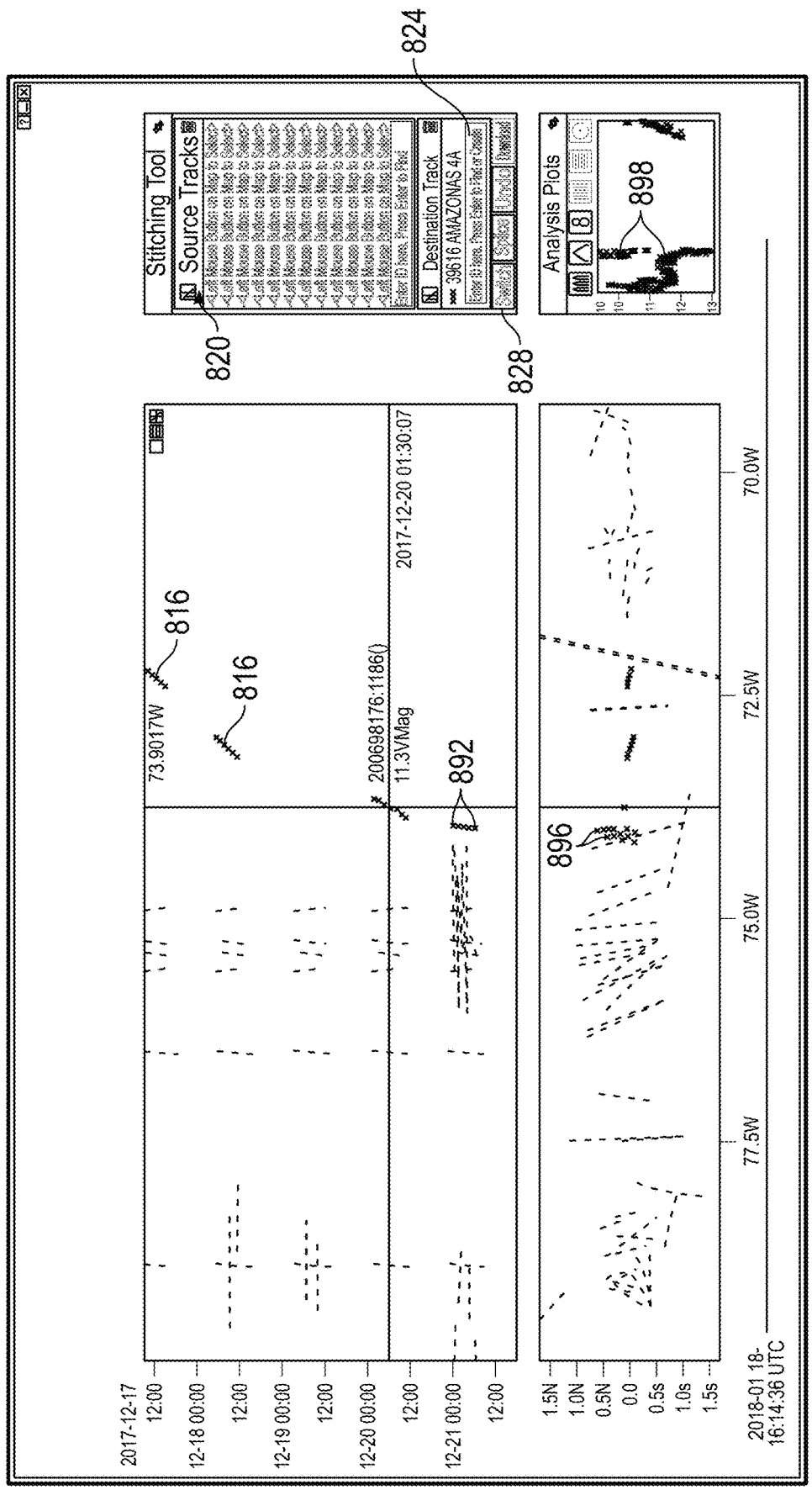
FIG. 10D shows the visualization display of FIG. 10C after a user has selected the stitch selector.

FIG. 10D shows the visualization display 200 of FIG. 10C after a user has selected the stitch selector 828. Once the stitch selector 828 has been selected by the user, the resulting new collection 892 of longitude-time destination points comprise the original destination and source track(s). A corresponding new collection 896 of longitude-latitude destination points and/or a new collection 898 of destination analysis points may also be displayed. Accordingly, it may be that no source tracks are indicated in the source track region 820. The destination track region 824 may continue to display an object identifier associated with the resulting destination track.

In this way, the tagging interface may allow a user to select a destination element comprising a first name identifier and a source element comprising at least one of the plurality of pixels corresponding to longitude-time points comprising a second name identifier. After selecting the stitch selector, the display can be configured to indicate that the source element comprises the first name identifier. In some designs, each of the destination element and source element consists of one or more points displayed by the system during the user selection of the stitch selector. In response to the user selection, the computer readable storage may be configured to associate a first data file comprising the first name identifier with a second data file comprising the second name identifier.

A reverse process may be used to splice a collection of points into separate sets of points. For example, a user may be able to select a collection of source points as well as one or more splice points from among the source points. After selecting the splice selector 832, the system may be configured to remove and/or alter an object identifier associated with the splice points relative to the source points.

For example, the system can be configured such that a user may be able to select at least one pixel corresponding to at least one longitude-time point comprising a first object identifier. The system may be configured to highlight a series of longitude-latitude points comprising an object identifier identical to the first object identifier. In response to a user selection of the splice selector, the system can be configured to distinguish a first set of one or more longitude-time points from a second set of one or more longitude-time points on the visualization display 200.

The system can be configured to highlight one or more pixels corresponding to a set of longitude-time points, for example, in response to a user input. The user input may comprise a selection of the one or more longitude-time points (e.g., via a selection of one or more pixels). The user input may include a mouse click, a double tap, a pinch motion, a two-finger tap, a grouping (e.g., circling) motion, or some other input signifying a selection of points. In some embodiments, the system may highlight a series of points based on a user selection of a first pixel. The system may be configured to highlight a series of pixels comprising the first pixel. Each of the pixels in the series can correspond to longitude-time points comprising a common object identifier. Moreover, while longitude-time points have been used as an example in FIGS. 10A-10D, other points (e.g., longitude-latitude points, analysis plot points) may be used for selecting and/or tagging (e.g., stitching, splicing).

Autoselector

One of the many advantages of the systems described herein includes the ability to track and/or predict space objects. The trajectory of a space object can be extremely challenging to calculate and predict. Each prediction may include a set of measurements, which can be variable in their accuracy, precision, and/or dependability. For example, determining a position of the object in flight may require many images of the object using many optical sensors, such as a network of telescopes. Piecing the data from these images and arriving at an accurate and reliable position can be extremely difficult.

Despite the many challenges of capturing and allowing meaningful user interactions with space objects, embodiments disclosed herein can allow a user and the system to work synergistically to help identify areas where certain data can be improved, modified, and/or removed if necessary. Such an interface combines access to an enormous dataset, direction to more interesting features and aspects of that dataset that a human user can understand, and often a user experience that allows for real-time interaction with those features and aspects that is intuitive and manageable. In certain embodiments, a user can work with the machine to identify, manipulate, and sort (e.g., combine) data about various space objects.

Figure 11:
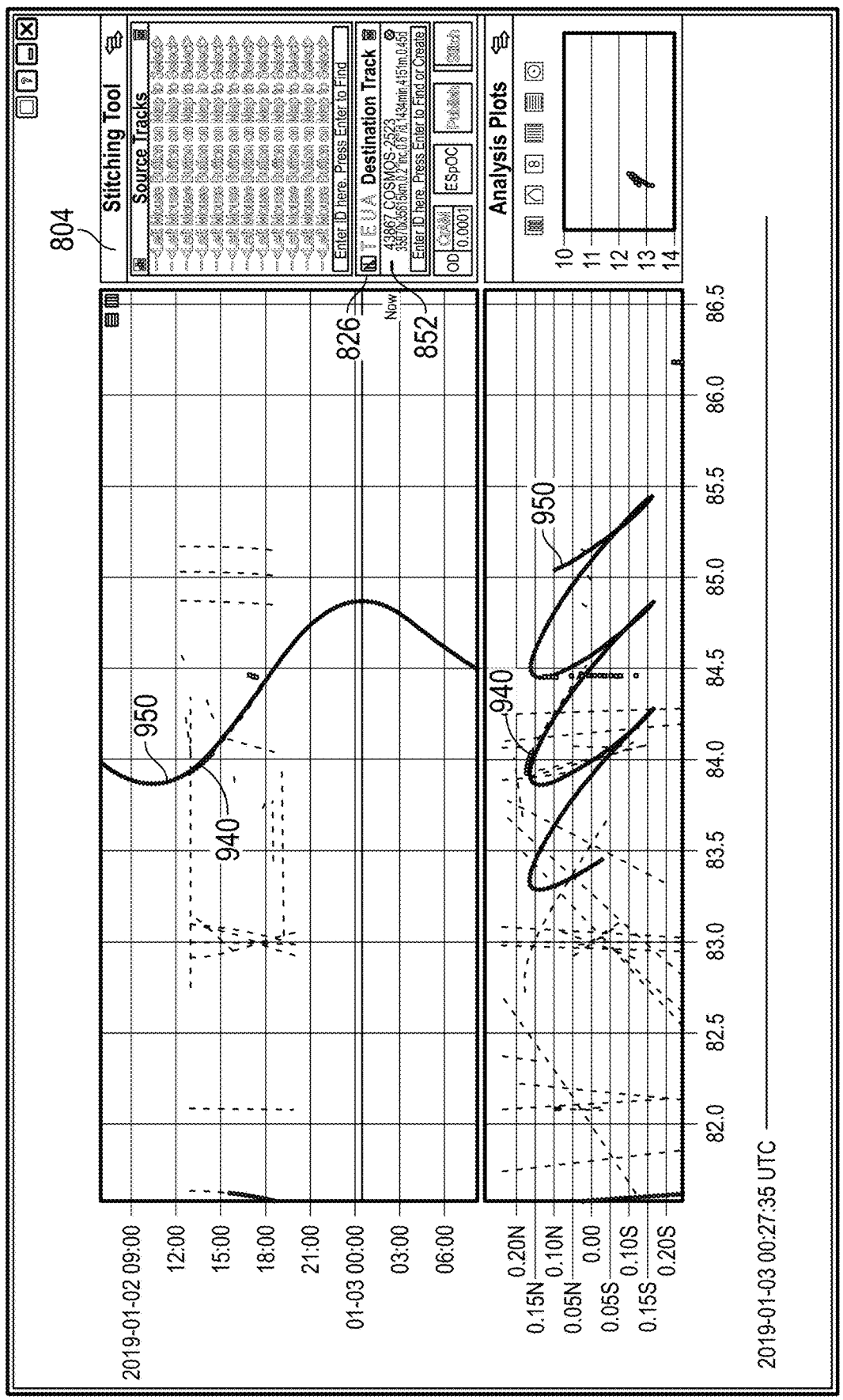
FIG. 11 shows a representation of an orbit of a space object superimposed on a longitude-time graph and longitude-latitude graph.

FIG. 11 shows an example user-selected first track (e.g., via a track identifier or track representation) and a system-predicted second track (e.g., via a system-predicted track identifier or track representation). A tagging interface is shown. One or more track representations (e.g., lines) may represent a corresponding number of tracks. A track may represent a path that an orbital object takes in space. One or more points or pixels may be used to indicate data points (e.g., timepoints) associated with an object's trajectory, position, time, etc. As shown, the first and second tracks may be displayed one on or more graphs. For example, a longitude-time graph may be shown together with a longitude-time graph (e.g., as described elsewhere herein). Additionally or alternatively, one or more scalar-time plots may be included. Other graphs/plots may be used, such as those described elsewhere herein.

Figure 12:
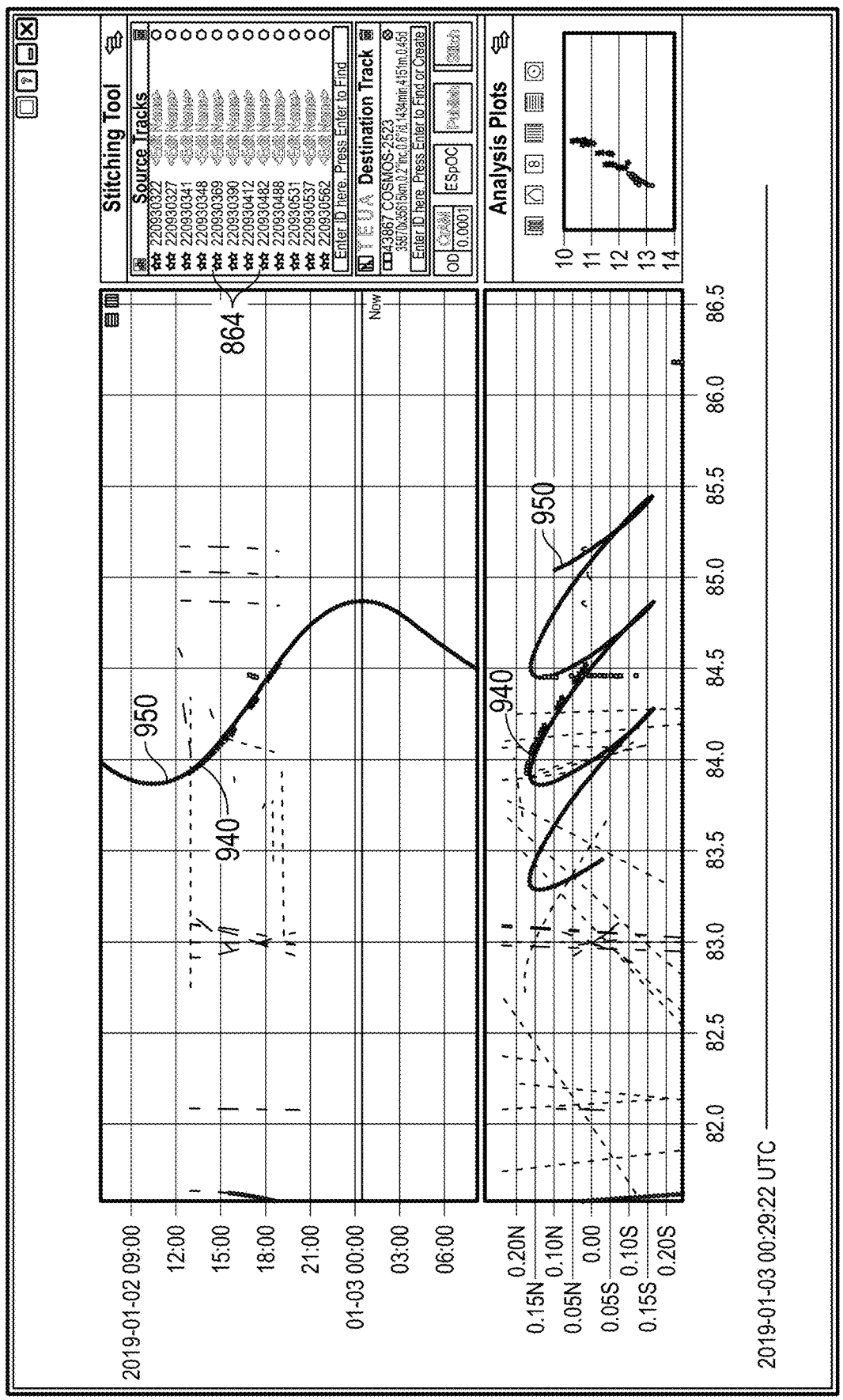
FIG. 12 shows the visualization display of FIG. 11 with highlighted longitude-time points and longitude-latitude points indicating a selection of multiple tracks associated with a space object.

FIG. 12 shows where second track is updated (e.g., to include additional tracks). As shown in the photographs of FIGS. 11-12, for example, the first and/or the second tracks can include an indication of the "future" (e.g., below a "current time" line). A first track representation may include points (e.g., longitude-time points) within a corresponding graph (e.g., longitude-time graph). Each of the plurality of longitude-time points can correspond to a set of identifiers having a time identifier between the lower-time limit and the upper-time limit and having a longitude identifier between the lower-longitude limit and the upper-longitude limit. The first track representation can provide a view of at least a portion of the first track. Additional tracks may be represented with corresponding track representations.

The display system may include a tagging interface that includes a stitch selector (e.g., "Stitching Tool" in FIGS. 11-12). The stitch selector may include certain functionality (e.g., buttons, interface design, etc.) of that described in relation to FIGS. 10A-10D, for example. In response to a user selection of a track representation, the display can indicate a selection (e.g., automatic, user-identified) of a different track representation corresponding to a second track. The system may automatically determine that the second track representation based on a determination that the second track is associated with the same orbital object as the first track.

The second track representation may be displayed on one or more graphs described herein. The system can highlight one or more of the first and/or second track representations (e.g., based on a user selection of the corresponding track representation).

In certain embodiments, the system can update the display to progressively highlight one or more additional track representations (e.g., after highlighting the first and/or second track representations). The system may update the display to automatically and/or progressively highlight each of the additional track representations. The delay may be between about 0.01 s to about 10 s between each of the highlights. The delay may depend on the density of tracks and/or the number of tracks in the viewable display. In response to a user's suspend input, the system may suspend and/or stop progressive highlighting of each of the additional track representations. A length of the delay between each of the highlights may depend on at least one of a density and/or a number of tracks displayed. The display may be configured to progressively highlight the additional track representations based at least on a time identifier associated with the additional track representations. The display may progressively highlight the additional track representations (e.g., within the longitude-time graph) by receiving a user designation. The designation may include one or more of a scroll indicator, a button, a wheel, a switch, or any combination thereof. Additionally or alternatively, the display may deselect highlighting by receiving the user designation.

As described in more detail herein, the system may be configured to determine an orbital path of the orbital object. The orbital path may be determined over an orbital time period that includes a first time period that (i) overlaps the time period, (ii) precedes the time period, (iii) succeeds the time period, or (iv) any combination thereof. As shown in FIGS. 11-12, the orbital path may be shown on one, two, or more graphs simultaneously. For example, the orbital path may be shown on the latitude-longitude graph and/or the longitude-time graphs. Other variations are possible.

Image Stacking

Figure 13:
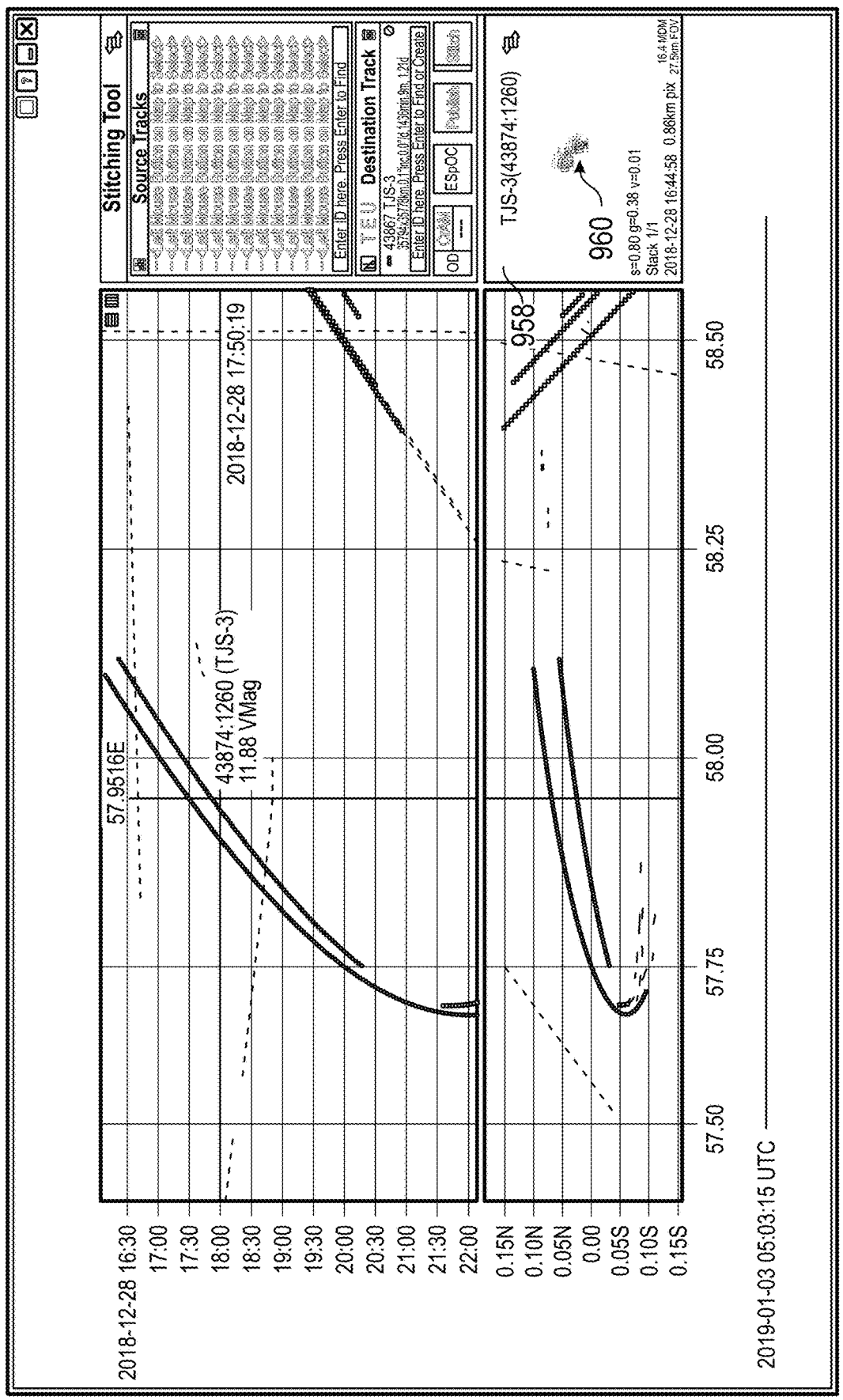
FIG. 13 shows a visualization display comprising a photograph selected from a set of photographs based on a specified latitude range, a specified longitude range, and a specified time range.

The system can receive a plurality of photographs of space objects within a time domain. Each of the plurality of photographs can correspond to a latitude domain, a longitude domain, and/or a timestamp within the time domain. Based on a selection (e.g., by a user), the system can receive image data derived from the plurality of photographs. In certain embodiments, the system may receive a user selection of a latitude range within the latitude domain, a longitude range within the longitude domain, and/or a time range within the time domain. FIG. 13 shows a photograph based on a user-selection of a latitude range, a longitude range, and a time range of set of photographs. Once selected, the display can show an object image 960 within the image chip 958.

Figure 14:
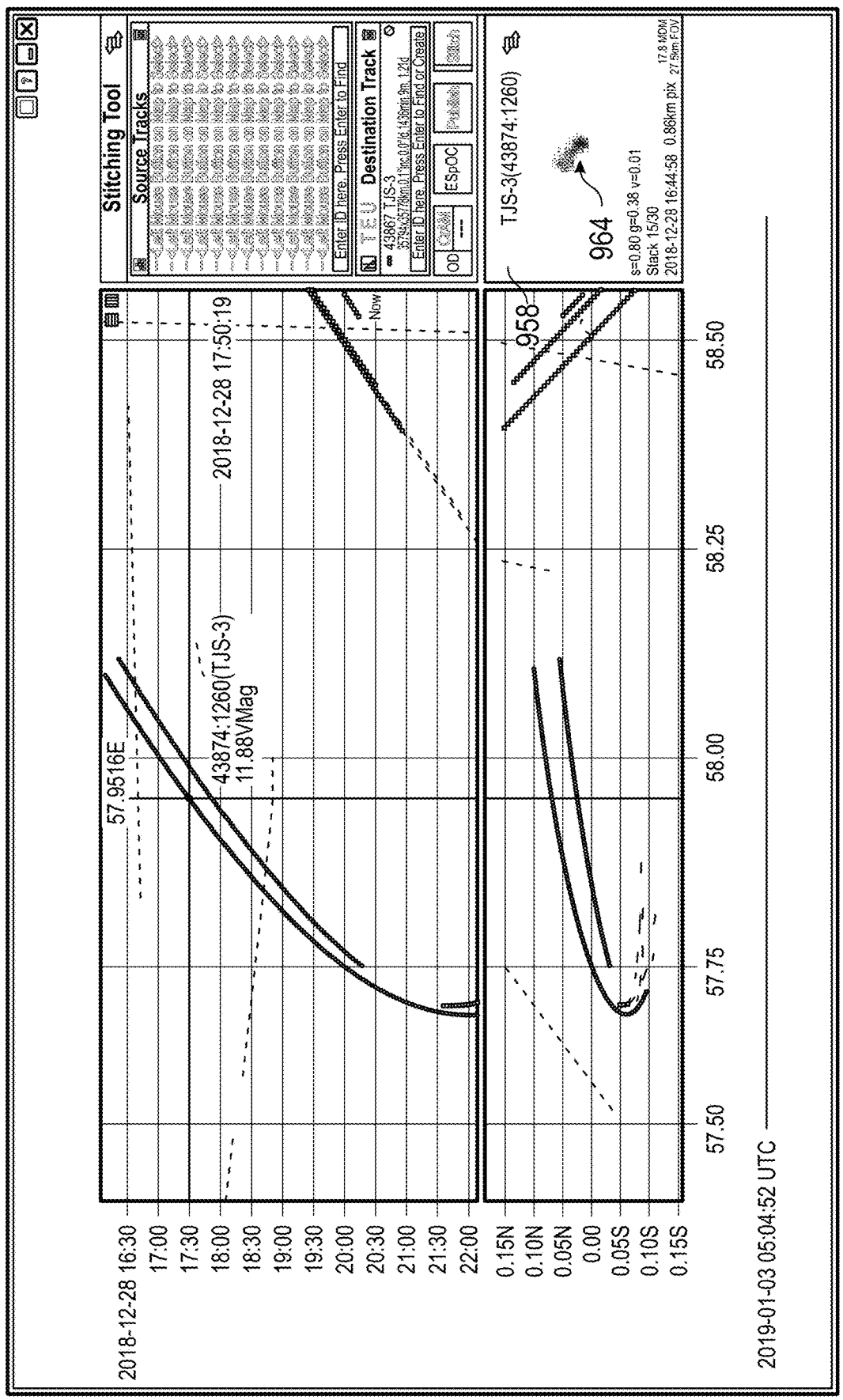
FIG. 14 shows the visualization display of FIG. 13 comprising a photograph modified relative to the photograph shown in FIG. 13.

In response to the user selection, the system may modify the image shown in the image chip 958. FIG. 14 shows an example modified photograph (e.g., based on a set of photographs) relative to the photograph showed in FIG. 13. The modification may be based on at least one of the plurality of photographs received by the system. As shown in FIG. 14, the display interface can generate a display of the 958. As shown in the photographs of FIGS. 13-14, one or more of the space object's characteristics (e.g., location in photo, size, color, brightness, etc.) may be shown as being modified (e.g., the object may be removed from the photo).

The modified image may be a combination (e.g., a summation, overlay, etc.) of two or more images of the plurality of photographs within the selected latitude range, longitude range, and time range. For example, the system may integrate (e.g., summate values of) the image data derived from the plurality of photographs of space objects. For example, certain values (e.g., RGB values, color histogram values, image histogram values, brightness values, contrast values, contrast histogram values, etc.) may be added together and/or averaged across a plurality of photographs to determine a final (e.g., integrated) value. One of more of the photographs may show a plurality of space objects even though FIGS. 13-14 show only a single space object.

The system can receive a user selection of an object shown in a photograph and display a marker indicating a location of the object within the photograph. The marker may include any marker, such as a circle, a box, and/or crosshairs. In some embodiments, a user can select a time identifier and/or a name identifier associated with an object. Based on this selection, the system may display a marker indicating a location of the object within the photograph.

The system can be configured to automatically identify one or more objects within the modified image. Such modification may include increasing or decreasing a brightness, a contrast, or a gamma value of one or more photographs. Other changes may be made. For example, the system may reduce a characteristic of an object within at least one of the plurality of photographs. As another example, the system may remove an object within at least one of the plurality of photographs, as further discussed below.

When reducing a characteristic of an object, the system can reduce a brightest of the object within the photograph. Additionally or alternatively, a larger object (e.g., the largest object in the photograph) within the at least one of the plurality of photographs may be obscured or removed. In some embodiments, the system is configured to reduce a characteristic of an object based on a location of the object within the photograph. For example, a central object may be obscured or removed from the photograph. The user may select the object and/or the system may automatically detect the object. Additionally or alternatively, the system may reduce a characteristic of the selected object, such as a brightness. Other objects may be removed from the photograph or their visibility may be otherwise substantially reduced.

In some embodiments, the system develops each of image chips such that a space object is disposed at a predetermined location of each image chip of a plurality of image chips. For example, the space object may be disposed at or near a center of the image chip. This can allow a user more convenient and intuitive visual access to the space object within the chip. Additionally or alternatively, this arrangement can allow for fewer mistakes by the system in identifying the space object, such as when modifying one or more characteristics thereof, as disclosed herein.

It may be further advantageous to dispose the space object within the same predisposed location within the image chip within a particular range of latitudes, longitudes, times, etc. For example, the space object may be maintained at a center of each image chip even as corresponding latitude and longitudes ranges change for each image chip of the plurality of image chips as the space object moves through space. The system may use this information to predict a position of the space object position and/or an orbit of the space object orbit. The system may, based on the predicted space object's position and/or orbit, develop an image chip such that the predicted space object position and/or the space object orbit position (e.g., in an image chip where the expected position of the space object is located) is disposed at a center of the image chip. Other configurations are possible.

Object Detection

It can be advantageous to be able to automatically and/or manually identify objects in the photographs or image chips. For example, the system may be configured to detect one or more objects (e.g., additional objects) that may not have been previously detected by the system or a user.

Figure 15:
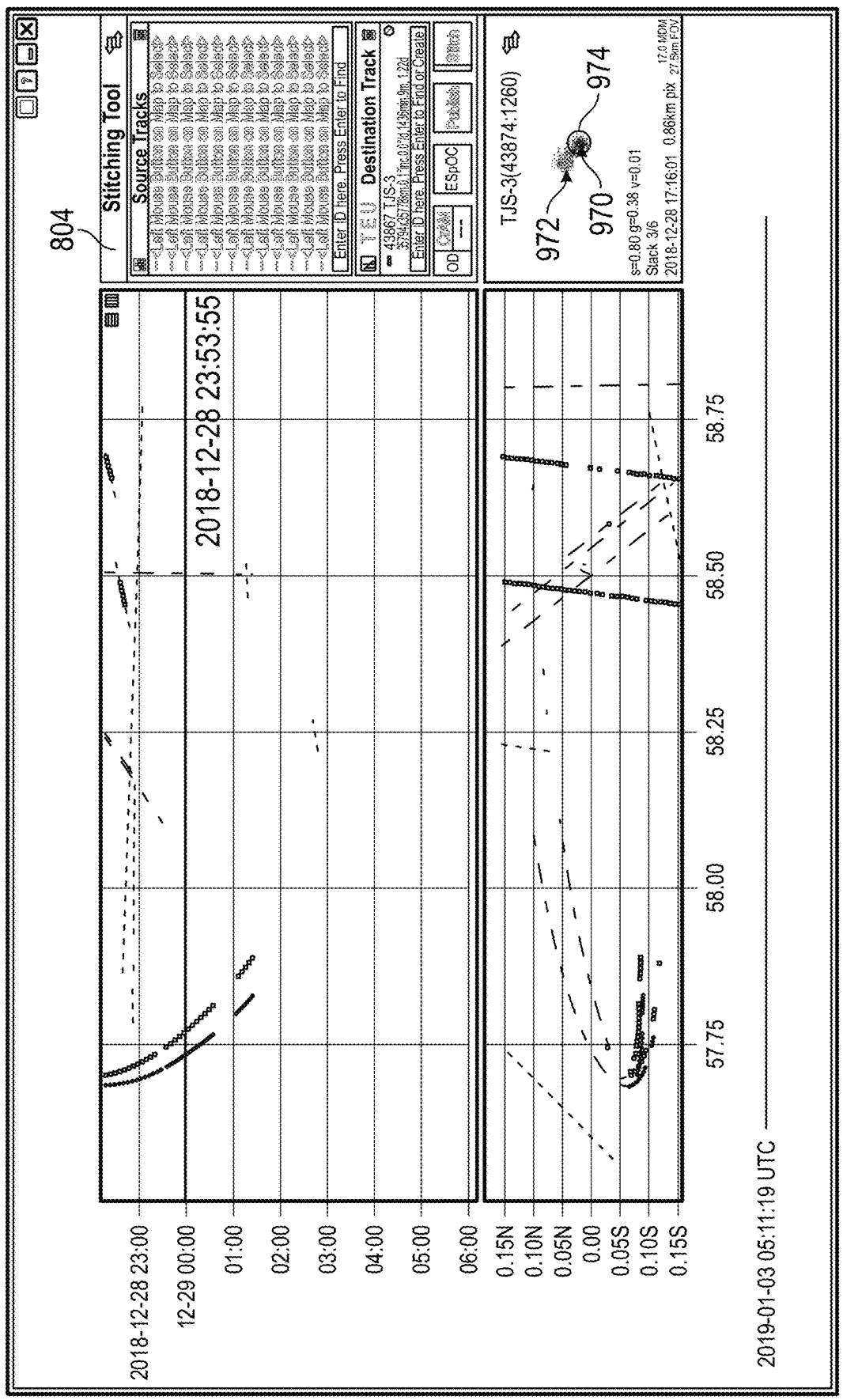
FIG. 15 shows a visualization display comprising an indication of a user-selected primary object in a photograph.
Figure 16:
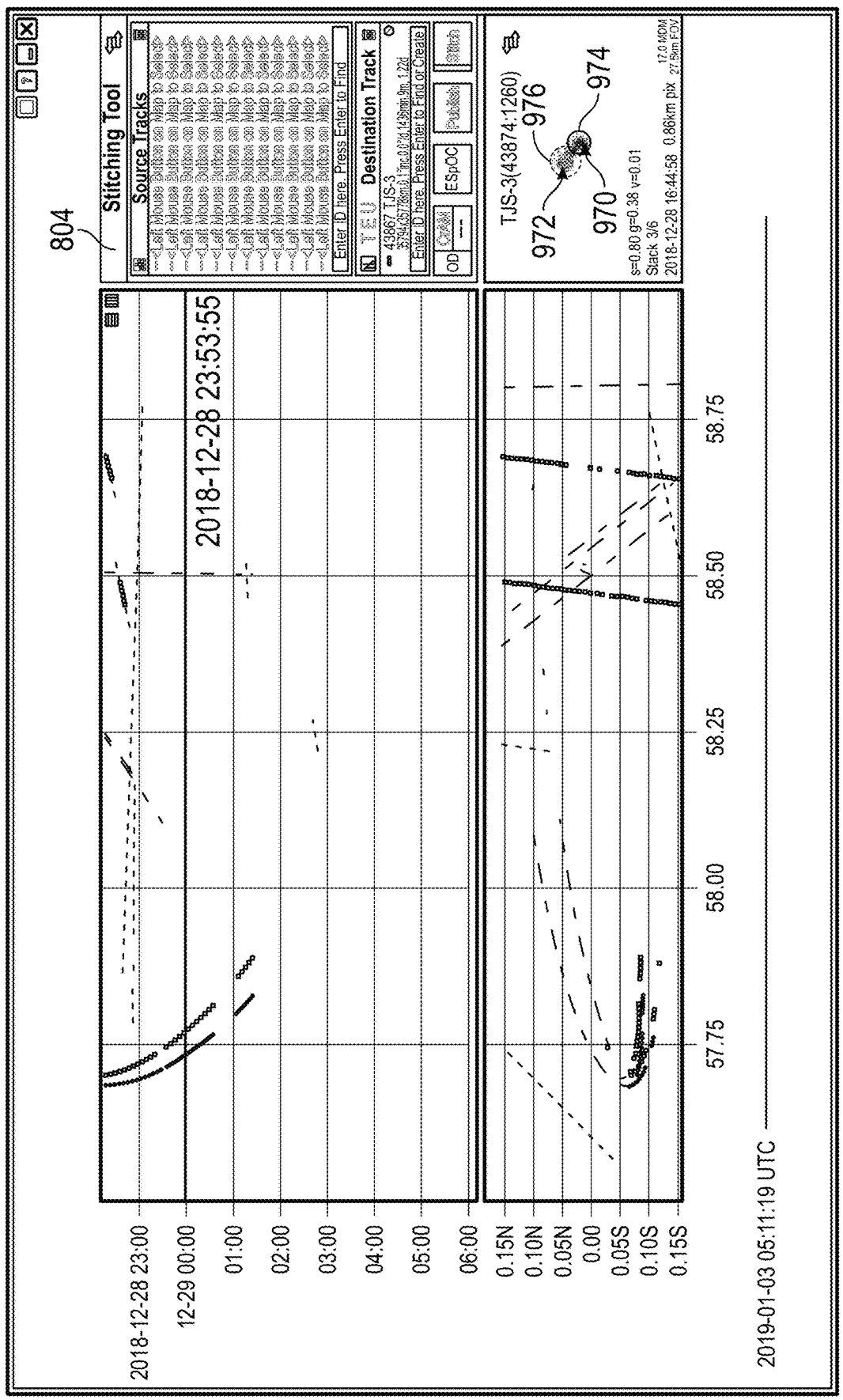
FIG. 16 shows a visualization display comprising an indication of a secondary object detected by a space object detection system.

Reference will now be made to FIGS. 15-16. FIG. 15 shows an indication of a user-selected primary object 970 in a photograph and FIG. 16 shows an indication of a secondary object 972 detected by the system (e.g., based on the user selection of the first object, based on an automatic detection). As shown in the photographs of FIGS. 15-16, the primary and/or secondary objects may be selected using user-inputted time and/or name identifiers. The system can automatically identify the primary object 970 in the photograph. In some embodiments, the system may receive a user selection of the secondary object 972 object in the at least one of the plurality of photographs. The secondary object 972 may be more visible in part because of modifications to the photographs, as described herein. In response to the user selection of the secondary object 972 in the at least one of the plurality of photographs, derive a second set of identifiers corresponding to the second orbital object.

A display a marker can be displayed to indicate a location of the primary object 970 and/or the secondary object 972 (and/or other objects) within the photograph. The marker(s) 974, 976 can be one or more of a circle, a box, crosshairs, and/or some other visual or audible marker. For example, as shown in FIG. 16, the secondary object selection identifier 976 may be a dotted-lined circle. The primary object selection identifier 974 may be a different shape, size, color, etc. to distinguish it from the secondary object selection identifier 976. Various colors or highlights may additionally or alternatively be included to mark its location in the photograph.

In some embodiments, a user can select a time and/or name identifier to signal to the system a particular location or other characteristic of the secondary object 972. The system can receive the time and/or name identifier display a marker indicating a location of the secondary object 972 within the at least one photograph. The user can enter the secondary object's 972 via various input methods, such as a mouse, keyboard, eye gesture, hand gesture, and/or other indication.

In some embodiments, the system may be configured to derive a set of identifiers associated with the secondary object 972 to automatically identify the secondary object 972 in one or more photographs. For example, the system may determine a particular contrast between an object and a background. Additionally or alternatively, the system may determine that a primary object (e.g., the primary object 970) appears to have an unusual shape, which may be an indication of another object in the frame. Such a contrast may be more apparent, for example, if a user and/or the system automatically adjusts a parameter of the image, such as the image's brightness, contrast, gamma value, and/or other characteristic. As noted above, this modification may include modifying a characteristic of the primary object 970 of the at least one of the plurality of photographs.

The system may receive the user input via two or more interface devices. For example, a combination of a keyboard, mouse, controller, headset, touch-interface, and/or other interfaces may be used.

Orbit Determination

As noted above, one of the many advantages of the systems described herein includes the ability to track and/or predict space objects. The trajectory of a space object can be extremely challenging to calculate and predict. Yet, if determining a space object's position is challenging, predicting the trajectory (e.g., orbit) of the object into the future and/or based on limited data can often be even more complicated. Yet, in spite of these challenges, embodiments disclosed herein can accurately determine such trajectories and/or present those determinations in a format that a user can readily understand and manipulate. Such an interface combines access to an enormous dataset, direction to more interesting features and aspects of that dataset that a human user can understand, and often a user experience that allows for real-time interaction with those features and aspects that is intuitive and manageable. Indications of, and data on, an object's trajectory can be indispensable to a user in certain circumstance. Such data may help identify future collisions, and having access to the data may help protect life and property.

Figure 17:
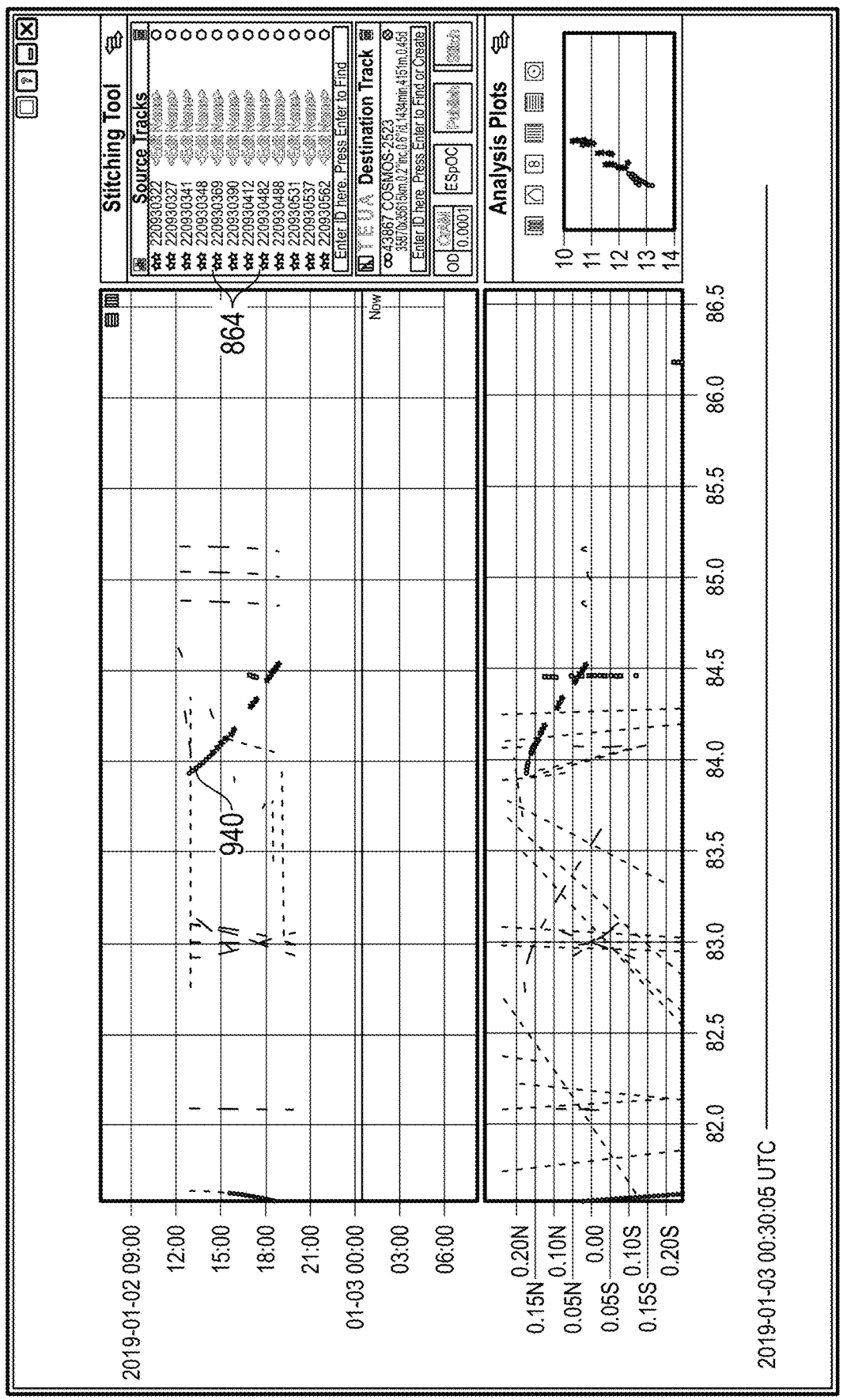
FIG. 17 shows a visualization display comprising a plurality of tracks selected by a user.
Figure 18:
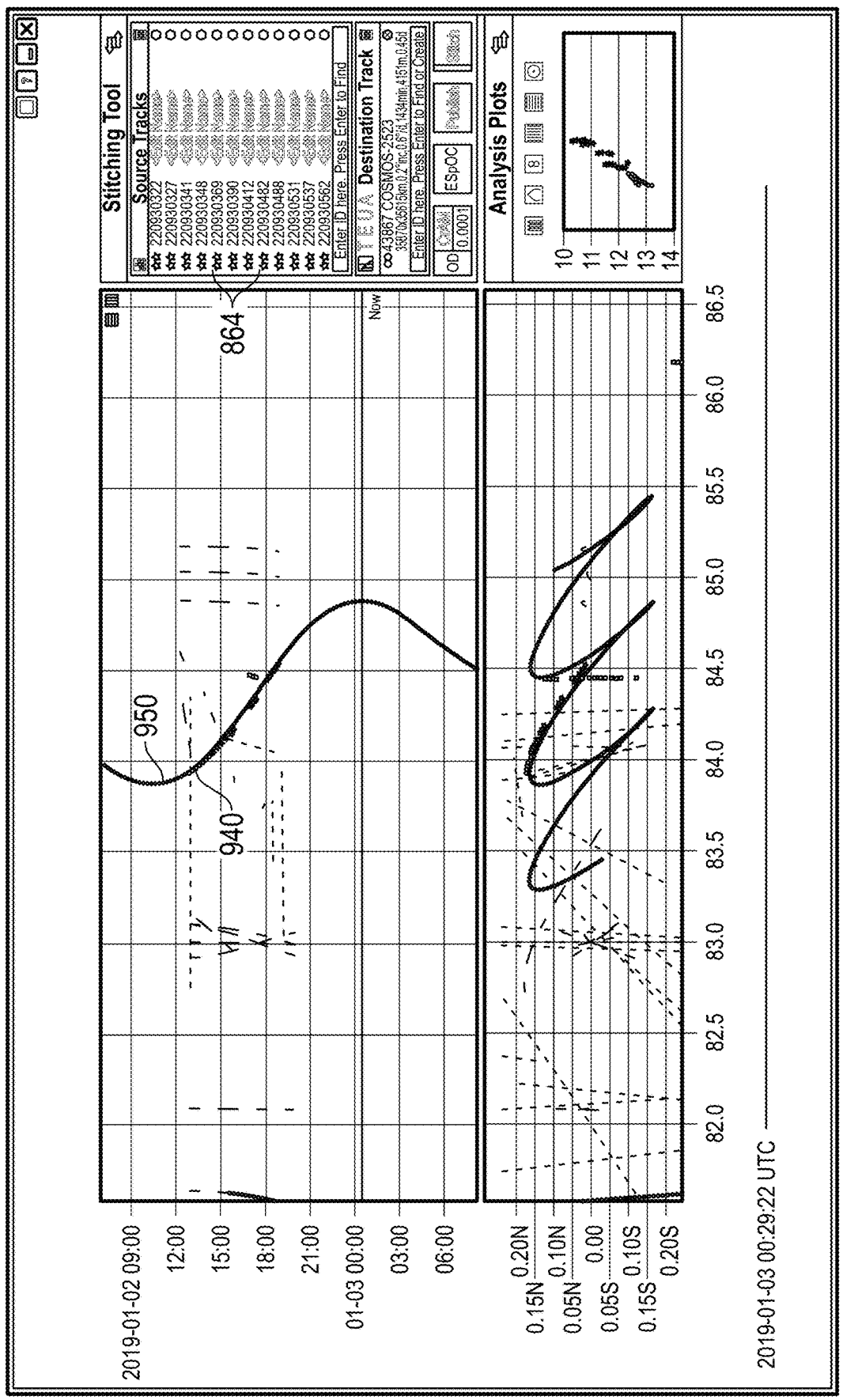
FIG. 18 shows a visualization display comprising an orbit of a space object determined using a destination track and source tracks.
Figure 19:
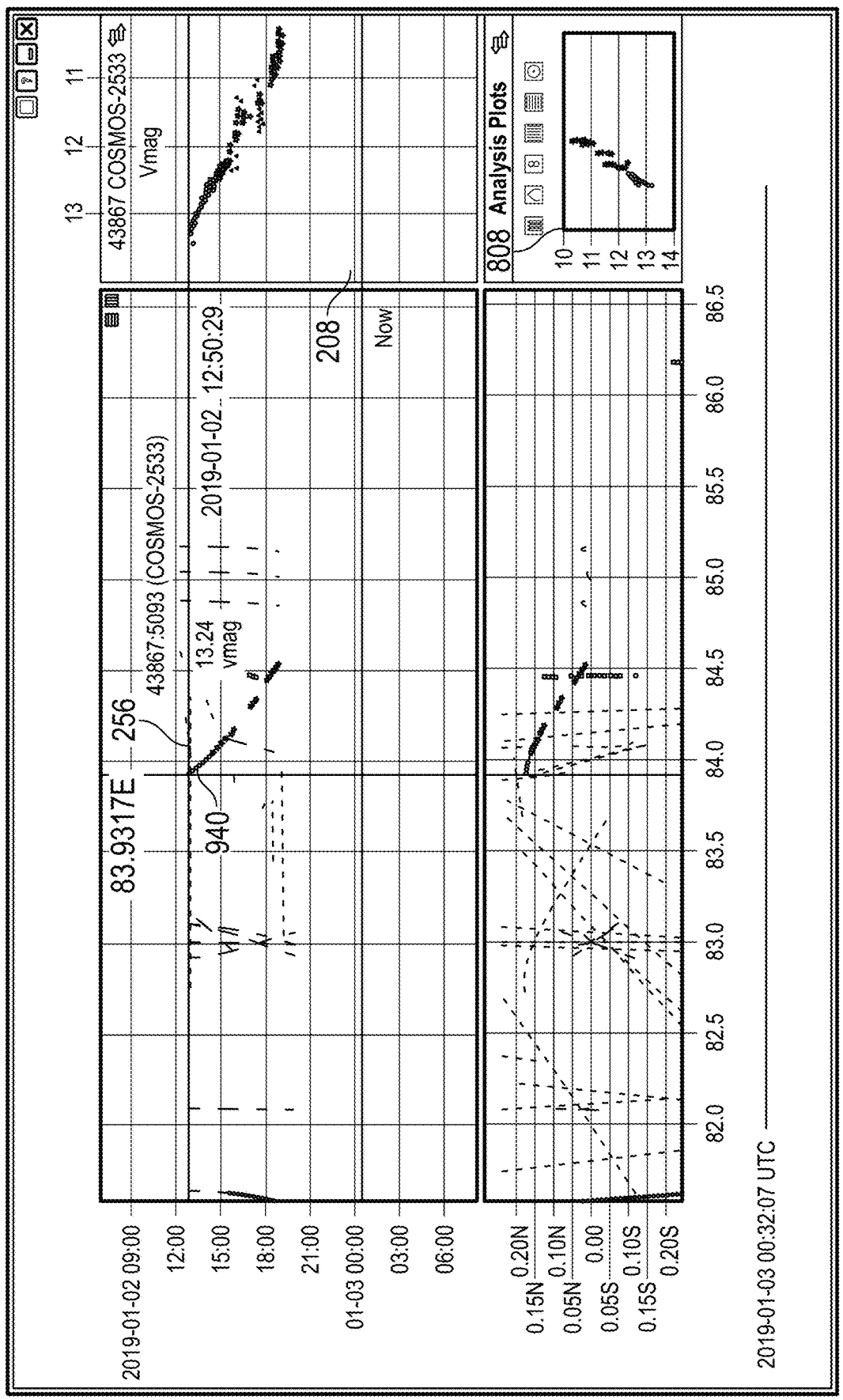
FIG. 19 shows a visualization display comprising longitude, time, and selected track labels.
Figure 20:
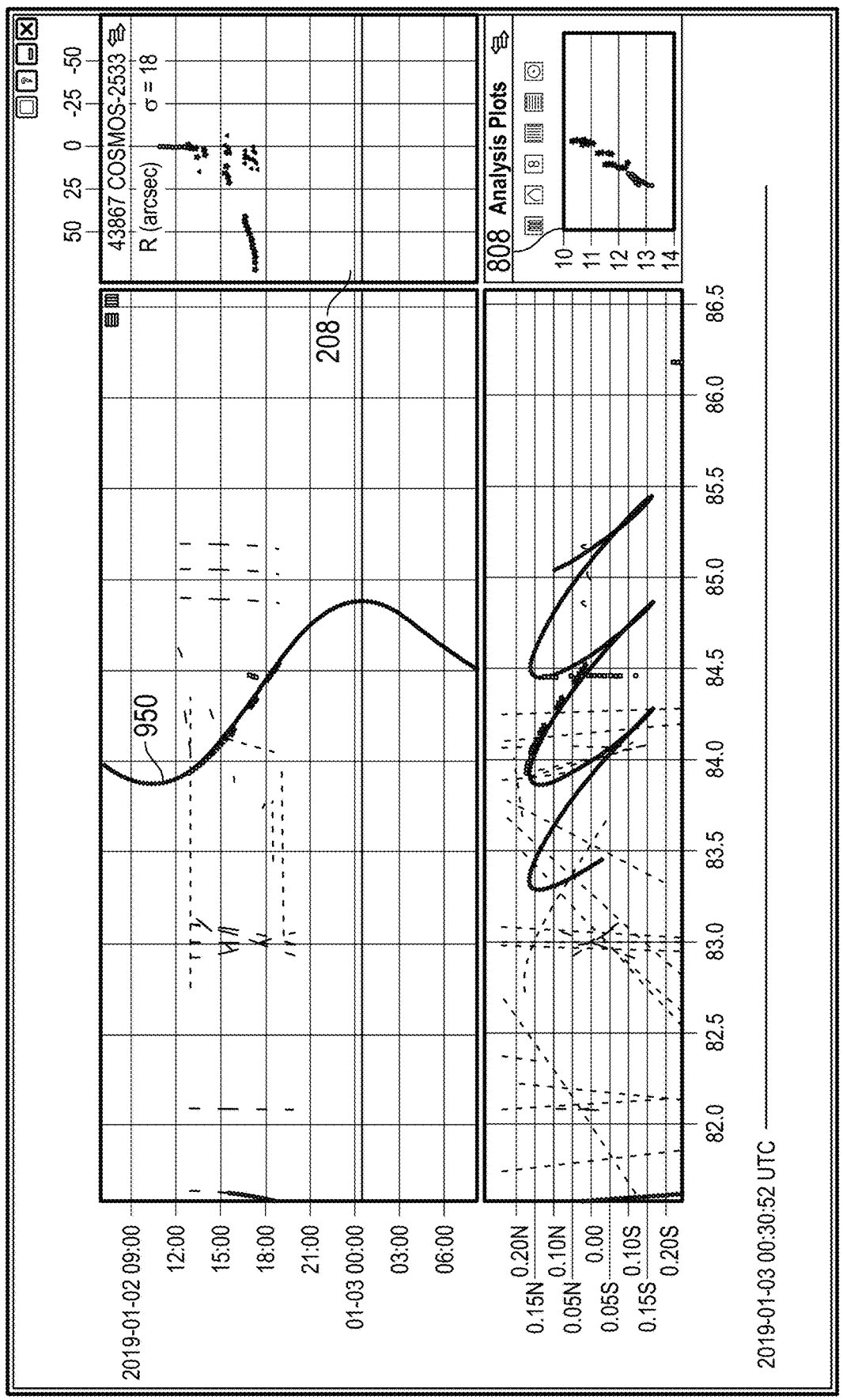
FIG. 20 shows a visualization display comprising selected tracks of a space object, an orbit for the space object, and a graph of residuals between the selected tracks and the orbit.

Reference will now be made to FIGS. 17-20. FIG. 17 shows a plurality of time points selected by user. FIG. 18 shows a track that extends both into the past and future. Tracks may include published orbit tracks and/or user-determined tracks. FIG. 19 shows an example of a longitude-time plot and a scalar-time plot showing same points. As shown, two or more plots may be used to show the same plurality of points and/or one or more of the same tracks. As shown in FIGS. 17-19, for example, a user may select timepoints by choosing a combination of time, name, longitude, and/or latitude identifiers. FIG. 20 shows a graph of residuals (either between published and user-selected or between published and system-determined). For example, as shown, the scalar-time graph 208 may indicate the residual between the system-determined timepoints and/or track and another (e.g., published) corresponding track. The scalar-time graph 208 shown indicates that a residual is near zero for some portions but deviates (e.g., to greater than 50) for other portions. Such a comparison can help the user and/or the system to calibrate the accuracy of the system's determinations. Additionally or alternatively, the user and/or system may be better able to determine the accuracy of the other corresponding track. As shown, the residual is represented as a sigma ("a") or other symbol. The residual may be shown as a difference, an average, a standard deviation, or other metric.

As shown, the system can receive a selection of a plurality of timepoints (e.g., from a remote or local database, as described herein) corresponding to one or more orbital objects. Each timepoint may include sets of identifiers within a selected time period. For example, as shown, the point marker 256 indicates that a user has selected the track representation 940. Based on these timepoints, the system can determine an orbital path of an orbital object associated with the selected plurality of timepoints, wherein the orbital path is determined over an orbital time period that includes a time period that (i) overlaps the selected time period, (ii) precedes the selected time period, (iii) succeeds the selected time period, or (iv) any combination thereof. The selected time period generally spans from a lower-time limit to an upper-time limit that may be selected by a user or in certain implementations by the system automatically. Based on the selection, the system can generate a display interface, such as the one shown in any of FIGS. 17-20. The selected time period can determine one or more axes of one of more graphs displayed, such as any of the graphs described herein. The display can show an indication of the orbital path of the object spanning the selected time period. This indication is represented as a predicted track representation 950 in FIGS. 18 and 20.

The selection of the timepoints may include a selection based one two or more identifiers of those timepoints. This selection may help the system identify a space object of interest. For example, the selection may be based on a selection of a time identifier and a name identifier, multiple time identifiers, multiple longitude identifiers, multiple latitude identifiers, a combination of these, or some other combination of identifiers.

Once selected, the system can display an indication of the orbital path spanning a future-time period subsequent to the selected time period. Additionally or alternatively, the indication of the orbital path may span a prior-time period preceding the selected time period. As shown in FIG. 19, for example, an indication of the current time (e.g., the time the user is using the display) may be displayed. The current time may be shown as a line traversing at least part of a longitude-time graph and/or a scalar-time graph, for example, as shown in FIG. 19. Additionally or alternatively, a time of a selected timepoint may be displayed. Such times can orient a user around which part of the displayed orbital path covers a future time period. As shown, for example, in FIG. 20, the predicted track representation 950 may be displayed on a plurality of graphs simultaneously. Additionally or alternatively, the selected timepoints may be indicated on a plurality graphs.

Because the system in certain embodiments can predict the future position of the space object, the indicator of the current time may be displayed so as to indicate that the time period of the predicted track representation 950 spans a time later than the current time (e.g., the "future").

It may be helpful for a user to compare a system-predicted path with a third-party published path (e.g., a path determined from a received path equation or other symbolic representation). The system may, through an orbital path data interface for example, receive orbital path data from one or more orbital path data sets (e.g., a third party data set, a previously predicted data set of the disclosed systems). Each of the received orbital paths may be associated with the same orbital object. The system can then display, based on the received orbital path data, an indication of a received orbital path (e.g., from the third party) spanning the selected time period. This orbital path may be in addition to or instead of the predicted track representation 950, for example.

In some embodiments, the system can determine the received orbital path based on a comparison of corresponding name identifiers associated with the received orbital path and the orbital path determined by the system. Because the orbital path data among the various predicted data may be slightly different, a comparison of the data may be helpful. Accordingly, the system may be able to compare the selected orbital path with the received orbital path and, based on the comparison, indicate a result of the comparison. For example, the system may determine and display a residual characteristic of the selected orbital path by determining a difference between a timepoint associated with the selected orbital path and a corresponding timepoint associated with the received orbital path.

Comparing the selected orbital path with the received orbital path may include determining a difference between at least one identifier (e.g., a time identifier, a latitude identifier, etc.) associated with the selected orbital path and a corresponding identifier of the received orbital path. The system may determine, for example, a residual characteristic (e.g., a level of accuracy or reliability) by calculating an ascension and/or a declination based on the data. Other configurations are possible.

Maneuver and Transfer Determination

Once an orbit has been determined, it can be useful to determine how that orbit relates to another space object, such as an orbit of the other space object. Space objects may from time to time change their expected trajectory. For example, an altitude, longitude, latitude, and/or velocity may be altered. This alteration may occur through short accelerations (e.g., burns) and/or sustained (e.g., continuous) accelerations. In some instances, it may be desirable to adopt the orbit of a target space object or simply some other orbit. Adopting a new orbit, such as the orbit of a target space object, is called an orbit transfer. It may additionally or alternatively be desirable to not only adopt another orbit but to do so at the same or similar position of a target object (e.g., substantially along the same path as the other space object). Joining another object in such a way is called a rendezvous transfer. An orbit transfer or a rendezvous transfer may include a Lambert transfer, which is an expenditure of a minimum or substantially minimum change in velocity (or energy) of the object to complete the transfer. The change in velocity can be denoted as a "delta V." In each of the orbit and rendezvous transfers, the object completes at least two separate maneuvers—an initial maneuver and a final maneuver.

A third type of transfer may involve a single maneuver. This type of transfer can be used to alter an orbit of an object to contact or impact another space object (e.g., substantially transverse to the path of the other space object). Such a maneuver may be used to perturb the path or orbit of the target object. This third type of transfer is called an intercept transfer. Each of these transfers, along with other details, is described in more detail below.

A user interface can be helpful in visualizing, identifying, and/or manipulating a path (e.g., orbit) of a space object. The user interface can include a display interface such as is disclosed herein (e.g., visualization display 100, 200). For example, the interface can include a longitude-time graph (e.g., having longitude and/or time axes). The interface can include a zoom control interface (e.g., a time axis zoom control interface, a longitude axis zoom control interface, etc.) and/or a pan control interface (e.g., a time axis pan control interface, a longitude axis pan control interface, etc.). The zoom control interface can allow a user to select a scale factor for one or more axes of a graph (e.g., a longitude-time graph, a longitude-latitude graph, a magnitude-time graph, etc.). Additionally or alternatively, the pan control interface can allow a user to move a lower and/or upper limit of a graph in the same direction.

The user interface can include one or more indications of orbital paths that have been stored, received, and/or determined by the system. The interface can allow a user to select an initial orbit of an orbital object and a target orbit. One or both of the initial and target orbits may be selected from stored, received, and/or determined orbits. The system may allow a user to quickly and easily toggle between which selected object corresponds to the initial orbit and which one corresponds to the target orbit, where applicable.

Using the interface, a user can select an orbit transfer window (e.g., an orbit transfer time window, an orbit transfer longitude window, etc.). The orbit transfer window can set boundary conditions for when and/or where an orbit transfer is to be initiated, at least partially take place, and/or be completed by a space object. The "now" line on the user interface may serve as a minimum boundary condition on time. The transfer window can identify how long an object has to complete a transfer, when the transfer can begin, and/or when it can end. Based on the transfer window, the system can automatically determine a transfer duration, a transfer start position, a transfer end position, and/or a total transfer distance. Automatically may mean occurring without further input from a user (e.g., execution instruction, selection, etc.). The system may allow a user to set a maximum computation time that determines how long the system can strive to best approximate the calculated value(s) within the set time. For example, a user may set a maximum computation time of about 0.01 s, 0.1 s, 0.5 s, 1 s, 2 s, 5 s, 10 s, 25 s, 30 s, 45 s, 60 s, or any value therein or a range of values having any endpoints therein. The transfer window can determine in part an efficiency of an energy expenditure by the selected object. For example, a larger time window may improve an efficiency of an energy expenditure of a selected object. A user can select a transfer action for the orbital object (e.g., an orbit transfer, a rendezvous transfer, an intercept transfer, etc.). As disclosed herein, the transfer action may include one, two, or more individual maneuvers. In some designs, details of each maneuver may be selected by the user. For example, one or more of the following parameters (e.g., maximum, minimum, target, etc.) of the space object may be selectable by a user: an energy change, a velocity change, a path angle change, an altitude change, a latitude and/or longitude change, a threshold distance from another object (e.g., another space object), a closing velocity, a solar phase angle (e.g., an angle between the vector toward the sun and the line of sight from one target to the other), etc. Other details of the space object may, if known, be identified by the user (e.g., mass of the object, name of the object, relationship of object to other space objects, etc.), such as those described herein.

The system can calculate or otherwise determine one or more details of an orbital object and/or of an orbit of the orbital object, such as is described above. Some details may apply to a change in a path of the orbital object, such as a transfer action. Many of these details include, for example, one or more of the following: a trajectory of the transfer path, a duration of one or more maneuvers, a total duration of a transfer action, a curvature of a path during one or more maneuvers and/or transfer actions, a velocity (e.g., speed and/or direction) of the object during one or more maneuvers and/or transfer action, a time of initiating and/or concluding one or more maneuvers and/or transfer actions, a contact time when an object encounters another object, a location of said encounter, an altitude during one or more maneuvers and/or transfer actions, a mass of the object, another scalar value (e.g., brightness, diameter, etc.) of the object, a closing velocity, a solar phase angle (e.g., an angle between the vector toward the sun and the line of sight from one target to the other), and/or any other detail of a space object.

For example, the system can determine a velocity change of the orbital object capable of causing the orbital object to move from the initial orbit to the target orbit within the transfer window (e.g., starting and/or ending the transfer within the transfer window). The system may additionally or alternatively calculate a transfer path of the orbital object corresponding to a path between the initial orbit and the target orbit. The path may begin and/or end within the transfer window, which may include a transfer time window. The system can modify the longitude-time graph to include an indication of the calculated transfer path.

In some designs, the system determines the initial orbit of the orbital object by using observations of the orbital object collected over a time period having an endpoint no later than a first maneuver timepoint (e.g., when the first maneuver is to begin). The calculated velocity change may be a minimum velocity change (e.g., in a Lambert transfer) needed to perform the maneuver and/or the full transfer action.

For certain transfer actions (e.g., the orbit transfer), the system may be configured to calculate, based on the orbit transfer window, a velocity change associated with a maneuver of the transfer action. The orbit transfer window can include a completion timepoint by which the orbit transfer is to be completed. The calculated second velocity change may be capable of causing the orbital object to move (e.g., after a first maneuver) into the target orbit within the orbit transfer time (e.g., based on the orbit transfer time window). The system can display an indication of the target orbit relative to the transfer path, such as described below. The indication of the calculated transfer path can include indications of timepoints corresponding to respective initiations of one or more maneuvers of the transfer action.

In some implementations, the system can determine a total velocity change. The total velocity change can include a summation of one or more velocity changes associated, for example, with corresponding one or more maneuvers of a transfer action.

As noted above, the transfer action can be an orbit transfer for adopting a target orbit. The transfer action can be a rendezvous transfer for joining a position and adopting an orbital path of a target orbital object.

The transfer action can additionally or alternatively include an intercept transfer for causing the orbital object to contact a target orbital object. The user may be allowed to select a minimum intercept velocity or other parameter (e.g., minimum energy, maximum intercept velocity, target path direction, etc.) associated with the orbital object as it contacts the target orbital object. As noted, a user can identify and/or select an orbit transfer window (e.g., time window) and/or one or more targetable objects from a subset of one or more potential objects (e.g., within a graph of the user interface).

The system can determine whether the transfer action (e.g., intercept transfer) is possible within the orbit transfer window. In some cases, for example, a particular transfer action may not be possible within a certain time frame. In some implementations, a maximum velocity change may be set by the system. For example, a maximum velocity change may be about 10 m/s, about 12 m/s, about 15 m/s, about 20 m/s about 25 m/s, or fall within any range having endpoints therein or having a value therein. In some implementations, the maximum velocity change is about 15 m/s. The system may be able to calculate a time and/or may display a timepoint corresponding to that time when the orbital object is to contact the target orbital object and/or adopt its orbit and/or position. The user interface can display this timepoint within the orbit transfer window if applicable.

The system can allow a user to update the orbit transfer window. In some designs, the system may automatically update calculated output (e.g., transfer path, contact time, contact location, maneuver time, etc.) in real-time based on a change in the orbit transfer window (e.g., by panning, by zooming, by direct input via an input interface, etc.). For example, the system may be configured to automatically calculate an updated transfer path of the orbital object in response to a user-updated orbit transfer time window. The system may allow a user to lock the display so that panning and/or zooming is temporarily disabled to allow, for example, for more precise window determination and more accurate calculations. Additionally or alternatively, the lock function may allow a user to pan and/or zoom without causing the system to automatically recalculate one or more details related to a transfer.

As noted above, some of the data may be obtained from a real-time telescope data connection interface configured to receive image data from historical and contemporary data sets. These data sets can be generated by a network of telescopes photographing the orbital object. From such photographs, one or more sets of identifiers can be identified about the space object.

The system can display an indication of the current time (e.g., by a line and/or timestamp). The system may display the indication of the transfer path of the orbital object in relation to the indicator of the current time so as to indicate that at least part of the transfer action (e.g., an initiation and/or completion of the transfer action) occurs and/or spans a time later than the current time. Additionally or alternatively, the system may display the indication of the transfer path in relation to the indicator of the current time so as to indicate that at least part of the transfer action occurs and/or spans a time prior to the current time.

Figure 21:
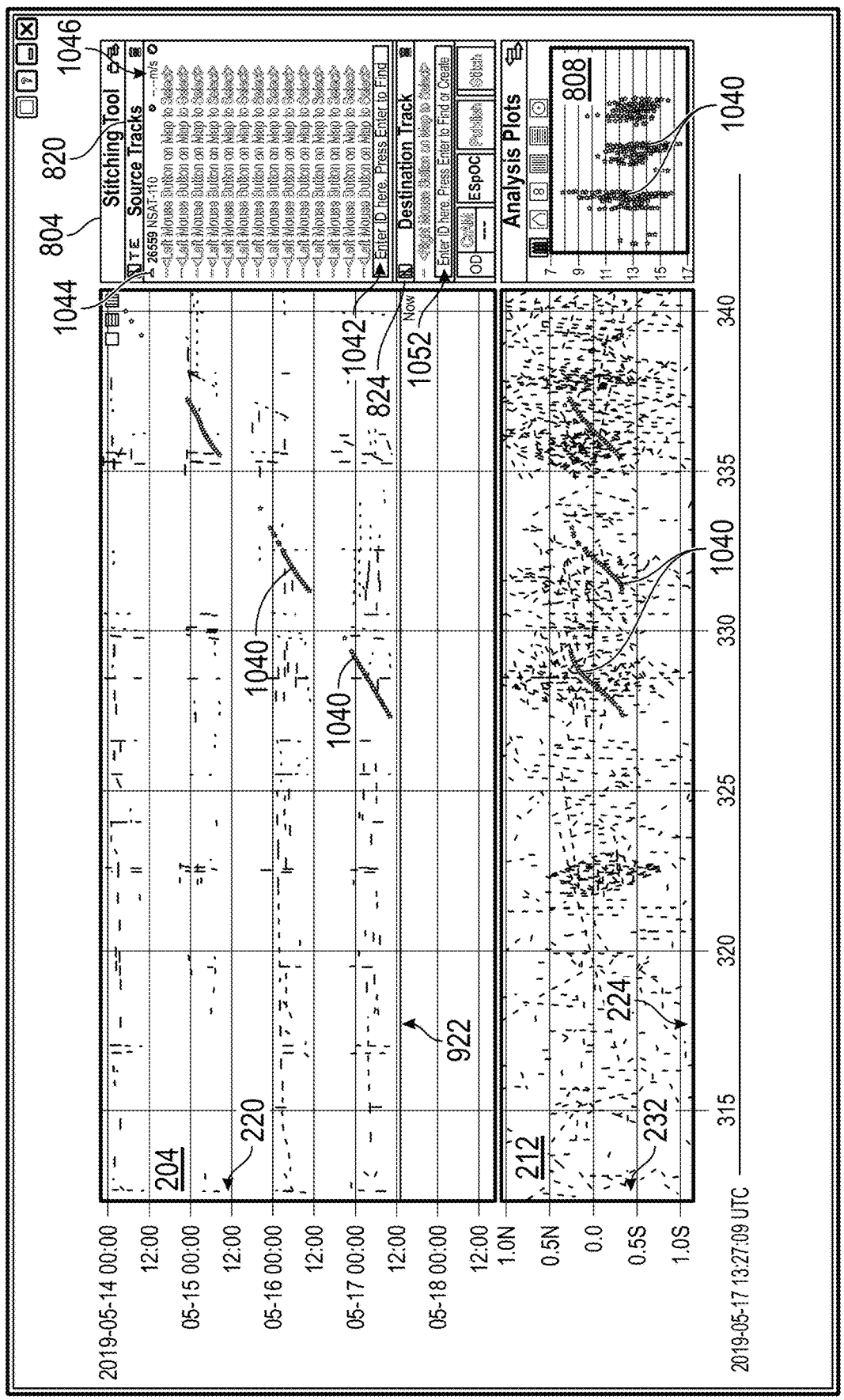
FIG. 21 shows an interface displaying an initial track.
Figure 22:
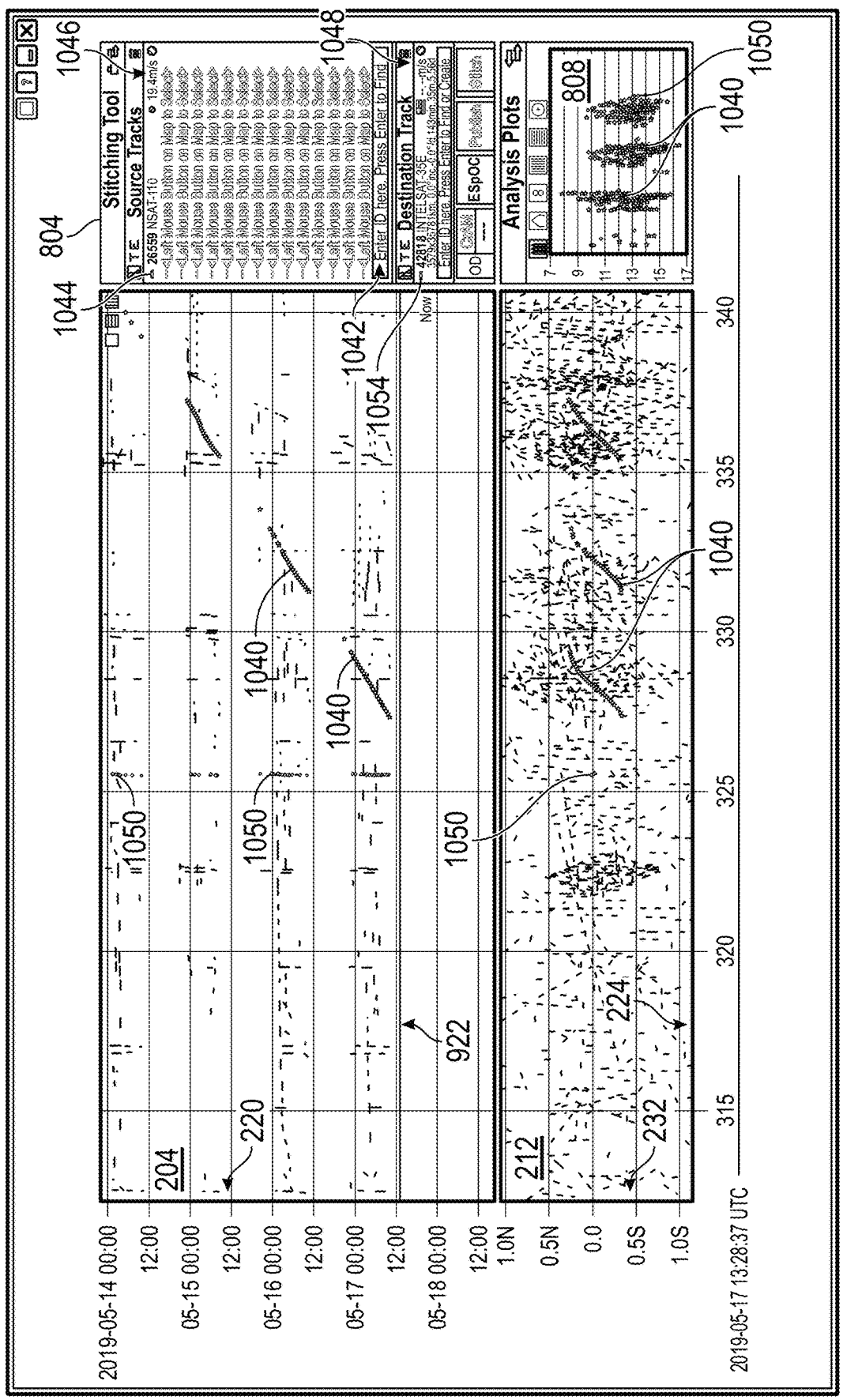
FIG. 22 shows an interface displaying an initial track and a target track.
Figure 23:
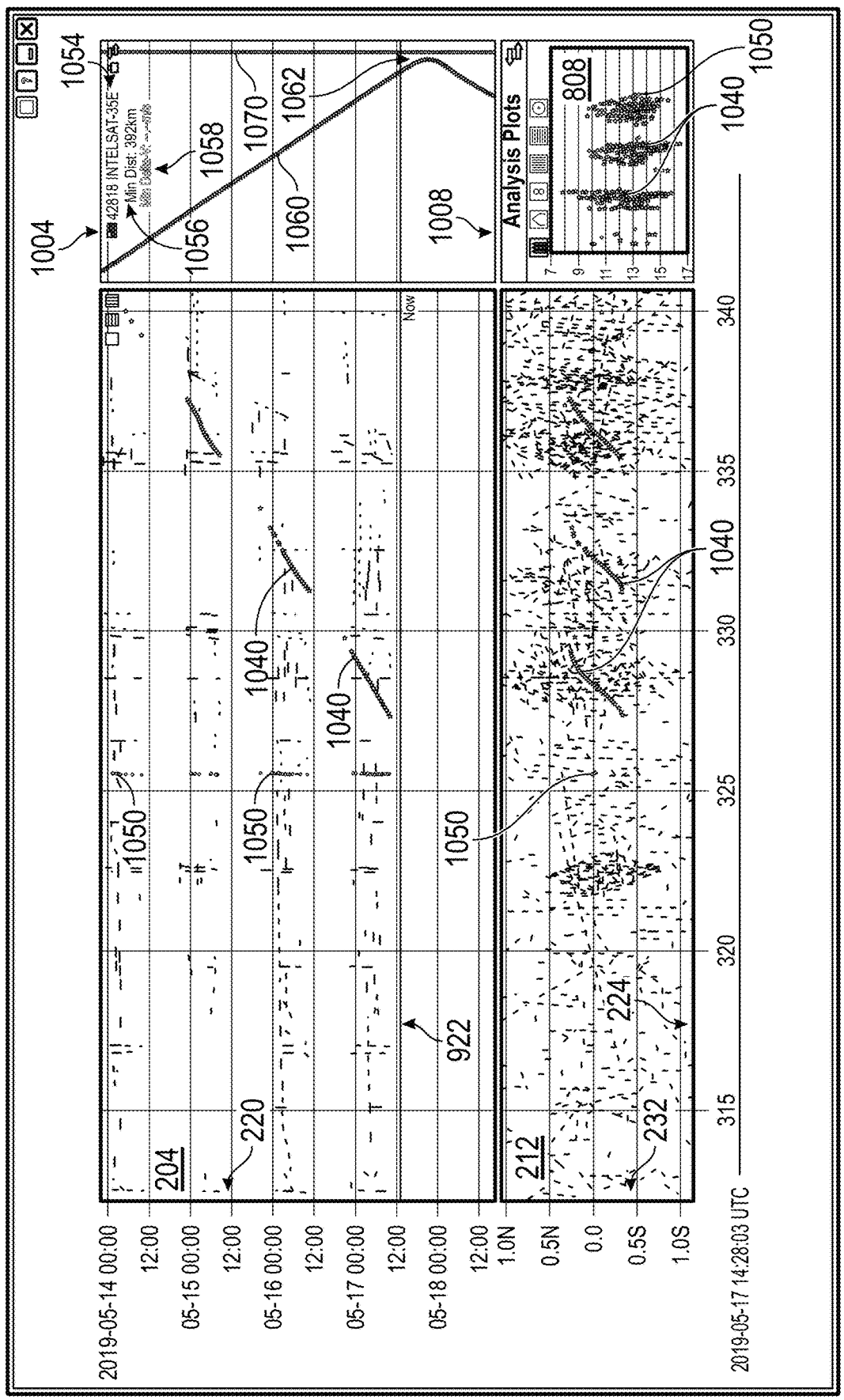
FIG. 23 shows an interface displaying an initial track, a target track, and a transfer selection interface.

Turning now to the figures, the details above will be explained in greater detail and/or additional features will be described. FIGS. 21-23 show initial orbit selection, target orbit selection, and transfer action selection. FIG. 21 shows an interface having a longitude-time graph 204, a longitude-latitude graph 212, a stitching tool interface 804, and an analysis plot interface 808. It should be noted that many of the features described with reference to FIGS. 21-29 include one or more features of FIGS. 1-20. Where common numbers are used, similar or common functionality may be included.

For example, FIG. 21 and FIG. 22 show a time axis 220, a latitude axis 232, and a longitude axis 224. A first plurality of elements may form an initial track 1040 and a second plurality of elements may form a target track 1050. One or both may be additionally or alternatively represented in the longitude-latitude graph 212 and/or the analysis plot interface 808. The analysis plot interface 808 may show a magnitude value of the tracks, as described in more detail above. One or both of these can be identified, for example, in the stitching tool interface 804. For example, the initial track identifier 1044 can indicate what track the initial track 1040 is (e.g., based on a color coordination, a shape coordination, etc.). Additional information may be provided about the initial track 1040 as shown, such as an identification number, a name, an associated country (e.g., origin, owner, etc.), and/or a velocity. Other details described herein may be included additionally or alternatively. Similar information may be presented for the target track 1050 via the target track identifier 1054. The "now" or "current time" line is indicated by the current time marker 922. FIG. 13 also includes an alert selector 1042 configured to allow a user to select a target one or more alerts from the source track region 820.

FIG. 23 shows an initial orbit 1060 and target orbit 1070 corresponding to the initial track 1040 and the target track 1050, respectively. The initial orbit 1060 and the target orbit 1070 may be shown within a transfer selection interface 1004, as shown. The transfer selection interface 1004 may be included additionally with, alternatively to, or part of the stitching tool interface 804. The transfer selection interface 1004 can include a transfer relationship axis 1008. The transfer relationship axis 1008 has units associated with distance in kilometers, though other units of distance (e.g., m, miles, etc.) may also be used. The vertical axis may correspond to the time axis 220. Additionally or alternatively, a separate axis (e.g., longitude, latitude, altitude, etc.) may be used. The transfer selection interface 1004 can include details about one or more orbital objects. As shown, details of the object associated with the target orbit 1070 are indicated, such as the target track identifier 1054, the distance differential indicator 1056, and the velocity differential indicator 1058. If a user selects a different target object, target track 1050, and/or target orbit 1070, different information may be indicated.

The transfer selection interface 1004 can allow a user to select a target type of transfer action. For example, a user may select a space object (e.g., by selecting a track, by selecting an orbit, by selecting a photograph, etc.) as well as a target space object and/or orbit (e.g., by selecting a track, by selecting an orbit, by selecting a photograph, etc.). The user may select the type of transfer (e.g., orbit transfer, rendezvous transfer, intercept transfer). The user may additionally or alternatively select various parameters, such as a transfer window, as described herein. Other details may be selected by the user, such as maximum values for a velocity, energy, etc., as described herein in more detail. A target final velocity may be selected. In some embodiments, the target velocity may be 0.1 km/s, 0.5 km/s, 1 km/s, 2 km/s, 5 km/s, or any value therein or fall within any range with endpoints therein.

In some designs, the system may automatically suggest a target space object/orbit. The system may also automatically update the interface to indicate one or more details associated with the combination of the target object/orbit with the selected transfer type (e.g., a calculated velocity change, a calculated time of completion, a calculated duration of transfer, etc.). The system may take into account other factors, such as a direction and/or energy of sunlight on one or more of the initial and/or target object.

As shown the initial orbit 1060 approaches the target orbit 1070. The system indicates that an expected closest approach 1062 is to occur sometime in the future. This is because the closest approach 1062 occurs below the current time marker 922. However, the closest approach 1062 could occur in the past in a different circumstance.

Figure 24:
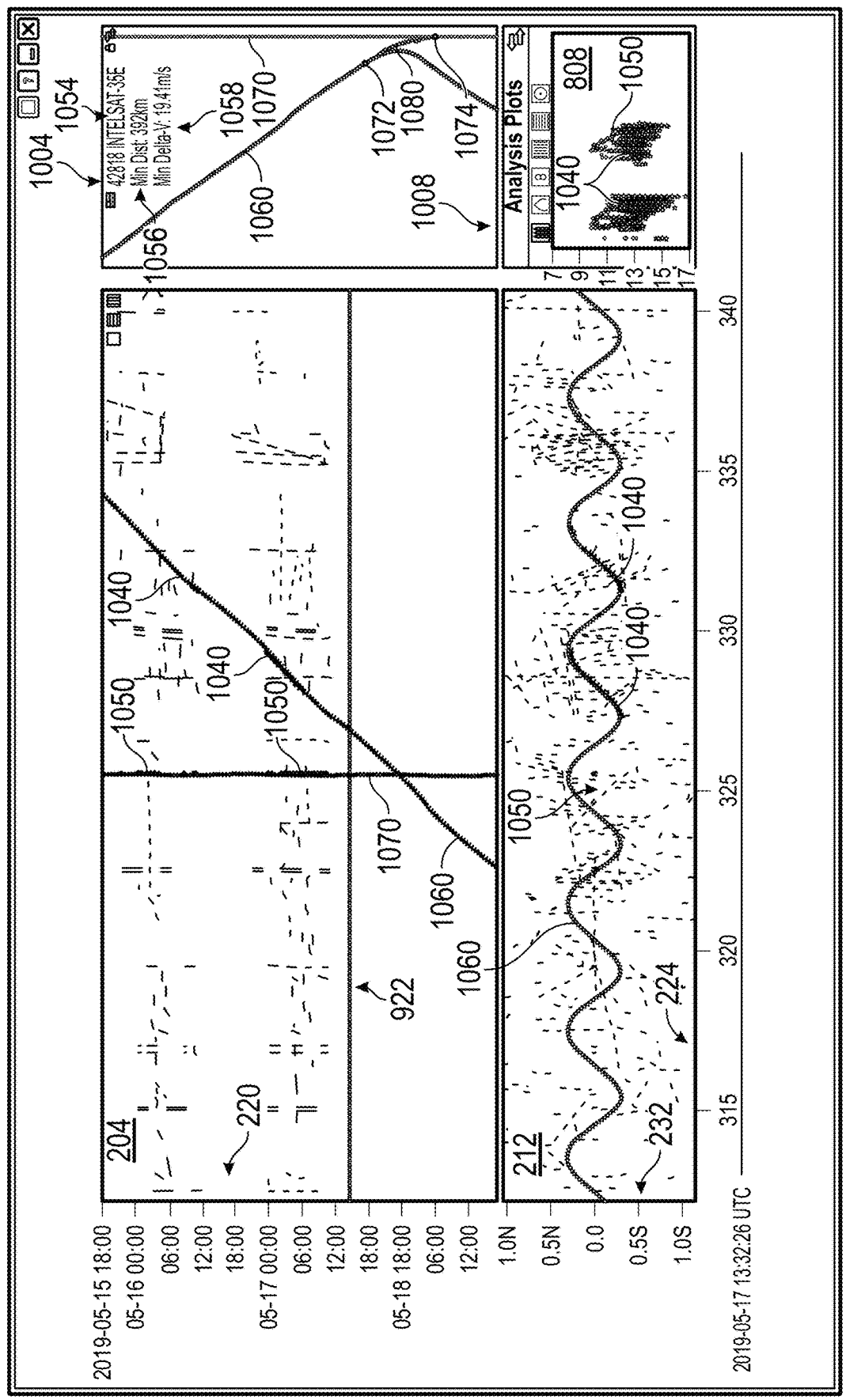
FIG. 24 shows an example intercept transfer via the user interface.

FIG. 24 shows an example intercept transfer via the user interface. As shown, the initial orbit 1060 and/or the target orbit 1070 may be indicated on one or more of the longitude-time graph 204, the longitude-latitude graph 212, and/or the analysis plot interface 808. In the transfer selection interface 1004, a transfer path 1080 is provided. The transfer path 1080 informs a user of a calculated path that a selected space object could take to complete the intercept transfer. Since the intercept transfer only requires a single maneuver, the intercept transfer has an initial maneuver point indicated by the transfer initiation indicator 1072 and an ending maneuver point indicated by the transfer completion indicator 1074. In this case, the transfer completion indicator 1074 indicates a time where the orbital object is expected to contact the target object. As shown, each of the transfer initiation indicator 1072, the transfer path 1080, and the transfer completion indicator 1074 occur below the current time marker 922, which indicates that the beginning and ending of the transfer action would occur in the future. Additionally or alternatively, the system may be able to identify such transfer actions in the past.

Figure 25:
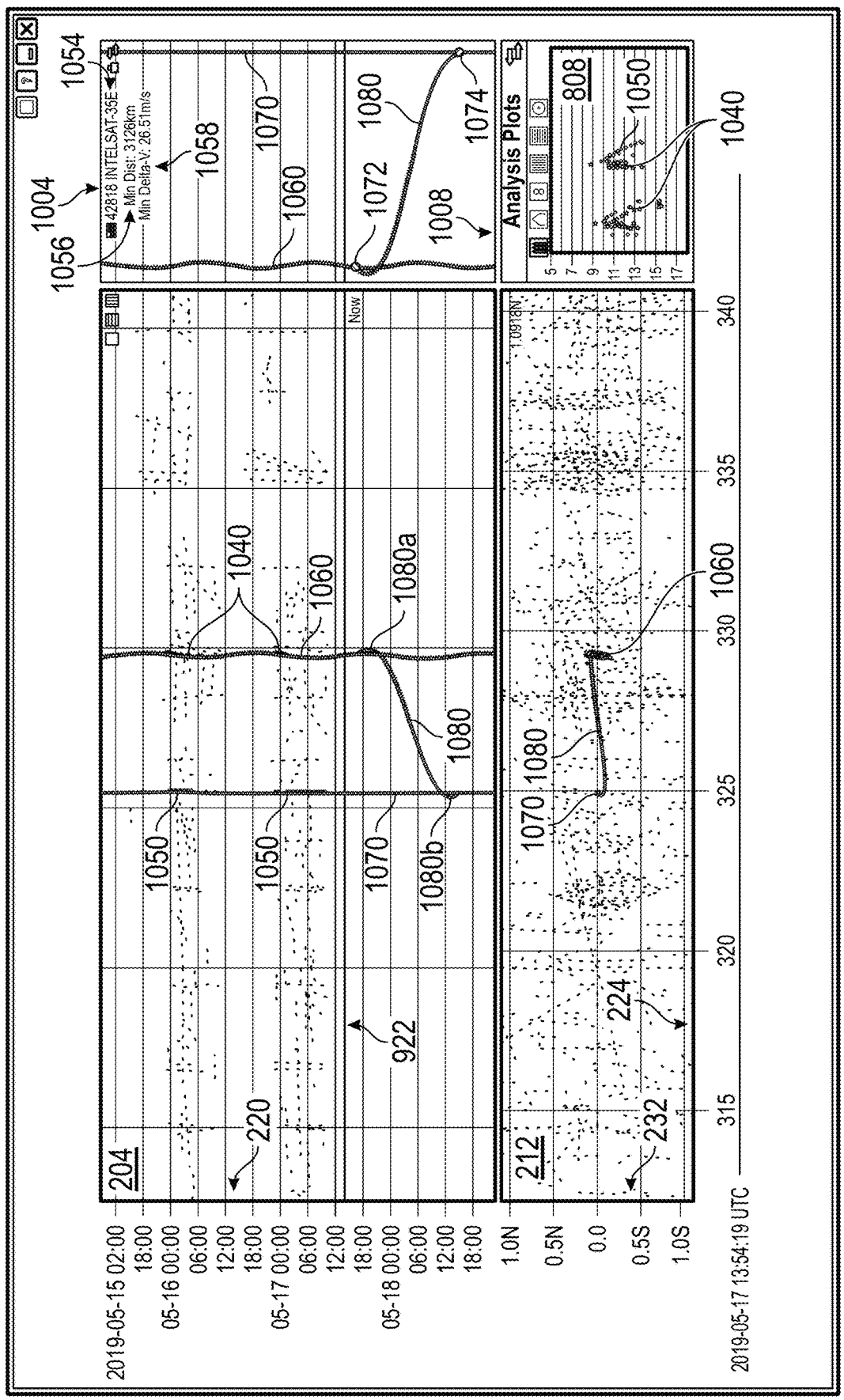
FIG. 25 shows an example rendezvous transfer via the user interface.

FIG. 25 shows an example rendezvous transfer via the user interface. As shown, the initial orbit 1060, the target orbit 1070, and/or the transfer path 1080 may be provided in one or more of the longitude-time graph 204, the longitude-latitude graph 212, and/or the transfer selection interface 1004. As shown, the initial orbit 1060 and the target orbit 1070 appear to be at a substantially constant longitude. Here, as indicated in the longitude-latitude graph 212, the initial orbit 1060 may also be a nearly substantially constant latitude. However, as shown below in FIG. 28, this appearance may be largely due to the zoom factor of the longitude-latitude graph 212. As shown in FIG. 25 (e.g., in the longitude-time graph 204), the rendezvous requires at least two maneuvers, each indicated by corresponding curves 1080*a*, 1080*b* of the "S-shape" transfer path 1080. The transfer path 1080 may indicate a visual transition between the initial track 1040 and the target track 1050. For example, a beginning of the transfer path 1080 (e.g., the first maneuver 1080*a*) may share the same or similar color as the initial orbit 1060 and/or an end of the transfer path 1080 (e.g., the second maneuver 1080*b*) may share the same or similar color as the target orbit 1070. Continuing the example, the color along the transfer path 1080 may indicate a smooth transition to suggest that the orbital object is transitioning from the initial orbit 1060 to the target orbit 1070. Additionally or alternatively, other visual indicators may be used, such as dot shapes, shadings, line dashings, number of lines, line style, highlighting, background color, and/or other indicator. Similar indicators may apply to the transfer initiation indicator 1072 and the transfer completion indicator 1074, respectively.

Figure 26:
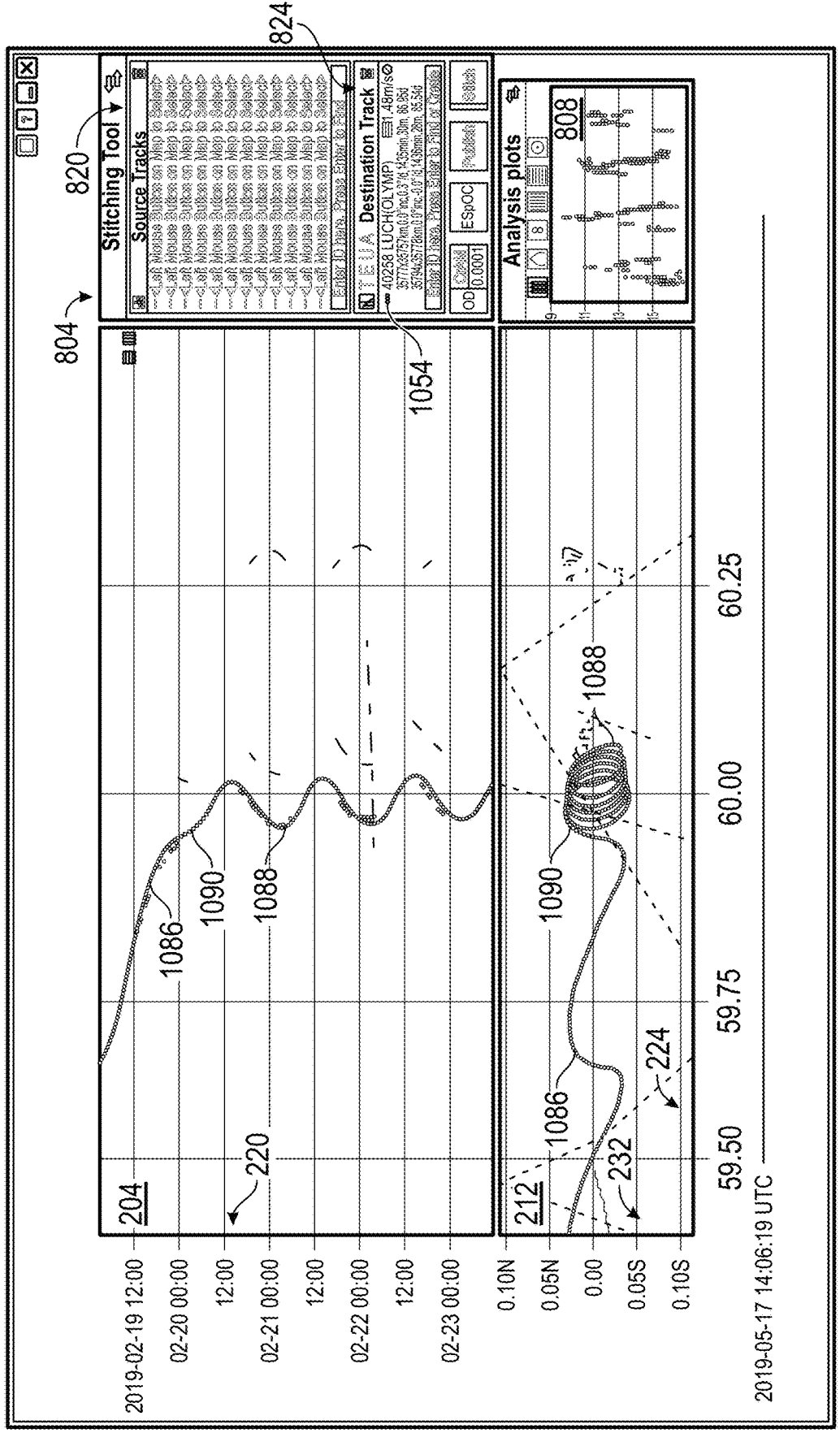
FIG. 26 shows a characterization of a maneuver that has moved an object from a first path to a second path.

FIG. 26 shows a characterization of a maneuver that has moved an object from a first path to a second path. Sometimes an object has already changed its trajectory but what transfer has taken place may not yet be known. The system can allow a user to quickly and/or automatically determine and characterize the transfer that has taken place. The target track identifier 1054 shows details related to the object. As shown, an initial orbit 1086 of a space object is displayed in the longitude-time graph 204 and the longitude-latitude graph 212. A corresponding final orbit 1088 is also shown. When transferring between the initial orbit 1086 and the final orbit 1088, the object underwent at least one maneuver 1090. The maneuver 1090 can be identified by the system automatically and/or by the user. The maneuver 1090 may generally be difficult to detect by a human for a number of reasons. For example, photographic and/or other tracking data may not be available for a corresponding space object during the maneuver 1090. Additionally or alternatively, details of the space object may be incomplete during the maneuver 1090. The system may automatically identify the two orbits 1086, 1088 or receive a user selection of the two orbits 1086, 1088 and thus identify the intervening maneuver 1090. In this way, the system can automatically direct a user to find the maneuver 1090 within the user interface. The system may indicate or highlight the maneuver 1090 by, for example, displaying it using a different aspect (e.g., color, dot shape, shading, line dashing, etc.) from one or more of the initial orbit 1086 and/or the final orbit 1088.

Figure 27:
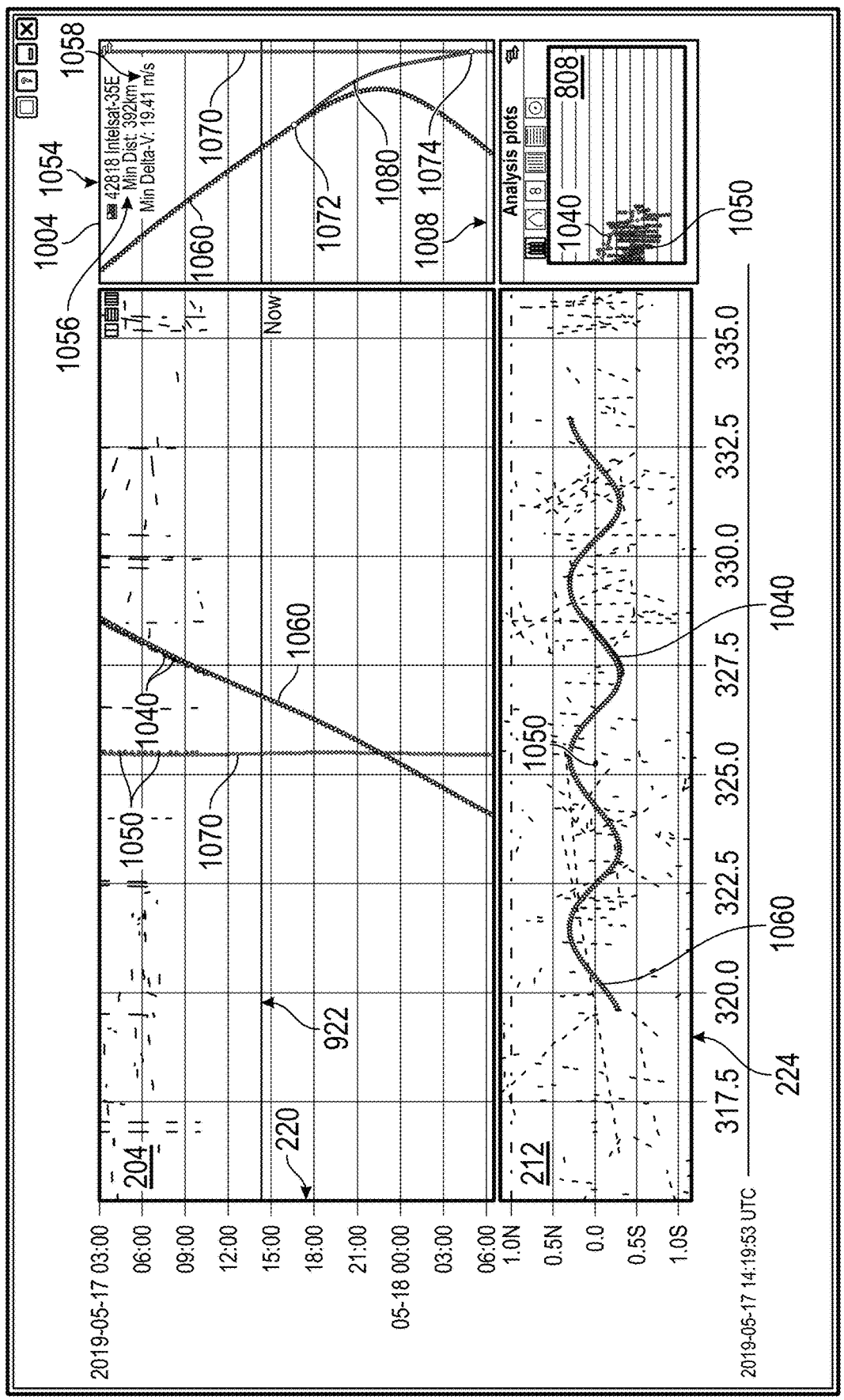
FIG. 27 shows a panned and zoomed display of FIG. 24.
Figure 28:
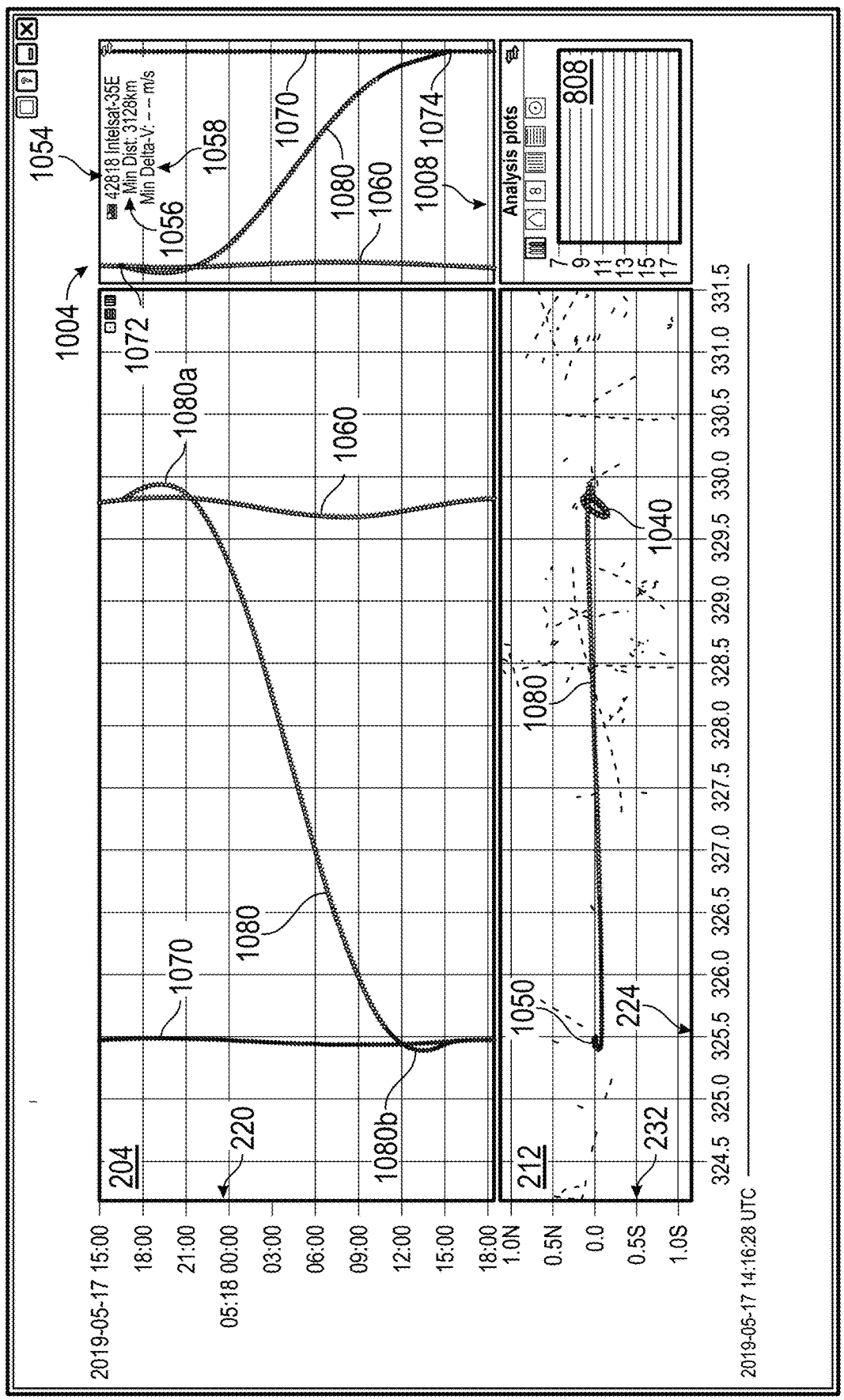
FIG. 28 shows a panned and zoomed display of FIG. 25.
Figure 29:
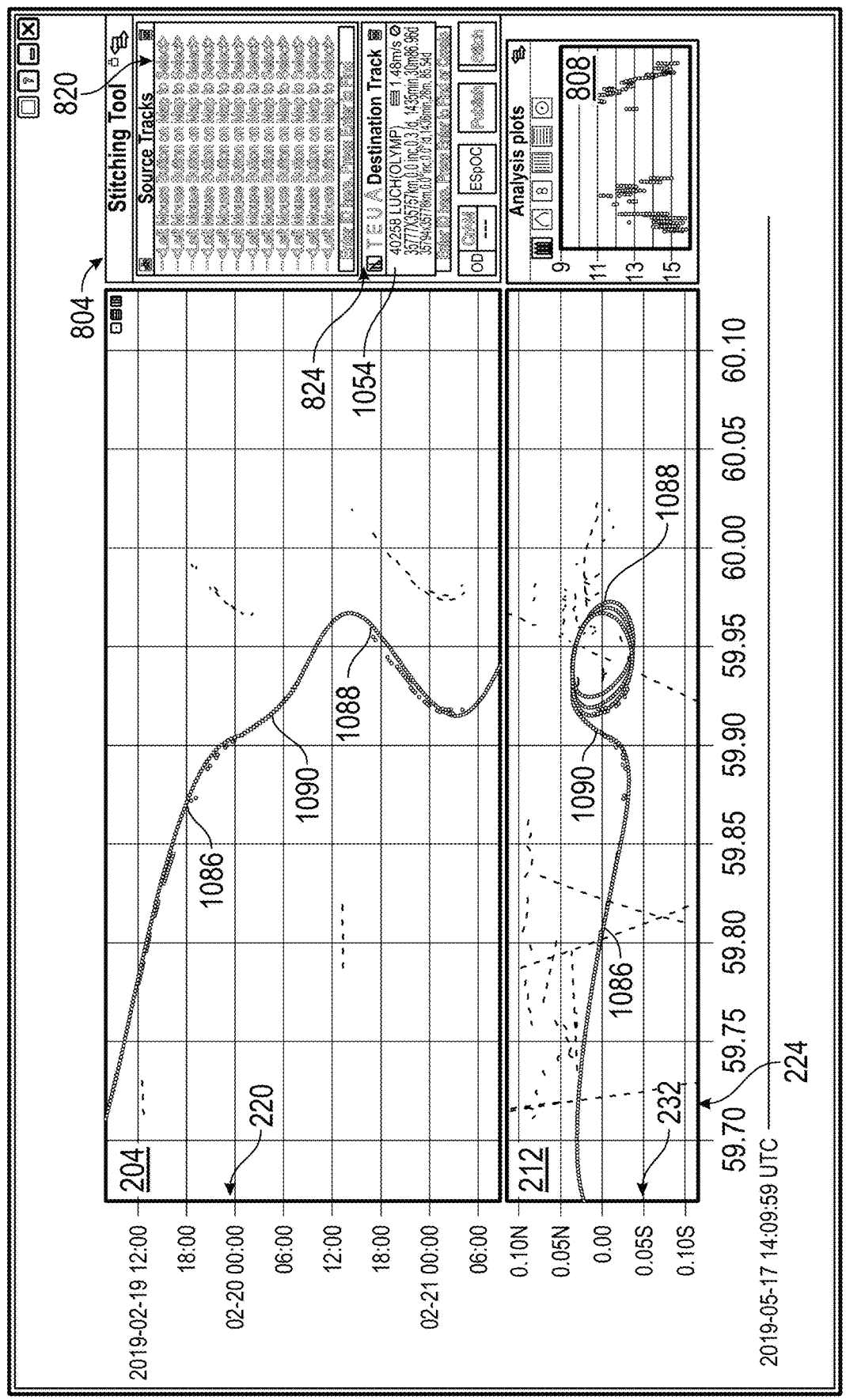
FIG. 29 shows a panned and zoomed display of FIG. 26.

FIGS. 27-29 show panned and zoomed displays of corresponding FIGS. 24-26. Accordingly, the time axis 220, the longitude axis 224, the latitude axis 232, the analysis plot interface 808, and/or the transfer relationship axis 1008 have been zoomed and/or panned. As noted above, the system can let a user quickly and easily pan and/or zoom one or more of these axes of one or more of the graphs. This can help allow a user to focus in on particular details that may be of interest. Additionally or alternatively, the user can zoom out to obtain a more high-level perspective of one or more of the objects' movements. The system is tailored for either close-up or zoomed-out inspection of space objects and their movements and/or objects.

Figure 30:
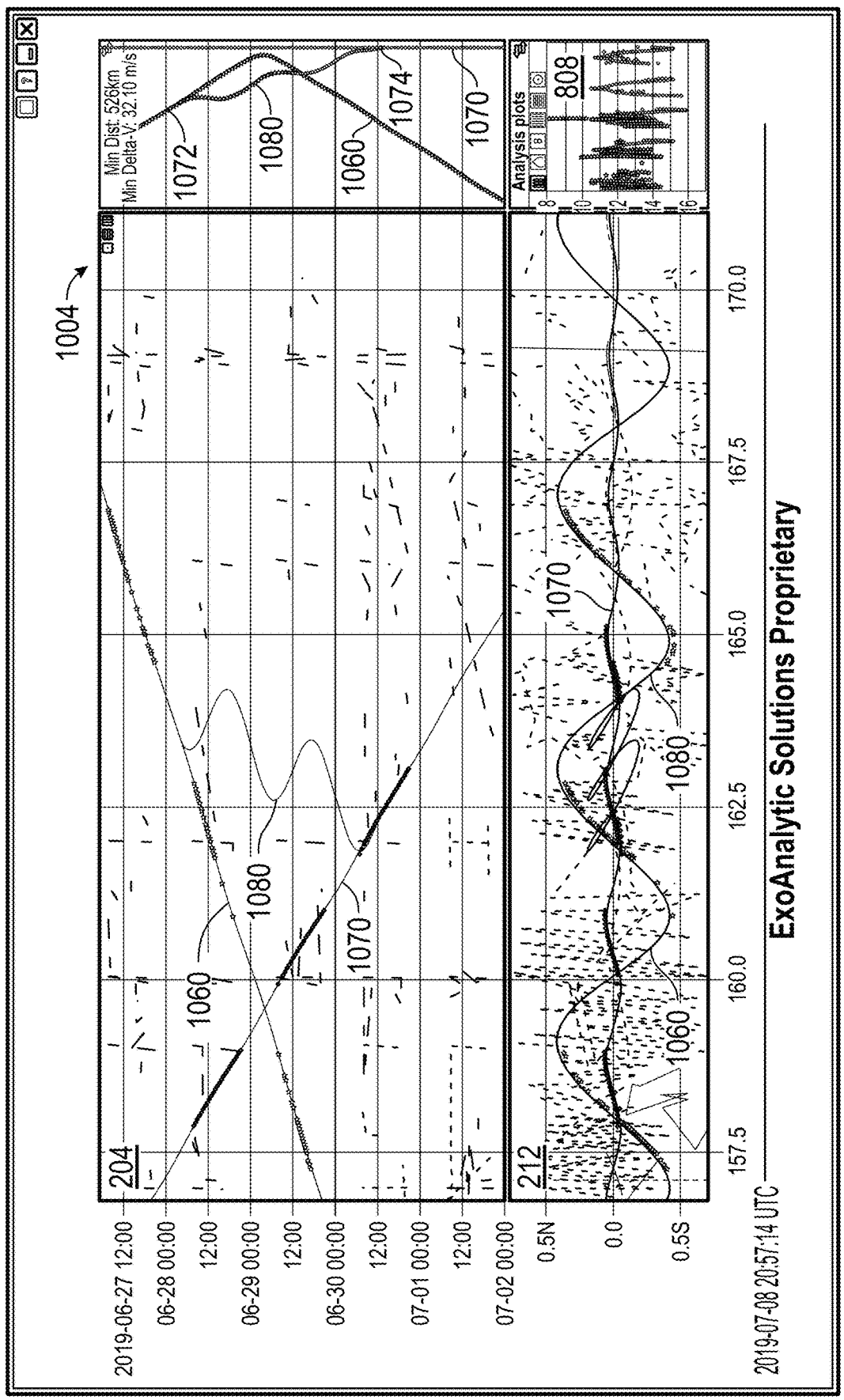
FIG. 30 shows another example rendezvous transfer via the user interface.
Figure 31:
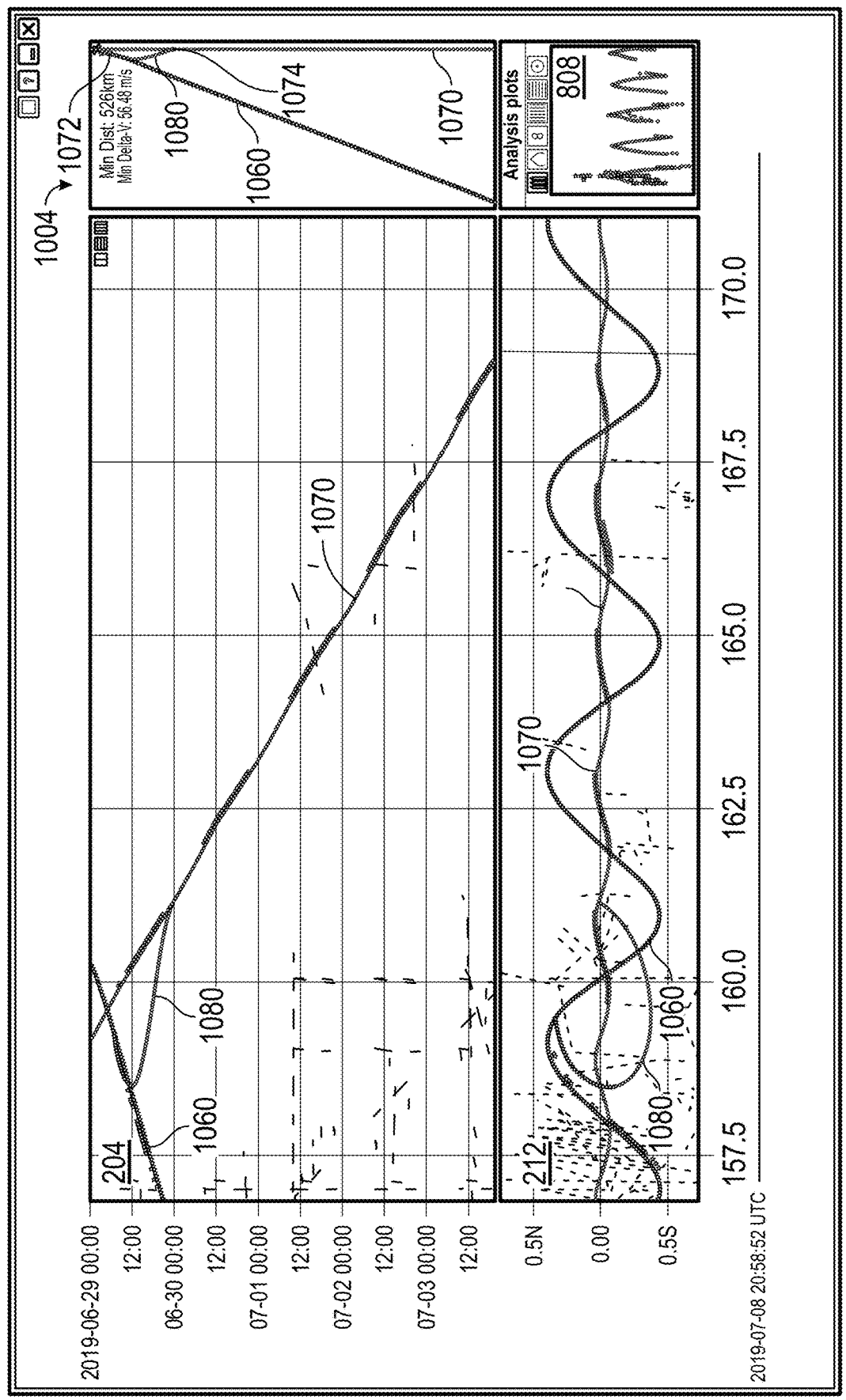
FIG. 31 shows another example rendezvous transfer between the same orbits as shown in FIG. 30 but with different time constraints.

FIGS. 30-31 show an example of additional panned and zoomed displays where the system determines a different transfer based on the corresponding boundary conditions set by the display in the respective figure. As noted above, a user may select a viewing screen to be able to determine the boundary conditions (e.g., time range, latitude range, longitude range) of a desired transfer. For example, a user may be able to determine a time range in which the transfer must begin, in which the transfer must end, or both. In some configurations, the user may select whether the ending, the beginning, or both are required to be performed within the selected boundary conditions.

FIG. 30 shows an example determination of a boundary condition for which the completion of both the beginning and ending of the transfer path 1080 are required. As shown in the longitude-time graph 204 and in the transfer selection interface 1004, the transfer is to begin or has begun (as indicated, for example, by the transfer initiation indicator 1072) at around Jun. 28, 2019 at midnight. Further, as shown the transfer is to be completed or has completed just after noon on Jun. 30, 2019.

FIG. 31 shows the same initial orbit 1060 and target orbit 1070 as in FIG. 30 but with different boundary conditions (e.g., via a panning and zooming of the longitude-time graph 204). As shown, the transfer is to begin around 6 a.m. on Jun. 29, 2019 and is to end around midnight of Jun. 30, 2019. The boundary conditions of the selected time interval of the longitude-time graph 204 and/or the transfer selection interface 1004 in FIG. 31 do not include the calculated time for the beginning of the transfer in FIG. 30 (midnight of Jun. 28, 2019). Thus, according to the boundary conditions set by the user shown in FIG. 31 (and, in this case, the requirements that both the beginning and ending of the transfer occur within those boundary conditions), the same transfer as calculated for FIG. 30 is not calculated and/or shown. Accordingly, a user can quickly and intuitively identify a desired boundary condition in which to begin and/or end a transfer by panning and/or zooming on one of the graphs in the visualization display 200. As the user pans and/or zooms, the system can automatically and/or in real-time update one or more of the graphs to show the newly calculated transfer path 1080.

Alert and Report Generator

The systems and methods described herein can be used to develop and display one or more reports configured to be read by a computer and/or human. The reports can be generated based on information collected as described above. The collected information can be analyzed, optionally with the supplementary input from a human user, to determine unique interactions between or among two or more space objects that have already occurred, that are occurring at a present time, that are expected to occur based on current trajectories, and/or that may occur based on contingent intermediate maneuvers of one or more space objects. The collected information can be analyzed to identify one or more maneuvers of a single space object. Thus, the systems and interactive graphical user interfaces described herein may be configured to generate a report on one, two, three, or more space objects and the path parameters associated therewith.

The systems described herein can determine whether a given space object is an active satellite under control of a launching or operating entity or an inactive object. This information may be obtained without having information provided about the true nature of the object. The nature of the object may be inferred through observations of its behaviors.

Behaviors of a single object can be divided into those that are observable via the astrometric characteristics of an object and those that are observable via its photometric characteristics. The photometric and astrometric characteristics of an object may not truly be independent. For example, the pose (orientation in 3-space) and motion of an object may affect the signature observed by a sensor. If this signature is faint, the ability of a sensor to localize the object may be degraded. In general, however, the astrometric and photometric behaviors may considered to be at least somewhat independently. One benefit of systems and methods described herein is to prevent unwanted interactions between space objects (e.g., unsafe close approaches, collisions, radio frequency interference, etc.) that may be prevented.

A report can be generated in response to a user selection. Additionally or alternatively, a report can be generated in response to an identification (e.g., manual, automatic) of one or more events that have occurred, are occurring at a current time, or that may occur under certain circumstances. Such events can trigger an alert or some other indication of the event. The alert can include a communication or indication on the graphical user interface and/or may be configured to be understandable by a human user or observer.

A first type of alert that may be triggered is a maneuver alert. Space objects, including orbital objects, may perform maneuvers from time to time. A maneuver can include a single maneuver or a plurality of maneuvers. Maneuvers that require two or more maneuvers may be referred to as "transfers." Examples of such maneuvers include those discussed above, such as an orbit transfer, a rendezvous transfer, and an intercept transfer. Orbit transfers, for example, can include a shift to anther orbit. As an example, an orbital object may transfer to and/or from the graveyard orbit. Such maneuvers can include an increase or decrease in a delta V (e.g., instantaneous change in velocity) of the object.

An alert may be triggered when two or more space objects come into or are predicted to come into proximity with each other. The trigger may occur when a distance between two objects is measured or predicted to be below a threshold (e.g., minimum threshold). When closer than the threshold, the two objects may be referred to as being in conjunction with one another at a particular time or within a particular time window. Such an alert may be referred to as a "proximity alert" or a "conjunction alert." Rendezvous and proximity operations (RPO) described herein (e.g., where a space object makes an intentional controlled approach to another space object) may reflect one or more orbit regimes, such as satellite servicing, inspection, and/or active debris removal.

Another maneuver includes station keeping, which involves a subtle movement by the space object to retain its current target orbital path. Often a space object (e.g., one orbiting at Geosynchronous Equatorial Orbit (GEO)) may be a government- or commercially-owned communications or weather satellite. When stationed in its assigned orbital location, the behavior of such an object may often be routine, with station-keeping maneuvers usually occurring on a predictable schedule. Sometimes persistent and precise observations may detect these relatively small maneuvers, and patterns can often be teased out of the observation data. As orbital objects revolve around a planet, the orbital object's orbit may deteriorate over time. Thus, a station keeping maneuver may be used to maintain the orbit and prevent and/or repair deterioration in the orbit. For example, a station keeping maneuver can prevent a loss of altitude, circularization, and/or other imperfection in the orbit. Circularization refers to the lack of eccentricity in an orbit.

While a station keeping maneuver can trigger an alert, a failure of an object to maintain a stable orbit can also trigger an alert. Such drifting can indicate that an object is no longer capable of maintaining a stable orbit and/or that control of the object has diminished or ceased. The system may be able to identify if an object is failing to maintain the stable orbit by identifying an expected value, such as a position, degree of circularization (e.g., angle of curvature), velocity, and/or acceleration, and comparing the expected value with a corresponding measured or observed value. Additionally or alternatively, the system may identify an alert when a drift rate has been increased, decreased, and/or changes directions.

Specific details (e.g., path parameters) of a space object's trajectory may trigger an alert. For example, a particular apparent destination or source orbit may trigger an alert. The system may, for example, identify an alert when a space object enters/exits a graveyard orbit, a geosynchronous orbit, a geostationary orbit, a semi-geosynchronous orbit, and/or other type of orbit.

In generating alerts, the system may identify a threshold (e.g., maximum threshold) that needs to be exceeded before an alert is triggered. For example, the system may generate an alert if a threshold difference between the expected value and the measured value is exceeded. The threshold can include a difference between an expected trajectory and a measured trajectory. For example, the threshold can refer, for example, to an angular threshold and may be about 0.05 degrees, about 0.1 degrees, about 0.2 degrees, about 0.3 degrees, about 0.5 degrees, about 0.8 degrees, about 1 degree, about 1.5 degrees, about 2 degrees, about 2.5 degrees, about 3 degrees, about 4 degrees, about 5 degrees, any value therein, or fall within any range having endpoints therein. The threshold may refer to a distance threshold and may be about 1 meter, about 5 meters, about 10 meters, about 20 meters, about 30 meters, about 40 meters, about 50 meters, about 60 meters, about 75 meters, about 100 meters, about 150 meters, about 200 meters, about 250 meters, any value therein, or fall within any range having endpoints therein. The threshold can refer to a velocity threshold and may be about 0.5 m/s, about 1 m/s, about 1.5 m/s, about 2 m/s, about 2.5 m/s, about 3 m/s, about 4 m/s, about 5 m/s, about 7 m/s, about 10 m/s, about 12 m/s, about 15 m/s, about 20 m/s, about 30 m/s, about 40 m/s, about 50 m/s, about 100 m/s, any value therein, or fall within any range having endpoints therein. In some embodiments, the threshold may be an isolated value (e.g., not a difference between two values). For example, an alert may be generated if a Delta-V value exceeds a threshold value.

Another event that may trigger an alert is the identification (e.g., appearance) of a new object. The system may be regularly (e.g., continuously) reviewing images of space to identify new objects. Additionally or alternatively, as described herein, a human user may aid the system in identifying new objects. A new object may be identified from a launch, a deployment, a third-party listing that draws attention to the object, and/or from a new visibility (e.g., manually and/or automatically). The identification of new objects may trigger an alert that can cause the system to generate a report. Additionally or alternatively, a lost space object may trigger an alert. An object may be lost when a space object does not appear at or near an expected location. The expected location may be an area or volume of space. The boundaries of the area or volume may be based on a threshold distance, area, or volume from or around a target point. Examples of such threshold distances are described herein. Threshold areas or volumes may be a 2D or 3D extension of such threshold distances.

Yet another example of a possible alert that may be triggered is when the system determines that a magnitude (e.g., intensity of light, light pattern) of a space object differs from an expected magnitude value. For example, one alert is triggered when an intensity of light differs from an expected intensity of light. Additionally or alternatively, the alert may be triggered if the shape or pattern of the light emitted and/or reflected from the space object is sufficiently different (e.g., greater than a threshold value) from an expected shape or pattern. Such an alert may be referred to as a "photometric anomaly alert" (PAA).

As described in more detail above, the system can receive a plurality of images of one or more space objects. Based on these images, the system can identify an intensity of light projected from the space objects at different times and positions. Using these images, the system can determine a model of a photometric pattern projected from the objects and, based on the model, determine an expected photometric pattern and/or intensity of light at a given future time.

Using the model (e.g., expected photometric pattern, intensity of light), the system can determine an attitude state, such as a relative attitude state, of the space object. Examples of such attitude states include a spin stable state, an attitude control state, an uncontrolled spin state (e.g., anomalous slewing), a directed orientation (e.g., dynamic slewing), and a tumble state (e.g., a low-aspect-ratio tumble). Dynamic slewing includes directing the objects orientation in a controlled way, such as apparently directing an attitude toward another object. An alert may be generated if a particular attitude state changes, such as a beginning, ending, or acceleration of an attitude state.

In some embodiments, the system identifies certain attitude states as non-alerts. For example, certain embodiments may use attitude states to identify alerts of objects that appear to be "dead" (e.g., apparently not controlled). However, in certain implementations, "live" objects may trigger alerts as described herein, such as the proximity and orbit transfer alerts.

One of the many advantages of the systems described herein includes the ability to identify and signal anomalous or otherwise interesting information to a human user and/or the computer system. Each alert can be based on tracking path parameters of a space object. The path parameters can include a position, a displacement, a speed, a velocity, an acceleration, a curvature of orbit (e.g., circularization), and/or any other detail of the object's orbit or other trajectory. Path parameters can additionally or alternatively include a relationship with one or more space objects (e.g., a distance from, a relative velocity/speed, a relative lighting advantage, etc.) such as described herein. A path parameter can include a detail of a departure or change in object trajectory (e.g., a maneuver, a transfer, etc.).

Figure 32:
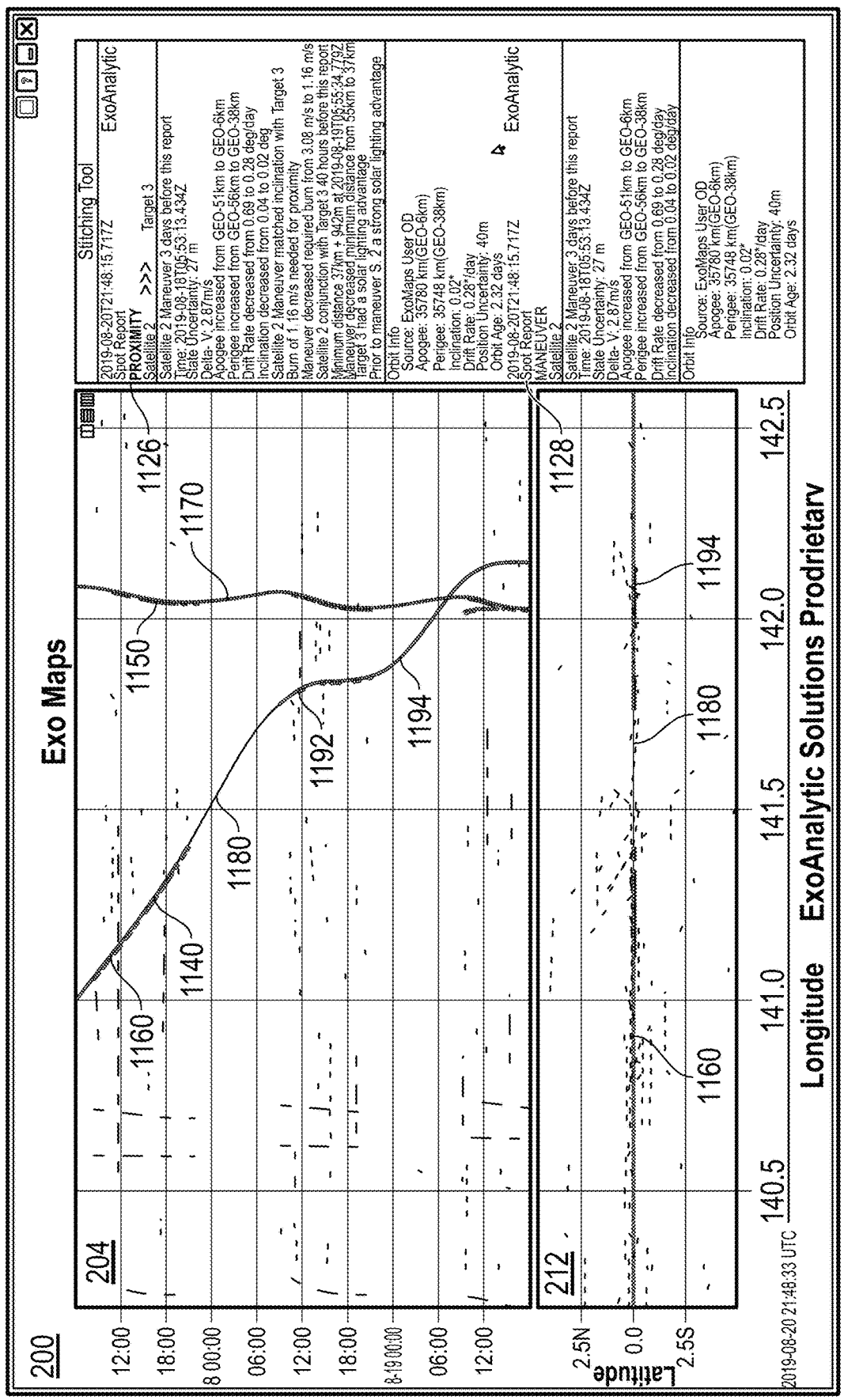
FIG. 32 shows an example visualization with a proximity spot report and a maneuver spot report.

Various features of certain embodiments will now be described with reference to the figures. FIG. 32 shows an example visualization display 200 (e.g., interactive graphical user interface) with a proximity spot report and a maneuver spot report. The proximity spot report and the maneuver spot report may be indicated by the proximity spot report indicator 1126 and the maneuver spot report indicator 1128, respectively. The spot reports 1126, 1128 represent pop-up reports that can be shown directly in the visualization display 200, as shown. However, other types of displays and formats are possible, such as those described below with FIGS. 34-35. The longitude-time graph 204 and longitude-latitude graph 212 show two orbital paths of separate objects—Satellite 2 and Target 3. The initial orbit 1160 of Satellite 2 is shown, which is based at least in part on a corresponding initial track 1140 of Satellite 2. Following the initial orbit 1160, the visualization display 200 shows that Satellite 2 undertook one or more maneuvers to initiate a transfer path 1180 (e.g., a intercept transfer). Following the transfer path 1180, a final orbit 1194 of the Satellite 2 is displayed. The final orbit 1194 may be calculated in part based on a corresponding final track 1192 of Satellite 2. The initial track 1140 and final track 1192 each represent one or more data points (e.g., timepoints) associated with corresponding one or more images of the Satellite 2.

The Target 3 has an orbit represented on the visualization display 200 by the target orbit 1170, which is determined at least in part by its associated target track 1150. As shown in the longitude-time graph 204, the final orbit 1194 of Satellite 2 and the target orbit 1170 of Target 3 appear to reach their point of closest approach around 06:00 of Aug. 18, 2019.

In response to a user selection, a spot report may be generated. Such a report may be based on an alert identified by the system and/or may be based on a user search. For example, a user may select (e.g., click on) a particular alert, which may result in the automatic generation of the spot report. Additionally or alternatively, a user may search for one or more source objects (e.g., Satellite 2), one or more target objects (e.g., Target 2), a time or time window, a latitude or latitude range, a longitude or longitude range, and/or other search parameter.

As shown in FIG. 32, for example, a user has selected one or both of Satellite 2 and Target 3. In response, the proximity spot report indicator 1126 can include details such as when the maneuver occurred (e.g., 3 days before the generation of the report), at what time the maneuver occurred (e.g., at 5:53:13 on Aug. 18, 2019), a degree of uncertainty (e.g., positional uncertainty of about 27 m), a near-instantaneous change in velocity (e.g., Delta-V) of the source object Satellite 2 (e.g., 2.87 m/s), a change in apogee (e.g., increase from GEO-51 km to GEO-6 km), a change in perigee (e.g., increase from GEO-56 km to GEO-38 km), a drift rate change (e.g., decrease from 0.69 deg/day to 0.28 deg/day), and/or change in inclination (e.g., decrease from 0.04 deg to 0.02 deg).

The report may additionally or alternatively include a status of any matches of the above factors to a target object (e.g., Target 2) and/or related information. For example, the system may identify that the maneuver of Satellite 2 caused it to have a matched inclination with Target 2, which required a burn of 1.16 m/s to achieve proximity. A change in burn economics (e.g., a decrease or increase) based on the maneuver can be shown (e.g., decrease from 2.08 m/s to 1.16 m/s). The report can include a time of when the conjunction occurred (e.g., 10 hours before the generation of the report). A minimum distance (e.g., 37 km+/−942 m) of the conjunction and/or the time of the conjunction (e.g., 5:55:34 on Aug. 19, 2019) can be displayed. An effect on the minimum distance and/or on the time of conjunction (e.g., maneuver decreased minimum distance from 55 km to 37 km) can be displayed.

It may be advantageous to know whether one or more objects had a solar lighting advantage. For example, an object may be equipped with image sensors to obtain details about another object, such as when the conjunction occurs. The proximity spot report 1126 can additionally or alternatively include an indication of which object had a solar lighting advantage during the conjunction (e.g., Target 3 had a solar lighting advantage) and/or whether the maneuver changed the nature of the solar lighting advantage (e.g., Satellite 2 had a strong solar lighting advantage prior to the maneuver).

Other path parameters of the source object (e.g., Satellite 2) and/or target object (e.g., Target 3) can be calculated and displayed. For example, the details of the orbit of Satellite 2 are shown in FIG. 32—Source: ExoMaps User OD; Apogee: 35780 km (GEO-6 km); Perigee: 35748 km (GEO-38 km); Inclination: 0.02 degrees; Drift Rate: 0.28 degrees/day; Position Uncertainty: 40 m; Orbit Age: 2.32 days.

As shown, the system also generated a maneuver spot report 1128. A system may generate one or more spot reports. The maneuver spot report 1128 indicates path parameters associated with the path of the source object (e.g., Satellite 2). Here, because the proximity report already included details of the maneuver (e.g., time of maneuver, effect, etc., as discussed above), those details are not listed again here.

Figure 33:
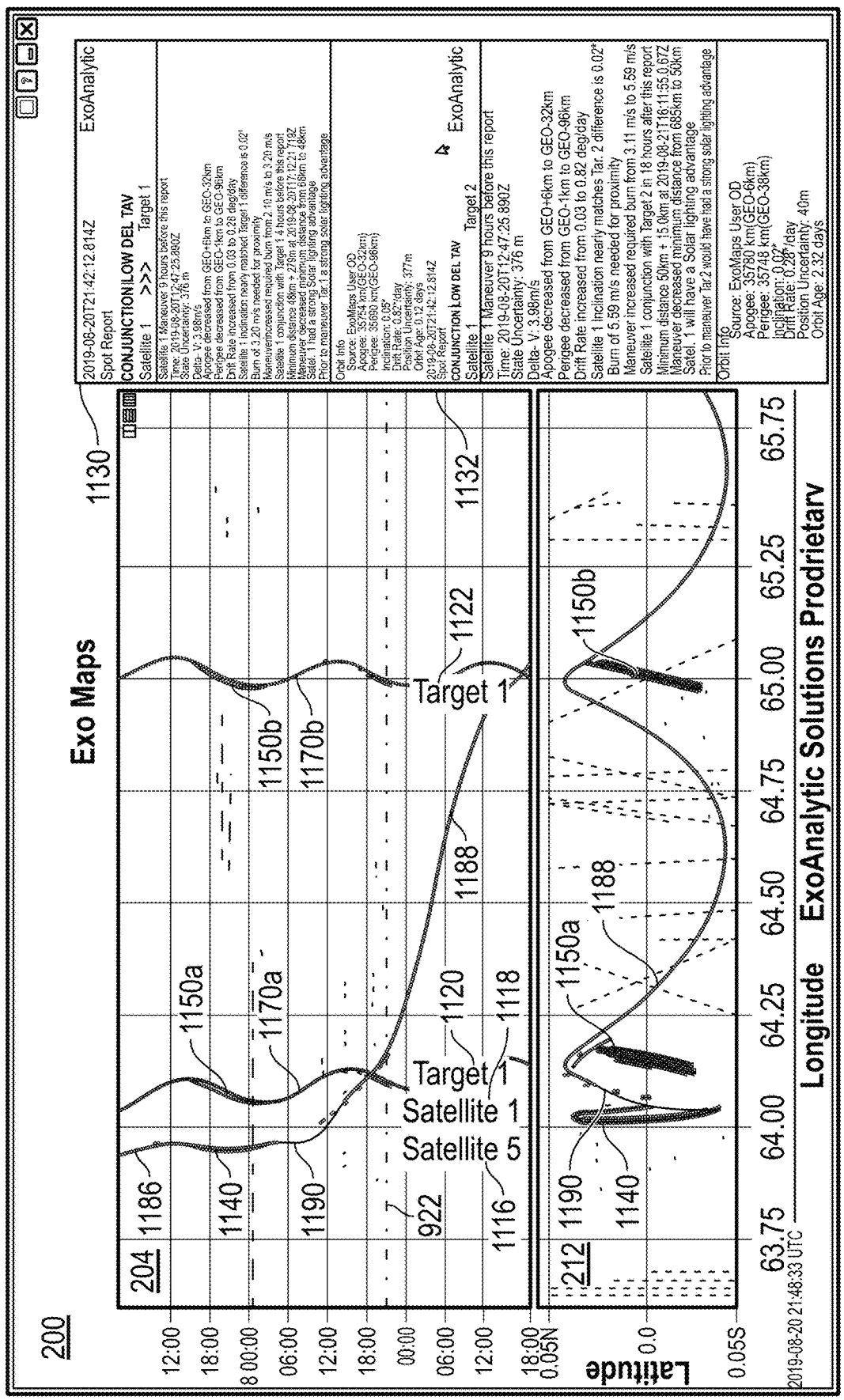
FIG. 33 shows two example conjunction spot reports within a visualization display.

FIG. 33 shows two example conjunction spot reports 1130, 1132. The first conjunction spot report 1130 describes details associated with a conjunction between a source object Satellite 1 and a first target object Target 1. The second conjunction spot report 1132 shows details related to a conjunction between the Satellite 1 and a second target object Target 2.

The longitude-time graph 204 and longitude-latitude graph 212 visually show details of the paths of the Satellite 1, Target 1, and Target 2. The visualization display 200 shows an initial orbit 1186, maneuver path 1190, and a final orbit 1088. The initial orbit 1186 is calculated in part based on the initial track 1140. The visualization display 200 shows the first target orbit 1170*a* (e.g., based at least in part on the first target track 1150*a*) and the second target orbit 1170*b* (e.g., based in least in part on the second target track 1150*b*). One or more of the elements described above may be displayed by the longitude-time graph 204, the longitude-latitude graph 212, another graph described herein (e.g., the magnitude-time graph), and/or any combination thereof.

The longitude-time graph 204 shows a current time marker 922. The final orbit 1088, first target orbit 1170*a*, and the second target orbit 1170*b* each span before and after a current time, as indicated by their display below and above, respectively, the current time marker 922. In some embodiments, as a user zooms into the longitude-time graph 204 and/or the longitude-latitude graph 212 to a certain threshold of detail, one or more object indicators may be shown. The visualization display 200 shows a Satellite 5 indicator 1116, a Satellite 1 indicator 1118, a Target 1 indicator 1120, and/or a Target 2 indicator 1122. These object indicators may indicate where a corresponding orbit would intersect the current time marker 922 in the absence of any intervening maneuvers. In some embodiments, the location of the object indicators may based on a relative location of the paths of the respective object orbital paths. Note that no tracks (e.g., initial track 1140, first target track 1150*a*, second target track 1150*b*) are indicated below the current time marker 922 since no future images of objects would yet be available for analysis.

As shown, the first conjunction spot report 1130 includes details related to a maneuver of Satellite 1 that already caused a conjunction (e.g., historical conjunction) with Target 1. As shown, the maneuver occurred 9 hours before the generation of the report. The maneuver occurred at 12:47:25 on Aug. 20, 2019 with a degree of positional uncertainty of 376 m and a Delta-V of the Satellite 1 of 3.98 m/s. The first conjunction spot report 1130 shows a decrease in apogee from GEO+6 km to GEO-32 km and a decrease in perigee from GEO-1 km to GEO-96 km and a drift rate increase from 0.03 deg/day to 0.82 deg/day.

The first conjunction spot report 1130 indicates that Satellite 1 and Target 1 had a matched inclination with a difference of 0.02 degrees, which required a burn of 3.20 m/s to achieve proximity. The required burn increased from 2.10 m/s to 3.20 m/s. The conjunction occurred 4 hours before the generation of the report. A minimum distance of 48 km+/− 279 m of the conjunction occurred at 17:12:21 on Aug. 20, 2019. The maneuver decreased a minimum distance from 68 km to 48 km. The first conjunction spot report 1130 indicates that Satellite 1 had a solar lighting advantage during the conjunction but that prior to the maneuver, Target 1 had a strong solar lighting advantage.

Other path parameters of Satellite 1 are shown in FIG. 33—Source: ExoMaps User OD; Apogee: 35754 km (GEO-32 km); Perigee: 35690 km (GEO-96 km); Inclination: 0.05 degrees; Drift Rate: 0.82 degrees/day; Position Uncertainty: 377 m; Orbit Age: 0.12 days.

FIG. 33 also shows an example second conjunction spot report 1132 that shows an expected conjunction (e.g., future conjunction) between Satellite 1 and Target 2. As shown, the maneuver shares the same characteristics of the maneuver described by the first conjunction spot report 1130, so those details will not be repeated. The second conjunction spot report 1132 indicates that Satellite 1 and Target 2 had a matched inclination with a difference of 0.02 degrees, which required a burn of 5.59 m/s to achieve proximity. The required burn increased from 3.11 m/s to 5.59 m/s. The conjunction is not expected to occur until 18 hours after the generation of the report. A minimum distance of 50 km+/− 15.0 km of the conjunction occurred at 16:11:55 on Aug. 21, 2019. The maneuver decreased a minimum distance from 685 km to 50 km. The second conjunction spot report 1132 indicates that Satellite 1 will have a solar lighting advantage during the conjunction but that prior to the maneuver, Target 2 would have had a strong solar lighting advantage but for the maneuver by Satellite 1. Other path parameters of Satellite 1 are shown in FIG. 33, but as above, these details repeat the orbit information shown by the first conjunction spot report 1130 and are not repeated here.

Figure 34:
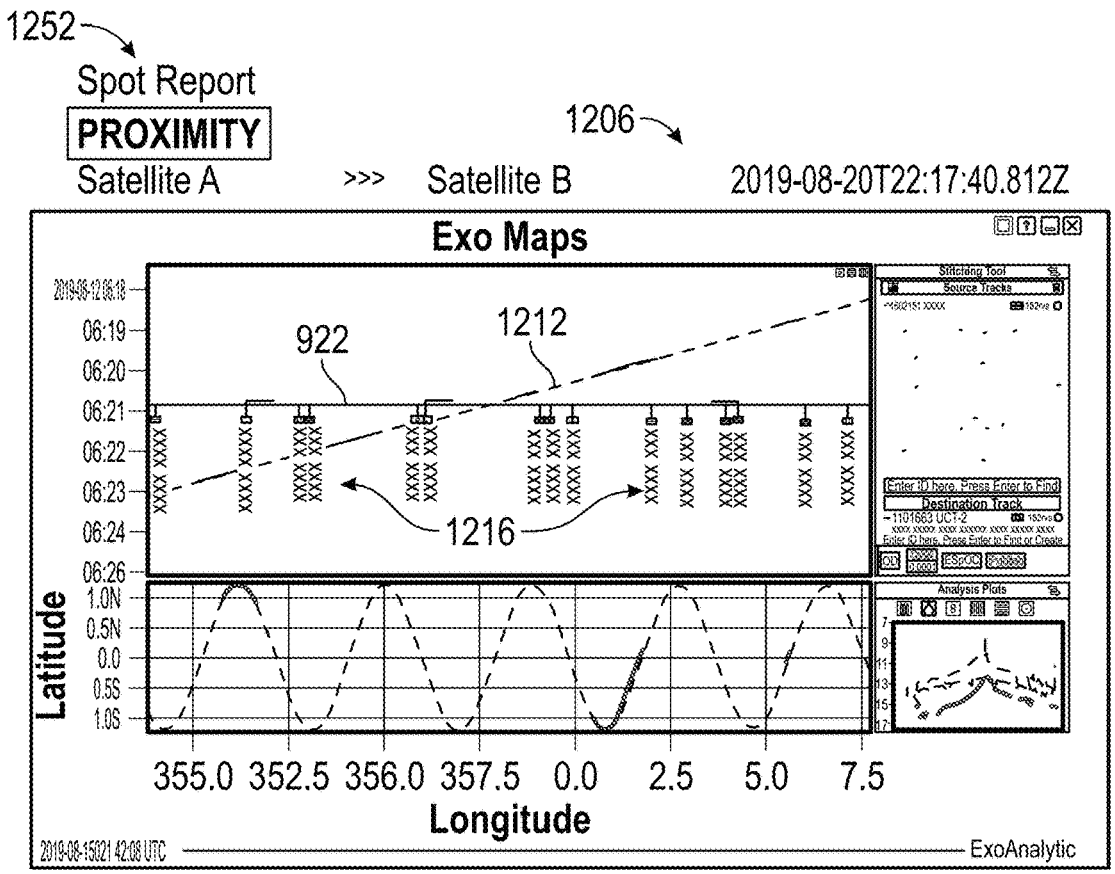
FIG. 34 shows an example first proximity spot report showing a conjunction between Satellite A and Satellite B.
Figure 35:
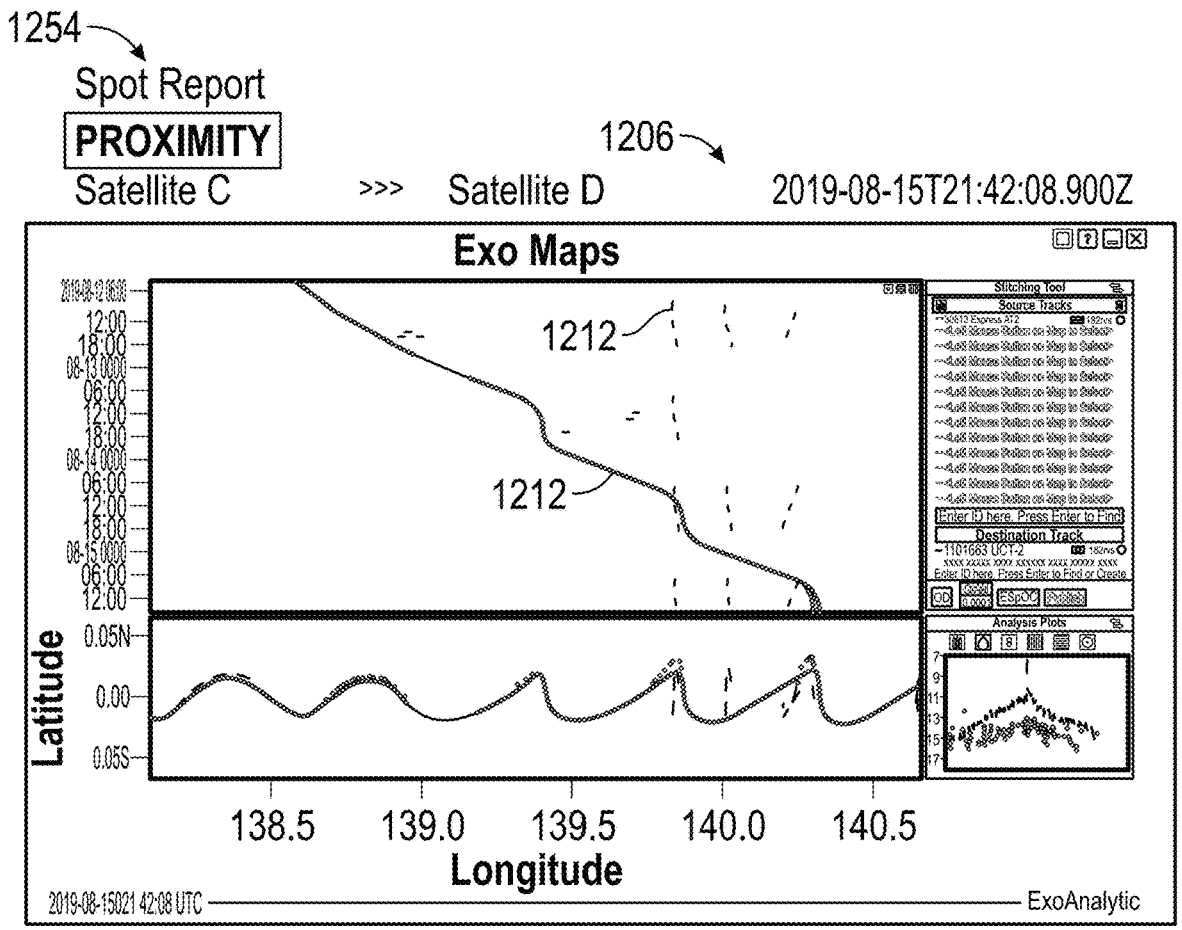
FIG. 35 shows a second proximity spot report in response to a maneuver performed by Satellite C.

FIGS. 34-35 show two example proximity spot reports 1252, 1254, respectively. The proximity spot reports 1252, 1254 show reports that can be presented to a human user in an easily digestible format. The proximity spot reports 1252, 1254 do not require access to the visualization display 200 described above but can be prepared (e.g., printed) and presented to a human user after analysis by the computer system and/or one or more human users has been conducted.

FIG. 34 shows an example first proximity spot report 1252 showing a conjunction between Satellite A and Satellite B. The first proximity spot report 1252 includes a display interface detail 1206 and a spot report detail 1208. The display interface detail 1206 shows an object orbit 1212 (e.g., of the Satellite A and/or of the Satellite B), a current time marker 922, and a plurality of object indicators 1216. The object indicators 1116 can include identifiers such as country flags, position indicators (e.g., lines, arrows), activity details (e.g., blinking, highlighting, font adjustments) based on current or otherwise relevant object behavior (e.g., a satellite may blink or be highlighted based on a recently obtained alert related thereto). Other details, such as those described above, are shown but are not discussed here in detail. For example, details of the source and/or target objects can be shown in with the stitching tool interface (e.g., stitching tool interface 804 of FIG. 22) and/or the analysis plot interface (e.g., analysis plot interface 808 of FIG. 22).

The spot report detail 1208 shows that Satellite A maneuvered at 01:11:32 on Aug. 19, 2019, which was 45 hours before the generation of the first proximity spot report 1252. The state uncertainty is 52 m with a Delta-V of 2.66 m/s. The perigee decreased from GEO+316 km to GEO+289 km with a decrease in drift rate from 4.07 degrees/day to 3.88 degrees/day. Satellite A is expected to match the inclination of Satellite B, and 0.66 m/s of burn is required for proximity. The maneuver decreased a required burn rate from 2.00 m/s to 0.66 m/s. The first proximity spot report 1252 indicates that the conjunction is expected to occur 34 hours after this report with a minimum distance of 0 km+/−5.2 km at 08:24:42 on Aug. 22, 2019. The maneuver decreased the minimum distance from 16 km to 0 km and will give Satellite A a solar lighting advantage, even though prior to the maneuver, Satellite B would have had a slight solar lighting advantage.

FIG. 35 shows a second proximity spot report 1254 in response to a maneuver performed by Satellite C. The second proximity spot report 1254 includes a display interface detail 1206 and a spot report detail 1208. The 11206 includes a plurality of object orbits 1212, including the orbits of Satellites C and D.

The spot report detail 1208 shows that Satellite C maneuvered at 17:24:02 on Aug. 12, 2019, with a Delta-V of 1.58 m/s. The apogee increased from GEO-28 km to GEO-10 km and the perigee decreased from GEO-42 km to GEO-55 km. Satellite C matched the inclination of Satellite D, and a Delta-V of 1.82 m/s is required to enter proximity operations. The second proximity spot report 1254 indicates that the conjunction is expected to occur with a minimum distance of 16 km+/−1.2 km at 15:31:32 on Aug. 14, 2019. The maneuver will give Satellite C a solar lighting advantage.

Alert Management

The systems can display and manage alerts (e.g., description, report, update, etc.). Certain alerts may be automatically generated while others may be generated as a result of user interaction with a user interface. In some embodiments, the user interfaces may display to a user one or more alerts. The user may be able to select an alert and view the alert or metadata associated with the alert, update the alert, remove the alert, transmit the alert to another computer, and/or take another action related to the alert. The alert may notify a user of unique interactions between or among two or more space objects that have already occurred, that are occurring at a present time, that are expected to occur based on current trajectories, and/or that may occur based on contingent intermediate maneuvers of one or more space objects. Accordingly, the alerts may include a report and/or other alert data related to one, two, or more space objects and/or path parameters associated therewith.

As discussed above, there are many kinds of alerts that can be identified and/or generated by the systems described herein. For example, an alert can be related to a maneuver, a proximity of two space objects, a station keeping of a space object, a failure to station keep by a space object, failure to maintain a stable orbit, an apparent destination or source orbit of a space object (e.g., to/from a graveyard orbit, etc.), a drift rate of a space object, an appearance of a new object, a disappearance of a known object, a change in a magnitude (e.g., radiometric measurement) associated with one or more space objects, and/or other conditions or scenarios described herein may result in generation of an alert.

In some embodiments the system may be able to predict what a user determines to be an alert. For example, the system may use a trained machine learning model to develop predictions for what a user may identify as important alerts and/or what a user identifies as a dismissible alert. The methods and systems for using deep learning techniques to arrive at what is an important or dismissible alert, alone or in combination with other data (e.g., user input). Deep learning techniques in the form of one or more algorithms can be used to analyze the alerts. An algorithm can obtain results of user responses to alerts as input data and output a prediction of a user outcome of an alert. The algorithm may utilize a neural network, such as a convolutional neural network (CNN), or some other machine learning model. In some embodiments, the algorithm includes a particle filter that is configured to probabilistically assign a condition that most likely matches or fits with characteristics associated with each dismissed and/or maintained. This probabilistic assignment may be based on hundreds, thousands, or even millions of relevant alerts as prior information.

The system can receive alert input, pass the alert input through a machine learning model, such as, for example, a convolutional neural network (CNN), and receive an alert status output. The machine learning model can receive the alert input and pass it to one or more model layers. The model layers can include a plurality of convolutional layers that "convolve" with a multiplication or other dot product. Additional convolutions may be included, such as pooling layers, fully connected layers, and normalization layers. One or more of these layers may be "hidden" layers because their alert inputs and alert status outputs are masked by an activation function and a final convolution.

Pooling layers may reduce the dimensions of the data by combining the alert status outputs of neuron clusters at one layer into a single neuron in the next layer. Pooling may be a form of non-linear downsampling. Pooling may compute a max or an average. Thus, pooling may provide a first approximation of a desired feature, such as a degree of damage to a hair follicle or other sample. For example, max pooling may use the maximum value from each of a cluster of neurons at a prior layer. By contrast, average pooling may use an average value from one or more clusters of neurons at the prior layer, as represented schematically in FIG. 2. Maximum and average pooling are only examples, as other pooling types may be used. In some examples, the pooling layers transmit pooled data to fully connected layers. Fully connected layers can connect every neuron in one layer to every neuron in another layer. Thus, fully connected layers may operate like a multi-layer perceptron neural network (MLP). A resulting flattened matrix can pass through a fully connected layer to classify alert input.

At one or more convolutions, the algorithm can use a sliding dot product and/or a cross-correlation. Indices of a matrix at one or more convolutions or model layers can be affected by weights in determining a specific index point. For example, each neuron in a neural network can compute an alert status output value by applying a particular function to the alert input values coming from the receptive field in the previous layer. A vector of weights and/or a bias can determine a function that is applied to the alert input values. Thus, as the machine learning model proceeds through the model layers, iterative adjustments to these biases and weights results in a defined alert status output, such as a likelihood of a user dismissal of the alert, or the like.

Figure 36:
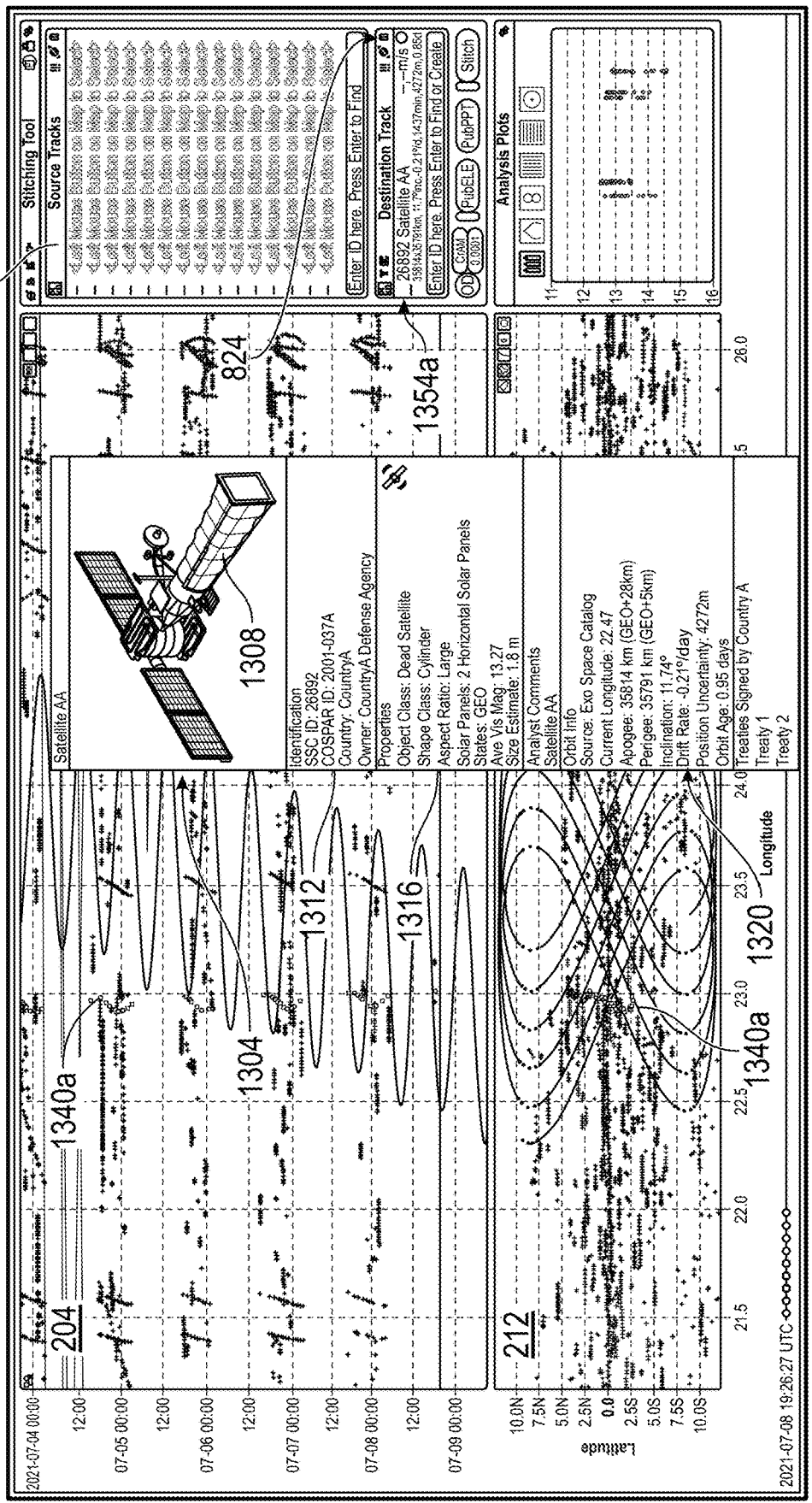
FIG. 36 shows an example visualization display that shows a space object graphical representation in combination with other features described herein.

FIG. 36 shows an example visualization display 200 that shows a space object graphical representation 1304 in combination with other features described herein. The space object graphical representation 1304 shows a space object pictorial representation 1308, one or more space object identification indicators 1312, one or more space object property indicators 1316, and/or space object orbit indicators 1320. The space object graphical representation 1304 shown corresponds to a target track identifier 1354a. As shown the target track identifier 1354a is indicated within the destination track region 824 of the visualization display 200. The target track identifier 1354a corresponds to selected track representations 1340a in both the longitude-time graph 204 and the longitude-latitude graph 212. The space object graphical representation 1304 may be overlayed across the visualization display 200 and may be manipulable (e.g., resized, moved, etc.) by a user.

The space object pictorial representation 1308 can include a visual image of what the Satellite AA looks like or may look like to a human viewer. For example, the space object pictorial representation 1308 shows a satellite that includes a large image sensor, a data communication interface, solar panels, and other features.

The space object identification indicators 1312 can include identifying details or characteristics that may be relevant to and/or identify the Satellite AA. For example, the space object identification indicators 1312 can include an system identification number, an international identification number, a country of origin and/or ownership, and/or an entity that owns the space object.

The space object property indicators 1316 can include relevant details about the Satellite AA that are of interest to a user. For example, the space object property indicators 1316 can include an object class (e.g., dead satellite, operational satellite, active satellite, etc.), a size class (e.g., large, micro, etc.), a shape class (e.g., cylinder, cube, elongate, irregularly shaped, box, etc.), an aspect ratio (e.g., large, small, etc.), an indication of solar panels (e.g., 2 horizontal solar panels, 4 vertical solar panels, none, etc.), a status such as an orbit status (e.g., geo-orbit) or other properties (e.g., inclusion of thrusters, etc.), a state of the satellite (e.g., station keeping, drifting, dynamic slewing, in geo-orbit, etc.), an average visible magnitude (e.g., 13.27), a size estimate (e.g., 1.8 m), and/or other property of the space object.

The space object orbit indicators 1320 can include details related to an orbit of the space object. For example, the space object orbit indicators 1320 can include a source of the orbital information (e.g., Exo Space Catalogue, another private catalogue, a military catalogue, etc.), a current longitude of the space object (e.g., 22.47), an apogee (e.g., 35814 km or GEO+28 km), a perigee (e.g., 35791 km or GEO+5 km), an inclination (e.g., 11.74o), a drift rate (e.g., −0.21o/day), a position uncertainty (e.g., 4272 m), an orbit age (e.g., 0.95), and/or other information related to the space object's orbit. In some embodiments, the space object graphical representation 1304 can additionally or alternatively include treaty information related to a country of origin or ownership of the space object (in the case shown in FIG. 36, Country A). For example, the treaty information may include a listing of existing treaties governing the country, such as Treaty 1 or Treaty 2 as shown.

Figure 37:
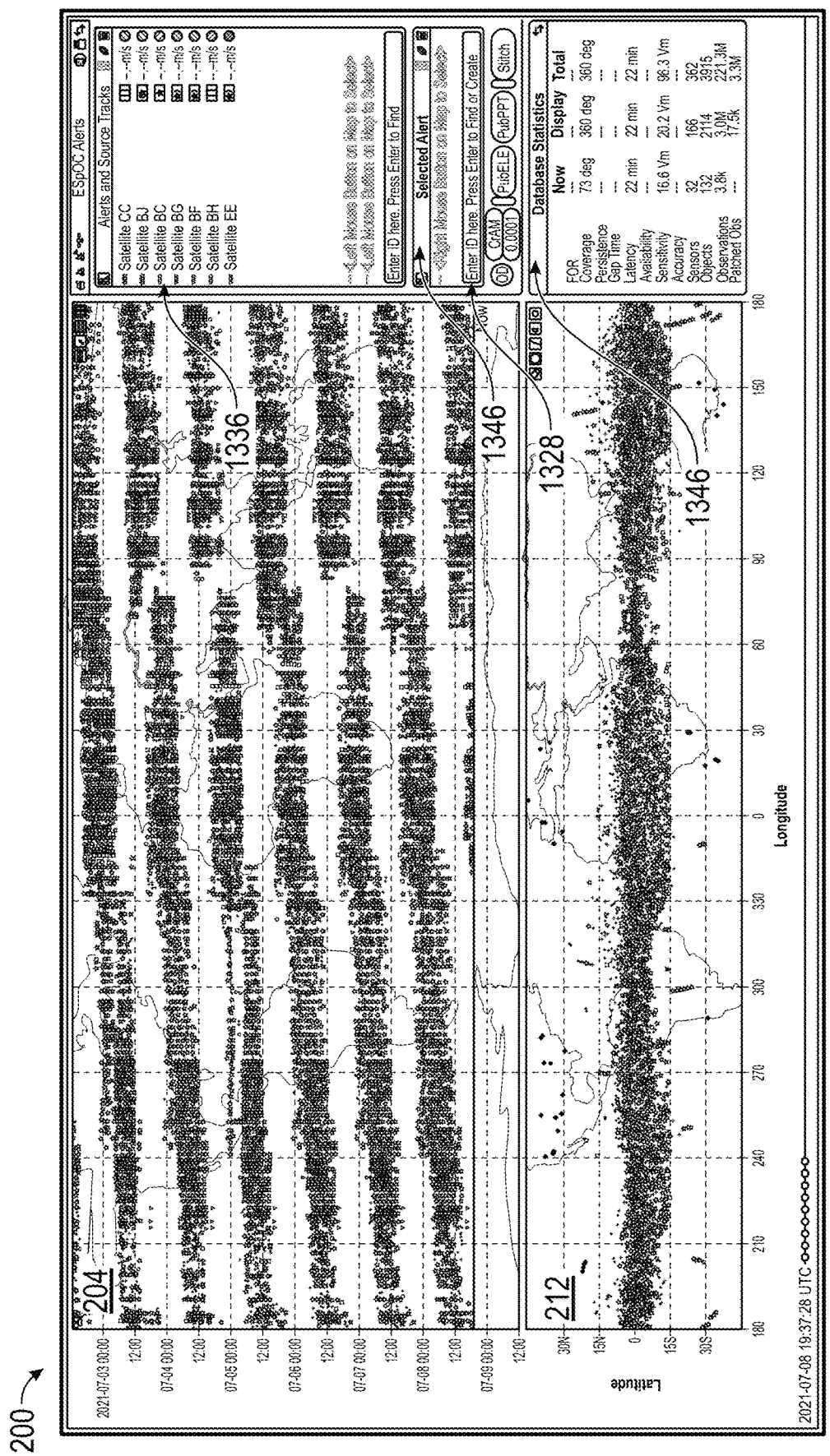
FIG. 37 shows an example visualization display that includes an alert and source track interface as well as a selected alert interface and an alert selection interface.

FIG. 37 shows an example visualization display 200 that includes an alert and source track interface 1324 as well as a selected alert interface 1346 and an alert selection interface 1328. The alert and source track interface 1324 can list one or more alerts associated with corresponding source tracks. The source tracks may be identified with corresponding source track identifiers. As shown, the source track identifiers include alerts associated with Satellites CC, BJ, BC, BG, BF, BH, and EE. A user may be able to select one or more of the source track identifiers from the alert and source track interface 1324 (e.g., by selecting an associated alert) and/or from corresponding track representations within the longitude-time graph 204, the longitude-latitude graph 212, and/or some other region of the visualization display 200. The source track identifiers may include an indicator of country origin or ownership (e.g., a country flag) and/or a speed of a corresponding space object. A color associated with each of the source track identifiers may be indicated by the corresponding source track identifier. That color may be indicated by corresponding track representations within the longitude-time graph 204 and/or the longitude-latitude graph 212. In some embodiments, the corresponding track representations may be indicated using some other indicator additional to or alternative to color (e.g., shape of individual track representation elements, shading, etc.). In some embodiments the alert and source track interface 1324 can show all or nearly all alerts shown in the longitude-time graph 204 and/or the longitude-latitude graph 212. If there are more alerts than can be shown at once, the alert and source track interface 1324 may include an expander selector, such as a scroll window, to allow a user to see the additional alerts.

In some embodiments the visualization display 200 includes a selected alert interface 1346. The selected alert interface 1346 can include one or more features of the visualization display 200, such as an angle of coverage, a degree of persistence, a gap time, an amount of time latency, an availability and/or accuracy and/or sensitivity of measurements, a number of sensors used to obtain the measurements, a number of objects, a number of observations, a number of patched or modified observations, and/or other data related to the space objects. The data of the selected alert interface 1346 may be divided into segments for one or more of those categories. The segments may correspond to NOW, DISPLAY, and/or TOTAL.

Figure 38:
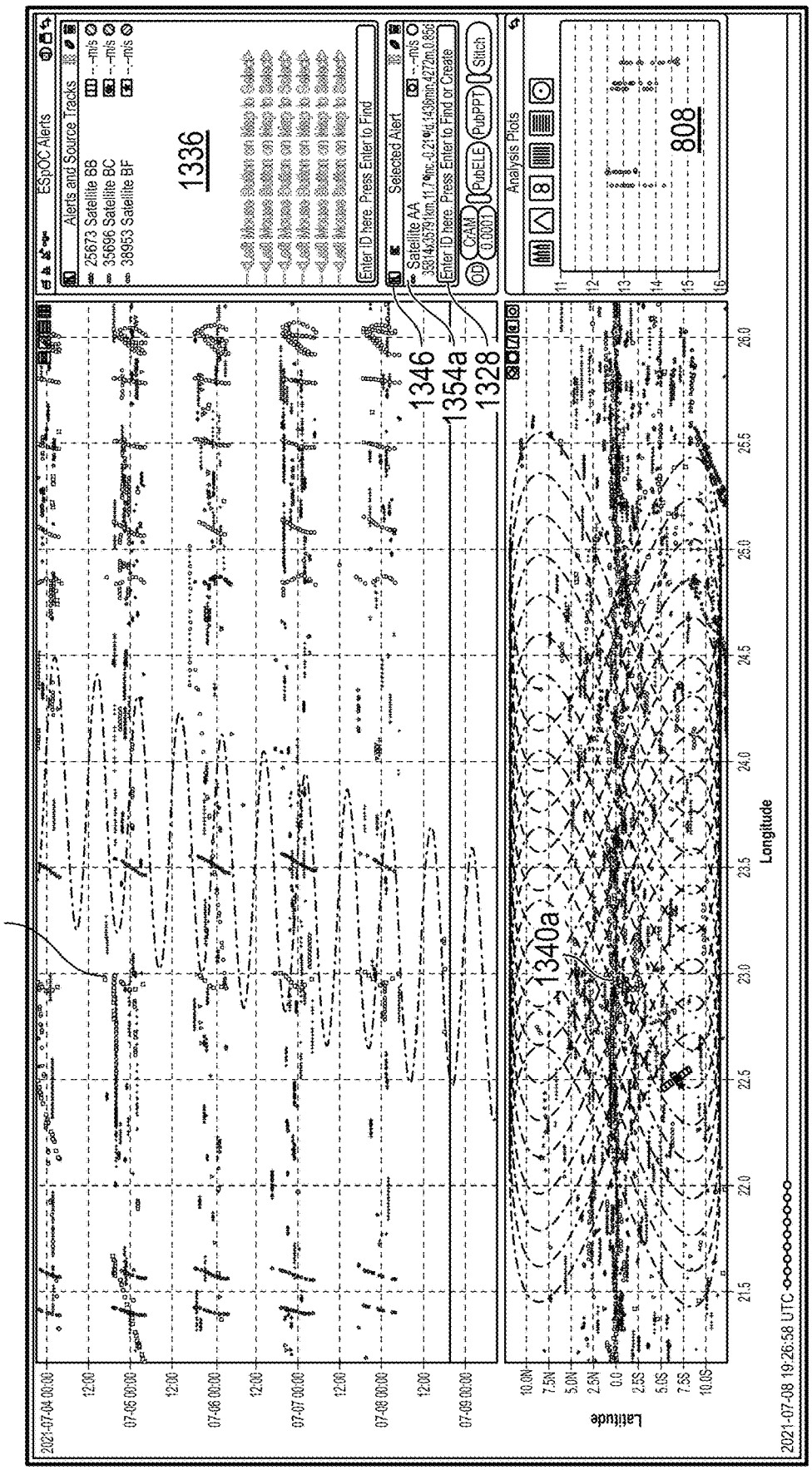
FIG. 38 shows the visualization display of FIG. 36 but with the alert and source track interface and the target track identifier within the alert selection interface.

FIG. 38 shows the visualization display 200 of FIG. 36 but with the alert and source track interface 1324 and the target track identifier 1354*a* within the alert selection interface 1328. The alert may have been generated by a user (e.g., after viewing the space object graphical representation 1304 and/or the selected track representation 1340*a* within the visualization display 200) and/or automatically by the system. In some embodiments, the destination track region 824 changes to the selected alert interface 1346 after the target track identifier 1354*a* has been identified as an alert and/or in response to the same.

Figure 39:
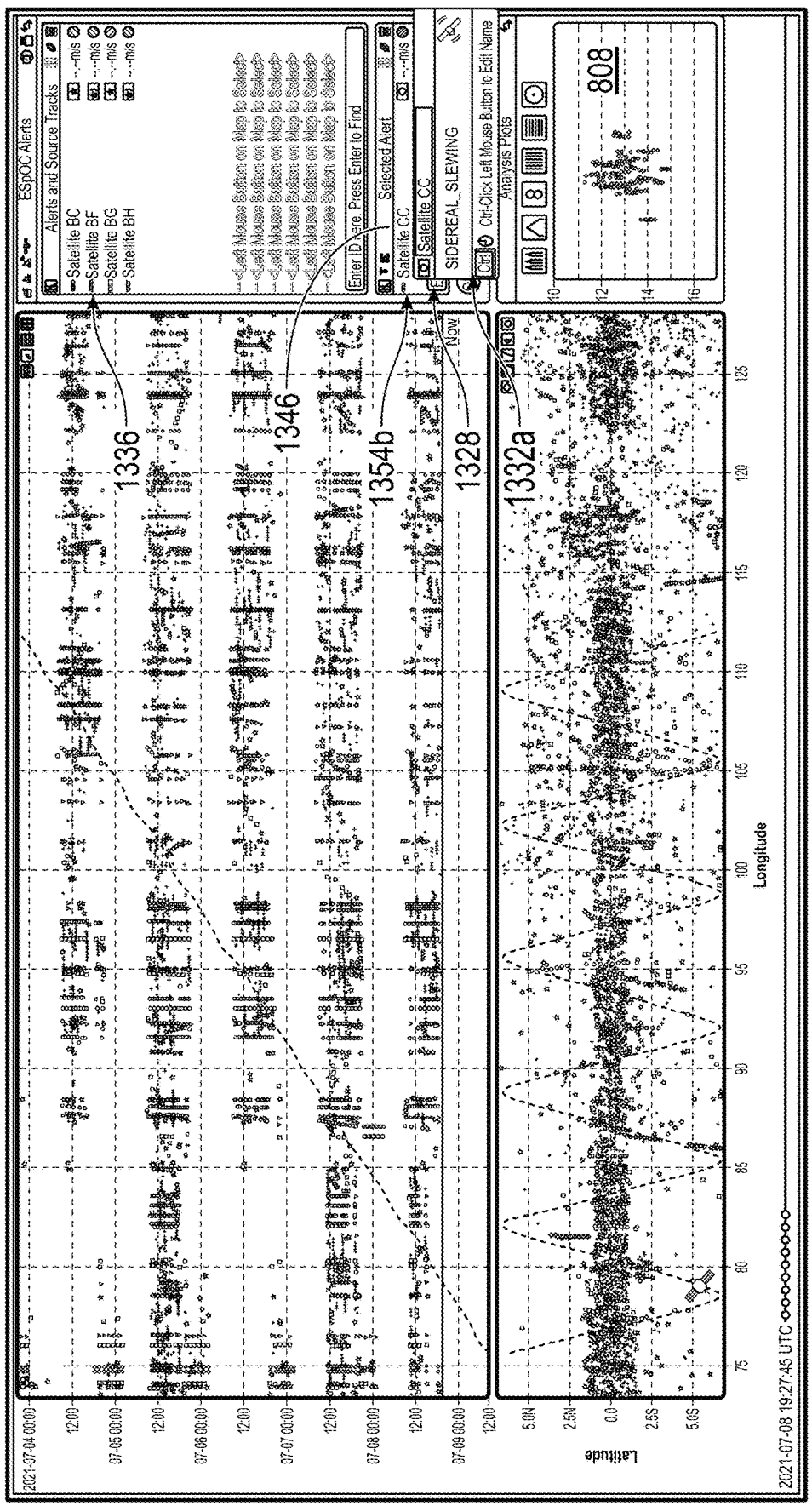
FIG. 39 shows the visualization display with an indication of an alert type indicator 1332 corresponding to a radiometric (e.g., photometric) alert.

FIG. 39 shows the visualization display 200 with an indication of an alert type indicator 1332 corresponding to a radiometric (e.g., photometric) alert. The radiometric alert may correspond to one or more of a variety of possible radiometric alerts, such as a slewing anomaly, a spin stable alert, a tumbling alert, and/or any radiometric or photometric anomalies described herein, such as ones regarding an attitude of the space object. The alert type indicator 1332*a* can include a text descriptor and/or graphical descriptor (e.g., icon) of the nature of the alert. The alert type indicator 1332*a* can indicate that a target track identifier 1354*b* is associated with the alert.

Figure 40:
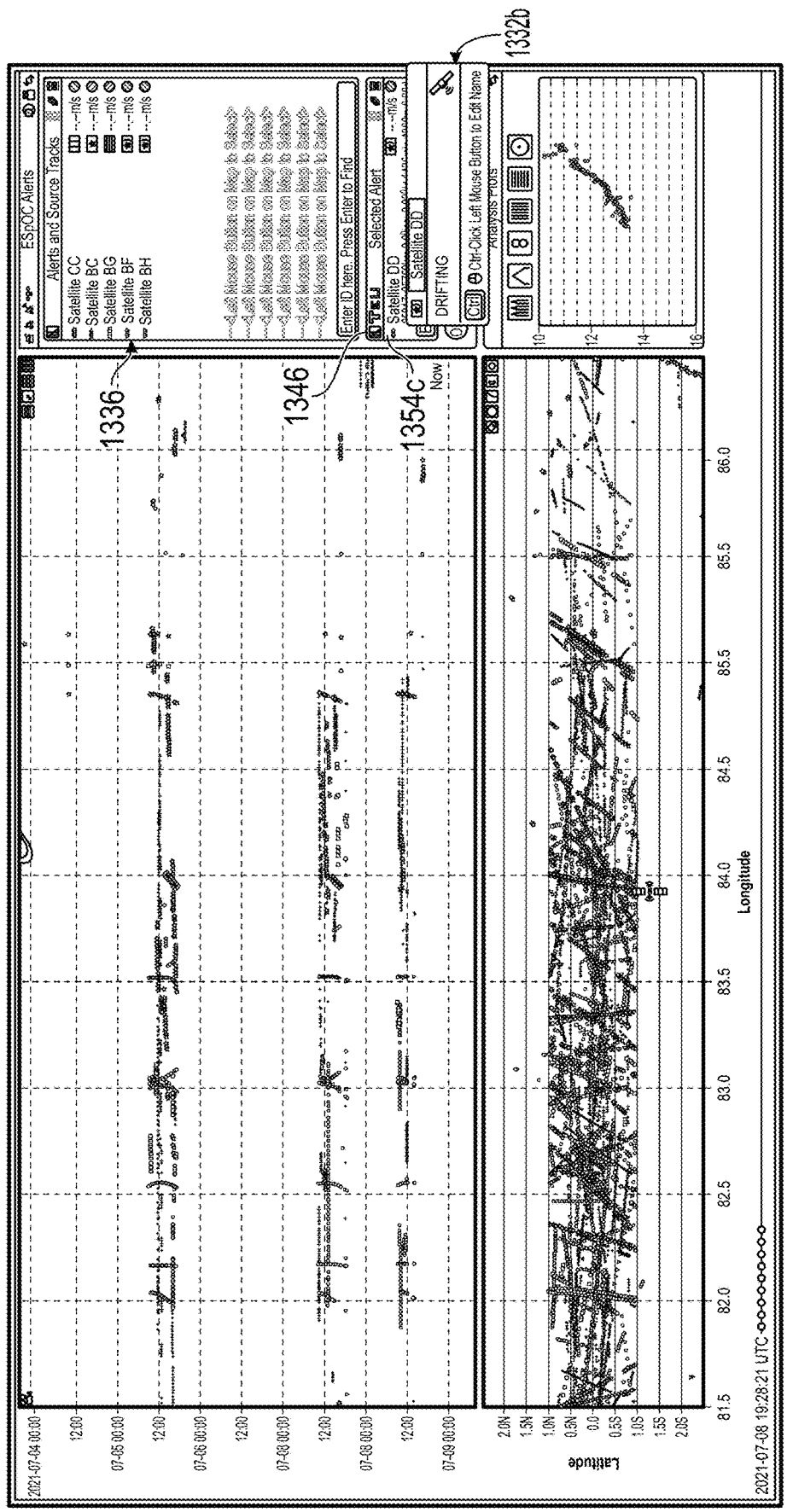
FIG. 40 shows a different alert type indicator related to a maneuver-based alert.

FIG. 40 shows a different alert type indicator 1332*b* related to a maneuver-based alert. As discussed above, maneuver-based alerts can include one or more of a variety of alerts, including ones related to station keeping (e.g., failing to keep station), an orbit transfer, drifting, moving to/from a different orbit, etc. Also shown in the alert and source track interface 1324 of FIG. 40 is the inclusion of the alert related to Satellite CC from FIG. 39.

Figure 41:
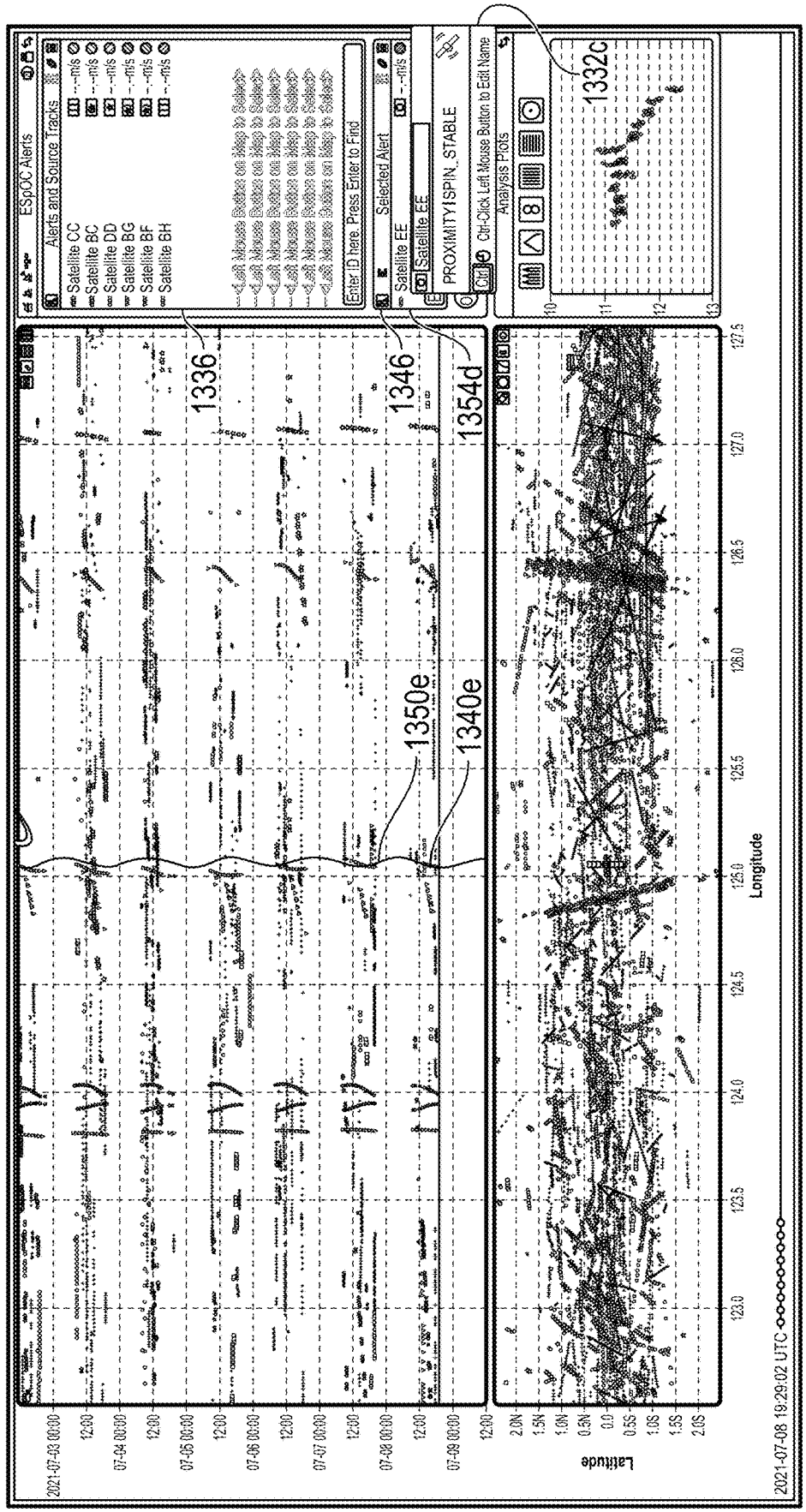
FIG. 41 shows another alert type indicator related to an object interaction alert associated with Satellite EE.

FIG. 41 shows another alert type indicator 1332*c* related to an object interaction alert associated with Satellite EE. As shown, the alert type indicator 1332*c* indicates a proximity alert, but other kinds of object interaction alerts are possible, such as a conjunction alert or other alerts described herein. The alert type indicator 1332*c* is associated with the target track identifier 1354*d* corresponding to a selected track representation 1340*e* and a predicted track representation 1350*e*. The predicted track representation 1350*e* may have previously been calculated.

Figure 42:
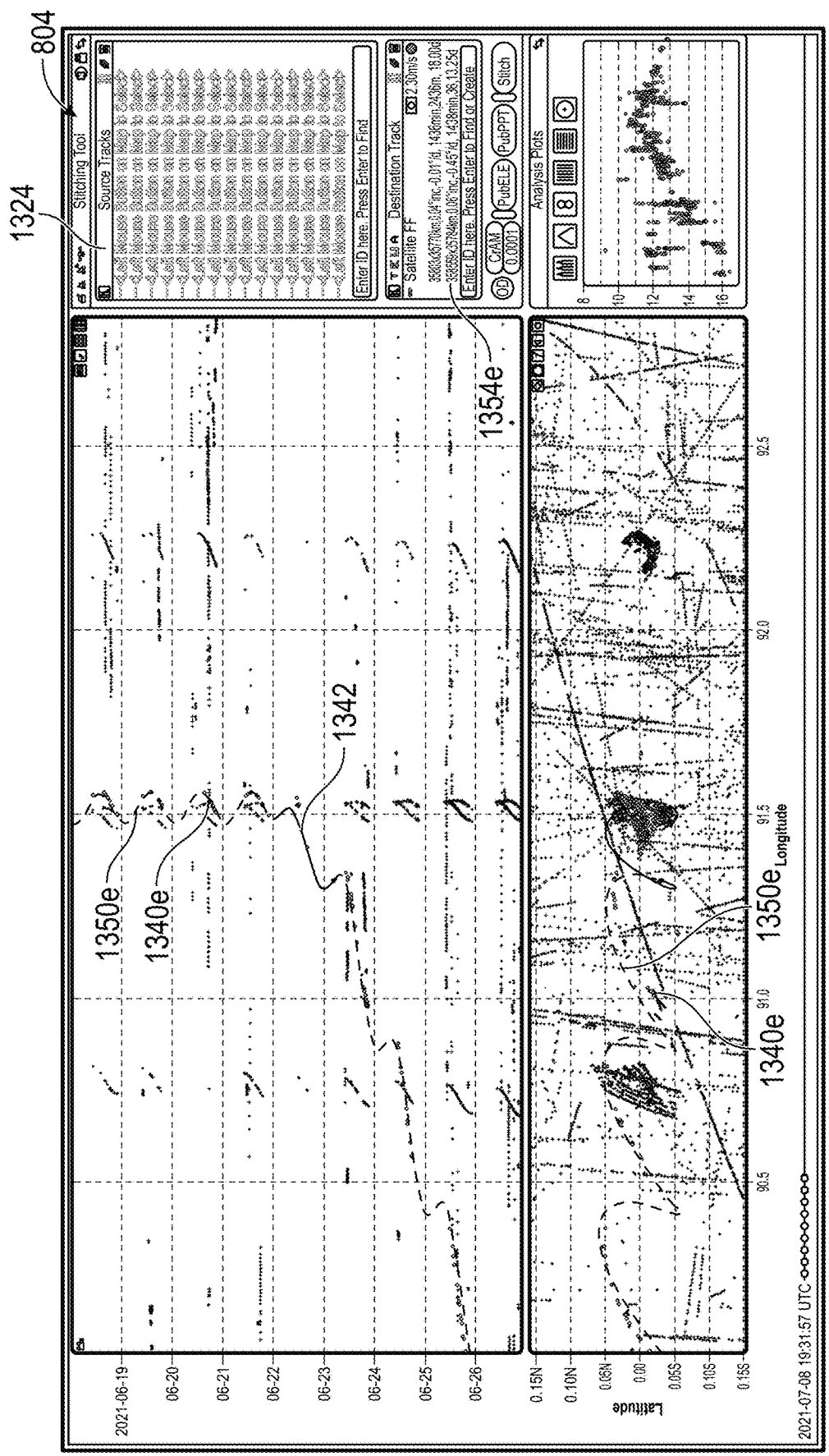
FIG. 42 shows a selected track representation and a predicted track representation each associated with a target track identifier.
Figure 43:
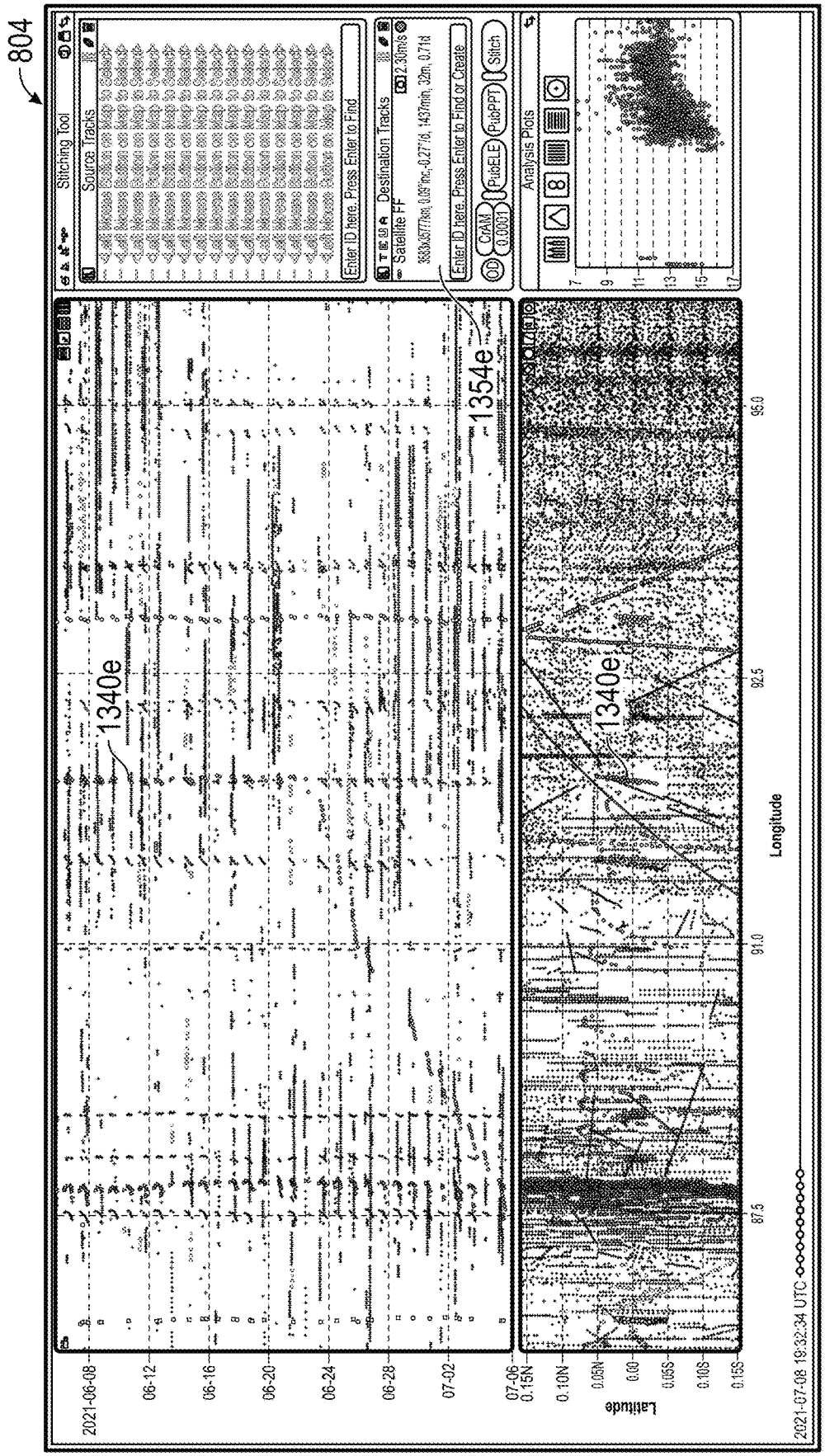
FIG. 43 shows another view of the selected track representation of FIG. 51 and the predicted track representation each associated with a target track identifier.
Figure 44:
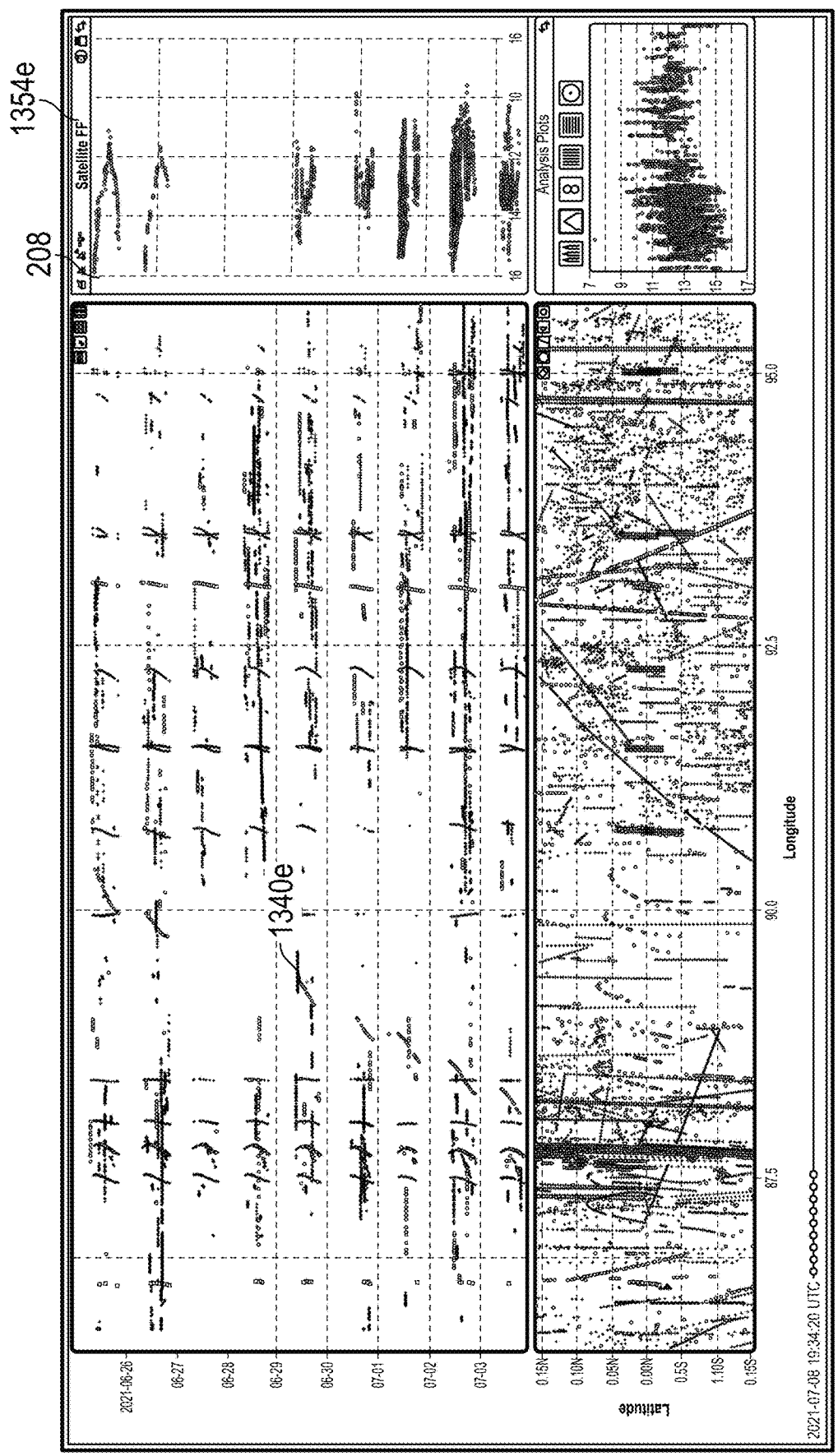
FIG. 44 shows the visualization display including the scalar-time graph associated with the Satellite FF.

FIG. 42 and FIG. 43 both show a selected track representation 1340*e* and a predicted track representation 1350*e* each associated with a target track identifier 1354*e*. FIG. 43 shows a zoomed out version of FIG. 42. As shown in FIG. 42, the Satellite FF has engaged in an orbit transfer, as shown by the orbit transfer indicator 1342. Such an orbit transfer may trigger its own alert. FIG. 44 shows the visualization display 200 including the scalar-time graph 208 associated with the Satellite FF. As can be seen in the analysis plot and the scalar-time graph 208, the pattern of the radiometric observations obtained of the Satellite FF before and after the orbit transfer indicates the changed orbit.

Figure 45:
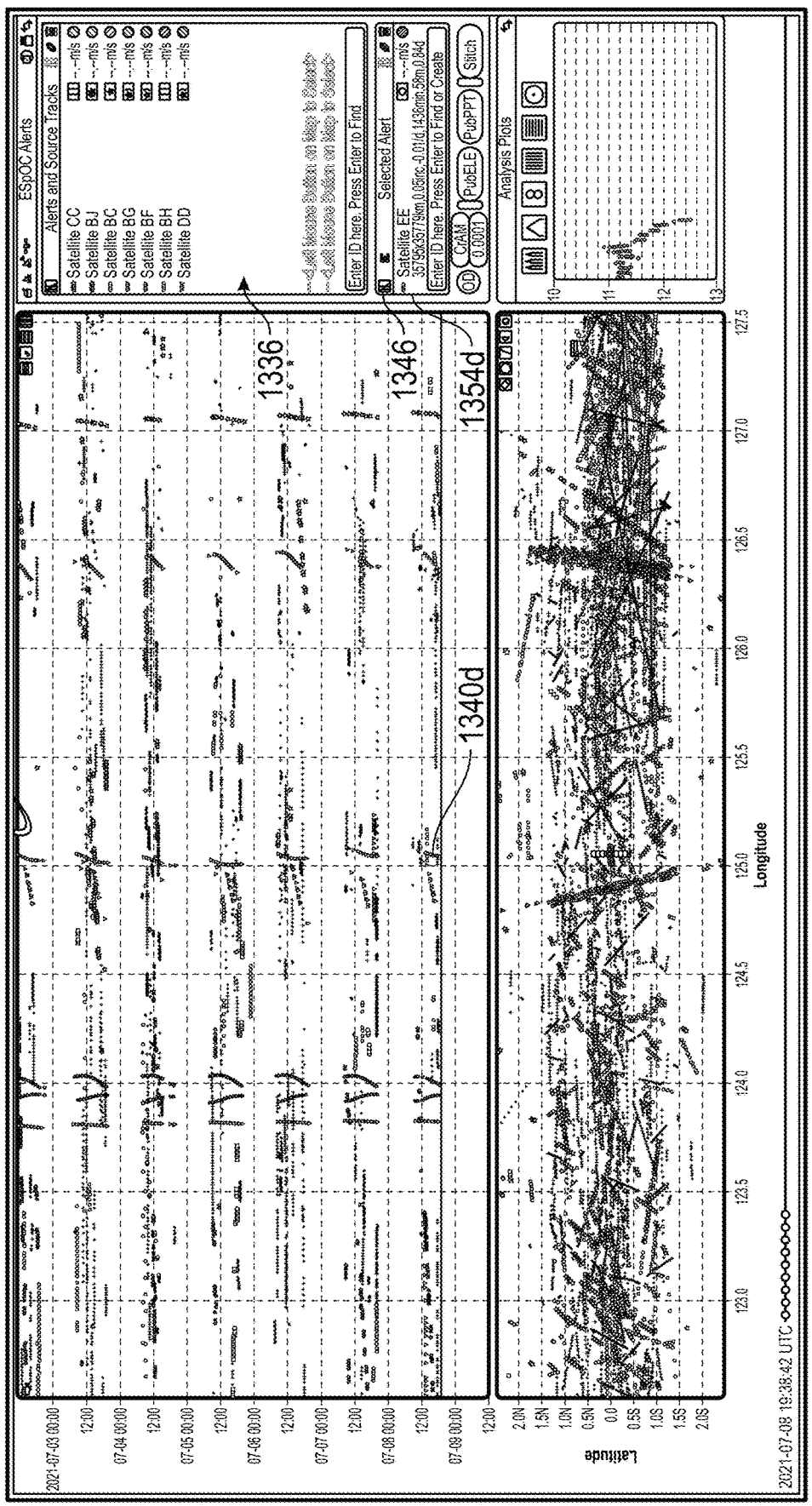
FIG. 45 shows a selection of the selected track representation associated with Satellite EE.
Figure 46:
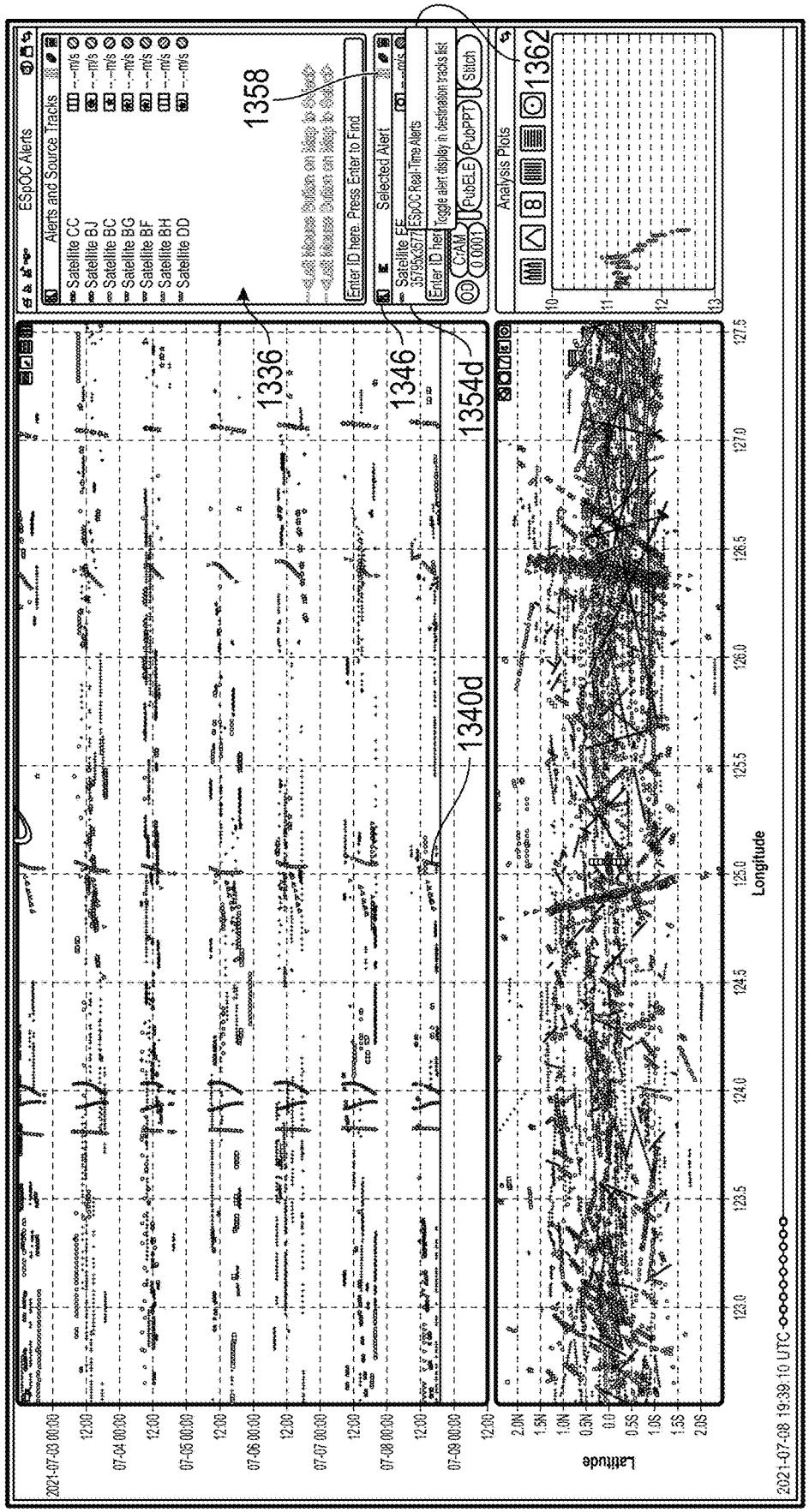
FIG. 46 shows a user selection of an alert display toggling selector allowing the user to include an alert associated with selected track representation in the alert and source track interface as indicated by the alert display toggling indicator.
Figure 47:
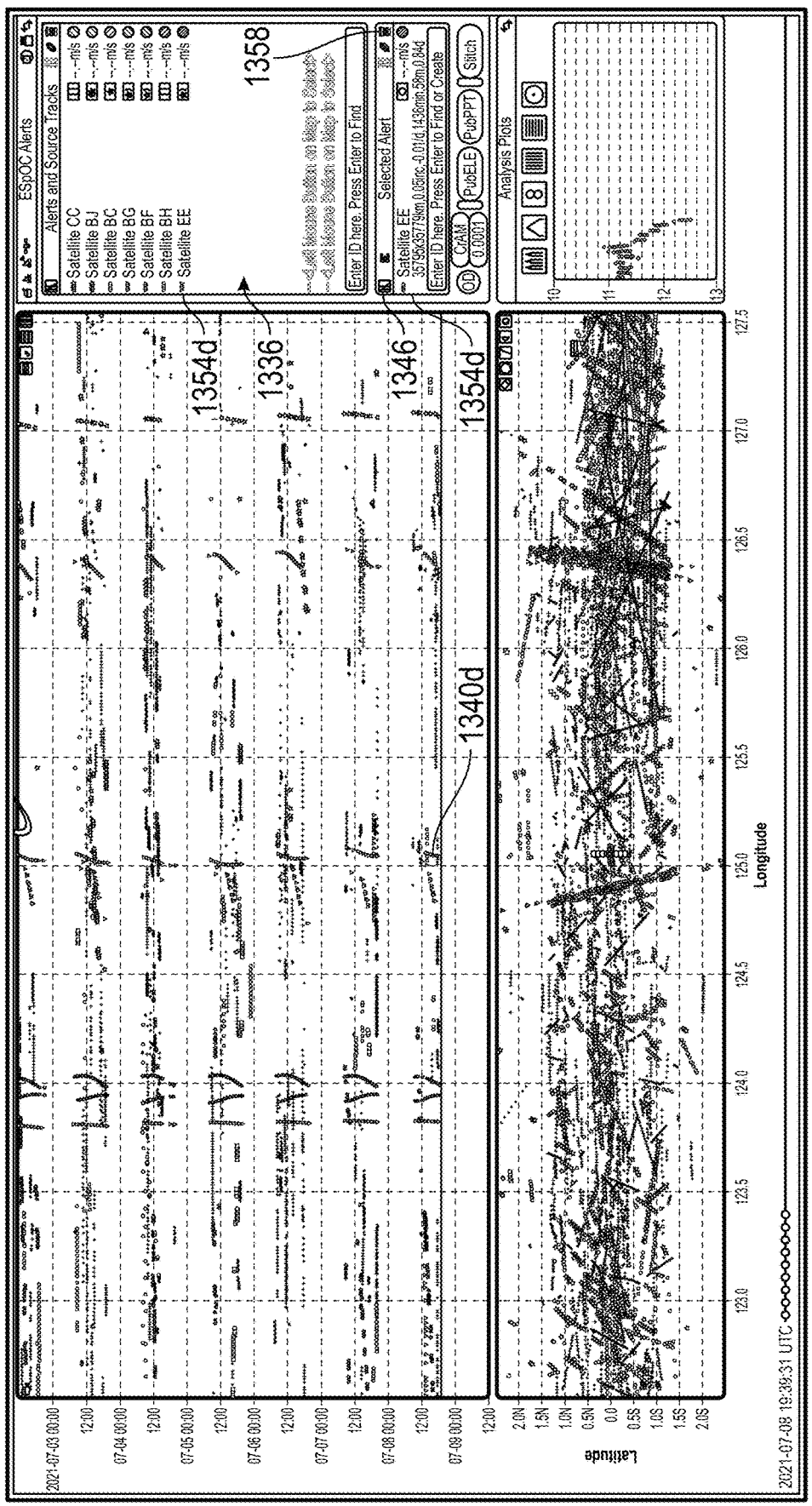
FIG. 47 shows the inclusion of the alert associated with Satellite EE in the target track identifier.
Figure 48:
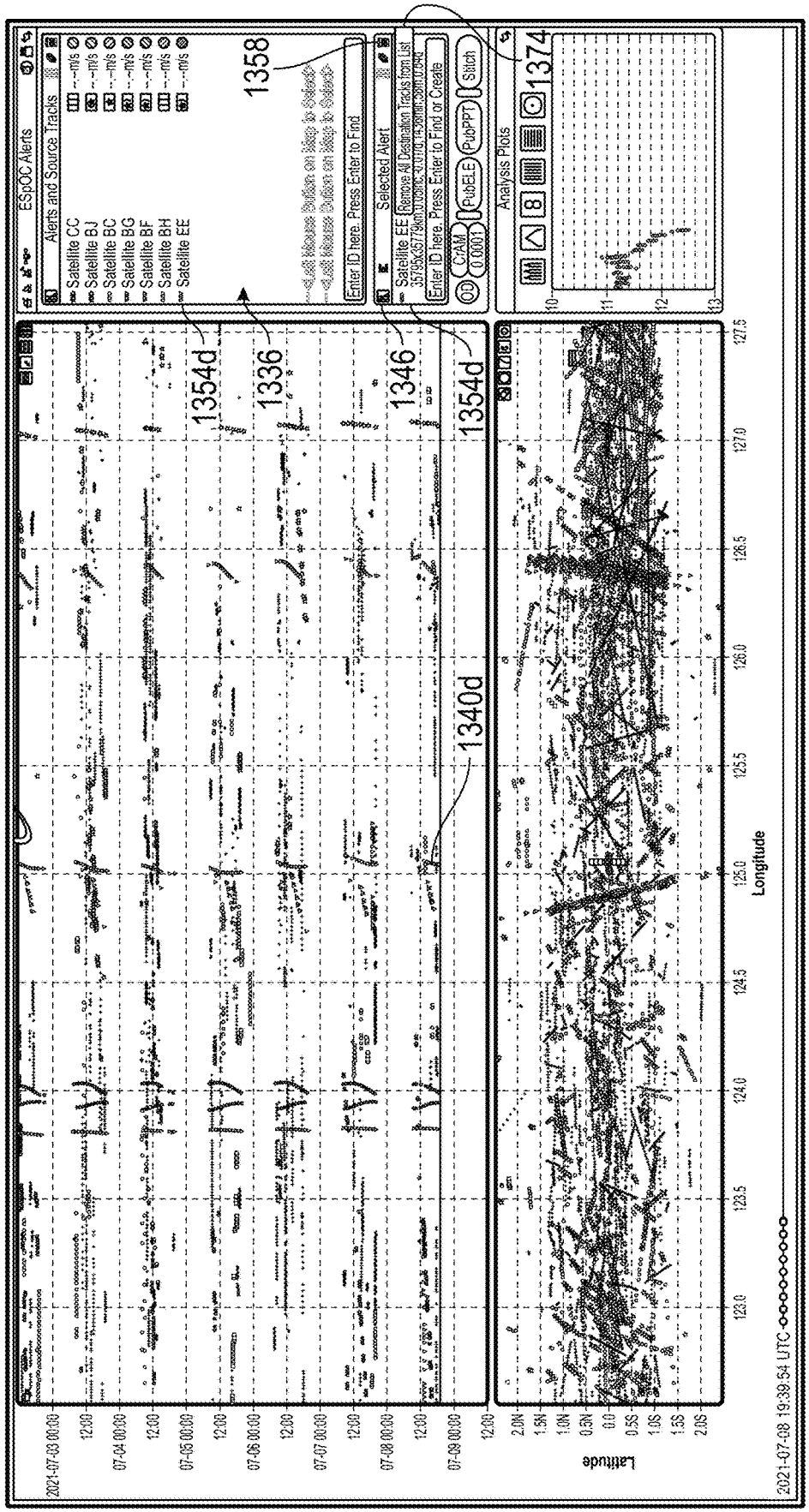
FIG. 48 shows a destination track removal indicator that appears in response to selection of the alert display toggling selector.
Figure 49:
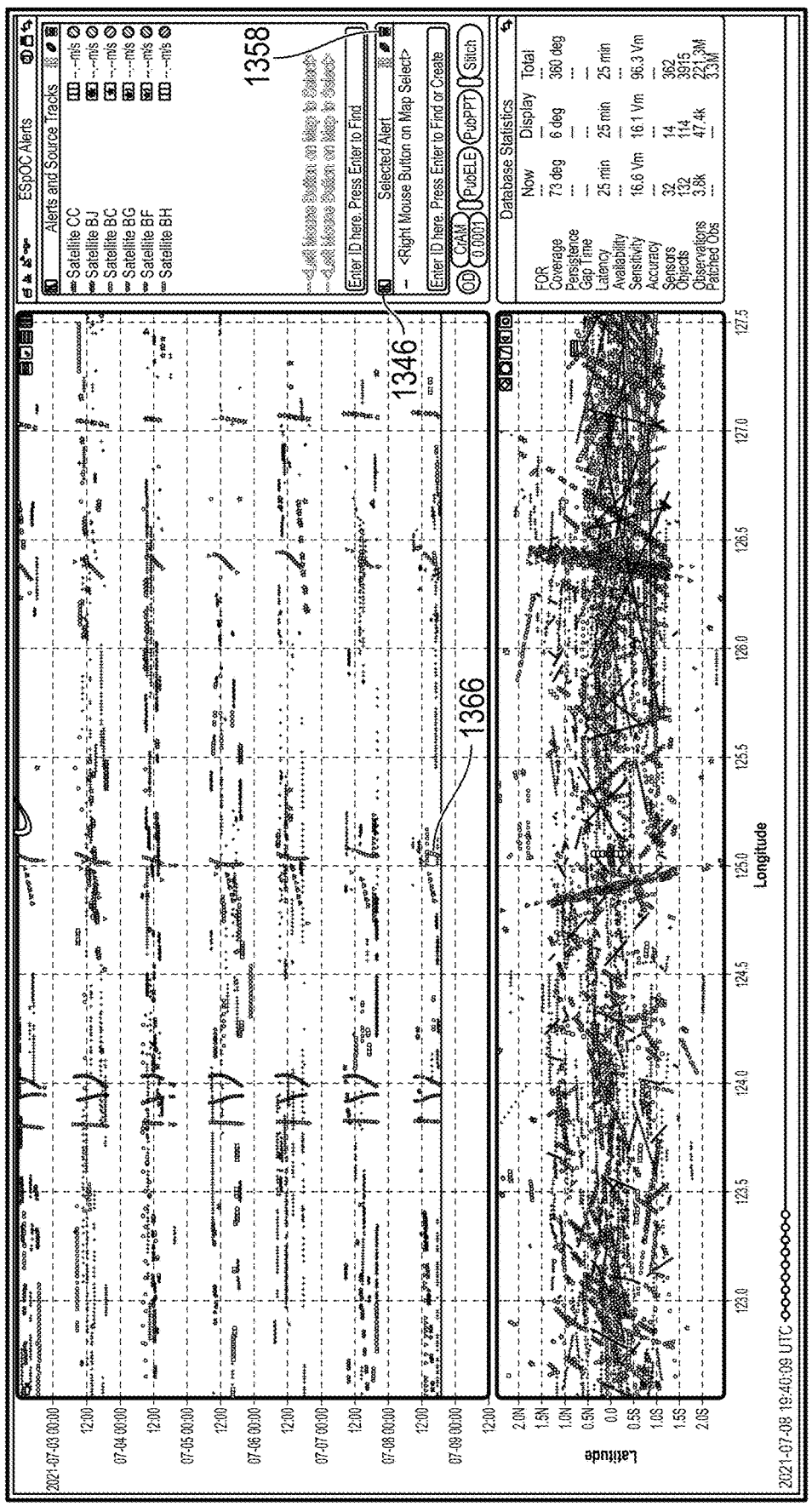
FIG. 49 shows how in response to selection of the target track identifier, the alert for Satellite EE is no longer visible.

FIGS. 45-49 shows a sequence of selection and removal of an alert and its associated destination track(s). FIG. 45 shows a selection of the selected track representation 1340*d* associated with Satellite EE. In FIG. 46, a user has selected an alert display toggling selector 1358 allowing the user to include an alert associated with selected track representation 1340*d* in the alert and source track interface 1324 as indicated by the alert display toggling indicator 1362. In some embodiments, the user can select a type of alert and/or details associated with the alert. FIG. 47 shows the inclusion of the alert associated with Satellite EE in the target track identifier 1354*d*. As shown in FIG. 47, a user can select an alert display toggling selector 1358 to allow the user to ultimately delete or remove the alert associated with Satellite EE from the alert and source track interface 1324. As shown in FIG. 48, a destination track removal indicator 1374 appears in response to selection of the alert display toggling selector 1358 and allows a user to select one or more alerts to remove from the alert and source track interface 1324. In response to selection of the target track identifier 1354*d*, the alert for Satellite EE is no longer visible, as shown in FIG. 49. In FIG. 49, the deselected track representation 1366 is indicated by a different color of track representation relative to the color of the track in FIGS. 45-48. Other differences in indication are possible, such as shape, shading, etc. In some embodiments, the indication of the Satellite EE may be maintained in the alert and source track interface 1324 until a user takes a different action.

Figure 50:
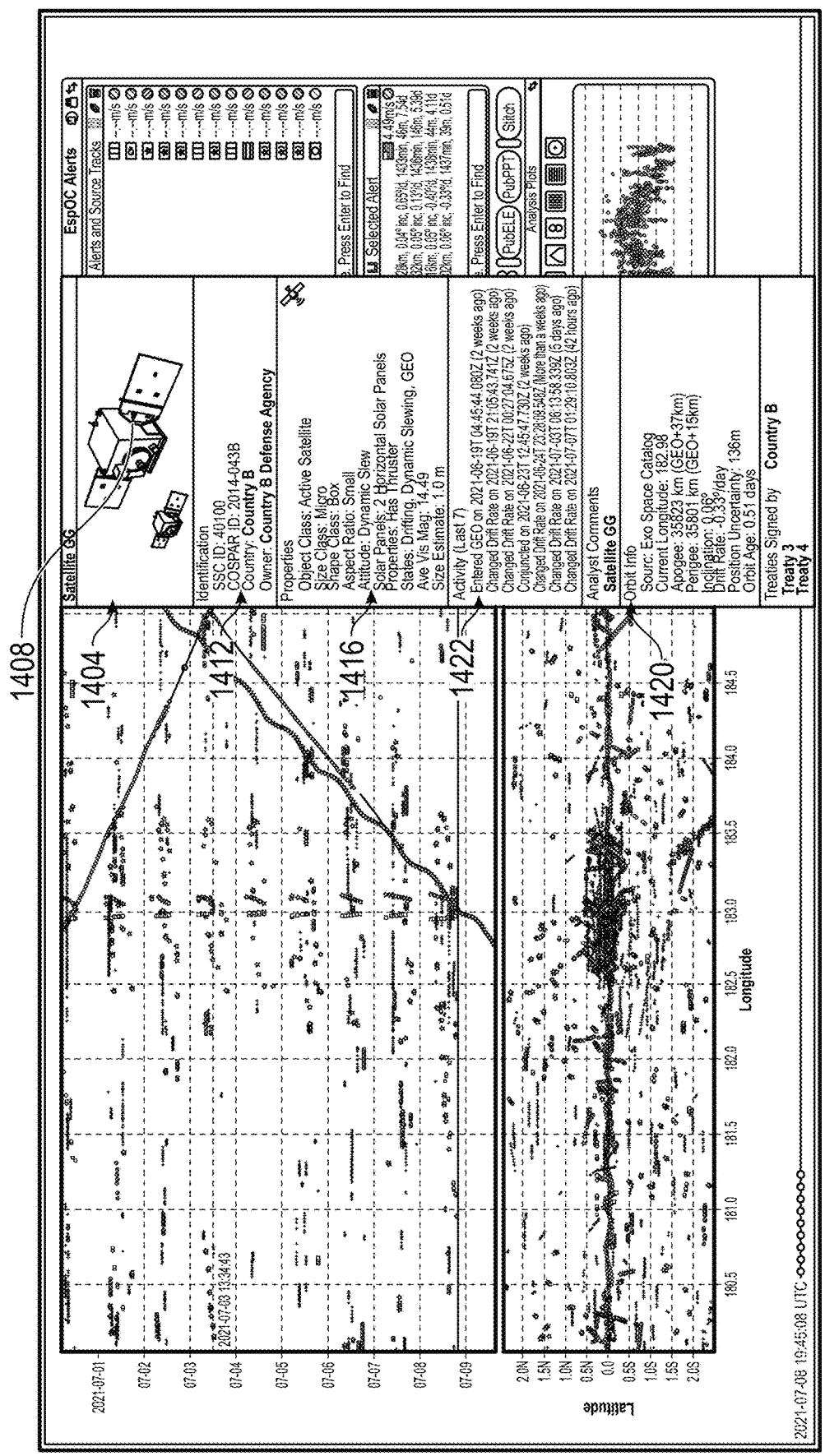
FIG. 50 shows a space object annotated graphical representation.

FIG. 50 shows a space object annotated graphical representation 1404. It may be helpful to see a space object annotated graphical representation 1404 that includes updated or annotated information about the corresponding space object (in this case Satellite GG). As shown, the space object annotated graphical representation 1404 includes a space object pictorial representation 1408, one or more space object identification indicators 1412, one or more space object property indicators 1416, one or more space object annotated activity indicators 1422, and one or more space object orbit indicators 1420.

The space object pictorial representation 1408, like the space object pictorial representation 1308, can include can include a visual image of what the Satellite GG looks like or may look like to a human viewer. As shown by FIG. 50, the displayed satellite includes a large cubic satellite with solar panels, among other features.

The space object identification indicators 1412 can include one or more of the features described above with regard to the space object identification indicators 1312. The space object property indicators 1416 can include one or more features of the space object property indicators 1316 described above. The space object orbit indicators 1420 can include one or more features of the space object orbit indicators 1320 described above.

The space object annotated activity indicators 1422 can include details of alerts or other details about a space object. For example, the space object annotated activity indicators 1422 can describe when the space object entered a particular orbit, when a drift rate is or was changed, when a conjunction occurred, when the space object failed to keep its station, when the space object made a maneuver, etc. An end time of any of these may also be annotated. The annotations shown in the space object annotated activity indicators 1422 can be added to, removed, or otherwise modified by a user. Additionally or alternatively, the annotations may be tracked by the system and automatically updated when the space object annotated graphical representation 1404 is displayed. An annotation may indicate an accuracy of an alert, such as whether the alert is a true positive. A true positive may correspond to an alert that accurately describes a state or movement or other aspect of the space object. A true positive may be determined at least in part by comparing other data within the system, such as other space object data.

Figure 51:
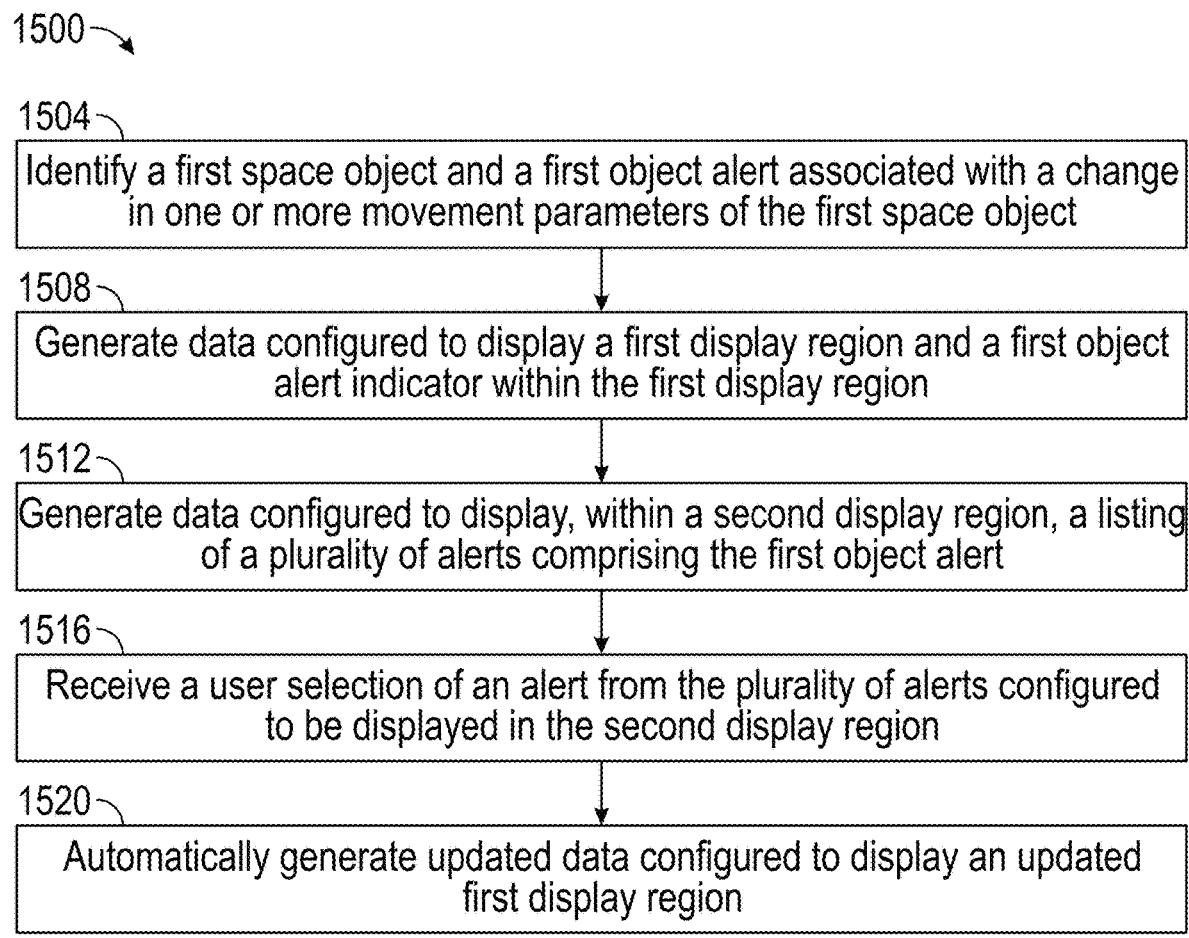
FIG. 51 shows an example method of managing alerts based on detection of movement parameters for space objects.

FIG. 51 shows an example method 6000 of managing alerts based on detection of movement parameters for space objects. The method 6000 can be performed by a system, such as a system described herein. At block 6004 the system can identify a space object and an object alert associated with a change in one or more movement parameters of the space object. The object alert may reflect astrometric and/or photometric properties, such as those described herein. The object alert can include alert metadata, such as details about when the alert was generated, what the nature of the alert is, and/or some other metadata. At block 6008 the system can generate data configured to display a display region and an object alert indicator within the display region. The object alert indicator can correspond to the object alert. The data may be configured to display the object alert indicator at a location within the display region. The location may be based on the alert metadata. At block 6012 the system can generate data configured to display, within a second display region, a listing of a plurality of alerts comprising the object alert. At block 6016 the system can receive a user selection of an alert from the plurality of alerts configured to be displayed in the second display region. At block 6020 the system can automatically generate updated data configured to display an updated display region based on the user selection of the alert. The updated display region can include a panned, rotated, and/or zoomed perspective of the display region.

The system can additionally or alternatively receive a user removal-selection of the object alert indicator. In response to selection of the removal-selection, the system can generate updated data that is configured to display the updated display region without the object alert indicator. Additionally or alternatively, the system may remove an indication that a corresponding track is associated with the alert. For example, the corresponding track may be displayed with a different color or other indicator, as described above.

In some embodiments, based on the alert metadata, the system may determine a state change of the space object. The state change can include one or more of a perturbation of the path of the space object, a changed attitude, a changed configuration of the space object, or some other state change described herein. Based on the state change, the system can identify one or more updated movement parameters associated with the space object and generate updated data that is configured to display an indication of the one or more updated movement parameters. In some embodiments, the system can generate updated data that is configured to display within the updated display region a longitude-time graph as described herein. additionally or alternatively, the system may determine a change in a radiometric (e.g., photometric) attribute associated with the space object. The one or more updated movement parameters can include the change in the radiometric attribute. For example, the system may determine that the change in the radiometric attribute exceeds a threshold value and, based on this determination, determine that the space object is in one or more of the following: a state of tumble, a state of uncontrolled spin, a state of directed orientation, a state of spin stable, and/or a state of attitude control. The system may identify a physical shape of the space object based on the radiometric attribute and/or display the physical shape, such as in a space object graphical representation described herein.

In some embodiments, the system can determine, based on the physical shape of the space object, a second radiometric attribute of the space object associated with a time later than a time associated with the object alert. For example, the system may be able to predict a shape, attitude, or other attribute of the space object at a future time.

In some embodiments a user can set a threshold value for determining when an alert should be generated for a space object. The system may determine that if a particular aspect of the space object exceeds the threshold, then the alert should be generated.

In some embodiments, the system can highlight an alert, such as in response to a user selection (e.g., mouse click, mouse over, etc.). The highlighting can be enlarged letters or pictures, flashing, change in color, or some other highlighting.

Data Object Management

The management of space objects can be important for tracking, reporting, and otherwise managing space object alerts, space object metadata, space object movement parameters, and/or other aspects of space object observations and management. Data objects corresponding to one or more aspects of the data described above. For example, a data object may be created in response to a determination by the system that a space object has likely caused and/or experienced a maneuver or other action that passes an alert threshold. If movement of a space object passes such a threshold, a data object that includes relevant data (e.g., metadata, movement parameters, etc.) can be created.

After a data object is created, a space object alert can be sent to and/or stored in a temporary database, where the system can automatically and/or a human analyst can validate the authenticity of the alert. Even though an alert may be generated by the system (e.g., because certain movement parameters trigger and/or meet an alert threshold), the alert may represent a false positive in the sense that true data corresponding to motion, location, and/or other data associated with the space object may not accurately be reflected in the alert. This may cause an alert to be generated even when the true data associated with the space object would not constitute an alert. If the alert can be authenticated (e.g., confirmed), the system can then automatically send and/or store the alert to a curated database of authentic space object alerts. The alert may be stored in a data object. Additionally or alternatively if the alert can be authenticated, then the data object may be referred to as a "curated data object." For data objects for which the alert data cannot be and/or has not yet been authenticated, the data object may be an "uncurated data object."

It may be advantageous to send alerts to remote computing devices corresponding to interested parties or entities. For example, certain entities may be interested in the motion, position, or other data associated with certain space objects (but perhaps not others). Thus, alerts related to those certain target space objects can be sent to those interested entities (and perhaps not to other entities). Accordingly, it may be beneficial for the systems described herein to correlate alert data with relevant entities. The system can include a publish selector to allow a user to "publish" the alert and/or data object if the alert and/or data object are ready to be sent to the relevant entities (e.g., if the data object has been authenticated). Publishing can therefore include indicating that the relevant data is ready to be transmitted to the remote electronic device(s). Additionally or alternatively, publishing may refer to the transmitting itself.

Once a user presses publish on a -publish selector, the system can automatically determine where to send the authenticated space object alert. This determination may have been previously made (e.g., as described above). The data to be transmitted may be transmitted from the curated database and/or may be based on one or more destination parameters. The destination parameters may correspond to and/or indicate respective recipient remote electronic devices. In some embodiments, the recipient electronic device can set the destination parameters.

Additionally or alternatively, the entities may set the alert thresholds and/or other criteria that determine what constitutes an uncurated alert, what constitutes a curated alert, for what object(s) alerts should be determined, a time (e.g., time of day, frequency, etc.) of transmission, a mode of transmission, an indication of urgency of alerts, and/or other relevant aspects of space objects and their motion that may be relevant for the system. Such information can include specific metadata or movement parameter thresholds, all metadata or movement parameters associated with a specific space object, and/or all metadata or movement parameters gathered by and/or received from specific telescopes.

Figure 52:
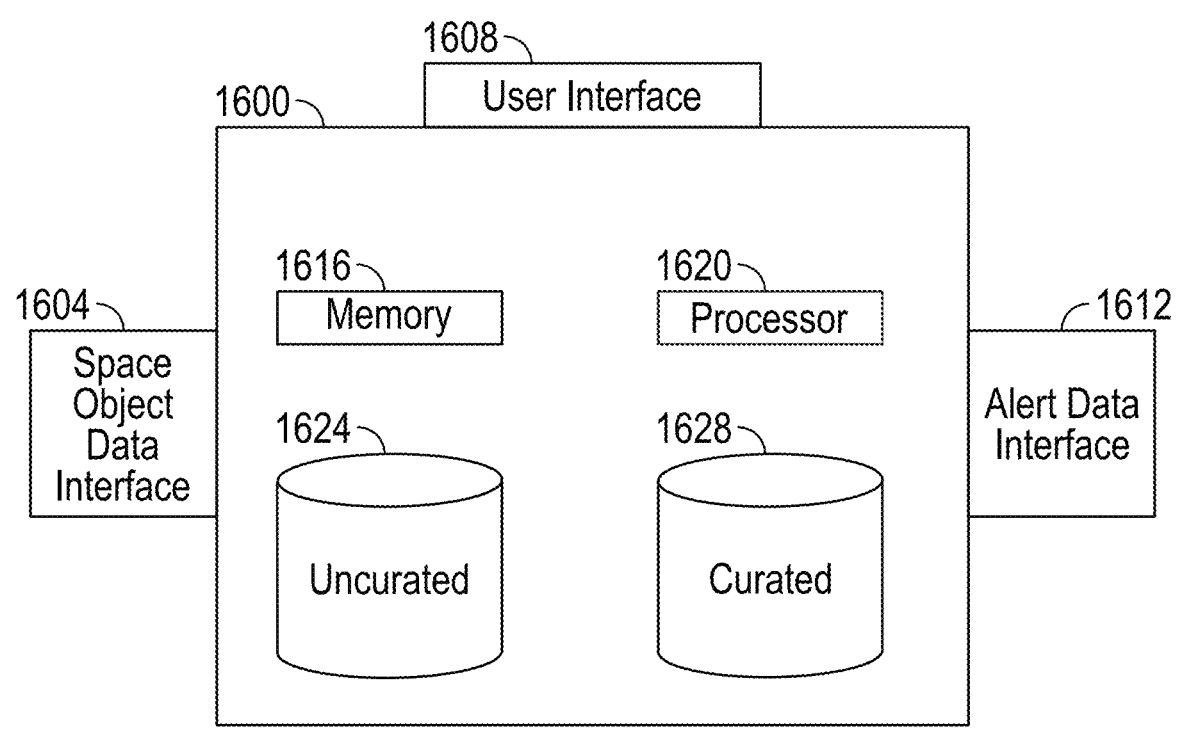
FIG. 52 shows a block diagram of an example curated data object system, according to some embodiments.

FIG. 52 shows a block diagram of an example curated data object system 1600, according to some embodiments. The curated data object system 1600 can include a space object data interface 1604, a user interface 1608, an alert data interface 1612, a memory 1616, a processor 1620, an uncurated alert database 1624, and/or a curated alert database 1628. The curated data object system 1600 may correspond to other systems described herein. The curated data object system 1600 may include one or more features of any system described herein. The user interface 1608 may include one or more features of the visualization display 200 or other interface described herein. The memory 1616 and/or processor 1620 may include features described of a corresponding memory and/or processor above. The uncurated alert database 1624 may be configured to store uncurated alerts and/or uncurated data objects. Additionally or alternatively, the curated alert database 1628 may be configured to store curated alerts and/or curated data objects.

The memory 1616 can include a trained machine learning model stored thereon. The trained machine learning model may be in operative communication with other elements of the system via one or more data connections. Although the trained machine learning model may be separate (e.g., remote) from the curated data object system 1600, in some embodiments the trained machine learning model is included in the curated data object system 1600.

Images of the space objects may be captured as described above. After capture, these images may be processed using the trained machine learning model. This process may be done automatically in response to receiving the images received by the curated data object system 1600.

The trained model may receive an input (e.g., image of a space object), pass the input through the trained machine learning model, for example, a convolutional neural network (CNN), and receive an output. The input may include one or more images or other tensor, such as those received from the telescopes. The trained machine learning model receives the input and passes it to one or more model layers. In some examples, the one or more model layers may include hidden layers and a plurality of convolutional layers that "convolve" with a multiplication or other dot product. Additional convolutions may be included, such as pooling layers, fully connected layers, and normalization layers. One or more of these layers may be "hidden" layers because their inputs and outputs are masked by an activation function and a final convolution.

Pooling layers may reduce the dimensions of the data by combining the outputs of neuron clusters at one layer into a single neuron in the next layer. Pooling may be a form of non-linear down sampling. Pooling may compute a max or an average. Thus, pooling may provide a first approximation of a desired feature, such as an alert status or maneuver. For example, max pooling may use the maximum value from each of a cluster of neurons at a prior layer. By contrast, average pooling may use an average value from one or more clusters of neurons at the prior layer. It may be noted that maximum and average pooling are only examples, as other pooling types may be used. In some examples, the pooling layers transmit pooled data to fully connected layers.

Fully connected layers may connect every neuron in one layer to every neuron in another layer. Thus, fully connected layers may operate like a multi-layer perceptron neural network (MLP). A resulting flattened matrix may pass through a fully connected layer to classify the input.

At one or more convolutions, the system may calculate a sliding dot product and/or a cross-correlation. Indices of a matrix at one or more convolutions or model layers maybe affected by weights in determining a specific index point. For example, each neuron in a neural network may compute an output value by applying a particular function to the input values coming from the receptive field in the previous layer. A vector of weights and/or a bias may determine a function that is applied to the input values. Thus, as the trained machine learning model proceeds through the model layers, iterative adjustments to these biases and weights results in a defined output, such as a location, orientation, or the like.

Figure 53:
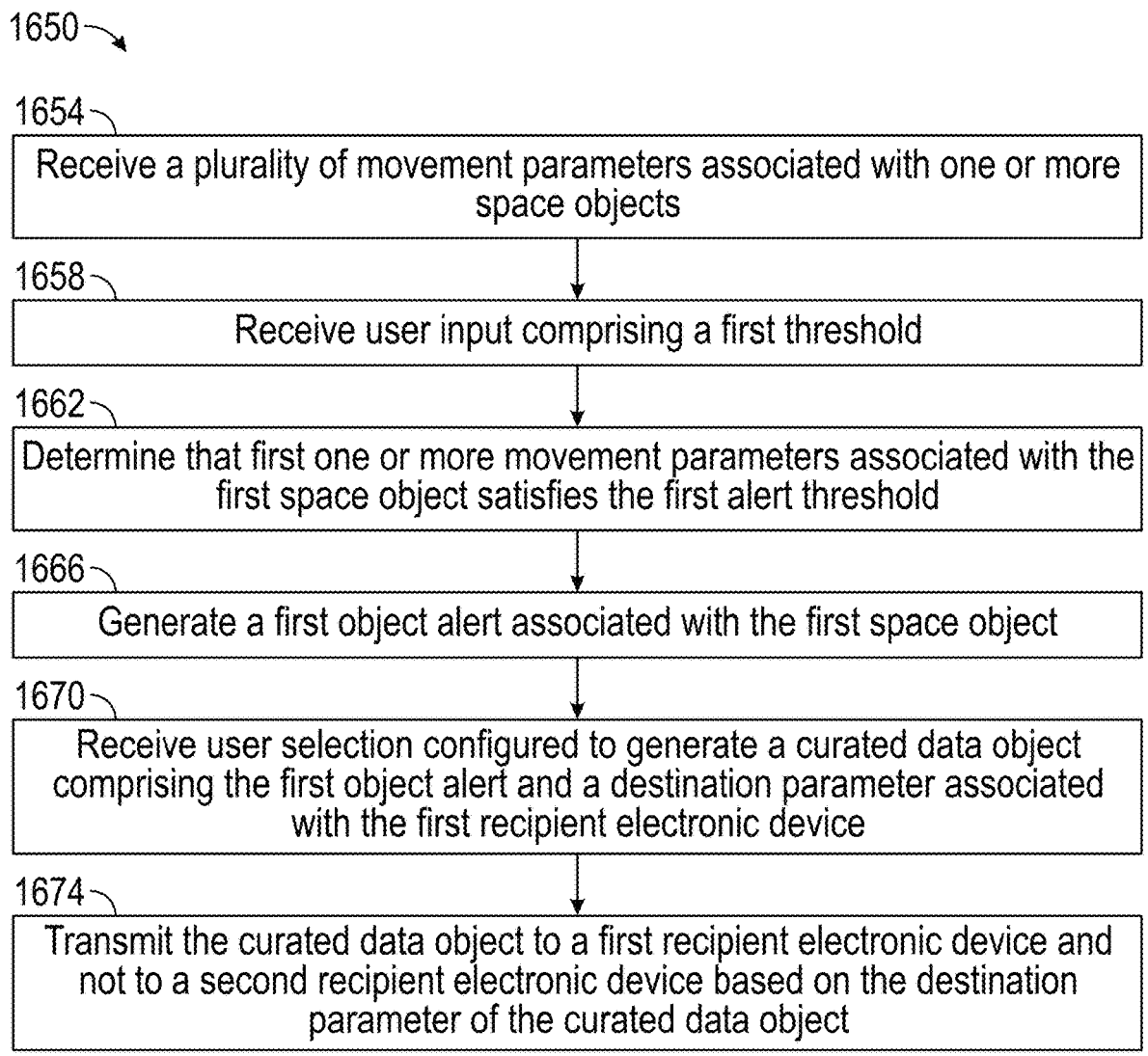
FIG. 53 shows an example method for determining where to send a curated data object based on the curated data object's destination parameters, according to some embodiments.

FIG. 53 shows an example method 1650 for determining where to send a curated data object based on the curated data object's destination parameters. The method 1650 can be performed by a system, such as a system described herein. At block 1654 the system can receive a plurality of movement parameters associated with one or more space objects. The plurality of movement parameters may be associated with corresponding timepoints of the space object, of which the orbit of the space object can be determined. At block 1658 the system can receive input from the user comprising an alert threshold. The alert threshold can be triggered by proximity, time, or specific space objects. At block 1662 the system can determine that specific movement parameters of the space object satisfy one of the alert thresholds. At block 1666 the system can generate an object alert associated with the space object. The object alert can include alert metadata, such as details about when the alert was generated, what the nature of the alert is, and/or some other metadata. At block 1670 the system can receive from the user a selection configured to generate a curated data object comprising the first object alert and a destination parameter associated with the recipient electronic device. At block 1674 the system can transmit the curated data object to a first recipient electronic device and not to a second recipient electronic device based on the destination parameter of the curated data object satisfying the first recipient electronic device's threshold and not the second recipient electronic device's threshold. For example, the destination parameter may be associated with the first recipient electronic device but not the second recipient electronic device.

The system can additionally or alternatively send the curated data object to the first recipient electronic device and not the second recipient electronic device based on transmission criteria such as time of day, a user command, a proximity of the first space object with a second space object at a current time, a determination that the object alert is associated with a time in the past, or a determination that the object alert is associated with a time in the future.

In some embodiments, the system can generate updated data configured to display a display region and an object alert indicator within the display region. The object alert indicator can correspond to the object alert. The data in this embodiment may display the object alert indicator at a location within the display region based on the curated data object. Additionally, or alternatively, the system can generate data configured to display, within a second display region, a listing of a plurality of alerts comprising the object alert. The system may then receive via a user interface, a user selection of an alert from the plurality of alerts displayed in the second display region. Based on that user selection, the system can automatically generate updated data configured to display an updated first display region. The first display region comprising a panned, rotated, and/or zoomed perspective of the display region.

In some embodiments, the system can determine the orbit of the space object based on a period that overlaps the selected time period, precedes the selected time period, and/or succeeds the selected time period. The selected time period spanning from a lower-time limit to an upper-time limit. Additionally, or alternatively, the system can generate a display interface comprising a time axis that spans from the lower-time limit to the upper-time limit, and displays an indication of the orbit spanning at least the time period.

In some embodiments, the system can receive a plurality of movement parameters that contain a set of identifiers, including a name identifier, a time identifier, a latitude identifier, and a longitude identifier. Additionally, the system may generate a magnitude-time plot, comprising a magnitude axis, a time axis, and a plurality of pixels corresponding to magnitude-time points within the magnitude-time plot, each point corresponding to a set of identifiers within a lower and upper limit.

Additionally, or alternatively, the system can generate a proximity plot, which comprises a distance axis and a time axis, both spanning upper and lower limits. The proximity plot also may contain a plurality of pixels corresponding to distance-time points within the proximity plot, each point corresponding to a set of identifiers within a lower and upper limit.

Additionally or alternatively, the proximity plot may also indicate the orbit of a space object in relation to the path of a second space object. The proximity plot may further comprise a graphical indication of a minimum distance between the space object and the second space object.

Figure 54:
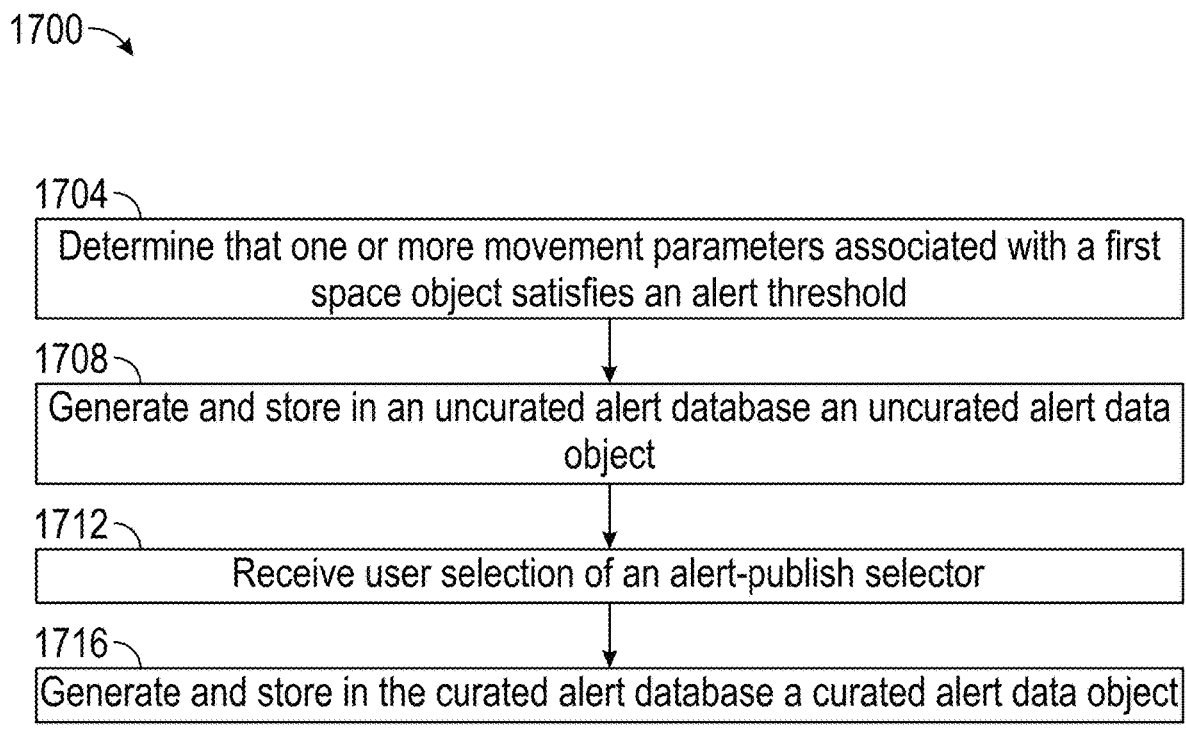
FIG. 54 shows an example method generating and storing a curated data object into a curated alert database, according to some embodiments.

FIG. 54 shows an example method 1700 generating and storing a curated data object into a curated alert database. The method 1700 can be performed by a system, such as a system herein. At block 1704 the system can determine that one or more movement parameters associated with a space object satisfy an alert threshold. The one or more movement parameters can be used the system to determine the orbit of the space object. At block 1708 the system can generate and store in an uncurated alert database an uncurated alert data object, based on the determination that the first one or more movement parameters satisfies the alert threshold. The uncurated alert data object comprising a change in the one or more movement parameters associated with the first space object. At block 1712 the system can receive an alert-publish selector from the user. The alert-publish selector being a selectable option that the user can trigger when the space object alert has been validated. At block 1716 the system can generate and store in a curated alert database a curated alert data object. The curated alert data object comprising the change in the one ore more movement parameters associated with the first space object and is generated based on the user selection of the alert-publish selector.

The system can additionally or alternatively receive a user selection configured to generate display data for displaying a magnitude-time plot. Additionally, or alternatively, the system can receive user selection configured to update the display data for displaying a proximity plot configured to indicate a minimum distance between the space object and a second space object.

In some embodiments, the system may include a destination parameter with the curated alert data object. The destination parameter being associated with a recipient electronic device. The system can then transmit the curated alert data object to the recipient electronic device and not a second recipient electronic device based on the destination parameters of the curated data object. This transmission may be directly or indirectly from the uncurated database.

Figure 55:
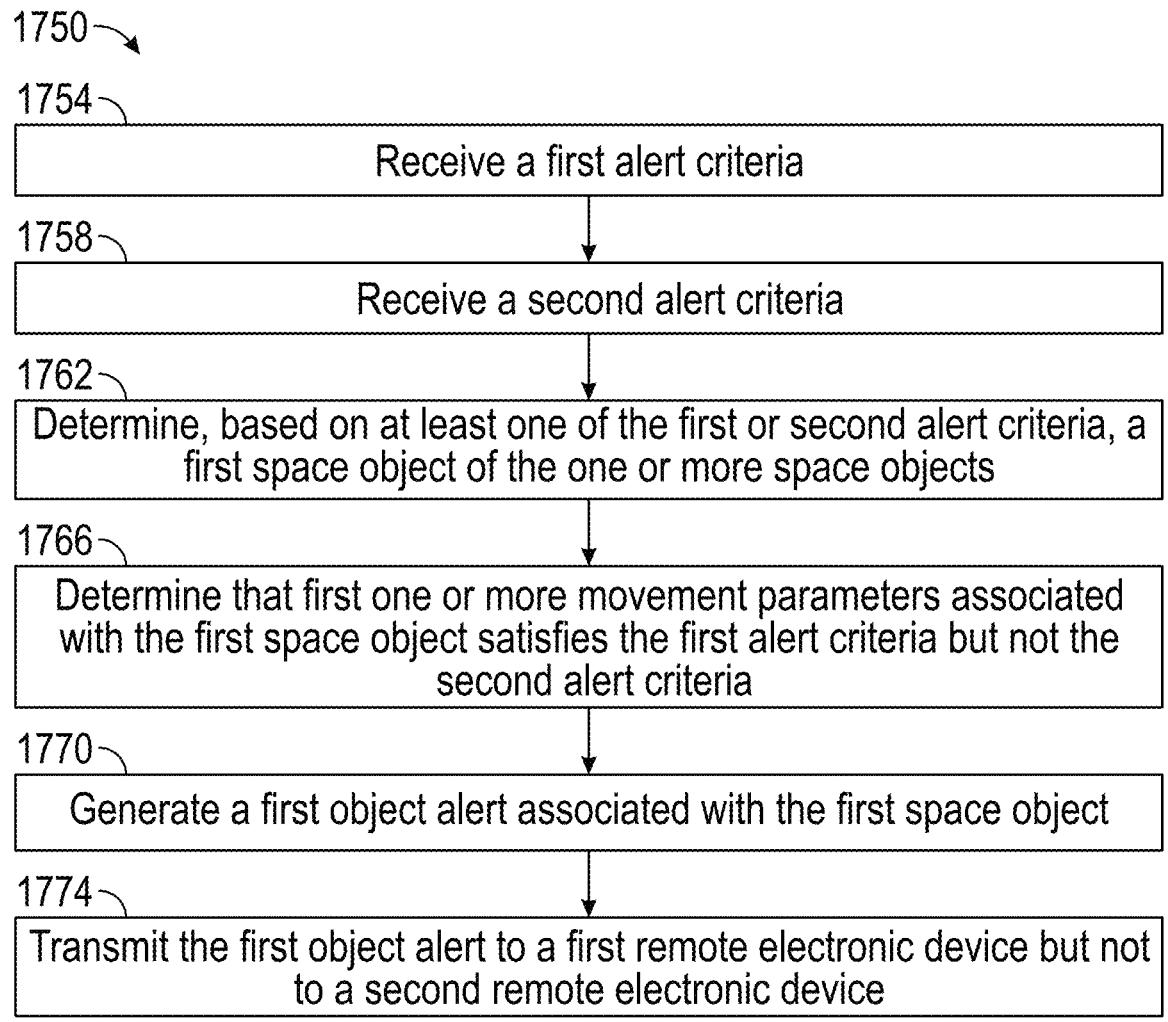
FIG. 55 shows an example method for transmitting an object alert to a first remote electronic device but not to a second remote electronic device.

FIG. 55 shows an example method 1750 for transmitting an object alert to a first remote electronic device but not to a second remote electronic device. The method 1750 can be performed by a system, such as a system herein. At block 1754 the system can receive a first alert criteria. The first alert criteria is associated with the first remote electronic device. At block 1758 the system can receive a second alert criteria. The second alert criteria is associated with the second remote electronic device. The first and second alert criteria can be based on specific user set thresholds such as proximity, time of day, and/or a user command. At block 1762 the system can determine, based on the first alert criteria and/or the second alert criteria, a space object. At block 1766 the system can determine that one or more movement parameters associated with the space object satisfy the first alert criteria but not the second alert criteria. At block 1770 the system can generate an object alert associated with the first space object. The object alert corresponds to a change in the one or more movement parameters associate with the space object. The object alert generated based on the determination that the one or more movement parameters associated with the space object satisfy the first alert criteria. At block 1774 the system can transmit the object alert to the first remote electronic device but not to the second remote electronic device based on the determination that the one or more movement parameters associated with the space object satisfies the first alert criteria but not the second alert criteria.

The system can additionally or alternatively, when requested by the user, generate a curated dated object that comprised the object alert and a destination parameter associated with the first remote electronic device.

In some embodiments, the system can receive user selection configured to generate display data for displaying a magnitude-time plot. Additionally, or alternatively, the system can determine an orbit of the space object based on the one or more movement parameters associated with the space object.

In some embodiments, the system can receive user selection configured to generate display data for displaying a proximity plot configured to indicate a minimum distance between the space object and a second space object.

Figure 56:
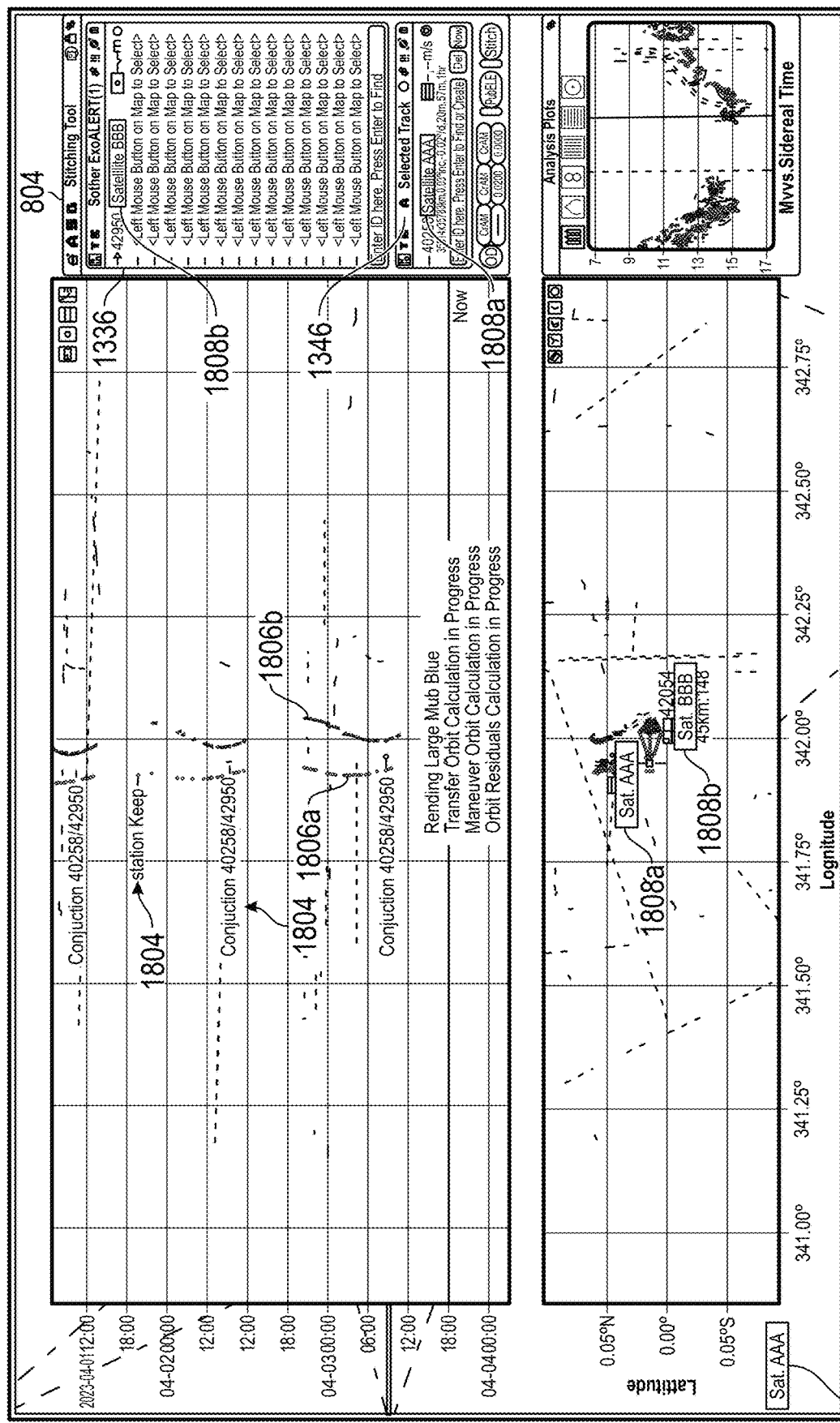
FIG. 56 shows a user interface that displays a plurality of published object alert indicators.

FIGS. 56-59 show a sequence of images of an example user interface (e.g., visualization display 200) for creating and managing data objects, such as curated data objects, associated with orbital objects and other space objects. FIG. 56 shows a plurality of published object alert indicators 1804. The published object alert indicators 1804 may have been previously determined by the system to be space object alerts or some other kind of alerts (e.g., maneuver alerts). Additionally or alternatively, the published object alert indicators 1804 may have been reviewed by a human analyst and/or a trained computer model for identifying and/or confirming the alerts.

The published object alert indicators 1804 may be referred to as published annotations and/or may be displayed within the longitude-time graph. The published object alert indicators 1804 may show details associated with one or more particular space objects and/or a plurality of space objects. For example, the published object alert indicators 1804 may indicate a location (e.g., in time and/or space), such as in a longitude-time plot or longitude-latitude plot described herein, of where a maneuver described herein took place or is taking place or is to take place by the one or more space objects. As shown, the published object alert indicators 1804 show multiple instances of conjunctions between two objects, indicated by corresponding space object indicators 1808a-b. The first space object indicator 1808a corresponds to Satellite AAA and the second space object indicator 1808b corresponds to Satellite BBB. The space object indicators 1808a-b may be displayed in the longitude-time graph, the longitude-latitude graph, the stitching tool interface 804, and/or in any other portion of the visualization display 200. The published object alert indicators 1804 in FIG. 56 also show other published object alerts, such as station keeping alerts. The published object alert indicators 1804 may include any of the alert types described herein.

The published object alert indicators 1804 may be based at least in part on a determined orbital path of one or more of the objects involved in the maneuver. The orbital path may not be necessarily displayed in the user interface (e.g., in the longitude-time plot), as is the case in FIG. 56. However, FIG. 56 shows a system that was at the time currently calculating a transfer orbit, a maneuver orbit, and orbit residuals. As described in more detail above, the system can use the first space object track 1806a to calculate the orbit of Satellite AAA. Additionally or alternatively, the system may use the second space object track 1806b to calculate the orbit of Satellite BBB. The orbit may be based on only the space object orbit tracks 1806a-b shown in some embodiments. Additionally or alternatively, other selected tracks may be used in the calculation in some embodiments even if they are not shown in the visualization display 200.

The published object alert indicators 1804 may be manually input by a user for later display and/or they may be automatically generated based on a determination of the orbital path(s) of one or more objects involved in the maneuver and/or one or more maneuver parameters (e.g., velocity, direction, and/or acceleration of one or more space objects; nature of maneuver; location of maneuver; time of maneuver; etc.) associated with the maneuver, such as those described herein. The maneuver parameters may be based at least in part on one or more movement parameters (e.g., velocity, location, direction of travel, acceleration, etc.) associated with one or more objects associated with the maneuver. As shown, the published object alert indicators 1804 may repeat based on a regular occurrence (e.g., regular locations, regular or predictable times), and this regularity may be predictable in the future based on a calculated orbit. The published object alert indicator 1804 may be published. For example, the published object alert indicator 1804 may be transmitted to a remote computing device that stores and/or disseminates the published object alert indicator 1804 and/or maneuver parameters associated therewith.

In some embodiments, a user may select an object and add or remove an associated annotation. The system may display only annotations for selected object(s), in some embodiments. In some embodiments, one or more annotations may only be displayed at appropriate levels of downsampling. For example, the system may select a subset of annotations to be displayed when at a certain level of downsampling the number of annotations is too many to legibly fit within the appropriate location. In some embodiments, the published object alert indicators 1804 may be automatically generated in response to a user selection (e.g., confirmation of a true positive) of an alert described herein.

FIG. 56 also shows the stitching tool interface 804 that includes an alert list interface 1336. The alert list interface 1336 can include one or more space object indicators corresponding to space objects for which alerts have been identified by the system and/or by an analyst. If a space object indicator is available to be selected, it can appear in the alert list interface 1336 as second space object indicator 1808b. The second space object indicator 1808b also appears on visualization display 200 in the form of second space object track 1806b, which shows the longitude-time data points that correspond to second space object indicator 1808b.

Additionally or alternatively, if a user selects a satellite from alert list interface 1336, the selected satellite may be removed from alert list interface 1336 and added to selected alert interface 1346. In the selected alert interface 1346, the selected satellite first space object indicator 1808a is shown. First space object indicator 1808a also appears in visualization display 200 in the form of first space object track 1806a, which shows the longitude-time data points that correspond to first space object indicator 1808a.

Additionally or alternatively, in the selected alert interface 1346, an alert rejection selector can be available for the user to reject (e.g., delete) the alert associated with the first space object indicator 1808a. The user may select this option if the system generated a false positive alert, and/or if no action is to be taken on the alert due to the first space object indicator 1808a not satisfying a uniqueness criteria (e.g., first space object indicator 1808a belongs to the same operator and/or same group of operators as second space object indicator 1808*b*) in order to be sent to a recipient electronic device.

Additionally or alternatively, the selected alert interface 1346 includes an alert-publish selector PubELE (e.g., the alert-publish selector 1896, described below), which allows the user to generate a curated alert data object and/or store it in the curated alert database 1628. The curated alert data object comprising a change in the one or more movement parameters associated with the first space object indicator 1808*a*.

Additionally or alternatively, the selected alert interface 1346 includes a stitch selector (e.g., stitch selector 1898, described below), which allows the user to generate an updated visualization display 200 with an updated first space object track 1806*a*. In some embodiments, the user may select a first space object track 1806*a* comprising a plurality of sets of identifiers, and a second space object track 1806*b* also comprising a plurality of sets of identifiers. The user may then select the stitch selector and a recipient device selector (e.g., a user selector which allows the alert to be sent to a requesting remote electronic device). Once the user selects the stitch selector, the system may update the name identifier of the second space object track 1806*b* to correspond to the name identifier of the first space object track 1806*a*. The system may then update the data to indicate that the first space object track 1806*a* and the second space object track 1806*b* are associated with the same name identifier.

Additionally or alternatively, if the system automatically (e.g., using a trained machine model) and/or an analyst through the stitch selector updates the data to display that the first space object track 1806*a* and the second space object track 1806*b* are associated with the same space object, the system and/or the analyst may determine that the first and second space object do not satisfy the uniqueness criteria, and may remove the second object alert from the alert list interface 1336. Additionally or alternatively, the system and/or the analyst may determine that the first and second space object do not satisfy the uniqueness criteria if they have the same recipient device identifier, correspond to the same owner or agency, and/or each have a recipient device identifier associated with a common set of recipient device identifiers.

Additionally or alternatively, if the system automatically and/or an analyst through the stitch selector updates the first one or more movement parameters associated with the first space object to include a second one or more movement parameters, replace the first one or more movement parameters with the second one or more movement parameters, and/or to remove an already included one or more movement parameters, the system can automatically modify the alert start of the first space object alert based on the inclusion of the second one or more movement parameters, and/or the removal of one or more movement parameters. For example, if the second one or more movement parameters do not satisfy the alert threshold, the first object alert status can be modified to remove the alert. Additionally or alternatively, the system and/or the analyst can modify the alert status of the first space object if the inclusion of a second one or more movement parameters and/or the removal of one or more movement parameters causes the first space object to satisfy an alert threshold.

In some embodiments, after determining that the first space object and the second space object should be removed from the alert list interface 1336, the system and/or the analyst may still transmit the first object alert to the remote electronic recipient.

In some embodiments, the system may generate updated display data for displaying a magnitude-time plot (e.g., the scalar-time graph 208, the analysis plot interface 808, the residual plot 1816, etc.), based on one or more of the plurality of sets of identifiers.

Figure 57:
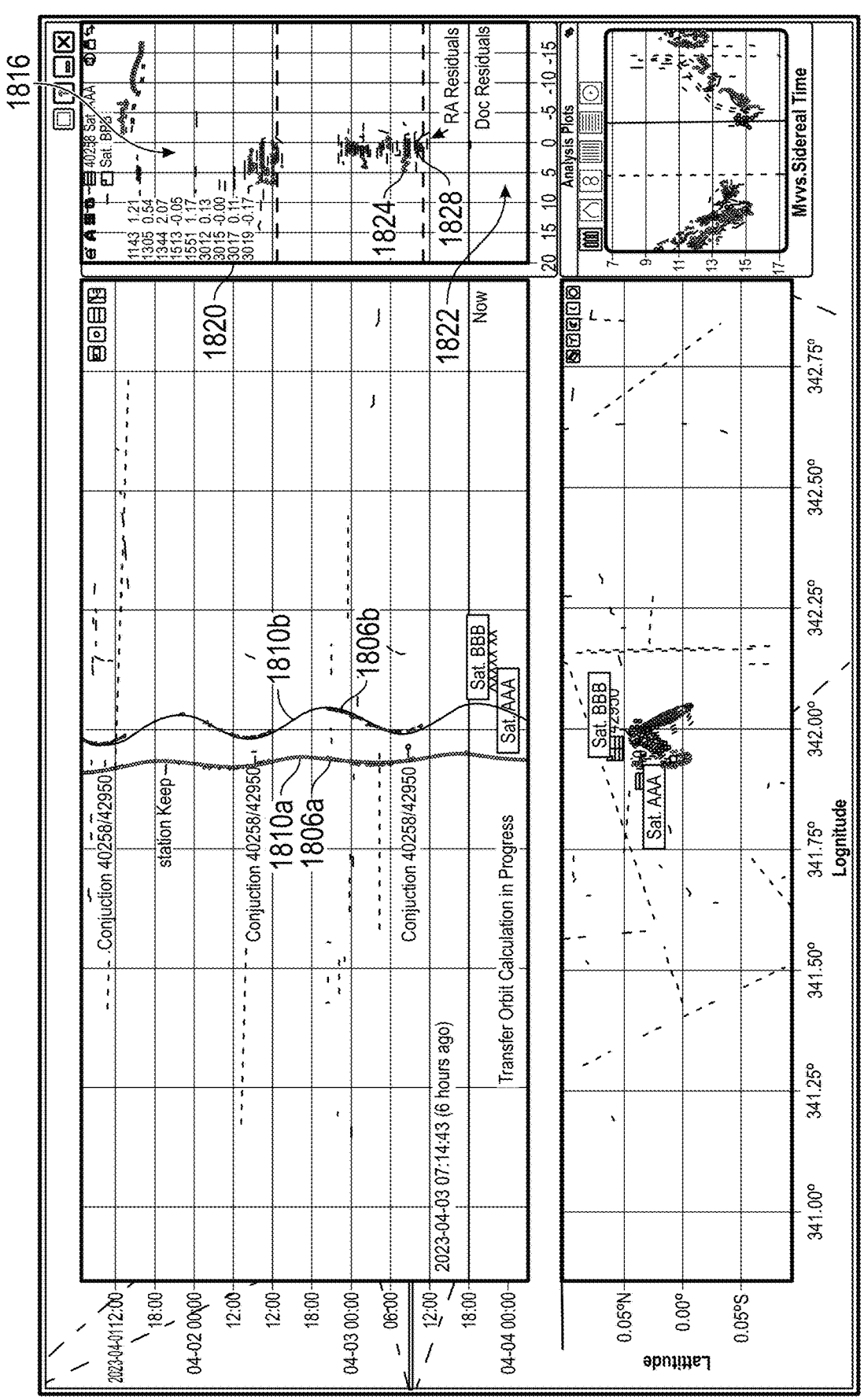
FIG. 57 shows a user interface displaying a residual plot, which contains right ascension residual indicators, and/or declination residual indicators.

FIG. 57 shows residual plot 1816, which contains right ascension residual indicators 1824, and/or declination residual indicators 1828. FIG. 57 also shows the calculated orbits of the corresponding space objects via space object orbit indicators 1810*a*-*b*. The residual plot 1816 can be plotted on the same time axis 1820 as the visualization display 200, with the same lower-time limit and upper-time limit. The residual plot 1816 is also plotted on angular axis 1822, which shows the arcsecond change in residuals from 20 to −15 arcseconds. The residual plot 1816 also shows the right ascension residual indicators 1824 and declination residual indicators 1828. In some embodiments, the right ascension residual indicators 1824 correspond to first space object orbit indicator 1810*a*, and the declination residual indicators 1828 correspond to second space object orbit indicator 1810*b*. Using these right ascension residual indicators 1824 and/or declination residual indicators 1828, an analyst can identify whether an alert automatically triggered by the system is an authentic or genuine alert. After reviewing the calculated orbits, the residuals, and/or relative proximities (see, e.g., FIG. 58 below) of the relevant space objects, an analyst and/or a trained machine model may be able to determine that the alert is authentic, which may result in automatic or manual generation of a curated data object.

Additionally or alternatively, as shown, the information provided in the residual plot 1816 is updated by the system as recently as 6 hours ago.

Figure 58:
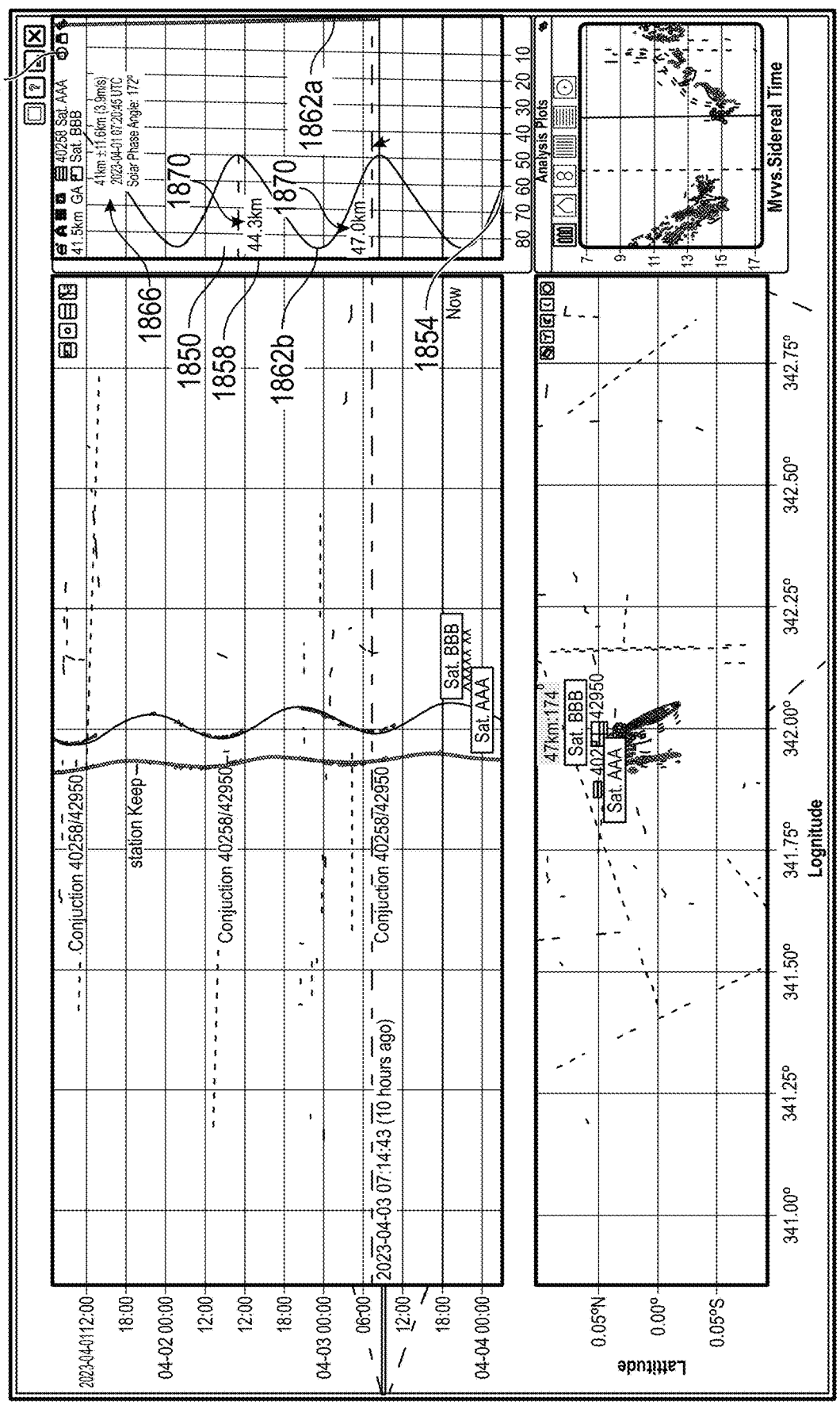
FIG. 58 shows a user interface displaying a proximity plot, which contains a first space object relative path indicator corresponding to a first space object, and a second space object relative path indicator corresponding to the second space object.

FIG. 58 shows the proximity plot 1850, which contains first space object relative path indicator 1862*a* corresponding to the first space object, and second space object relative path indicator 1862*b* corresponding to the second space object. The proximity plot 1850 can be set on the same time axis 1858 corresponding to the visualization display 200, and a distance axis 1854. The proximity plot 1850 can show distances, including minimum distances, between the first space object (in km) and the second space object over a period of time. The first space object relative path indicator 1862*a* corresponds to the data points associated with a first space object, and the second space object relative path indicator 1862*b* corresponds to the data points associated with a second space object and may indicate the distance between a second space object and the first space object while one or more of the first and/or second space objects follows their trajectories (e.g., orbital paths). A closest relative distance indicator 1870 shows the distance between the second space object and the first space object while both space objects were moving. Various apexes of their relative distance from each other may be shown throughout both of their trajectories. These apexes may be at somewhat regular times (e.g., as shown in FIG. 58) and/or irregular times.

Additionally or alternatively, space object relative motion indicators 1866 shows the closest the second space object got to the first space object, the time at which this took place, as well as the solar phase angle of the second space object when this occurred. In some embodiments, the system can use the information provided in space object relative motion indicators 1866 to generate a proximity alert, time alert, and/or a photosensitivity alert if the recipient electronic device request that information in their alerts.

Additionally or alternatively, the proximity plot 1850 has a spot report selector 1874, which allows the user to generate a spot report based on the space object relative motion indicators 1866 in the proximity plot 1850.

Figure 59:
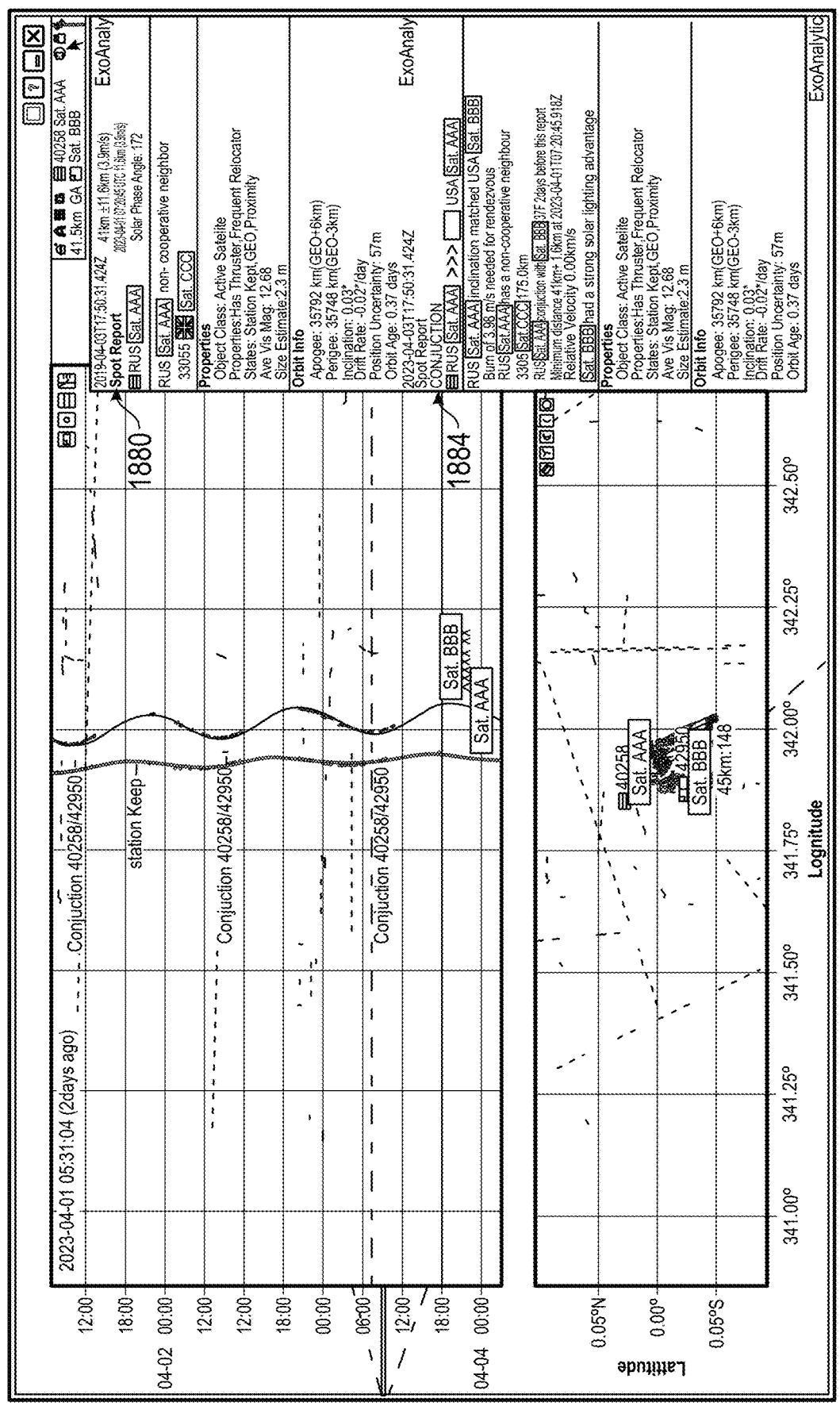
FIG. 59 shows a space object spot report indicator and a space object conjunction report indicator.

FIG. 59 shows a space object spot report indicator 1880 and a space object conjunction report indicator 1884. The space object spot report indicator 1880 describes various attributes or features of Satellite AAA and/or its movement. For example, the space object spot report indicator 1880 can include one or more movement parameters associated with the Satellite AAA. As shown, the space object spot report indicator 1880 shows a country of ownership or association of Satellite AAA. The space object spot report indicator 1880 shows that Satellite AAA is associated with a non-cooperative neighbor (Satellite CCC), which may be another country or an entity or a group of entities. In some embodiments, the space object spot report indicator 1880 can show cooperative neighbors, countries, entities, and/or groups of entities. The space object spot report indicator 1880 includes an activity status indicator (e.g., active satellite), a type of payload and/or equipment of the satellite (e.g., thrusters, frequent relocator, etc.).

A satellite may be considered "active" if the satellite has shown evidence that it can move on its own. In some embodiments, whether a satellite is active or not may impact whether an alert is or even can be generated, whether a data object is or can be generated, and/or whether a curated data object can be generated from an uncurated data object. For example, the system may only allow a maneuver alert to be generated if and only if the system has observation data associated with the satellite corresponding to times that occur before and after a maneuver-in-question.

The system may, for example, determine, based on certain maneuver criteria, that a space object is active. Such maneuver criteria may include a threshold deviation (e.g., position, velocity, acceleration) from an expected or calculated orbit and/or from an orbital path data (e.g., expected position, expected velocity, expected acceleration). For example, as discussed above with reference to FIGS. 24-30, space objects may perform maneuvers that indicate that they are active. The maneuver criteria can additionally or alternatively include certain name identifiers corresponding to a known active satellite.

If the system identifies that a possible maneuver has taken place, then the system can confirm that both first and second observation points have been received. The possible maneuver may include one or more movement parameters or space object identifiers. Each of the first and second observation points are associated with the respective times. A time associated with the first observation point should be before a time associated with the possible maneuver. A time associated with the second observation point should be after the time associated with the possible maneuver. In such circumstances, the system can determine that the possible maneuver associated with the first space object satisfies the alert criteria. If the alert criteria for a maneuver are satisfied and the required observations points can be confirmed, then the system may generate a data object (e.g., curated or uncurated) associated with the first space object.

The space object spot report indicator 1880 can include details related to a type of state of the Satellite, such as a type of orbit (e.g., geostationary orbit (GEO)), a type of maneuver(s) performed (e.g., station keeping, proximity, etc.). Specific orbit information, such as apogee, perigee, inclination, drift rate, amount of uncertainty in the position information, an age of the orbit and/or orbit information, and/or other details.

The space object conjunction report indicator 1884 shows a spot report based on a conjunction between Satellite AAA and Satellite BBB. The space object conjunction report indicator 1884 includes information from a conjunction alert. The space object conjunction report indicator 1884 indicates that Satellite AAA came within a minimum threshold distance, thus satisfying an alert threshold or alert criteria. A conjunction can indicate that a space object (here, Satellite AAA) made a maneuver and/or included a path that came within a minimum threshold distance from a second space object (here, Satellite BBB). A conjunction may be characterized by a time of closest approach (TCA), a miss distance, a relative velocity, and/or uncertainty in position at the TCA. Such information can allow the system to determine a probability of collision.

The space object conjunction report indicator 1884 may further include whether an inclination of Satellite AAA matched that of Satellite BBB and/or what burn would be needed for a rendezvous (here, 3.98 m/s). The space object conjunction report indicator 1884 shows that Satellite CCC is a non-cooperative neighbor of Satellite AAA and is within a certain distance. The space object conjunction report indicator 1884 shows that Satellite AAA had the conjunction with Satellite BBB a certain number of days before the report with a minimum distance of 41 km (including an uncertainty of 1.6 km). The space object conjunction report indicator 1884 shows a relative velocity between Satellite AAA and Satellite BBB at the time of the conjunction. The space object conjunction report indicator 1884 shows that Satellite BBB had a strong solar lighting advantage at the time of the conjunction (e.g., at the TCA). The space object conjunction report indicator 1884 also states that the Satellite AAA is active and/or may include other features disclosed above with regard to the space object spot report indicator 1880 above.

Figure 60:
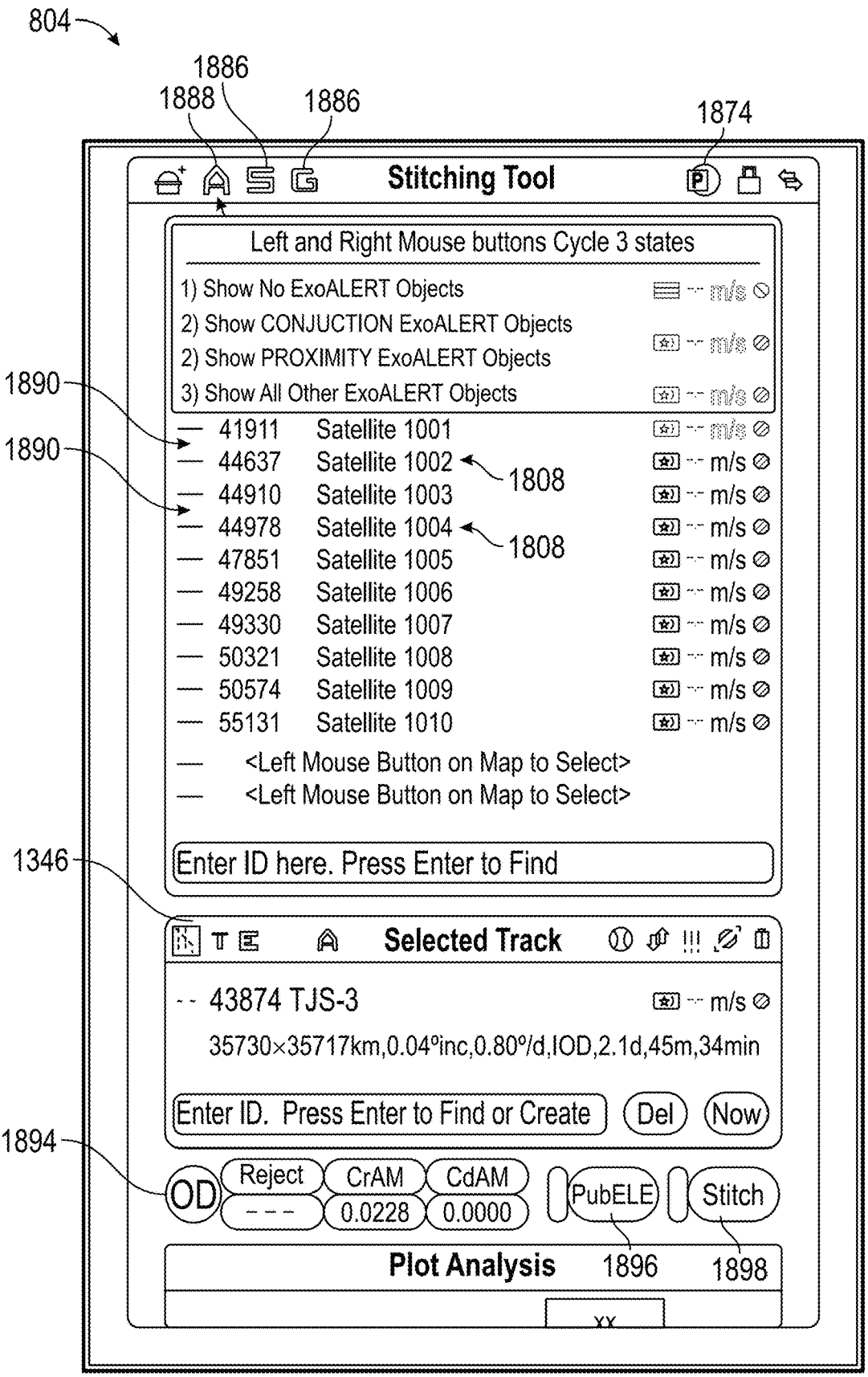
FIG. 60 shows a zoomed in view of an example stitching tool interface and a selected alert interface, according to some embodiments.

FIG. 60 shows a zoomed in view of an example stitching tool interface 804 and a selected alert interface 1346, according to some embodiments. The stitching tool interface 804 of FIG. 60 can be included in any of the previously presented display interface figures and is blown up to discuss certain elements that may have been too small and/or obscured to adequately indicate and describe. The stitching tool interface 804 can include a plurality of alert indicators 1890. Each of the alert indicators 1890 can be associated with corresponding space object indicators 1808 in some embodiments.

A user may be able to select a spot report selector 1874 to generate a spot report for a selected alert or selected track identified in the selected alert interface 1346. The user may select the spot report selector 1874 by clicking on, double clicking on, and/or hovering over the spot report selector 1874.

A user can select an alert list display modification selector 1888, which can change what is shown within the stitching tool interface 804. For example, the user may cycle or toggle through various options for display. A first option is to display no alerts (e.g., alert objects) withing the stitching tool interface 804. A second option is to display only conjunction alerts or alert objects. A third option is to display only proximity alerts or alert objects. A fourth option is to show all other types of alerts or alert objects. Alert objects may be data objects described herein, which can include alert data and/or other data displayed, for example, by a spot report.

The stitching tool interface 804 can additionally or alternatively include one or more recipient device selectors 1886. The recipient device selectors 1886 can allow a user to associate a selected alert or alert object with a recipient device and/or entity. As discussed above, certain entities may be interested in only certain space objects, certain alert types, certain geographic locations, certain types of space objects, and/or other categories of objects/alerts. Accordingly, it can be advantageous for the system to be able to allow a user to associate such objects and/or alerts with one or more entities via selection of corresponding one or more recipient device selectors 1886.

In some embodiments, a user can select a target recipient device selector 1886 to have only alerts associated with the corresponding recipient device displayed within the stitching tool interface 804. Additionally or alternatively, in some embodiments a user must both select a recipient device selectors 1886 and the alert-publish selector 1896 in order to associate the space object and/or alert with the target recipient device. The alert-publish selector 1896 can be selected by a user to "publish" an alert. In response to selection of the alert-publish selector 1896, the system may automatically generate a data object associated with the published alert. The data object may be an uncurated data object until the uncurated data object has been validated and/or authenticated by an analyst and/or a trained machine model. In response to the authentication process, a curated data object may be generated and stored. In some embodiments, in response to creating the curated data object, the uncurated data object may be modified, such as being updated to a different location or deleted altogether. The uncurated data objects may be saved in a different location as the curated data objects (e.g., the uncurated alert database 1624 vs. the curated alert database 1628).

In some embodiments, selection of the alert-publish selector 1896 may trigger automatic transmission of the alert and/or data object (e.g., uncurated and/or curated data object) to a recipient device. The automatic transmission may be essentially instantaneous after the selection of the alert-publish selector 1896 and/or it may be at a specified time of day, after a specified amount of time elapsed from selection of the alert-publish selector 1896, and/or some other criteria or threshold described above. In some embodiments, only curated data objects will be transmitted to recipient electronic devices and this transmission occurs at a specified time of day after selection of the alert-publish selector 1896 and/or corresponding recipient device selector 1886.

As discussed above, criteria and/or thresholds may be received directly from recipient devices. For example, recipient devices may specify alert thresholds or criteria, criteria for target space objects, publish criteria, criteria for determining whether an uncurated data object is a curated data object (e.g., based on an accuracy level of an orbit, a review of the residuals plot, a review of the distance of closest approach between two space objects, uniqueness criteria, etc.), when and/or how an alert should be transmitted, etc.

FIG. 60 also includes an orbit determination selector 1894 and an stitch selector 1898. A user can select the orbit determination selector 1894 to cause the system to calculate an orbit for a selected space object and/or track. The orbit determination selector 1894 may correspond to and/or include one or more features of the orbit selector 836 described above.

The stitch selector 1898 can correspond to and/or include one or more features of the stitch selector 828 described above. A user can select two or more tracks and/or two or more space object indicators and "stitch" them together in order to combine the information into one orbit and/or one space object. This stitching may cause previously different attributes of each of the space objects and/or tracks to be combined into a single. For example, name identifiers of the two space objects/tracks may be combined or unified. Additionally or alternatively, a recipient device identifier may be unified between the two space objects or tracks in response to selection of the stitch selector 1898 and user selection of the corresponding space object tracks or object indicators. The system may update, based on the user selection of the stitch selector 1898, one of the name identifiers to correspond with the other space object name identifier. Additionally or alternatively, the system may update one of the recipient device identifiers to correspond with the other space object recipient device identifier. These updates can be displayed by the user interface, such as by changing one or more indicators associated with a name or associated entity of the space object.

Alert status may be modified in response to user modification of space object data. For example, if one or more target tracks are removed or added to a source track, then this may result in generation of a new alert and/or removal (e.g., deletion) of an existing alert. Other data, such as movement parameters, space object identifiers, or other descriptive data described herein may trigger such modification of alert status. Alert status may be modified in part because of an updated calculated orbit of a space object, as described above. Modification of movement parameters or other descriptive data can include adding additional movement parameters, removing movement parameters, and/or replacing movement parameters associated with one or more space objects.

Additionally or alternatively, a user may manually modify a maneuver. This may include adding a maneuver to the system, removing a maneuver from the system, and/or replacing one maneuver with another maneuver. Such maneuver modification can include modifying an identifier and/or movement parameter associated with the maneuver. In some embodiments, modification of the maneuver may correspond to an automatic modification (e.g., removal, addition) of an alert associated with the corresponding space object.

EXAMPLE EMBODIMENTS

In a 1st Example, a system for transmitting a curated data object to a first recipient electronic device and not to a second recipient electronic device, the system comprising: a space object data interface configured to receive a plurality of movement parameters associated with one or more space objects; an alert data interface configured to transmit the curated data object to the first recipient electronic device; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; receive user input comprising a first alert threshold; identify a first space object of the one or more space objects; determine that first one or more movement parameters associated with the first space object satisfies the first alert threshold; generate, based on the determination that the first one or more movement parameters satisfies the first alert threshold, a first object alert associated with the first space object, the first object alert corresponding to a change in the first one or more movement parameters associated with the first space object; receive user selection configured to generate display data for displaying a magnitude-time plot; determine, based on the first one or more movement parameters associated with the first space object, an orbit of the first space object; receive user selection configured to update the display data for displaying a proximity plot configured to indicate a minimum distance between the first space object and a second space object; receive user selection configured to generate, based on the first object alert, the curated data object comprising the first object alert and a destination parameter associated with the first recipient electronic device; and transmit, via the alert data interface, the curated data object to the first recipient electronic device and not to the second recipient electronic device based on the destination parameter of the curated data object.

In a 2nd example, the system of Example 1, wherein the instructions, when executed by the hardware processor, are further configured to cause the system to: generate updated data configured to display a first display region and a first object alert indicator within the first display region, the first object alert indicator corresponding to the space object alert, wherein the data is configured to display the first object alert indicator at a location within the first display region, wherein the location is based on the curated data object.

In a 3rd example, the system of Example 2, wherein the instructions, when executed by the hardware processor, are further configured to cause the system to: generate data configured to display, within a second display region, a listing of a plurality of alerts comprising the first object alert.

In a 4th example, the system of Example 3, wherein the instructions, when executed by the hardware processor, are further configured to cause the system to: receive, via a user interface, a user selection of an alert from the plurality of alerts configured to be displayed in the second display region; and based on the user selection of the alert, automatically generate updated data configured to display an updated first display region, wherein the updated first display region comprises at least one of a panned, rotated, and/or zoomed perspective of the first display region.

In a 5th example, the system of any of Examples 1-4, wherein determining the orbit of the first space object is based on a set of the movement parameters of the first space object collected over a selected time period.

In a 6th example, the system of Example 5, wherein the set of the movement parameters of the first space object are associated with corresponding timepoints of the first space object, and wherein determining the orbit of the first space object is based on the corresponding timepoints.

In a 7th example, the system of Example 6, wherein the orbit of the first space object is based on a first time period that (i) overlaps the selected time period, (ii) precedes the selected time period, (iii) succeeds the selected time period, or (iv) any combination thereof, the selected time period spanning from a lower-time limit to an upper-time limit.

In a 8th example, the system of Example 7, wherein the instructions, when executed by the hardware processor, are further configured to cause the system to: generate a display interface comprising: a time axis spanning from the lower-time limit to the upper-time limit; and an indication of the orbit spanning at least the first time period.

In a 9th example, the system of any of Examples 1-8, wherein the movement parameters of the first space object comprise one or more sets of identifiers, wherein each set of identifiers comprises: a name identifier; a time identifier; a latitude identifier; and a longitude identifier.

In a 10th example, the system of Example 9, wherein the magnitude-time plot comprises: a magnitude axis spanning from a lower-magnitude limit to an upper-magnitude limit, a time axis spanning from a lower-time limit to an upper-time limit; and a plurality of pixels corresponding to magnitude-time points within the magnitude-time plot, each of the plurality of magnitude-time points corresponding to a set of identifiers having a time identifier between the lower-time limit and the upper-time limit and having a magnitude identifier between the lower-magnitude limit and the upper-magnitude limit.

In a 11th example, the system of Example 10, wherein the instructions, when executed by the hardware processor, are further configured to cause the system to: in response to a user selection of a set of identifiers, highlight one or more pixels corresponding to respective magnitude-time points, wherein each of the pixels of the one or more pixels corresponds to magnitude-time points comprising a common name identifier.

In a 12th example, the system of any of Examples 2-11, wherein the instructions, when executed by the hardware processor, are further configured to cause the system to: receive a user selection of the first object alert indicator, wherein generating the curated data object is in response to user selection of the first object alert indicator.

In a 13th example, the system of any of Examples 1-12, wherein the transmission of the curated data object to the first recipient electronic device and not the second recipient electronic device is based on one or more transmission criteria, wherein the one or more transmission criteria comprise one or more of a time of day, a user command, a proximity of the first space object with the second space object at a current time, a determination that the first object alert is associated with a time before the current time, or a determination that the first object alert is associated with a time after the current time.

In a 14th example, the system of any of Examples 9-13, wherein the proximity plot comprises: a distance axis spanning from a lower-distance limit to an upper-distance limit, a time axis spanning from a lower-time limit to an upper-time limit; a plurality of pixels corresponding to distance-time points within the distance-time plot, each of the plurality of distance-time points corresponding to a set of identifiers having a time identifier between the lower-time limit and the upper-time limit and having a distance identifier between the lower-distance limit and the upper-distance limit; and an indication of the orbit of the first space object in relation to an indication of a path of the second space object.

In a 15th example, the system of Example 14, wherein the proximity plot further comprises an graphical indication of the minimum distance between the first space object and a second space object.

In a 16th example, the system for generating a curated data object corresponding to a change in a first one or more movement parameters associated with a first space object, the system comprising: a space object data interface configured to receive a plurality of movement parameters associated with one or more space objects; an uncurated alert database configured to store uncurated alert data objects; a curated alert database configured to store curated alert data objects; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; receive user input comprising a first alert threshold; identify the first space object of the one or more space objects; determine that the first one or more movement parameters associated with the first space object satisfies the first alert threshold; generate and store in the uncurated alert database an uncurated alert data object, based on the determination that the first one or more movement parameters satisfies the first alert threshold, the uncurated alert data object comprising the change in the first one or more movement parameters associated with the first space object; receive user selection configured to generate display data for displaying a magnitude-time plot; determine, based on the first one or more movement parameters associated with the first space object, an orbit of the first space object; receive user selection configured to update the display data for displaying a proximity plot configured to indicate a minimum distance between the first space object and a second space object; receive user selection of an alert-publish selector; and generate and store in the curated alert database, based on the user selection of the alert-publish selector and on the uncurated alert data object, the curated alert data object comprising the change in the first one or more movement parameters associated with the first space object.

In a 17th example, the system of Example 16, wherein the curated alert data object further comprises a destination parameter associated with a first recipient electronic device.

In a 18th example, the system of Example 17, wherein the instructions, when executed by the hardware processor, are further configured to cause the system to: transmit the curated alert data object to a first recipient electronic device and not to a second recipient electronic device based on the destination parameter of the curated data object.

In a 19th example, a system for transmitting a first object alert to a first remote electronic device and not to a second remote electronic device, the system comprising: a space object data interface configured to receive a plurality of movement parameters associated with one or more space objects; an alert data interface configured to transmit the curated data object to the first recipient electronic device; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; receive, from the first remote electronic device via the alert data interface, a first alert criteria; receive, from the second remote electronic device via the alert data interface, a second alert criteria; determine, based on at least one of the first or second alert criteria, a first space object of the one or more space objects; determine that first one or more movement parameters associated with the first space object satisfies the first alert criteria but not the second alert criteria; generate, based on the determination that the first one or more movement parameters satisfies the first alert criteria, the first object alert associated with the first space object, the first object alert corresponding to a change in the first one or more movement parameters associated with the first space object; and transmit, via the alert data interface, the first object alert to the first remote electronic device and not to the second remote electronic device, based on the determination that the first one or more movement parameters associated with the first space object satisfies the first alert criteria but not the second alert criteria.

In a 20th example, the system of Example 19, further comprising a user interface, wherein the instructions, when executed by the hardware processor, are further configured to cause the system to: receive, via the user interface, a user selection configured to generate display data for displaying a magnitude-time plot.

In a 21st example, the system of any of Examples 19-20, wherein the instructions, when executed by the hardware processor, are further configured to cause the system to: determine, based on the first one or more movement parameters associated with the first space object, an orbit of the first space object.

In a 22nd example, the system of any of Examples 19-21, wherein the instructions, when executed by the hardware processor, are further configured to cause the system to: receive user selection configured to generate display data for displaying a proximity plot configured to indicate a minimum distance between the first space object and a second space object.

In a 23rd example, the system of any of Examples 19-22, wherein the instructions, when executed by the hardware processor, are further configured to cause the system to: receive user selection configured to generate, based on the first object alert, a curated data object comprising the first object alert and a destination parameter associated with the first remote electronic device.

In a 24th example, a system for updating a second recipient device identifier of a second space object track to correspond to a first recipient device identifier, the system comprising: a space object data interface configured to receive a the plurality of sets of identifiers; a non-transitory computer readable storage configured to communicate instructions for displaying a plurality of graphs; a hardware processor in communication with the non-transitory computer-readable storage, wherein the instructions, when executed by the hardware processor, are configured to cause the system to: receive, via the space object data interface, the plurality of sets of identifiers, wherein each set of identifiers corresponds to a space object and comprises: a name identifier; a time identifier; a latitude identifier; a longitude identifier; a scalar identifier; and a recipient device identifier; and generate data for displaying a plurality of space object tracks and a tagging interface comprising a stitch selector; receive user selection of first and second space object tracks associated with respective first and second name identifiers and first and second recipient device identifiers; receive user selection of the stitch selector and a recipient device selector; update, based on the user selection of the stitch selector, the second name identifier of the second space object track to correspond to the first name identifier; update the data to display, based on the updated second name identifier of the second space object track, an indication that the first and second space object tracks are associated with the same name identifier; and update, based on the user selection of the recipient device selector, the second recipient device identifier of the second space object track to correspond to the first recipient device identifier.

In a 25th example, the system of Example 24, wherein the instructions, when executed by the processor, are further configured to: receive a first alert threshold; determine that a set of identifiers associated with the first space object satisfies the first alert threshold; and generate, based on the determination that the set of identifiers satisfies the first alert threshold, a first object alert associated with the first space object, the first object alert corresponding to a change in the set of identifiers associated with the first space object.

In a 26th example, the system of Example 25, wherein determining that the set of identifiers associated with the first space object satisfies the first alert threshold comprises determining, based on the set of identifiers associated with the first space object, an orbit of the first space object.

In a 27th example, the system of any of Examples 25-26, wherein the instructions, when executed by the processor, are further configured to: receive user selection configured to update the display data for displaying a proximity plot configured to indicate a minimum distance between the first space object and a second space object.

In a 28th example, the system of any of Examples 25-27, wherein the instructions, when executed by the processor, are further configured to: generate, based on the first object alert, a data object comprising the first object alert and a destination parameter associated with a recipient electronic device; and transmit the data object to the recipient electronic device based on the destination parameter of the data object.

In a 29th example, the system of any of Examples 24-28, wherein the instructions, when executed by the processor, are further configured to: receive user selection configured to generate updated display data for displaying a magnitude-time plot based on one or more of the set of identifiers.

In a 30th example, a system for determining that at least one of first or second object alerts should not be transmitted to a remote electronic device, the system comprising: a space object data interface configured to receive a plurality of movement parameters associated with one or more space objects; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; receive a first alert criteria; determine, based on the first alert criteria, that movement parameters of first and second space objects satisfy the first alert criteria; generate, based on the determination that the movement parameters of the first and second space objects satisfy the first alert criteria, the first and second object alerts each associated with the respective first and second space objects, each of the first and second object alerts comprising respective changes in the corresponding movement parameters associated with the respective first and second space objects; and determine that the first and second object alerts do not satisfy a uniqueness criteria; and determine, based on the determination that the first and second object alerts do not satisfy the uniqueness criteria, that at least one of the first or second object alerts should not be transmitted to the remote electronic device.

In a 31st example, the system of Example 30, wherein the movement parameters of the first and second space objects each comprise one or more sets of identifiers, wherein each set of identifiers comprises: a name identifier; a time identifier; a latitude identifier; and a longitude identifier.

In a 32nd example, the system of Example 31, wherein determining that the first and second object alerts do not satisfy the uniqueness criteria comprises determining that the first space object and the second space object correspond to the same space object.

In a 33rd example, the system of Example 32, wherein determining that the first space object and the second space object correspond to the same space object comprises determining that the first space object and the second space object each comprise the same name identifier.

In a 34th example, the system of Example 32, wherein the instructions, when executed by the hardware processor, are further configured to cause the system to: remove, based on the determination that the first space object and the second space object correspond to the same space object, the second object alert.

In a 35th example, the system of Example 34, wherein determining that the at least one of the first or second object alerts should not be transmitted to the remote electronic device comprises determining that the first object alert, but not the second object alert, should be transmitted to the remote electronic device.

In a 36th example, the system of any of Examples 31-35, wherein each set of identifiers further comprises a recipient device identifier corresponding to an owner or agency associated with the corresponding first and second space objects.

In a 37th example, the system of Example 36, wherein determining that the first and second object alerts do not satisfy the uniqueness criteria comprises determining that the first space object and the second space object have the same recipient device identifier.

In a 38th example, the system of Example 36, wherein determining that the first and second object alerts do not satisfy the uniqueness criteria comprises determining that the first space object and the second space object each have the a recipient device identifier associated with a common set of recipient device identifiers.

In a 39th example, the system of any of Examples 30-38, wherein receiving the first alert criteria is from a first remote electronic device.

In a 40th example, a system for modifying a space object alert, the system comprising: a space object data interface configured to receive a plurality of movement parameters associated with one or more space objects; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; determine, based on the first one or more movement parameters associated with the first space object, an orbit of the first space object; receive an alert threshold; determine, based on the orbit of the first space object, that first one or more movement parameters associated with a first space object satisfies the alert threshold; generate, based on the determination that the first one or more movement parameters satisfies the alert threshold, a first object alert associated with the first space object, the first object alert corresponding to a change in the first one or more movement parameters associated with the first space object; receive user selection configured to update the first one or more movement parameters to include second one or more movement parameters; and modify an alert status of the first space object based on the second one or more movement parameters.

In a 41st example, the system of Example 40, wherein receiving the user selection configured to update the first one or more movement parameters to include second one or more movement parameters comprises adding the second one or more movement parameters to the first one or more movement parameters.

In a 42nd example, the system of any of Examples 40-41, wherein receiving the user selection configured to update the first one or more movement parameters to include second one or more movement parameters comprises replacing the first one or more movement parameters with the second one or more movement parameters.

In a 43rd example, the system of any of Examples 40-42, wherein receiving the user selection configured to update the first one or more movement parameters to include second one or more movement parameters comprises removing one or more movement parameters from the first one or more movement parameters.

In a 44th example, the system of any of Examples 40-43, wherein modifying the alert status of the first space object comprises determining that the second one or more movement parameters associated with a first space object do not satisfy the alert threshold.

In a 45th example, the system of any of Examples 40-44, wherein modifying the alert status of the first space object comprises determining that the second one or more movement parameters associated with a first space object satisfy a second alert threshold.

In a 46th example, the system of any of Examples 40-45, wherein the instructions, when executed by the hardware processor, are configured to cause the system to: receive user selection configured to update the display data for displaying a proximity plot configured to indicate a minimum distance between the first space object and a second space object.

In a 47th example, the system of any of Examples 40-46, wherein the instructions, when executed by the hardware processor, are configured to cause the system to: receive user selection configured to generate display data for displaying a magnitude-time plot.

In a 48th example, the system of any of Examples 40-47, wherein the instructions, when executed by the hardware processor, are configured to cause the system to: receive user selection configured to generate, based on the first object alert, a data object comprising the first object alert and a destination parameter associated with a recipient electronic device; and transmit the data object to the recipient electronic device based on the destination parameter of the data object.

In a 49th example, a system for generating a data object associated with a first space object based on respective times associated with first and second observation points, the system comprising: a space object data interface configured to receive a plurality of movement parameters and observation points associated with one or more space objects; an alert data interface configured to transmit the data object to a remote electronic device; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters and observation points associated with the one or more space objects; receive a maneuver criteria configured to indicate that a space object has performed a maneuver; determine, based on the maneuver criteria, that a first space object of the one or more space objects is active; receive an alert criteria; receive, via the space object data interface, the first and second observation points and a target movement parameter associated with the first space object, wherein each of the first and second observation points are associated with the respective times, wherein the time associated with the first observation point is before a time associated with the target movement parameter, and wherein the time associated with the second observation point is after the time associated with the target movement parameter; determine that the target movement parameter associated with the first space object satisfies the alert criteria; generate, based on the determination that the target movement parameter satisfies the alert criteria and based on the respective times of the first and second observation points, a data object associated with the first space object; and transmit, via the alert data interface, the data object to the remote electronic device.

In a 50th example, the system of Example 49, the system, wherein the first alert criteria is received from a remote electronic device via the alert data interface.

In a 51st example, a system for modifying one or more movement parameters of a data object, the system comprising: a space object data interface configured to receive a plurality of movement parameters associated with one or more space objects; a user interface configured to receive user selection for modifying the data object; a non-transitory, computer-readable storage storing machine-executable instructions; and a hardware processor in communication with the computer-readable storage, wherein the instructions, when executed by the hardware processor, are configured to cause the system to: receive, via the space object data interface, the plurality of movement parameters associated with the one or more space objects; receive a first alert criteria; determine that the one or more movement parameters of a first space object of the one or more space objects satisfies the first alert criteria; generate, based on the determination that the one or more movement parameters satisfies the first alert criteria, the data object associated with the first space object; and modify, based on the user selection via the user interface, the one or more movement parameters of the data object.

In a 52nd example, the system of Example 51, wherein modifying the one or more movement parameters of the data object comprises adding an updated movement parameter to the one or more movement parameters associated with the first space object.

In a 53rd example, the system of any of Examples 51-52, wherein modifying the one or more movement parameters of the data object comprises removing a movement parameter from the one or more movement parameters associated with the first space object.

In a 54th example, the system of any of Examples 51-53, wherein modifying the one or more movement parameters of the data object comprises replacing the one or more movement parameters with a second one or more movement parameters associated with the first space object.

In a 55th example, a system for generating a curated data object corresponding to a change in one or more movement parameters associated with a first space object, the system comprising: a space object data interface configured to receive a plurality of movement parameters associated with one or more space objects; an uncurated alert database configured to store uncurated alert data objects; a curated alert database configured to store curated alert data objects; a non-transitory, computer-readable storage storing executable instructions and a trained model configured to identify an alert event; and a hardware processor in communication with the computer-readable storage, wherein the instructions, when executed by the hardware processor, are configured to cause the system to: receive, via the space object data interface, the plurality of movement parameters associated with the one or more space objects; determine that the one or more movement parameters associated with the first space object satisfies the first alert threshold; generate and store in the uncurated alert database an uncurated alert data object, based on the determination that the one or more movement parameters satisfies the first alert threshold, the uncurated alert data object comprising the change in the one or more movement parameters associated with the first space object; compare the change in the one or more movement parameters of the uncurated alert data object with alert events of the trained model; determine that the uncurated alert data object corresponds to the alert event based on the comparison of the change in the one or more movement parameters of the uncurated alert data object with the alert events of the trained model; and generate and store in the curated alert database, based on the determination that the uncurated alert data object corresponds to the alert event, the curated alert data object comprising the change in the one or more movement parameters associated with the first space object.

In a 56th example, the system of Example 55, wherein the trained model comprises a convolutional neural network trained to identify the alert event based on the one or more movement parameters.

In a 57th example, a system for managing alerts based on detection of movement parameters for space objects, the system comprising: a space object data interface configured to receive a plurality of movement parameters associated with one or more space objects; a non-transitory, computer-readable storage storing machine-executable instructions; and a hardware processor in communication with the computer-readable storage, wherein the instructions, when executed by the hardware processor, are configured to cause the system to: identify a first space object and a first object alert associated with a change in one or more movement parameters of the first space object, wherein the first object alert comprises alert metadata; generate data configured to display a first display region and a first object alert indicator within the first display region, the first object alert indicator corresponding to the first object alert, wherein the data is configured to display the first object alert indicator at a location within the first display region, wherein the location is based on the alert metadata; generate data configured to display, within a second display region, a listing of a plurality of alerts comprising the first object alert; receive, via a user interface, a user selection of an alert from the plurality of alerts configured to be displayed in the second display region; and based on the user selection of the alert, automatically generate updated data configured to display an updated first display region, wherein the updated first display region comprises at least one of a panned, rotated, and/or zoomed perspective of the first display region.

In a 58th example, the system of clause 57, wherein the instructions, when executed by the hardware processor, are further configured to cause the system to: receive a user removal-selection of the first object alert indicator; and generate updated data configured to display the updated first display region without the first object alert indicator.

In a 59th example, the system of clause 57, wherein the instructions, when executed by the hardware processor, are further configured to cause the system to: based on the alert metadata, determine a first state change of the first space object, the first state change comprising one or more of a perturbation of a path of the first space object, a changed attitude, and/or a changed configuration of the first space object; based on the first state change, identify one or more updated movement parameters associated with the first space object; and generate updated data configured to display an indication of the one or more updated movement parameters.

In a 60th example, the system of clause 59, wherein the instructions, when executed by the hardware processor, are further configured to cause the system to: generate updated data configured to display within the updated first display region a longitude-time graph comprising a longitude axis spanning from a lower-longitude limit to an upper-longitude limit and a time axis spanning from a lower-time limit to an upper-time limit.

In a 61st example, the system of clause 59, wherein the instructions, when executed by the hardware processor, are further configured to cause the system to: determine a change in a radiometric attribute associated with the first space object, the one or more updated movement parameters comprising the change in the radiometric attribute.

In a 62nd example, the system of clause 61, wherein the instructions, when executed by the hardware processor, are further configured to cause the system to: determine that the change in the radiometric attribute exceeds a threshold value; based on the determination that the radiometric attribute exceeds a threshold value, determine that the first space object is in one or more of the following: a state of tumble, a state of uncontrolled spin, a state of directed orientation, a state of spin stable, or a state of attitude control.

In a 63rd example, the system of clause 61, wherein the instructions, when executed by the hardware processor, are further configured to cause the system to: based on the radiometric attribute, identify a physical shape of the first space object.

In a 64th example, the system of clause 63, wherein the instructions, when executed by the hardware processor, are further configured to cause the system to: based on the physical shape of the first space object, generate data configured to display the physical shape of the first space object.

In a 65th example, the system of clause 63, wherein the instructions, when executed by the hardware processor, are further configured to cause the system to: based on the physical shape of the first space object, determine a second radiometric attribute of the first space object associated with a time later than a time associated with the first object alert.

In a 66th example, the system of clause 57, wherein the instructions, when executed by the hardware processor, are further configured to cause the system to: generate data configured to display an indication of an orbit of the first space object within at least one of the first display region or the updated first display region.

In a 67th example, the system of clause 57, wherein the instructions, when executed by the hardware processor, are further configured to cause the system to: receive a user selection of a threshold value; based on the threshold value, determine that the first object alert does not exceed the threshold value; and generate updated data configured to display the updated first display region without the first object alert indicator.

In a 68th example, the system of clause 57, wherein the user selection of the first object alert indicator comprises mousing over the first object alert indicator.

In a 69th example, the system of clause 57, wherein the instructions, when executed by the hardware processor, are further configured to cause the system to: generate data configured to display an alert indicator associated with each of the plurality of alerts within one or more of the first display region or the updated first display region.

In a 70th example, the system of clause 69, wherein the instructions, when executed by the hardware processor, are further configured to cause the system to: in response to the user selection of the first object alert indicator, generate updated data configured to highlight the corresponding alert apart from other alerts associated with the others of the plurality of alerts.

In a 71st example, the system of clause 57, wherein the instructions, when executed by the hardware processor, are further configured to cause the system to: determine a first velocity preceding the first object alert; identify a maneuver associated with the first object alert; and based on the maneuver, determine a second velocity of the first space object subsequent to the alert.

In a 72nd example, the system of clause 57, wherein the instructions, when executed by the hardware processor, are further configured to cause the system to: determine an orbit of the first space object; and identify a station keeping maneuver of the first space object, the station keeping maneuver configured to maintain the orbit of the first space object, wherein the first object alert is associated with the station keeping.

In a 73rd example, the system of clause 57, wherein the instructions, when executed by the hardware processor, are further configured to cause the system to: determine a target orbit of the first space object; and identify an orbit transfer of the first space object, wherein the first object alert is associated with a maneuver of the orbit transfer.

In a 74th example, the system of clause 73, wherein the data are configured to display a start time and a stop time associated with the maneuver of the orbit transfer.

In a 75th example, the system of clause 57, wherein the plurality of movement parameters comprises at least one of a translation, a rotation, a deployment of an arm, and/or an opening of a door separation.

In a 76th example, the system of clause 57, wherein the instructions, when executed by the hardware processor, are further configured to cause the system to: generate second data configured to display a second object alert indicator within the first display region, the second object alert indicator corresponding to a second object alert comprising second object metadata, wherein the updated data is configured to display the second object alert indicator at a second location within the first display region, wherein the second location is based on the second alert metadata.

In a 77th example, the system of clause 76, wherein the instructions, when executed by the hardware processor, are further configured to cause the system to: identify a time associated with: receipt of a user removal-selection of the first object alert indicator, the first object alert, and the second object alert; and generate second updated data configured to display, based on the time associated with each of the receipt of a user-removal selection and of the first and second object alerts, the updated first display region without the first object alert indicator but with the second object alert indicator.

In a 78th example, the system of clause 77, wherein the time associated with the first object alert is before the time associated with the receipt of the user removal-selection of the first object alert indicator, and wherein the time associated with the second object alert is after the time associated with the receipt of the user removal-selection of the first object alert indicator.

In a 79th example, the system of clause 76, wherein the instructions, when executed by the hardware processor, are further configured to cause the system to: receive, via a user interface, a user annotation associated with the first object alert, wherein the second data are configured to display the user annotation with the second object alert indicator.

In a 80th example, the system of clause 79, wherein the annotation comprises an indication that the first object alert comprises a true positive.

In a 81st example, a system for managing alerts based on detection of movement parameters for space objects, the system comprising: a space object data interface configured to receive a plurality of movement parameters associated with one or more space objects; a data interface configured to transmit a report of one or more target space objects of the one or more space objects; a non-transitory, computer-readable storage storing machine-executable instructions; and a hardware processor in communication with the computer-readable storage, wherein the instructions, when executed by the hardware processor, are configured to cause the system to: receive an indication of the one or more target space objects; determine that a first space object of the one or more target space objects is associated with a change in one or more movement parameters that exceed a parameter threshold; identify a first object alert associated with the change in the one or more movement parameters of the first space object, wherein the first object alert comprises alert metadata; generate data configured to display a first display region and a first object alert indicator within the first display region, the first object alert indicator corresponding to the first object alert, wherein the data is configured to display the first object alert indicator at a location within the first display region, wherein the location is based on the alert metadata; generate data configured to display, within a second display region, a listing of a plurality of alerts comprising the first object alert; receive, via a user interface, a user selection of an alert from the plurality of alerts configured to be displayed in the second display region; transmit, via the data interface to a remote computing device, the report of the one or more target space objects, wherein transmitting the report is based on the determination that the first space object is associated with the change in one or more movement parameters that exceed a parameter threshold; and based on the user selection of the alert, automatically generate updated data configured to display an updated first display region, wherein the updated first display region comprises at least one of a panned, rotated, and/or zoomed perspective of the first display region.

In a 82nd example, the system of clause 57, wherein the instructions, when executed by the hardware processor, are further configured to cause the system to: receive a user removal-selection of the first object alert indicator; and generate updated data configured to display the updated first display region without the first object alert indicator.

In a 83rd example, the system of clause 57, wherein the instructions, when executed by the hardware processor, are further configured to cause the system to: based on the alert metadata, determine a first state change of the first space object, the first state change comprising one or more of a perturbation of a path of the first space object, a changed attitude, and/or a changed configuration of the first space object; based on the first state change, identify one or more updated movement parameters associated with the first space object; and generate updated data configured to display an indication of the one or more updated movement parameters.

In a 84th example, the system of clause 59, wherein the instructions, when executed by the hardware processor, are further configured to cause the system to: generate updated data configured to display within the updated first display region a longitude-time graph comprising a longitude axis spanning from a lower-longitude limit to an upper-longitude limit and a time axis spanning from a lower-time limit to an upper-time limit.

In a 85th example, the system of clause 60, wherein generating the data configured to display the first display region and the first object alert indicator within the first display region comprises at least one of panning, rotating, and/or zooming the display region such that the location is within the first display region.

In a 86th example, the system of clause 59, wherein the instructions, when executed by the hardware processor, are further configured to cause the system to: determine a change in a radiometric attribute associated with the first space object, the one or more updated movement parameters comprising the change in the radiometric attribute.

In a 87th example, the system of clause 86, wherein the instructions, when executed by the hardware processor, are further configured to cause the system to: determine that the change in the radiometric attribute exceeds a threshold value; and based on the determination that the radiometric attribute exceeds a threshold value, determine that the first space object is in one or more of the following: a state of tumble, a state of uncontrolled spin, a state of directed orientation, a state of spin stable, or a state of attitude control.

In a 88th example, the system of clause 86, wherein the instructions, when executed by the hardware processor, are further configured to cause the system to: based on the radiometric attribute, identify a physical shape of the first space object.

In a 89th example, the system of clause 63, wherein the instructions, when executed by the hardware processor, are further configured to cause the system to: based on the physical shape of the first space object, generate data configured to display the physical shape of the first space object.

In a 90th example, the system of clause 63, wherein the instructions, when executed by the hardware processor, are further configured to cause the system to: based on the physical shape of the first space object, determine a second radiometric attribute of the first space object associated with a time later than a time associated with the first object alert.

In a 91st example, the system of clause 57, wherein the instructions, when executed by the hardware processor, are further configured to cause the system to: generate data configured to display an indication of an orbit of the first space object within at least one of the first display region or the updated first display region.

In a 92nd example, the system of clause 57, wherein the instructions, when executed by the hardware processor, are further configured to cause the system to: receive a user selection of a threshold value; based on the threshold value, determine that the first object alert does not exceed the threshold value; and generate updated data configured to display the updated first display region without the first object alert indicator.

In a 93rd example, the system of clause 57, wherein the user selection of the first object alert indicator comprises mousing over the first object alert indicator.

In a 94th example, the system of clause 57, wherein the instructions, when executed by the hardware processor, are further configured to cause the system to: generate data configured to display an alert indicator associated with each of the plurality of alerts within one or more of the first display region or the updated first display region.

In a 95th example, the system of clause 69, wherein the instructions, when executed by the hardware processor, are further configured to cause the system to: in response to the user selection of the first object alert indicator, generate updated data configured to highlight the corresponding alert apart from other alerts associated with the others of the plurality of alerts.

In a 96th example, the system of clause 57, wherein the instructions, when executed by the hardware processor, are further configured to cause the system to: determine a first velocity preceding the first object alert; identify a maneuver associated with the first object alert; and based on the maneuver, determine a second velocity of the first space object subsequent to the alert.

In a 97th example, the system of clause 57, wherein the instructions, when executed by the hardware processor, are further configured to cause the system to: determine an orbit of the first space object; and identify a station keeping maneuver of the first space object, the station keeping maneuver configured to maintain the orbit of the first space object, wherein the first object alert is associated with the station keeping.

In a 98th example, the system of clause 57, wherein the instructions, when executed by the hardware processor, are further configured to cause the system to: determine a target orbit of the first space object; and identify an orbit transfer of the first space object, wherein the first object alert is associated with a maneuver of the orbit transfer.

In a 99th example, the system of clause 73, wherein the data are configured to display a start time and a stop time associated with the maneuver of the orbit transfer.

In a 100th example, the system of clause 57, wherein the plurality of movement parameters comprises at least one of a translation, a rotation, a deployment of an arm, and/or an opening of a door separation.

In a 101st example, the system of clause 57, wherein the instructions, when executed by the hardware processor, are further configured to cause the system to: generate second data configured to display a second object alert indicator within the first display region, the second object alert indicator corresponding to a second object alert comprising second object metadata, wherein the second data is configured to display the second object alert indicator at a second location within the first display region, wherein the second location is based on the second alert metadata.

In a 102nd example, the system of clause 76, wherein the instructions, when executed by the hardware processor, are further configured to cause the system to: receive a user removal-selection of the first object alert indicator; identify a time associated with: receipt of the user removal-selection of the first object alert indicator, the first object alert, and the second object alert; and generate second updated data configured to display, based on the time associated with each of the receipt of the user removal-selection and of the first and second object alerts, the second updated first display region without the first object alert indicator but with the second object alert indicator.

In a 103rd example, the system of clause 77, wherein the time associated with the first object alert is before the time associated with the receipt of the user removal-selection of the first object alert indicator, and wherein the time associated with the second object alert is after the time associated with the receipt of the user removal-selection of the first object alert indicator.

In a 104th example, the system of clause 76, wherein the instructions, when executed by the hardware processor, are further configured to cause the system to: receive, via a user interface, a user annotation associated with the first object alert, wherein the second data are configured to display the user annotation with the second object alert indicator.

In a 105th example, the system of clause 79, wherein the annotation comprises an indication that the first object alert comprises a true positive.

In a 106th example, the system of clause 76, wherein generating the second data comprises at least one of panning, rotating, and/or zooming the display region such that the location and the second location are within the first display region.

In a 107th example, a system for managing alerts based on detection of movement parameters for space objects, the system comprising: a space object data interface configured to receive a plurality of movement parameters associated with one or more space objects; a data interface configured to transmit a report of one or more target space objects of the one or more space objects; a non-transitory, computer-readable storage storing machine-executable instructions; and a hardware processor in communication with the computer-readable storage, wherein the instructions, when executed by the hardware processor, are configured to cause the system to: receive an indication of the one or more target space objects; determine that a first space object of the one or more target space objects is associated with a change in one or more movement parameters that exceed a parameter threshold; identify a first object alert associated with the change in the one or more movement parameters of the first space object, wherein the first object alert comprises alert metadata; generate data configured to display a first display region and a first object alert indicator within the first display region, the first object alert indicator corresponding to the first object alert; generate data configured to display, within a second display region, a listing of a plurality of alerts comprising the first object alert; receive, via a user interface, a user selection of an alert from the plurality of alerts configured to be displayed in the second display region; and transmit, via the data interface to a remote computing device, the report of the one or more target space objects, wherein transmitting the report is based on the determination that the first space object is associated with a change in one or more movement parameters that exceed a parameter threshold.

In a 108th example, a system for generating updated data configured to display an annotation of a maneuver associated with a first space object, the system comprising: a space object data interface configured to receive a plurality of movement parameters and positional indicators associated with one or more space objects; a data interface configured to transmit a report of one or more target space objects of the one or more space objects; a non-transitory, computer-readable storage storing machine-executable instructions; and a hardware processor in communication with the computer-readable storage, wherein the instructions, when executed by the hardware processor, are configured to cause the system to: receive data associated with the one or more target space objects; generate data configured to display, within a first display region, a longitude-time plot and an indication of at least the first space object of the one or more target space objects within the longitude-time plot based at least on the positional indicators associated with the first space object; determine, based at least on positional indicators associated with the first space object, an orbital path of the first space object; identify the maneuver associated with the first space object; generate updated data configured to display, within the longitude-time plot, the annotation of the maneuver.

In a 109th example, the system of claim 108, wherein the indication of the one or more target space objects comprises a user selection, via a user interface, of the one or more target space objects.

In a 110th example, the system of claim 108, wherein identifying the maneuver associated with the first space object comprises receiving a user selection, via a user interface, of maneuver parameters associated with the maneuver.

In a 111th example, the system of claim 108, wherein identifying the maneuver associated with the first space object comprises determining maneuver parameters associated with the maneuver based at least in part on the movement parameters associated with the first space object.

In a 112th example, the system of claim 111, wherein determining the maneuver parameters is further based on the orbital path.

In a 113th example, the system of claim 108, wherein displaying, within the longitude-time plot, the indication of the maneuver comprises displaying the annotation at a location within the longitude-time plot based on maneuver parameters of the maneuver.

In a 114th example, the system of claim 108, wherein the instructions, when executed by the hardware processor, are further configured to cause the system to: transmit, via the data interface to a remote computing device, maneuver parameters associated with the maneuver.

In a 115th example, the system of claim 114, wherein transmitting the maneuver parameters is based on a determination that the first space object is associated with a change in one or more movement parameters that exceed a parameter threshold.

In a 116th example, the system of claim 115, wherein the instructions, when executed by the hardware processor, are further configured to cause the system to: update a display of the longitude-time plot, wherein the updated display of the longitude-time plot comprises at least one of a panned, rotated, and/or zoomed perspective of the longitude-time plot.

CONCLUSION

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose computers. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may comprise connected logic units, such as gates and flip-flops, and/or may comprise programmable units, such as programmable gate arrays, application specific integrated circuits, and/or processors. The modules described herein may be implemented as software modules, or may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of non-transitory computer-readable medium or other non-transitory computer storage device. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with patients, health care practitioners, administrators, other systems, components, programs, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the example embodiments which follow should not be limited by the particular embodiments described above.

What is claimed:

1. A system for transmitting a curated data object to a first recipient electronic device and not to a second recipient electronic device, the system comprising:
   a space object data interface configured to receive a plurality of movement parameters associated with one or more space objects;
   an alert data interface configured to transmit the curated data object to the first recipient electronic device;
   a non-transitory, computer-readable storage storing machine-executable instructions; and
   a hardware processor in communication with the non-transitory, computer-readable storage, wherein the instructions, when executed by the hardware processor, are configured to cause the system to:
      receive, via the space object data interface, the plurality of movement parameters associated with the one or more space objects;
      receive user input comprising a first alert threshold;
      identify a first space object of the one or more space objects;
      determine that first one or more movement parameters associated with the first space object satisfies the first alert threshold;
      generate, based on the determination that the first one or more movement parameters satisfies the first alert threshold, a first object alert associated with the first space object, the first object alert corresponding to a change in the first one or more movement parameters associated with the first space object;
      receive user selection configured to generate display data for displaying a magnitude-time plot;
      determine, based on the first one or more movement parameters associated with the first space object, an orbit of the first space object;
      receive user selection configured to update the display data for displaying a proximity plot configured to indicate a minimum distance between the first space object and a second space object;
      receive user selection configured to generate, based on the first object alert, the curated data object comprising the first object alert and a destination parameter associated with the first recipient electronic device; and
      transmit, via the alert data interface, the curated data object to the first recipient electronic device and not to the second recipient electronic device based on the destination parameter of the curated data object.

2. The system of claim 1, wherein the instructions, when executed by the hardware processor, are further configured to cause the system to:
   generate updated data configured to display a first display region and a first object alert indicator within the first display region, the first object alert indicator corresponding to the first object alert, wherein the updated data is configured to display the first object alert indicator at a location within the first display region, wherein the location is based on the curated data object.

3. The system of claim 2, wherein the instructions, when executed by the hardware processor, are further configured to cause the system to:
   generate data configured to display, within a second display region, a listing of a plurality of alerts comprising the first object alert.

4. The system of claim 3, wherein the instructions, when executed by the hardware processor, are further configured to cause the system to:
   receive, via a user interface, a user selection of an alert from the plurality of alerts configured to be displayed in the second display region; and
   based on the user selection of the alert, automatically generate updated data configured to display an updated first display region, wherein the updated first display region comprises at least one of a panned, rotated, and/or zoomed perspective of the first display region.

5. The system of claim 1, wherein determining the orbit of the first space object is based on a set of the movement parameters of the first space object collected over a selected time period.

6. The system of claim 5, wherein the set of the movement parameters of the first space object are associated with corresponding timepoints of the first space object, and wherein determining the orbit of the first space object is based on the corresponding timepoints.

7. The system of claim 6, wherein the orbit of the first space object is based on a first time period that (i) overlaps the selected time period, (ii) precedes the selected time period, (iii) succeeds the selected time period, or (iv) any combination thereof, the selected time period spanning from a lower-time limit to an upper-time limit.

8. The system of claim 7, wherein the instructions, when executed by the hardware processor, are further configured to cause the system to:
generate a display interface comprising:
a time axis spanning from the lower-time limit to the upper-time limit; and
an indication of the orbit spanning at least the first time period.

9. The system of claim 1, wherein the first one or more movement parameters of the first space object comprise one or more sets of identifiers, wherein each set of identifiers comprises:
a name identifier;
a time identifier;
a latitude identifier; and
a longitude identifier.

10. The system of claim 9, wherein the magnitude-time plot comprises:
a magnitude axis spanning from a lower-magnitude limit to an upper-magnitude limit,
a time axis spanning from a lower-time limit to an upper-time limit; and
a plurality of pixels corresponding to a plurality of magnitude-time points within the magnitude-time plot, each of the plurality of magnitude-time points corresponding to a set of identifiers having a time identifier between the lower-time limit and the upper-time limit and having a magnitude identifier between the lower-magnitude limit and the upper-magnitude limit.

11. The system of claim 10, wherein the instructions, when executed by the hardware processor, are further configured to cause the system to:
in response to a user selection of a set of identifiers, highlight one or more pixels corresponding to respective magnitude-time points, wherein each pixel of the one or more pixels corresponds to magnitude-time points comprising a common name identifier.

12. The system of claim 2, wherein the instructions, when executed by the hardware processor, are further configured to cause the system to:
receive a user selection of the first object alert indicator, wherein generating the curated data object is in response to user selection of the first object alert indicator.

13. The system of claim 1, wherein a transmission of the curated data object to the first recipient electronic device and not the second recipient electronic device is based on one or more transmission criteria, wherein the one or more transmission criteria comprise one or more of a time of day, a user command, a proximity of the first space object with the second space object at a current time, a determination that the first object alert is associated with a time before the current time, or a determination that the first object alert is associated with a time after the current time.

14. The system of claim 9, wherein the proximity plot comprises:
a distance axis spanning from a lower-distance limit to an upper-distance limit,
a time axis spanning from a lower-time limit to an upper-time limit;
a plurality of pixels corresponding to a plurality of distance-time points within a distance-time plot, each of the plurality of distance-time points corresponding to a set of identifiers having a time identifier between the lower-time limit and the upper-time limit and having a distance identifier between the lower-distance limit and the upper-distance limit; and
an indication of the orbit of the first space object in relation to an indication of a path of the second space object.

15. The system of claim 14, wherein the proximity plot further comprises a graphical indication of the minimum distance between the first space object and a second space object.

16. A system for generating a curated data object corresponding to a change in a first one or more movement parameters associated with a first space object, the system comprising:
a space object data interface configured to receive a plurality of movement parameters associated with one or more space objects;
an uncurated alert database configured to store uncurated alert data objects;
a curated alert database configured to store curated alert data objects;
a non-transitory, computer-readable storage storing machine-executable instructions; and
a hardware processor in communication with the non-transitory, computer-readable storage, wherein the instructions, when executed by the hardware processor, are configured to cause the system to:
receive, via the space object data interface, the plurality of movement parameters associated with the one or more space objects;
receive user input comprising a first alert threshold;
identify the first space object of the one or more space objects;
determine that the first one or more movement parameters associated with the first space object satisfies the first alert threshold;
generate and store in the uncurated alert database an uncurated alert data object, based on the determination that the first one or more movement parameters satisfies the first alert threshold, the uncurated alert data object comprising the change in the first one or more movement parameters associated with the first space object;
receive user selection configured to generate display data for displaying a magnitude-time plot;
determine, based on the first one or more movement parameters associated with the first space object, an orbit of the first space object;
receive user selection configured to update the display data for displaying a proximity plot configured to indicate a minimum distance between the first space object and a second space object;
receive user selection of an alert-publish selector; and
generate and store in the curated alert database, based on the user selection of the alert-publish selector and on the uncurated alert data object, a curated alert data object comprising the change in the first one or more movement parameters associated with the first space object.

17. The system of claim 16, wherein the curated alert data object further comprises a destination parameter associated with a first recipient electronic device.

18. The system of claim 17, wherein the instructions, when executed by the hardware processor, are further configured to cause the system to:
transmit the curated alert data object to a first recipient electronic device and not to a second recipient electronic device based on the destination parameter of the curated data object.

19. A system for transmitting a first object alert to a first remote electronic device and not to a second remote electronic device, the system comprising:
a space object data interface configured to receive a plurality of movement parameters associated with one or more space objects;
an alert data interface configured to transmit a curated data object to the first remote electronic device;
a non-transitory, computer-readable storage storing machine-executable instructions; and
a hardware processor in communication with the non-transitory, computer-readable storage, wherein the instructions, when executed by the hardware processor, are configured to cause the system to:
receive, via the space object data interface, the plurality of movement parameters associated with the one or more space objects;
receive, from the first remote electronic device via the alert data interface, a first alert criteria;
receive, from the second remote electronic device via the alert data interface, a second alert criteria;
determine, based on at least one of the first or second alert criteria, a first space object of the one or more space objects;
determine that first one or more movement parameters associated with the first space object satisfies the first alert criteria but not the second alert criteria;
generate, based on the determination that the first one or more movement parameters satisfies the first alert criteria, the first object alert associated with the first space object, the first object alert corresponding to a change in the first one or more movement parameters associated with the first space object; and
transmit, via the alert data interface, the first object alert to the first remote electronic device and not to the second remote electronic device, based on the determination that the first one or more movement parameters associated with the first space object satisfies the first alert criteria but not the second alert criteria.

20. The system of claim 19, further comprising a user interface, wherein the instructions, when executed by the hardware processor, are further configured to cause the system to:
receive, via the user interface, a user selection configured to generate display data for displaying a magnitude-time plot.

21. The system of claim 19, wherein the instructions, when executed by the hardware processor, are further configured to cause the system to:
determine, based on the first one or more movement parameters associated with the first space object, an orbit of the first space object.

22. The system of claim 19, wherein the instructions, when executed by the hardware processor, are further configured to cause the system to:
receive user selection configured to generate display data for displaying a proximity plot configured to indicate a minimum distance between the first space object and a second space object.

23. The system of claim 19, wherein the instructions, when executed by the hardware processor, are further configured to cause the system to:
receive user selection configured to generate, based on the first object alert, a curated data object comprising the first object alert and a destination parameter associated with the first remote electronic device.

* * * * *